(12) United States Patent
Publicover et al.

(10) Patent No.: US 11,172,775 B2
(45) Date of Patent: *Nov. 16, 2021

(54) STANDING SURFACE TO ENCOURAGE MOVEMENT

(71) Applicant: JumpSport, Inc., Saratoga, CA (US)

(72) Inventors: Mark W. Publicover, Saratoga, CA (US); Daniel H. Publicover, Saratoga, CA (US); William Knight Foster, Saratoga, CA (US); Kevin B. Charles, Millbrae, CA (US)

(73) Assignee: JumpSport, Inc., Saratoga, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 16/102,588

(22) Filed: Aug. 13, 2018

(65) Prior Publication Data

US 2018/0360250 A1  Dec. 20, 2018

Related U.S. Application Data

(63) Continuation of application No. 15/437,349, filed on Feb. 20, 2017, now Pat. No. 10,045,647, which is a
(Continued)

(51) Int. Cl.
*A63B 23/10* (2006.01)
*A63B 23/035* (2006.01)
(Continued)

(52) U.S. Cl.
CPC ............ *A47G 27/0212* (2013.01); *A63B 5/11* (2013.01); *A63B 21/023* (2013.01);
(Continued)

(58) Field of Classification Search
CPC .............. A47G 27/0212; A47G 27/023; A47G 27/0231; A63B 21/4034; A63B 21/4037;
(Continued)

(56) References Cited

U.S. PATENT DOCUMENTS 3,434,715 A   3/1969   Brantingham et al.
4,710,415 A   12/1987  Slosberg et al.
(Continued)

FOREIGN PATENT DOCUMENTS

CA     871096 A      5/1971
JP     2007-68784 A  3/2007

OTHER PUBLICATIONS

European Patent Office, Supplementary European Search Report, dated Nov. 6, 2018, issued in European Patent Application No. 16787095.5.
(Continued)

*Primary Examiner* — Joanna Pleszczynska
(74) *Attorney, Agent, or Firm* — Klarquist Sparkman, LLP

(57) ABSTRACT

A shaped standing mat or base providing a trampoline-like rebounding surface that is a highly responsive and dynamic support surface for a standing person where that person is able to maintain a proper stance relative to their foot angle, and to engage in mild exercise movement and foot rotation and stretching without undue interruption of mental concentration in a work or other environment.

20 Claims, 98 Drawing Sheets

Related U.S. Application Data continuation of application No. PCT/US2016/029618, filed on Apr. 27, 2016.

(60) Provisional application No. 62/245,268, filed on Oct. 22, 2015, provisional application No. 62/211,856, filed on Aug. 30, 2015, provisional application No. 62/182,429, filed on Jun. 19, 2015, provisional application No. 62/153,505, filed on Apr. 27, 2015.

(51) Int. Cl.

| | | |
|---|---|---|
| *A63B 22/18* | (2006.01) | |
| *A47G 27/02* | (2006.01) | |
| *B32B 3/02* | (2006.01) | |
| *A63B 21/068* | (2006.01) | |
| *A63B 5/11* | (2006.01) | |
| *A63B 21/02* | (2006.01) | |
| *A63B 21/055* | (2006.01) | |
| *A63B 21/06* | (2006.01) | |
| *B32B 27/06* | (2006.01) | |
| *A63B 21/00* | (2006.01) | |
| *A63B 21/04* | (2006.01) | |
| *A63B 23/08* | (2006.01) | |
| *A63B 26/00* | (2006.01) | |
| *A63B 22/00* | (2006.01) | |
| *A63B 23/00* | (2006.01) | |
| *A63B 71/00* | (2006.01) | |
| *A63B 71/06* | (2006.01) | |
| *A61H 7/00* | (2006.01) | |
| *B32B 5/02* | (2006.01) | |
| *B32B 5/18* | (2006.01) | |
| *B32B 5/24* | (2006.01) | |
| *B32B 7/02* | (2019.01) | |
| *B32B 7/08* | (2019.01) | |
| *B32B 7/12* | (2006.01) | |
| *B32B 21/04* | (2006.01) | |
| *B32B 27/08* | (2006.01) | |
| *B32B 27/30* | (2006.01) | |
| *B32B 27/32* | (2006.01) | |
| *B32B 27/40* | (2006.01) | |
| *B32B 29/00* | (2006.01) | |
| *B32B 3/04* | (2006.01) | |
| *B32B 3/08* | (2006.01) | |
| *B32B 3/18* | (2006.01) | |
| *B32B 3/20* | (2006.01) | |
| *B32B 3/26* | (2006.01) | |

(52) U.S. Cl.
CPC ...... *A63B 21/0442* (2013.01); *A63B 21/0552* (2013.01); *A63B 21/0602* (2013.01); *A63B 21/068* (2013.01); *A63B 21/4034* (2015.10); *A63B 21/4037* (2015.10); *A63B 22/18* (2013.01); *A63B 23/03533* (2013.01); *A63B 23/08* (2013.01); *A63B 23/10* (2013.01); *A63B 26/003* (2013.01); *B32B 27/065* (2013.01); *A47G 27/0231* (2013.01); *A61H 7/001* (2013.01); *A61H 2201/1284* (2013.01); *A61H 2201/1695* (2013.01); *A61H 2203/0406* (2013.01); *A61H 2205/12* (2013.01); *A63B 21/00061* (2013.01); *A63B 21/00065* (2013.01); *A63B 21/00072* (2013.01); *A63B 21/026* (2013.01); *A63B 21/0428* (2013.01); *A63B 21/0557* (2013.01); *A63B 23/03541* (2013.01); *A63B 2022/0097* (2013.01); *A63B 2023/006* (2013.01); *A63B 2071/0063* (2013.01); *A63B 2071/0694* (2013.01); *A63B 2208/0204* (2013.01); *A63B 2208/0209* (2013.01); *A63B 2209/02* (2013.01); *A63B 2209/08* (2013.01); *A63B 2209/10* (2013.01); *A63B 2209/14* (2013.01); *A63B 2225/09* (2013.01); *A63B 2225/096* (2013.01); *A63B 2225/50* (2013.01); *A63B 2225/62* (2013.01); *B32B 3/02* (2013.01); *B32B 3/04* (2013.01); *B32B 3/08* (2013.01); *B32B 3/18* (2013.01); *B32B 3/20* (2013.01); *B32B 3/26* (2013.01); *B32B 3/263* (2013.01); *B32B 3/266* (2013.01); *B32B 5/02* (2013.01); *B32B 5/18* (2013.01); *B32B 5/245* (2013.01); *B32B 7/02* (2013.01); *B32B 7/08* (2013.01); *B32B 7/12* (2013.01); *B32B 21/04* (2013.01); *B32B 27/08* (2013.01); *B32B 27/304* (2013.01); *B32B 27/32* (2013.01); *B32B 27/40* (2013.01); *B32B 29/002* (2013.01); *B32B 2262/06* (2013.01); *B32B 2262/08* (2013.01); *B32B 2262/101* (2013.01); *B32B 2262/106* (2013.01); *B32B 2307/302* (2013.01); *B32B 2307/546* (2013.01); *B32B 2471/04* (2013.01); *B32B 2535/00* (2013.01)

(58) Field of Classification Search
CPC . A63B 21/068; A63B 22/18; A63B 23/03533; A63B 23/10; A63B 26/003; A63B 23/03541; A63B 2071/0063; A63B 2208/0204; A63B 2208/0209; A63B 2225/62; A62H 2205/12; B32B 3/02; B32B 2307/546; B32B 2471/04
See application file for complete search history.

(56) References Cited

U.S. PATENT DOCUMENTS

| | | |
|---|---|---|
| 5,062,629 A | 11/1991 | Vaughan |
| 5,160,785 A | 11/1992 | Davidson, Jr. |
| 5,351,637 A | 10/1994 | Brenckmann |
| 5,567,497 A | 10/1996 | Zegler et al. |
| 5,645,914 A | 7/1997 | Horowitz |
| 5,956,650 A | 9/1999 | Suzuki et al. |
| 5,965,650 A | 10/1999 | Brodeur, Jr. et al. |
| 6,061,980 A | 5/2000 | Poiencot |
| 6,168,551 B1 | 1/2001 | McGuinness |
| 6,323,251 B1 | 11/2001 | Perez et al. |
| 6,340,514 B1 | 1/2002 | Kerr et al. |
| 6,420,015 B1 | 7/2002 | Nord et al. |
| 6,589,631 B1 | 7/2003 | Suzuki et al. |
| 6,599,615 B2 | 7/2003 | Burke, III et al. |
| 6,605,343 B1 | 8/2003 | Motoi et al. |
| 6,719,248 B2 | 4/2004 | Lamont |
| 6,767,630 B2 | 7/2004 | Okuyama |
| 6,851,141 B2 | 2/2005 | McMahan |
| 6,921,502 B1 | 7/2005 | Nord et al. |
| 7,254,852 B2 | 8/2007 | Martin |
| 7,300,392 B1 | 11/2007 | Curran |
| 7,445,833 B2 | 11/2008 | Polley |
| 7,462,142 B1 * | 12/2008 | Gordon .............. A63B 6/00 482/142 |
| 7,566,291 B2 | 7/2009 | Lickle |
| 7,575,795 B2 | 8/2009 | Scott et al. |
| 7,575,796 B2 | 8/2009 | Scott et al. |
| 7,662,006 B2 | 2/2010 | Mollis |
| 7,670,265 B1 | 3/2010 | Forrest |
| 7,686,751 B2 | 3/2010 | Carlson et al. |
| 7,754,127 B2 | 7/2010 | McMahan |
| 8,034,274 B1 | 10/2011 | McMahan |
| 8,241,726 B2 | 8/2012 | Scott et al. |
| 8,677,532 B2 | 3/2014 | Legare |
| 8,734,308 B1 | 5/2014 | Joslin |
| 8,834,220 B2 | 9/2014 | Haller |
| 9,114,862 B2 | 8/2015 | Dingel |

(56) References Cited

U.S. PATENT DOCUMENTS

| | | |
|---|---|---|
| 9,724,586 B2 | 8/2017 | Smith et al. |
| 2003/0153221 A1 | 8/2003 | Weir |
| 2003/0186025 A1 | 10/2003 | Scott et al. |
| 2003/0203164 A1 | 10/2003 | Healy et al. |
| 2004/0022985 A1 | 2/2004 | Higgins et al. |
| 2004/0137212 A1 | 7/2004 | Ochoa et al. |
| 2004/0142619 A1 | 7/2004 | Ueno et al. |
| 2005/0049123 A1* | 3/2005 | Dalebout ............ A63B 21/0552 482/142 |
| 2006/0172122 A1 | 8/2006 | Polley |
| 2007/0154672 A1 | 7/2007 | Higgins et al. |
| 2007/0155495 A1 | 7/2007 | Goo |
| 2008/0154158 A1 | 6/2008 | Brown |
| 2009/0049757 A1 | 2/2009 | Potter |
| 2010/0234189 A1* | 9/2010 | Freitag ................... A63B 6/00 482/79 |
| 2010/0237082 A1 | 9/2010 | Fernandez |
| 2011/0240212 A1 | 10/2011 | McMahan |
| 2011/0244193 A1 | 10/2011 | Kehrle et al. |
| 2011/0318523 A1 | 12/2011 | Todd |
| 2012/0024454 A1 | 2/2012 | McMahan |
| 2012/0101635 A1 | 4/2012 | Datema |
| 2013/0084413 A1 | 4/2013 | McMahan et al. |
| 2013/0084427 A1 | 4/2013 | Ernst |
| 2013/0288866 A1* | 10/2013 | Rainey .................. A63B 22/18 482/146 |
| 2014/0196998 A1 | 7/2014 | Nauman et al. |
| 2015/0351573 A1 | 12/2015 | Heath |

OTHER PUBLICATIONS

World Intellectual Property Organization, International Search Report, dated Aug. 5, 2016, issued in PCT Application No. PCT/US2016/029618.

World Intellectual Property Organization, Written Opinion, dated Aug. 5, 2016, issued in PCT Apnlication No. PCT/US2016/029618.

\* cited by examiner

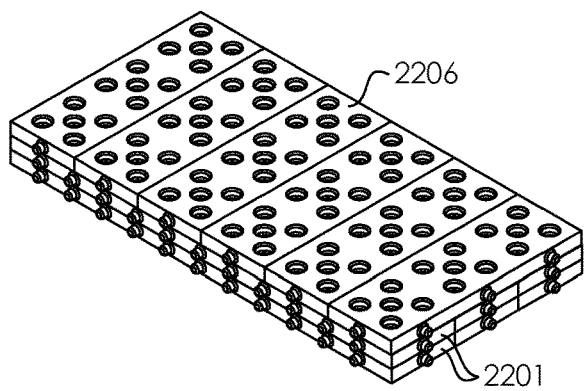
Fig. 22J
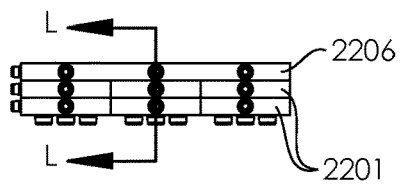
Fig. 22K
Fig. 22L
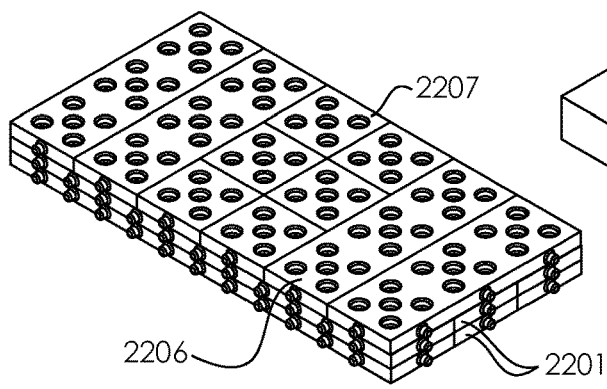
Fig. 22M
Fig. 22N
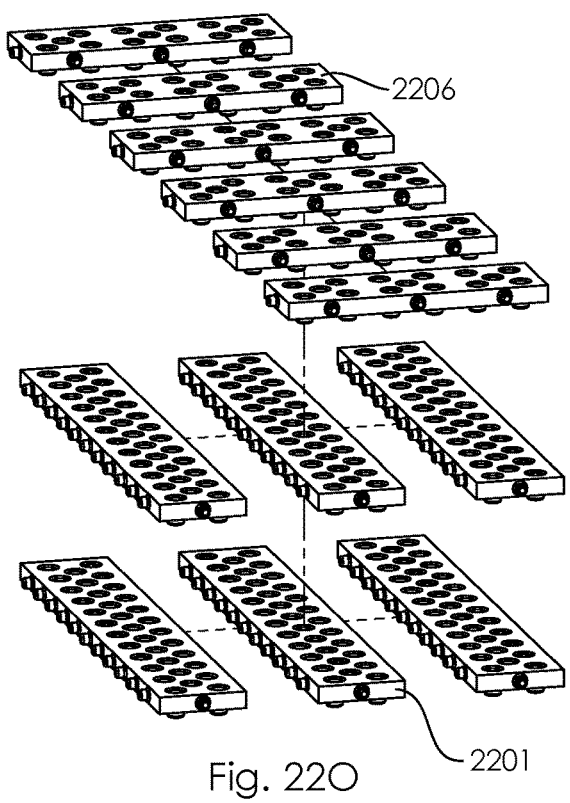
Fig. 22O
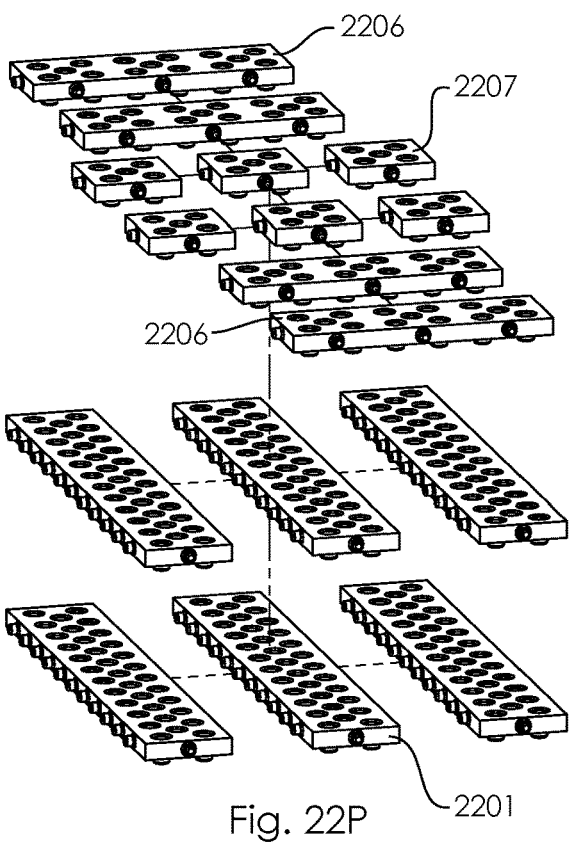
Fig. 22P

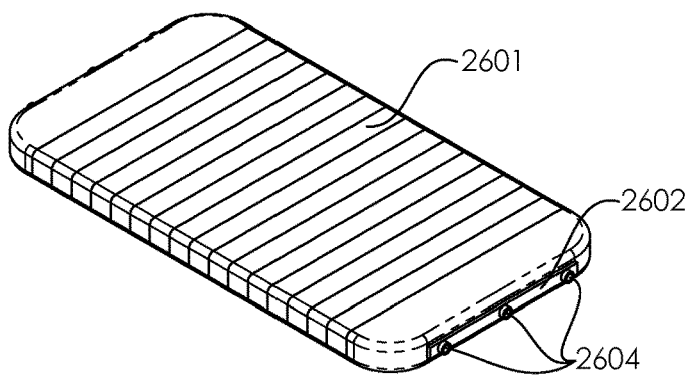
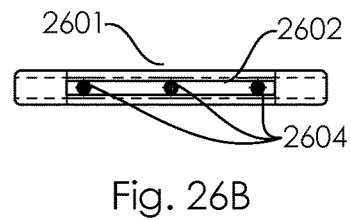
Fig. 26A
Fig. 26B
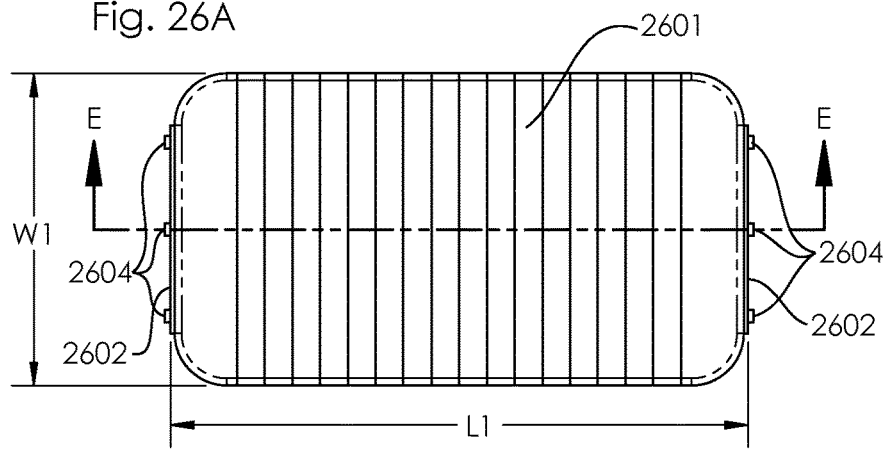
Fig. 26C
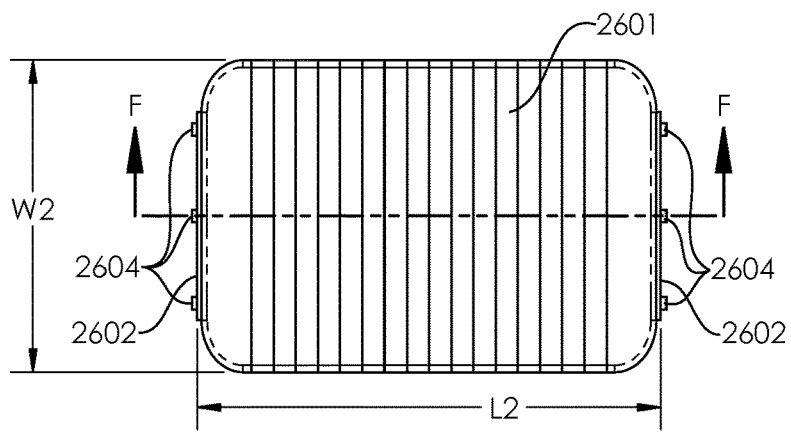
Fig. 26D
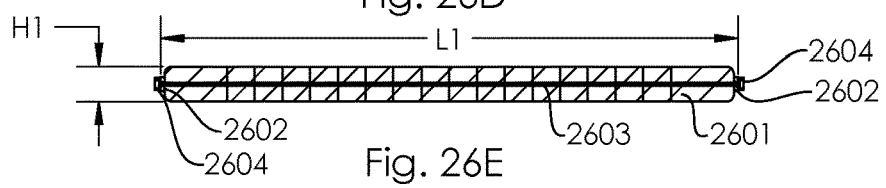
Fig. 26E
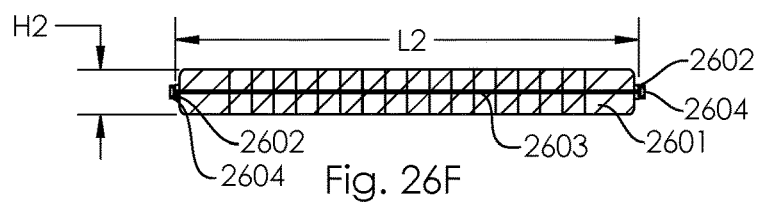
Fig. 26F

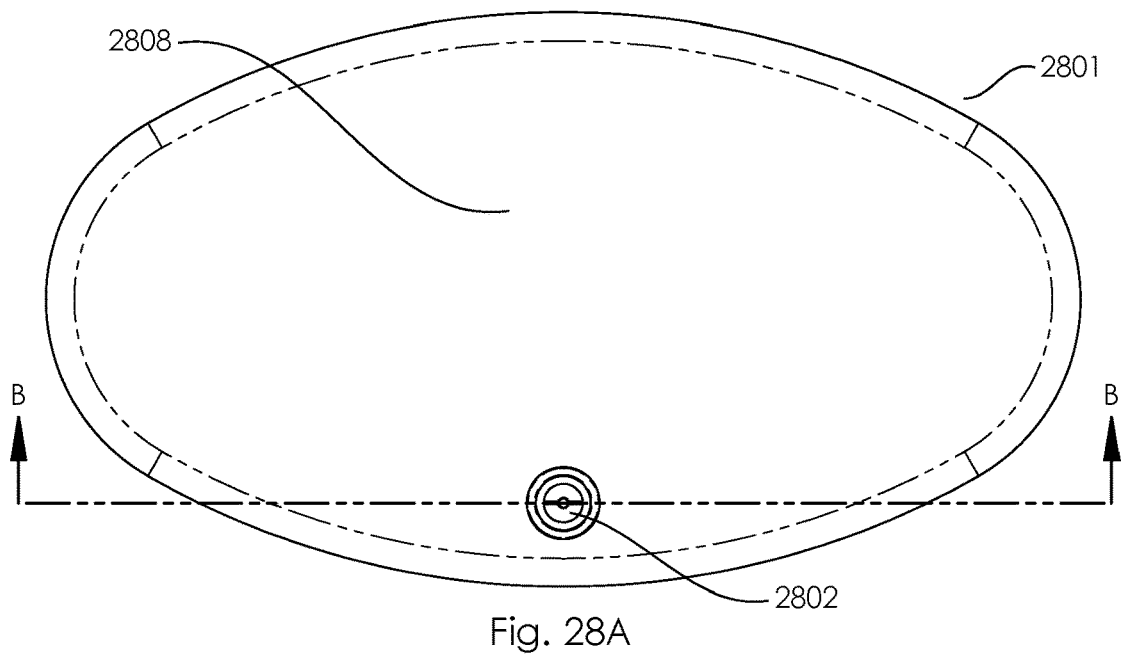
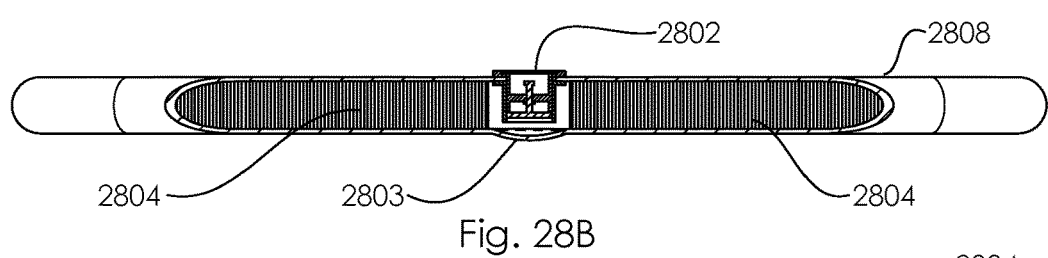
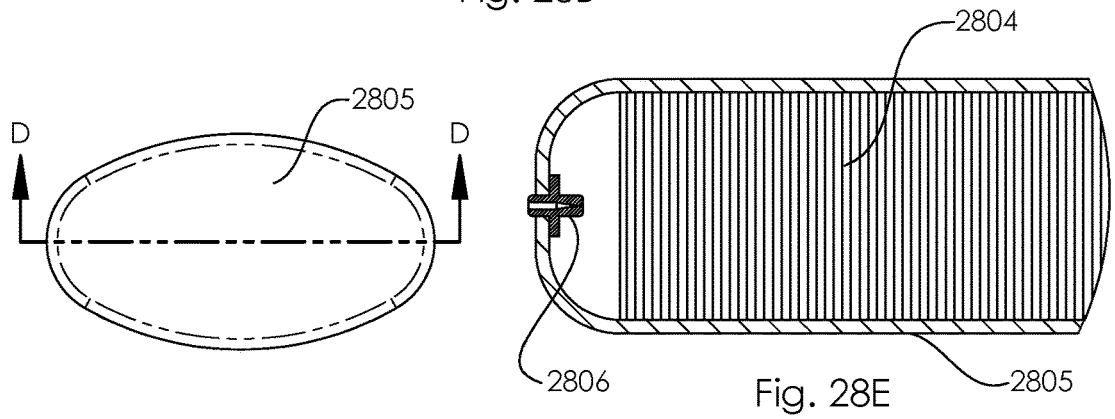
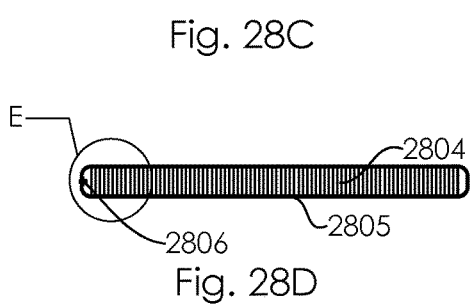
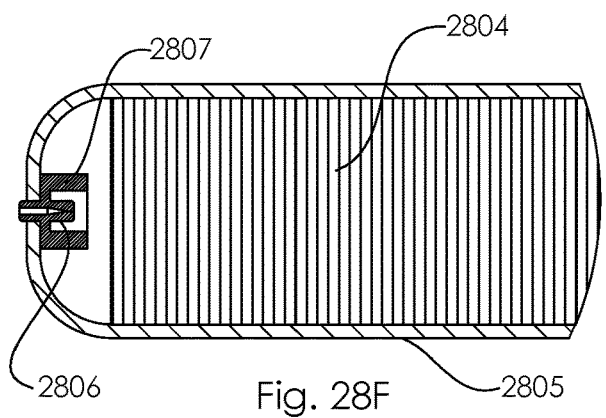

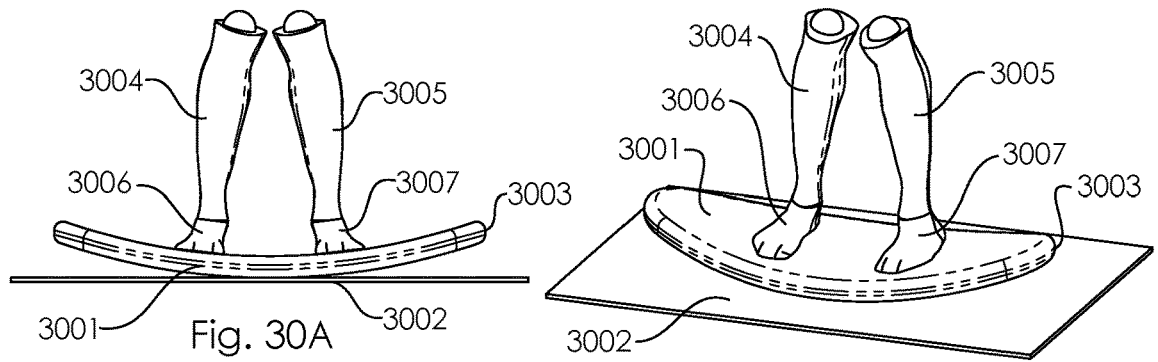
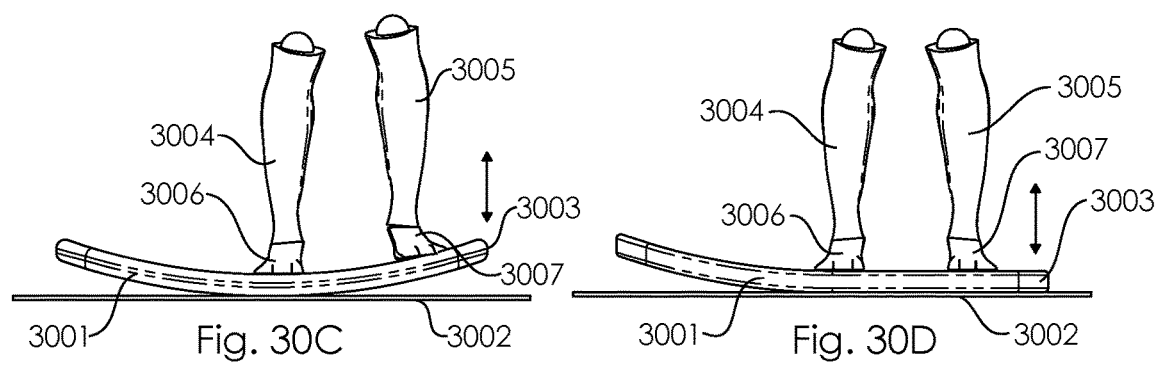
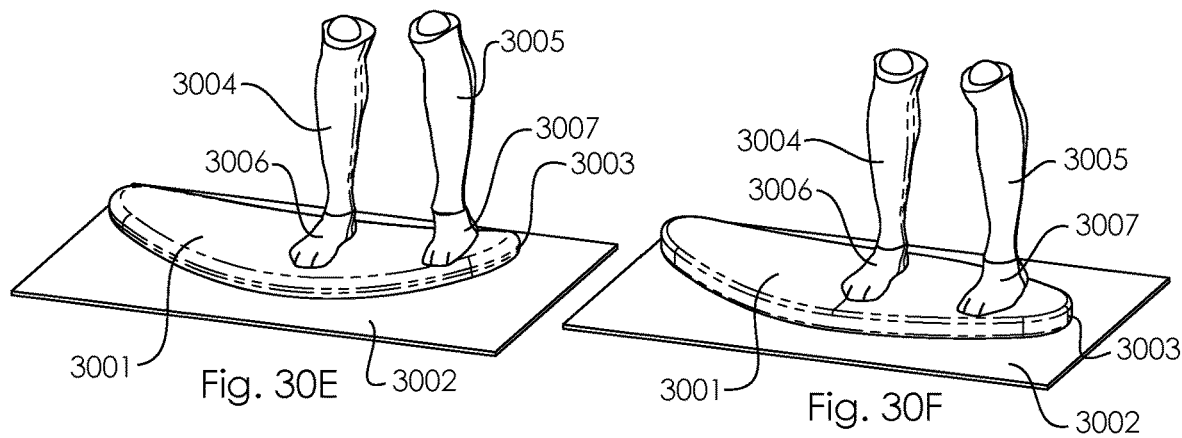
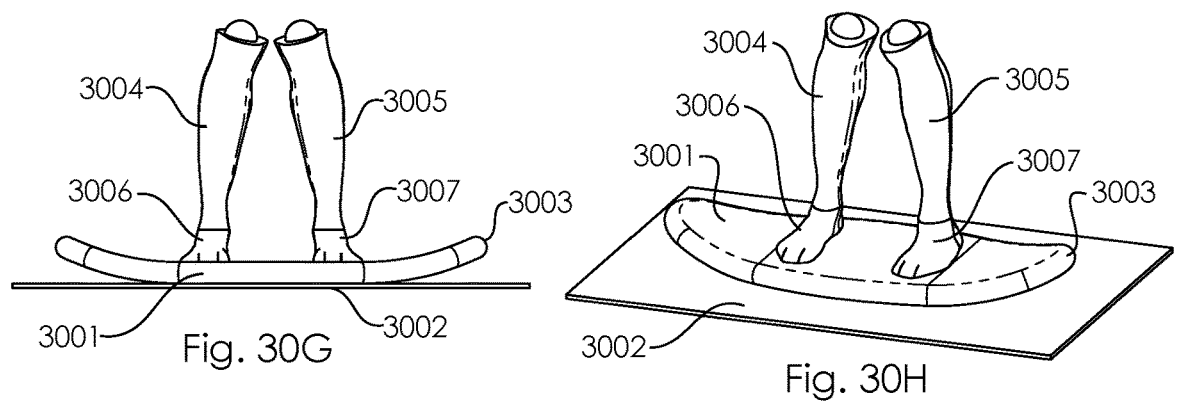

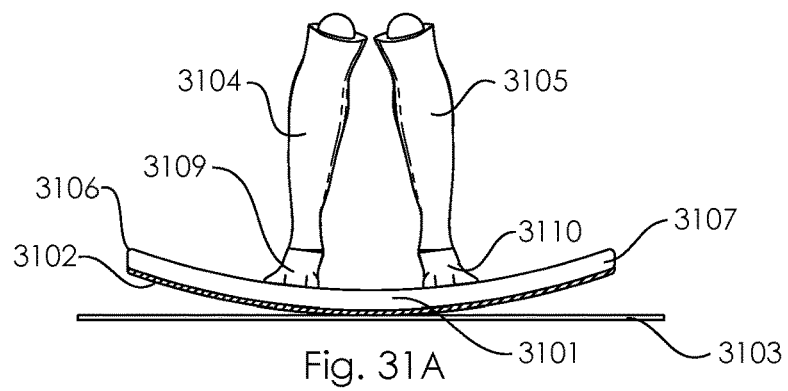
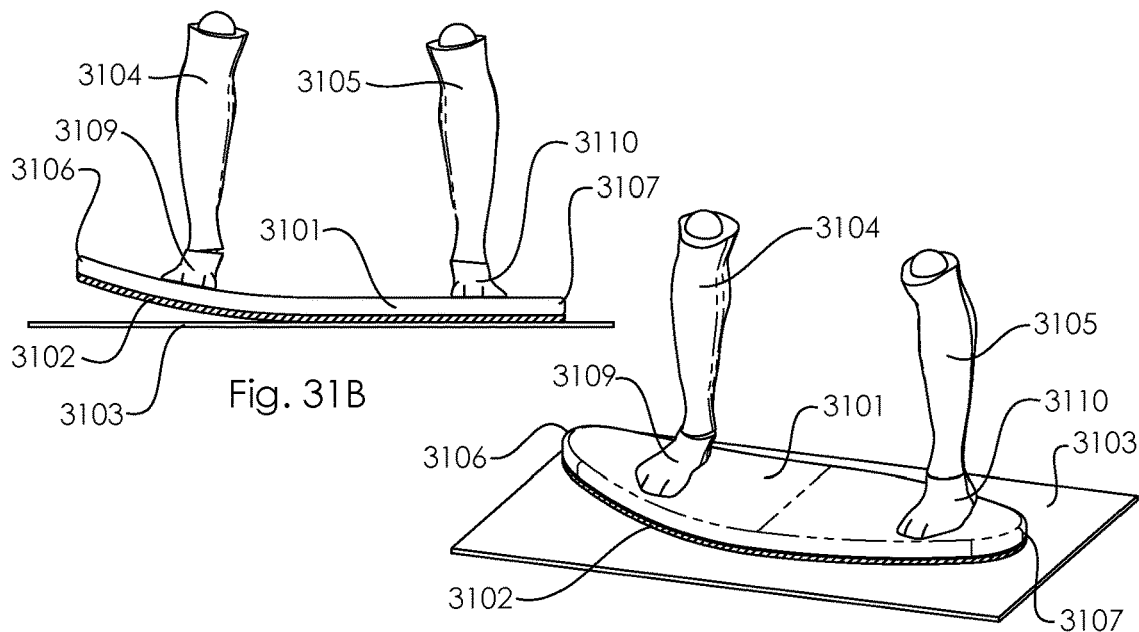
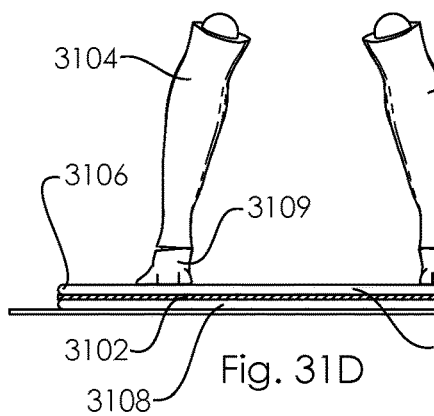
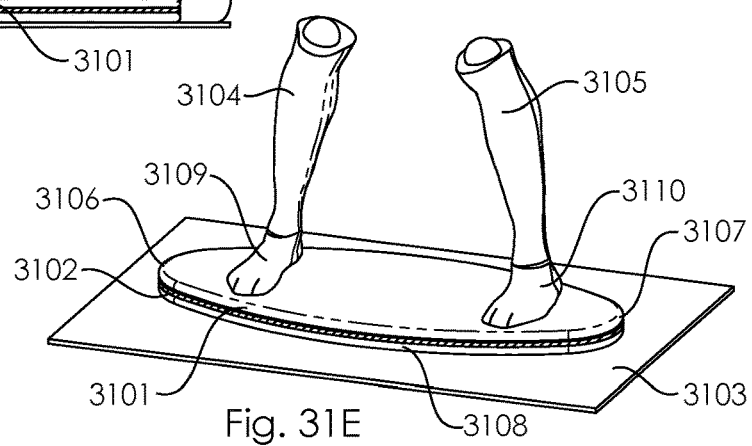
Fig. 31A
Fig. 31B
Fig. 31C
Fig. 31D
Fig. 31E

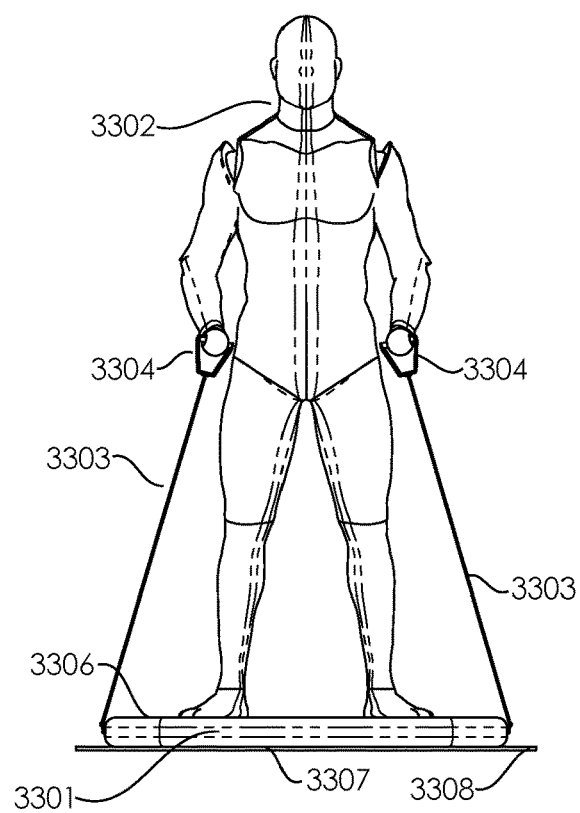 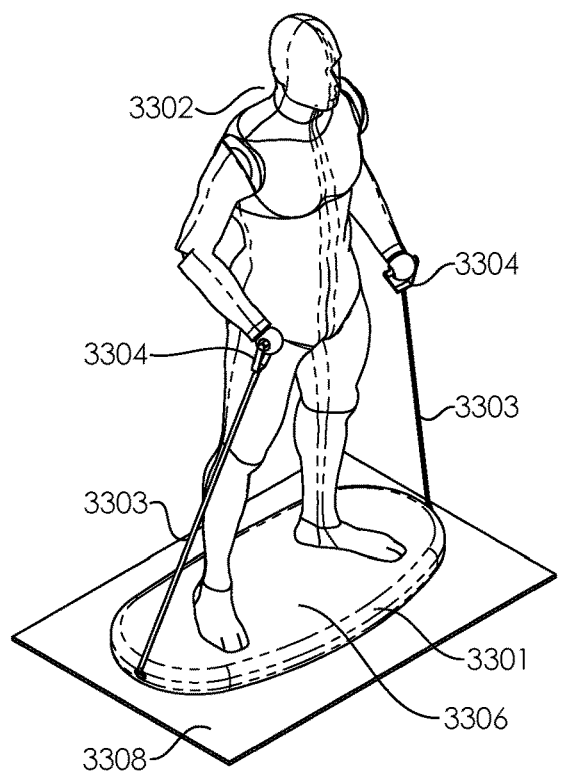
Fig. 33A  Fig. 33B
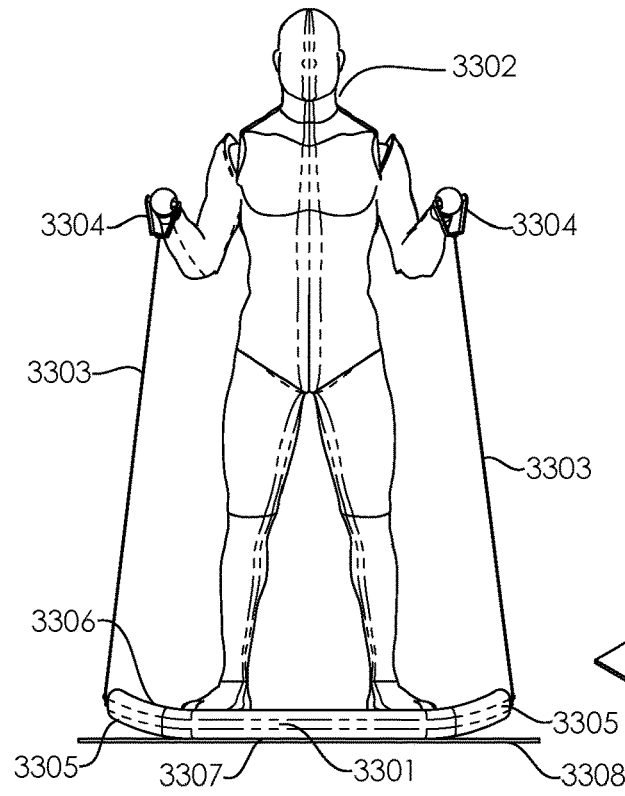 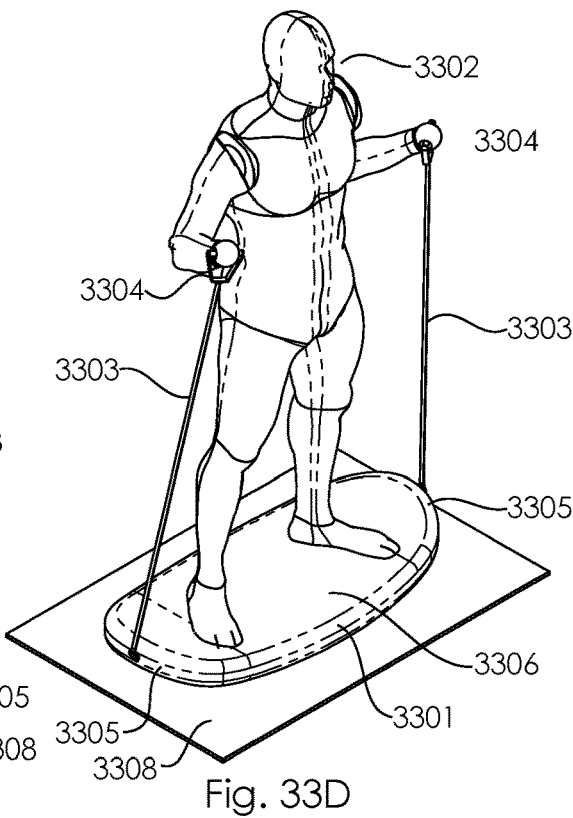
Fig. 33C  Fig. 33D

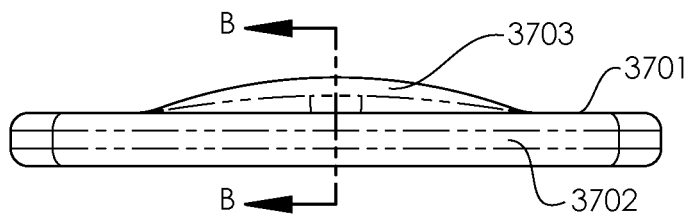
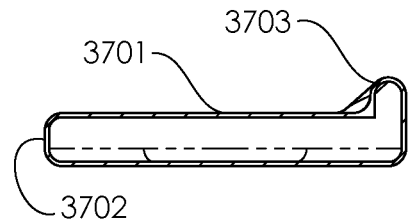
Fig. 37A  Fig. 37B
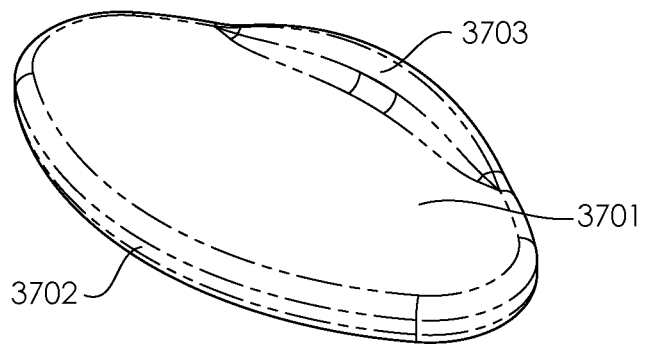
Fig. 37C
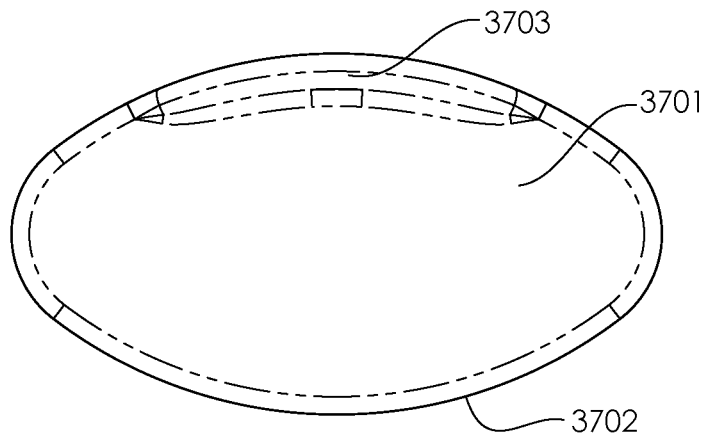
Fig. 37D

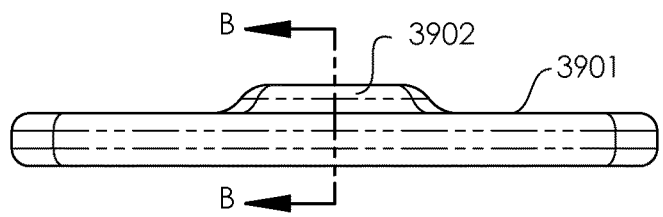
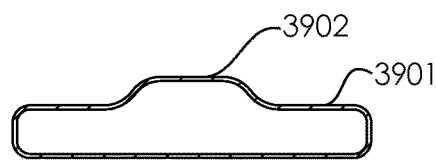
Fig. 39A  Fig. 39B
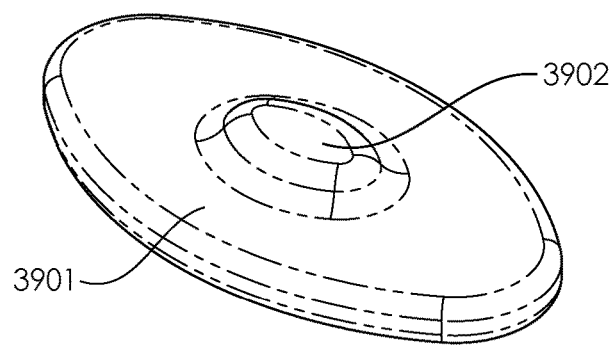
Fig. 39C
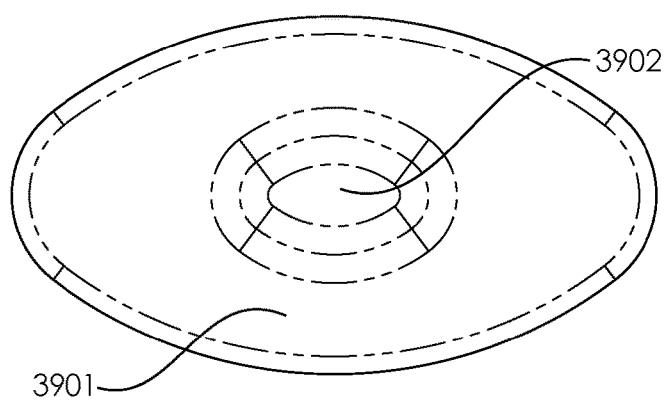
Fig. 39D

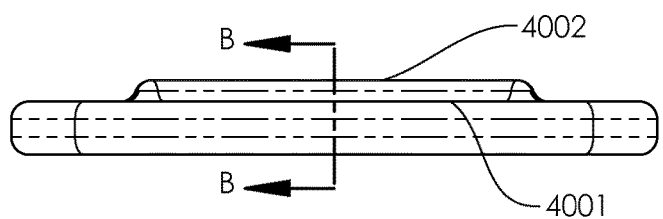
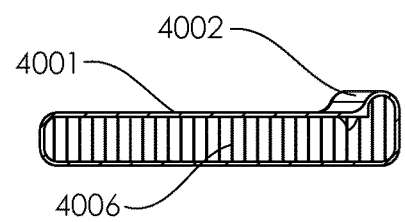
Fig. 40A    Fig. 40B
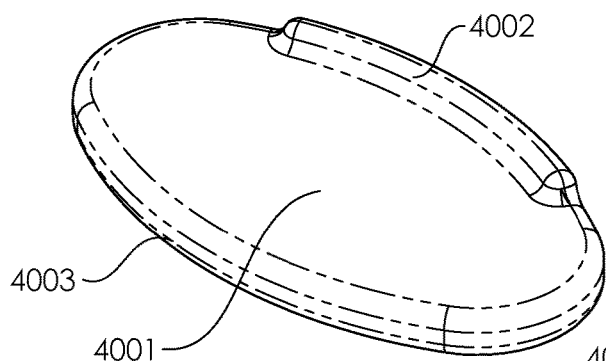
Fig. 40C
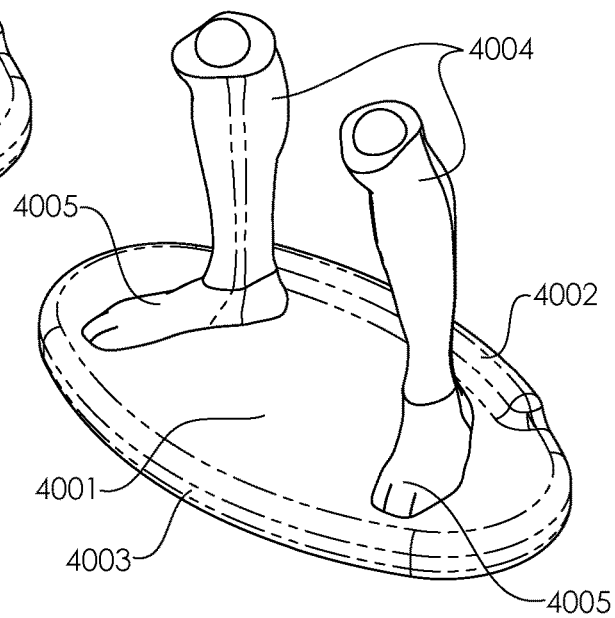
Fig. 40D
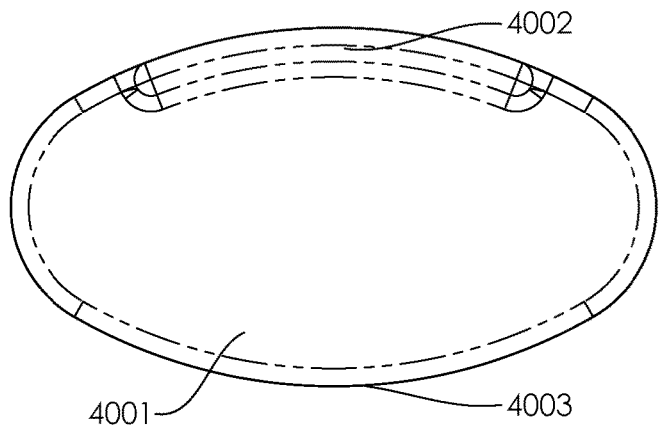
Fig. 40E

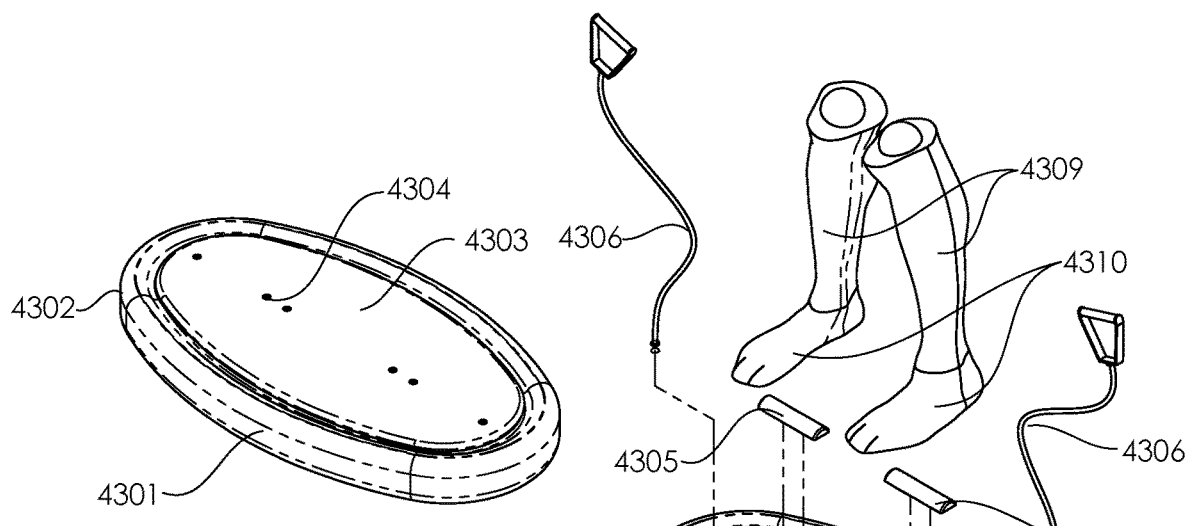
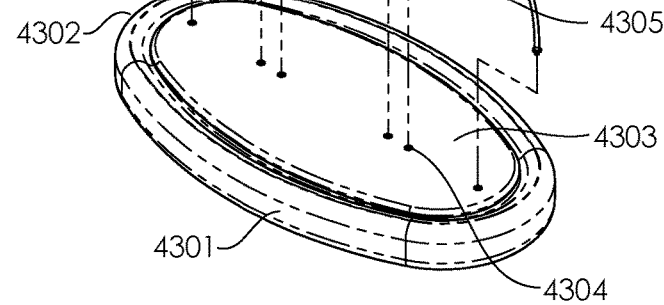
Fig. 43A
Fig. 43B
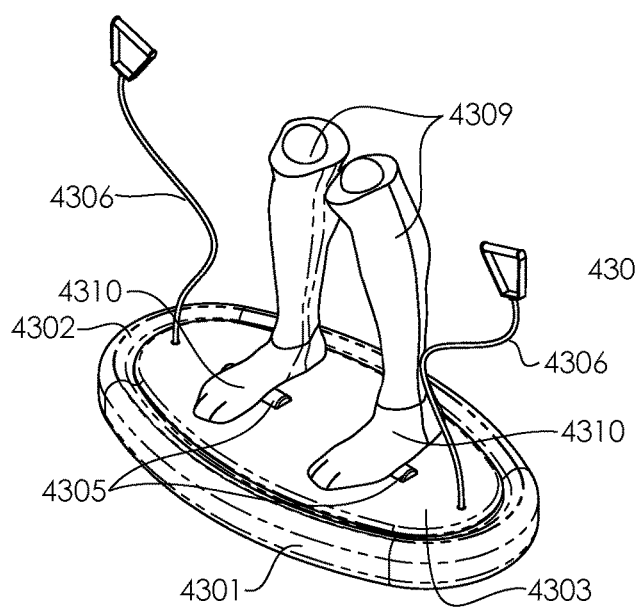
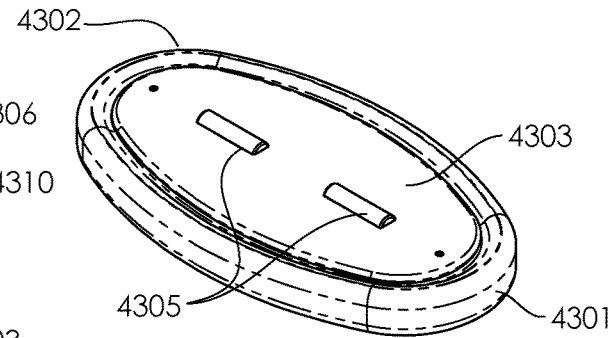
Fig. 43C
Fig. 43D
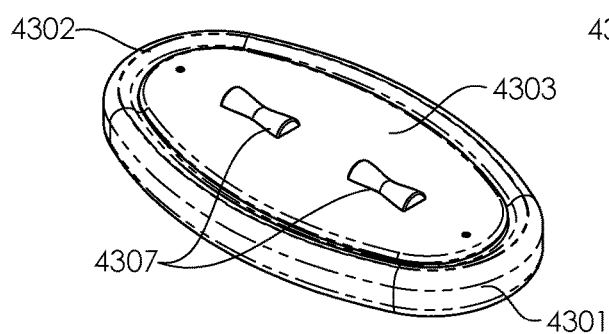
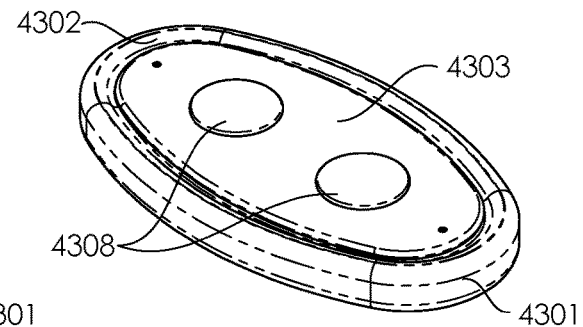
Fig. 43E
Fig. 43F

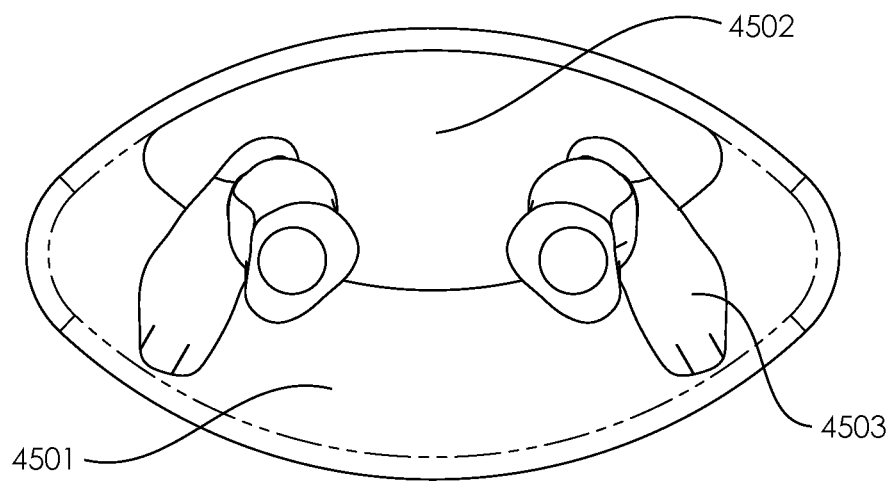
Fig. 45A
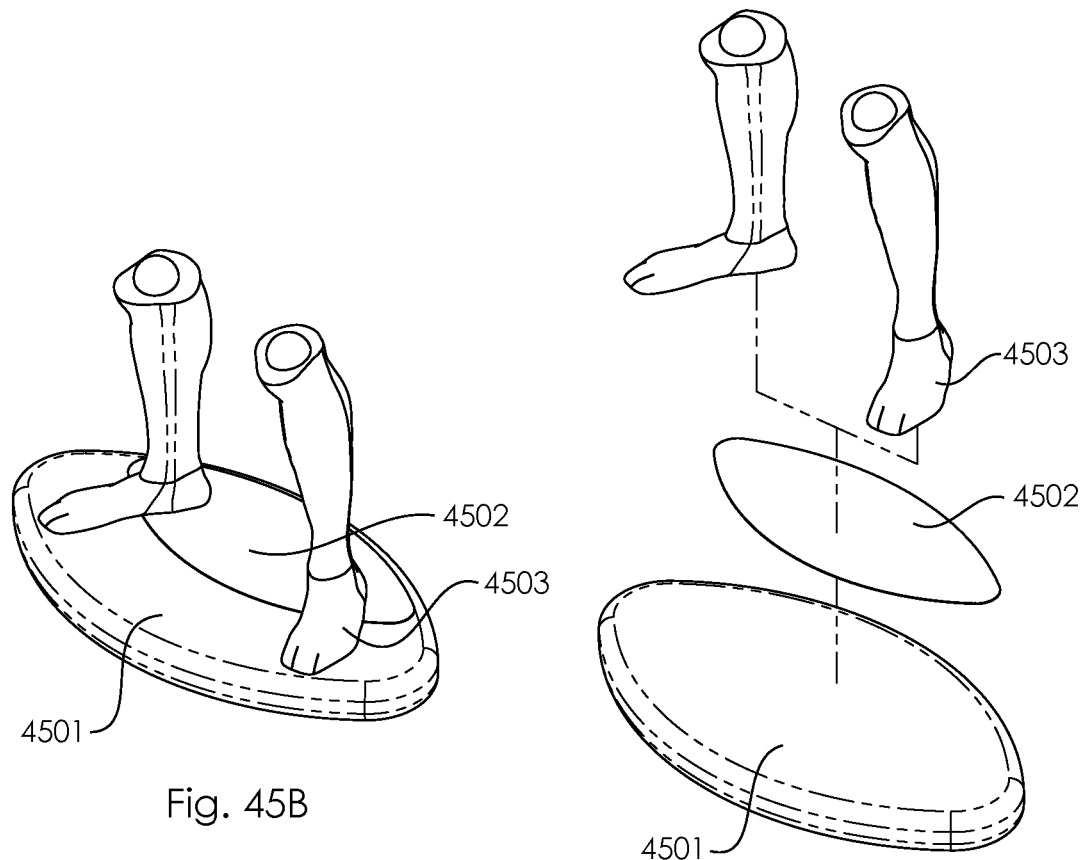
Fig. 45B
Fig. 45C

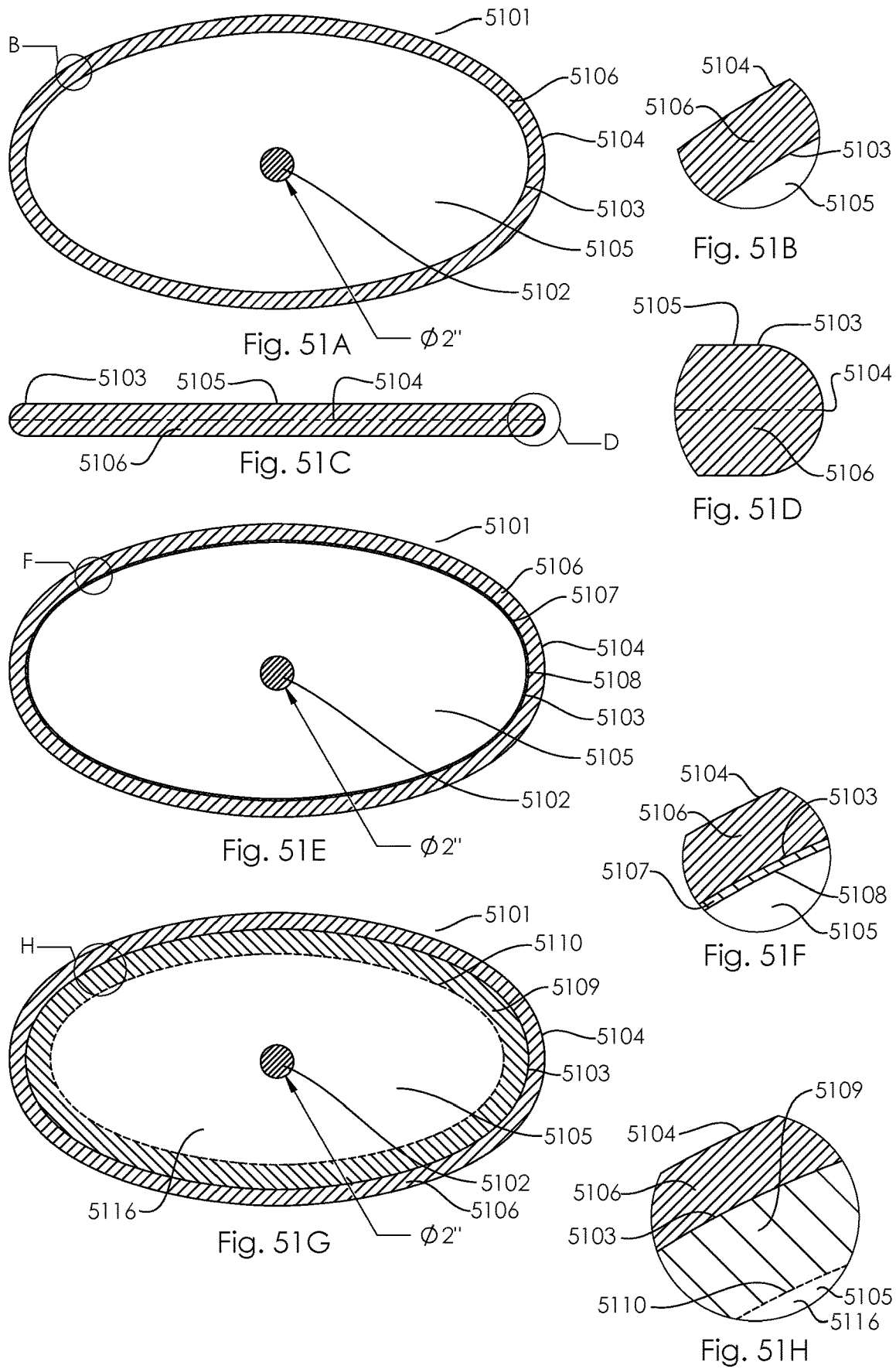

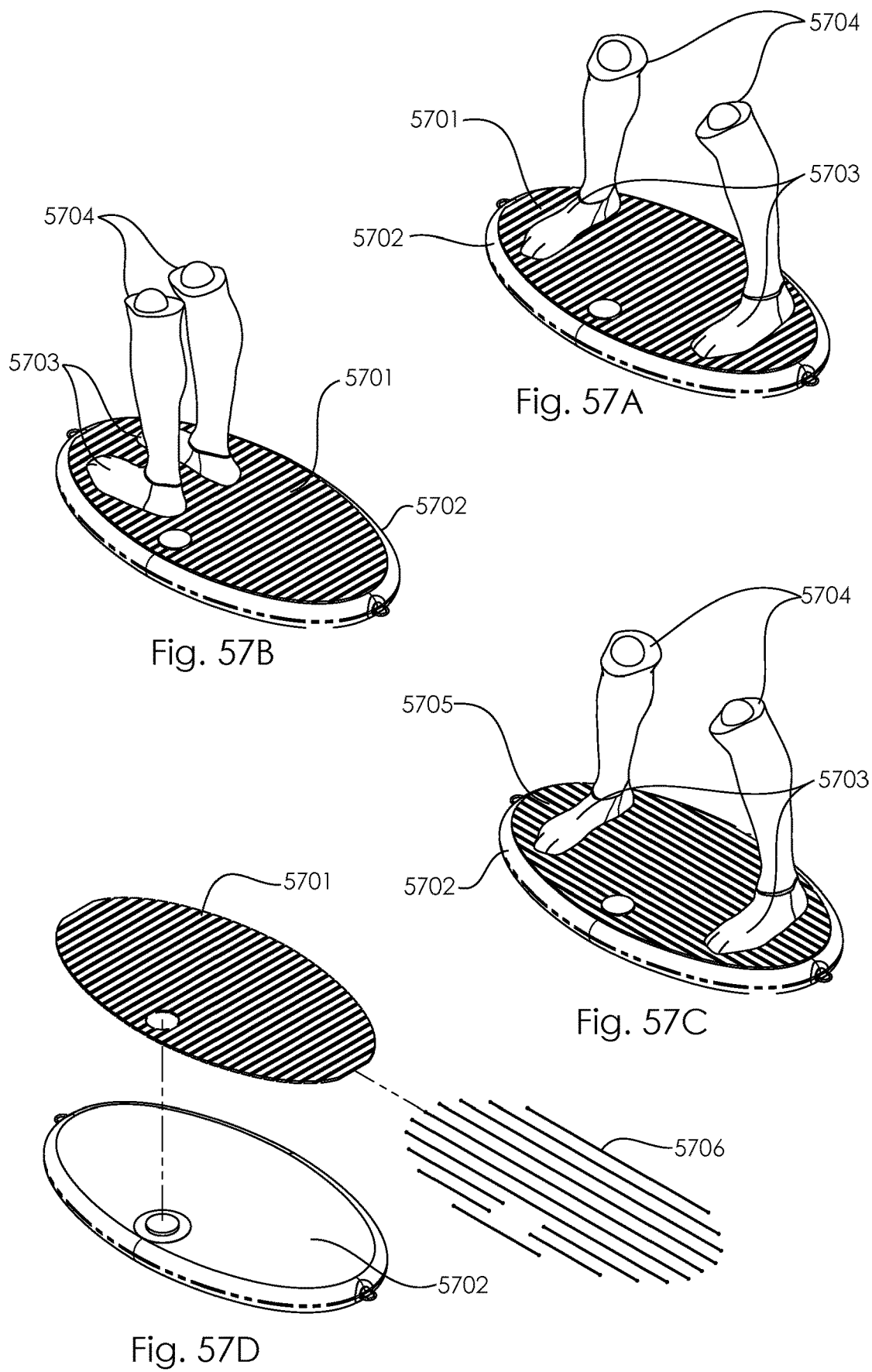

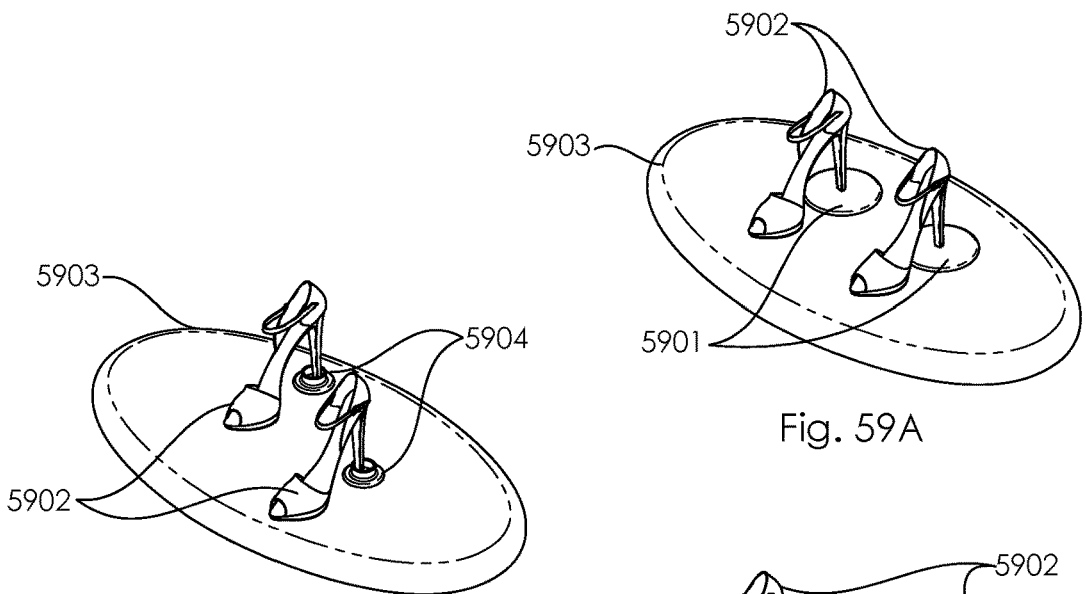
Fig. 59A
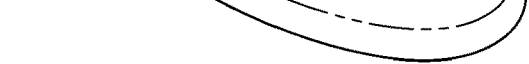
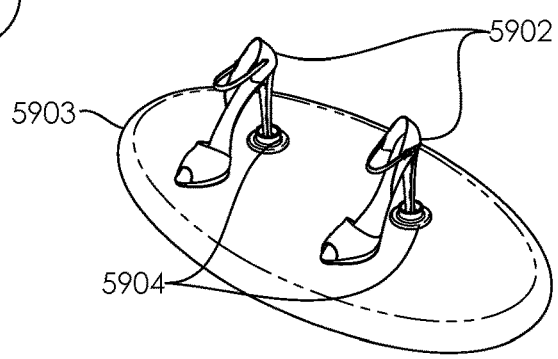
Fig. 59B
Fig. 59C
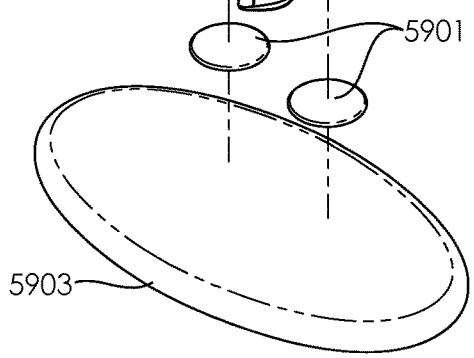
Fig. 59D
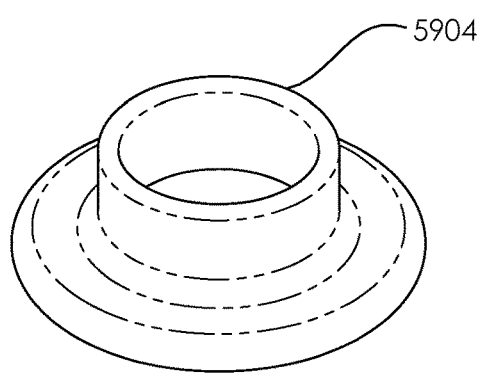
Fig. 59E
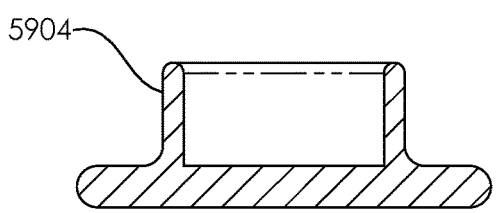
Fig. 59F

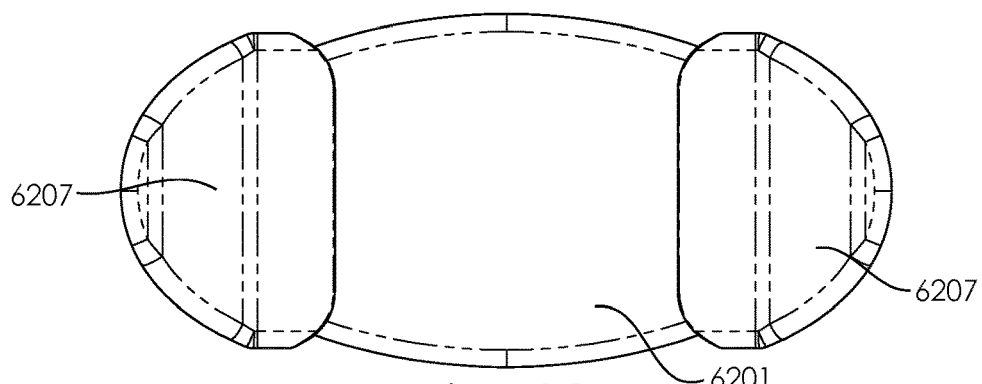
Fig. 62G
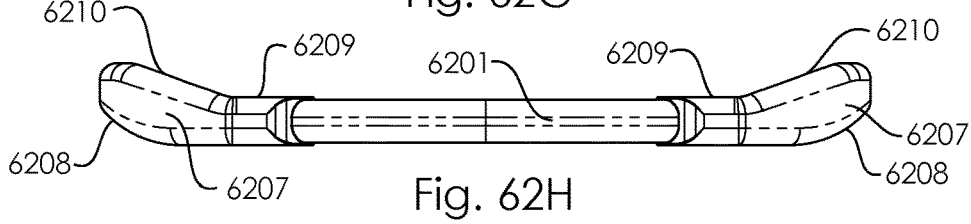
Fig. 62H
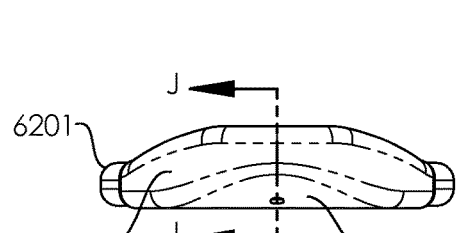
Fig. 62I
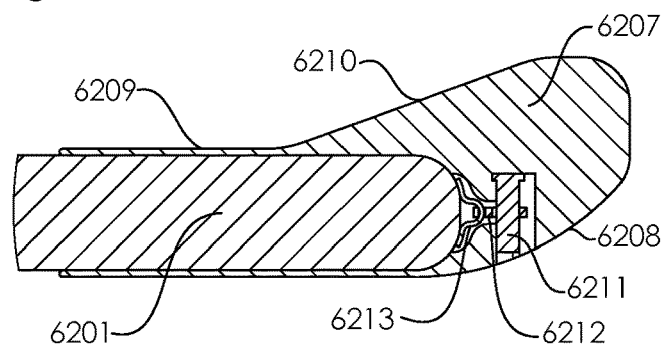
Fig. 62J
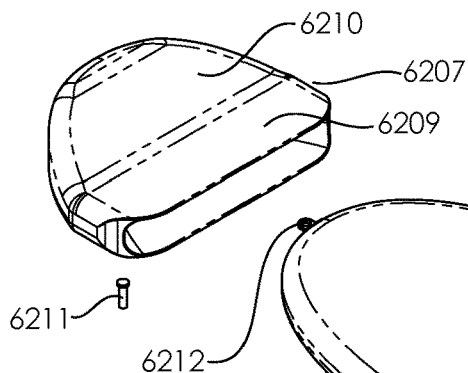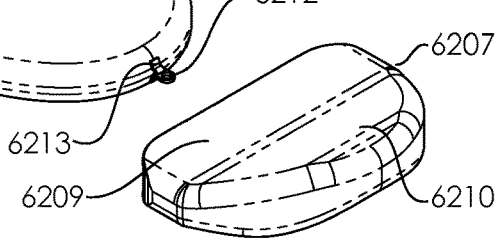
Fig. 62K

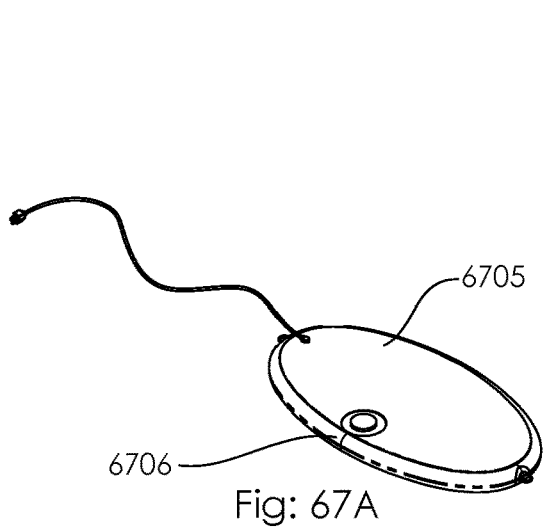
Fig: 67A
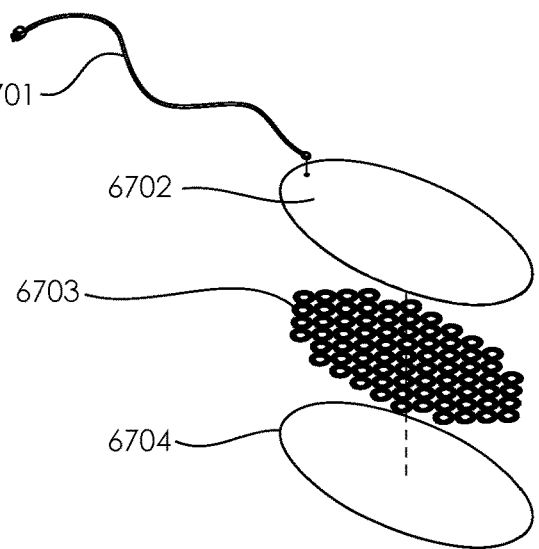
Fig: 67B
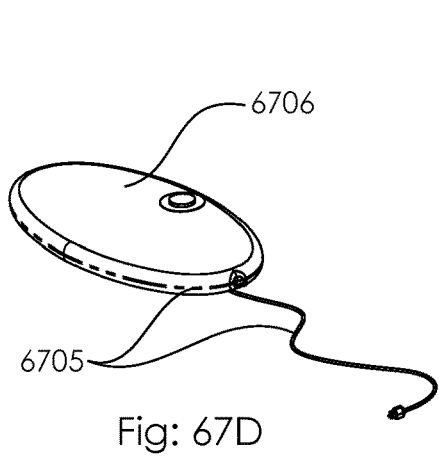
Fig: 67D
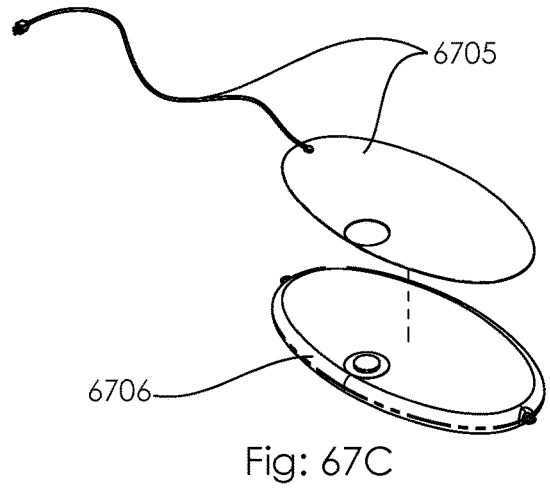
Fig: 67C
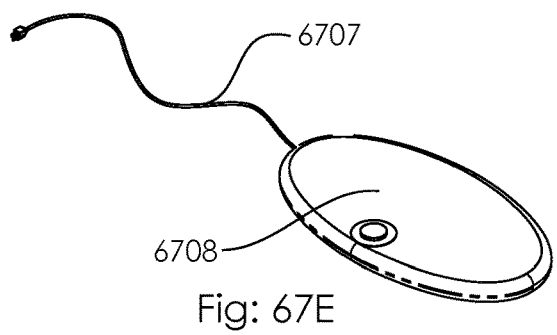
Fig: 67E
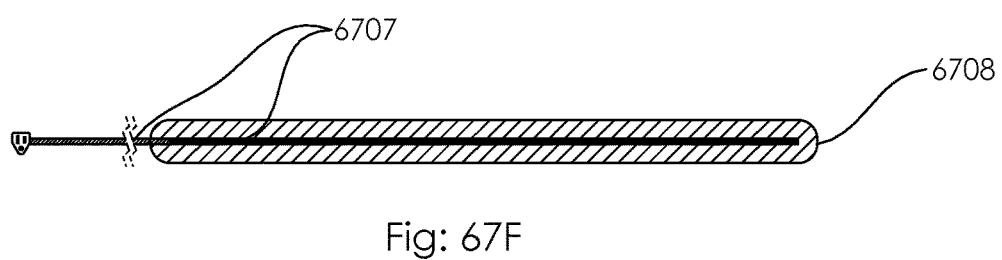
Fig: 67F

STANDING SURFACE TO ENCOURAGE MOVEMENT

CROSS REFERENCE TO RELATED APPLICATIONS

This is a continuation of application Ser. No. 15/437,349, filed Feb. 20, 2017, now U.S. Pat. No. 10,045,647, which is continuation of International Application No. PCT/US2016/029618, filed Apr. 27, 2016, which claims the benefit of U.S. Provisional Application No. 62/245,268, filed Oct. 22, 2015, U.S. Provisional Application No. 62/211,856, filed Aug. 30, 2015, U.S. Provisional Application No. 62/182,429, filed Jun. 19, 2015, and U.S. Provisional Application No. 62/153,505, filed Apr. 27, 2015, each of which prior applications is incorporated herein by reference in its entirety.

BACKGROUND

There is an increasing recognition that standing regularly during work provides numerous benefits and offsets the negative effects of over-sitting. However, standing for prolonged periods brings its own challenges, in part because many people are not used to standing while working. For example, individuals may stand stationary with their feet planted and moving relatively little for prolonged periods of time. Resilient standing mats may be used to provide cushioning underfoot. Although, such mats provide some comfort for standing workers, they do not encourage movement and are not sufficient to generally allow workers to stand more comfortably in a stationary position for prolonged periods (e.g., more than an hour). Due to these limitations related to anti-fatigue mats, recommendations have been made that a person rotate their sitting and standing every 15-30 minutes, which can be distracting and less likely to be followed without constant reminders. Some standing users have attempted to do some form of exercise while working by placing exercise devices next to a desk or near the work area, such as treadmills, rebounders, balance boards, foot stretching devices and many others that may be utilized near, at, or under a desk or standing desk. However, many exercise devices are too intense, involved, or distracting to utilize during concentrated work time where mental focus is necessary; and they are not designed for a worker to use during work, but rather during breaks from work.

SUMMARY

The disclosed devices employ a novel approach by encouraging movement by using a faster responding, more resilient trampoline-like rebounding action, and a relatively less dampening surface that allows for better circulation and blood flow through the feet and body, along with mild exercise type movements that can be performed concurrently during focused work.

The disclosed devices serve to make standing while working more comfortable, minimize the harm caused by excessive sitting, and permit for mild exercise and movement in order to increase blood flow; and to permit a worker to stand comfortably for a longer period of time.

As disclosed, persons who work standing up most of the day can experience fatigue and poor circulation after standing on a conventional anti-fatigue mat for long periods of time. Disclosed are devices that provide the benefits of an anti-fatigue mat but with a more trampoline-like response, as well as the benefits of exercise devices in a single standing mat or platform; while permitting a worker to concurrently maintain concentration on work tasks without being overly distracted.

Treadmill or bicycle/spinning desks create significant cognitive loads that demand the user's attention to moving and balancing at the cost of thoughtful, productive, efficient work. Whereas, the springy, reactive surfaces of the disclosed devices cause the user to make subtle continuous micro-movements to maintain their balance without adversely affecting their work productivity. These micro-movements don't demand conscious attention to maintain movement, yet still encourage enough movement and small muscle contractions to encourage healthy blood-flow to prevent legs and feet from feeling stiff from prolonged static standing.

The disclosed devices allow for beneficial and highly dynamic, more trampoline-like, rebound response and movement that increases the triggering of the body's mechanism for fat and sugar metabolism and that increases circulation and blood flow while standing at work. The benefits of the disclosed devices accrue whether one is working at a standing desk, or at other positions where a worker may need to stand; such as a cashier, or other jobs requiring long periods of standing.

It is to be understood that both the foregoing and the following descriptions are exemplary and explanatory only and are not intended to limit the claimed invention or application thereof in any manner whatsoever.

BRIEF DESCRIPTION OF THE DRAWINGS

In the drawings:

FIG. 9AA is a top view of seam tape with cutouts for use with a drop stitch inflatable platform to create a curved bottom edge.

FIG. 9AB is a side view of the inflatable platform of FIG. 9Z.

FIG. 9AC is a front cross-section view along line AC of the inflatable platform of FIG. 9AB.

FIG. 9AD is a front cross-section detailed view of the region within the area AD of the inflatable platform of FIG. 9AC.

FIG. 11N is a front view of a user raising a standing platform up by rocking it up with their left foot, while raising the bottom surface with their right foot.

FIG. 11O is a side view of a user with a standing platform held vertically between the user's legs.

FIG. 11P is a front view of a user with a standing platform held vertically between the user's legs.

FIG. 12A is a bottom view of a dimpled standing platform.

FIG. 12B is a lower isometric view of a user standing on a dimpled standing platform.

FIG. 12C is a side view of the user standing on the standing platform of FIG. 12B.

FIG. 12D is a front cross-section view along line D of the user standing on the standing platform of FIG. 12C.

FIG. 12E is a close up front cross-section view of the region within the area E of the bottom surface of the standing platform of FIG. 12D.

FIG. 13A is a front view of a standing platform with corner sliding feet.

FIG. 13B is a lower isometric view of a standing platform with corner sliding feet.

FIG. 13C is a front view of a standing platform with corner sliding feet resting on the floor.

FIG. 13D is a front view of a user standing on a standing platform with corner sliding feet resting on the floor.

Figure 14A:
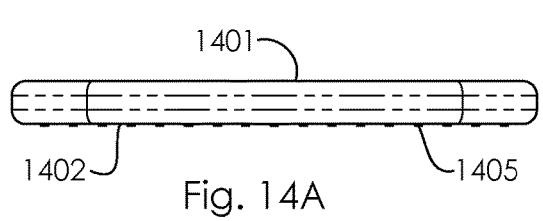

FIG. 14A is a front view of a standing platform with a plurality of low friction nubs.

Figure 14B:
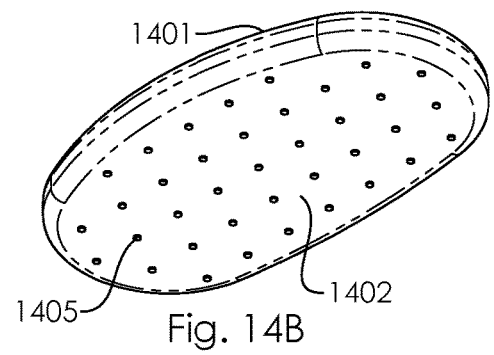

FIG. 14B is a lower isometric view of the standing platform of FIG. 14A.

Figure 14C:
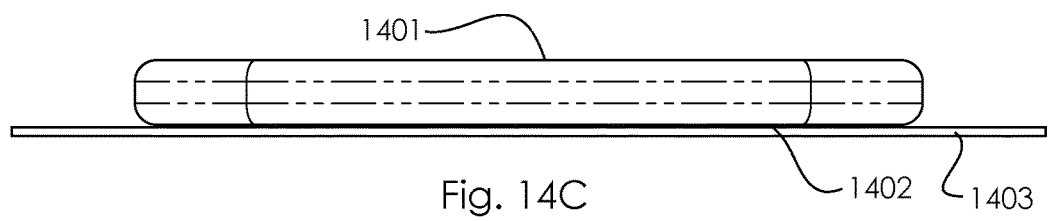

FIG. 14C is a front view of the standing platform of FIG. 14A resting on a floor.

Figures 14D, 14E:
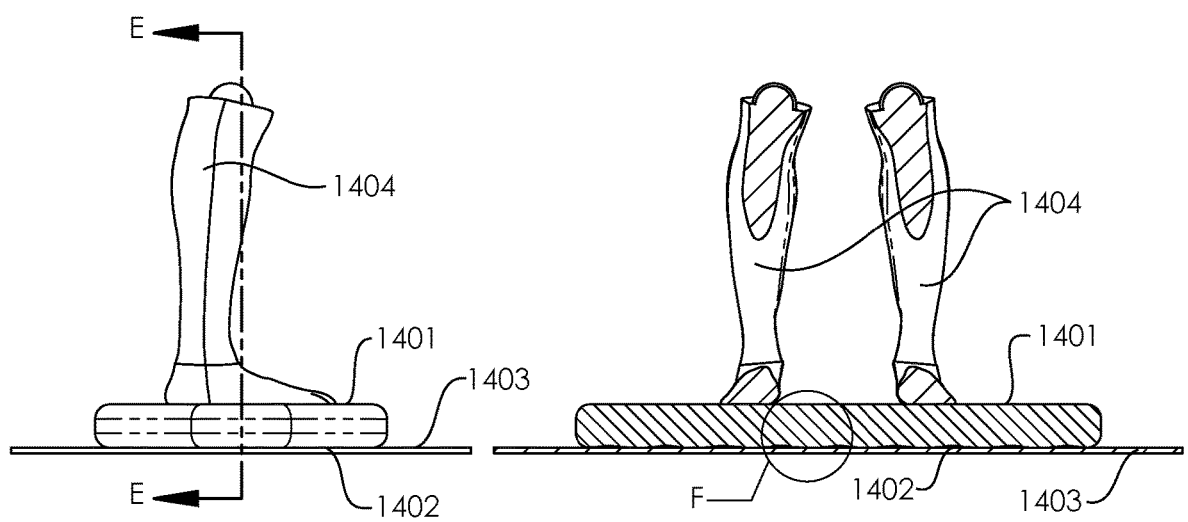

FIG. 14D is a side view of a user standing on the standing platform of FIG. 14C resting on a floor.

FIG. 14E is a front cross-section view along line E of the user standing on the standing platform of FIG. 14D.

Figure 14F:
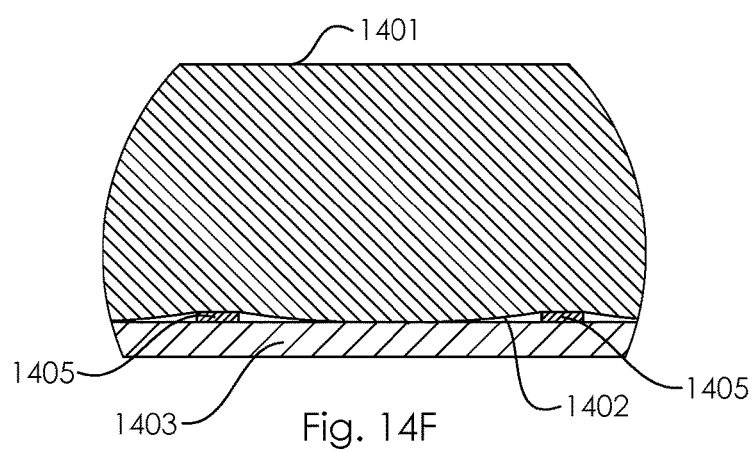

FIG. 14F is a close up front cross-section view of the region within the area F of the bottom surface of the standing platform of FIG. 14E with the user standing on the platform.

Figures 15A, 15B:
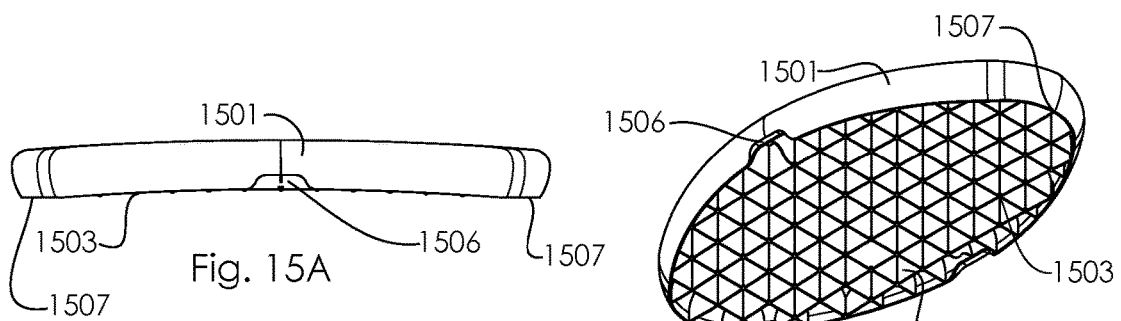

FIG. 15A is a front view of a plastic structured standing platform.

FIG. 15B is a lower isometric view of the standing platform of FIG. 15A.

Figure 15C:
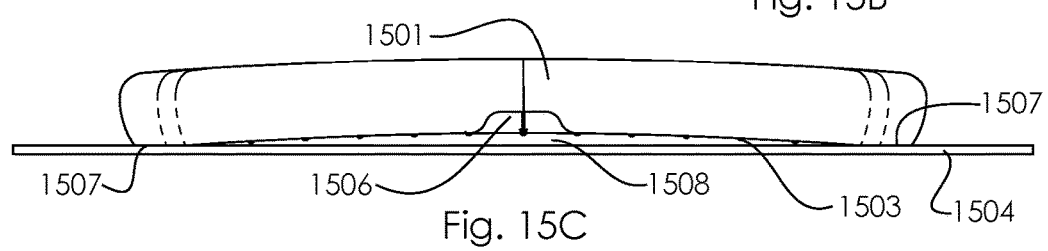

FIG. 15C is a front view of a plastic structured standing platform on the floor.

Figure 15D:
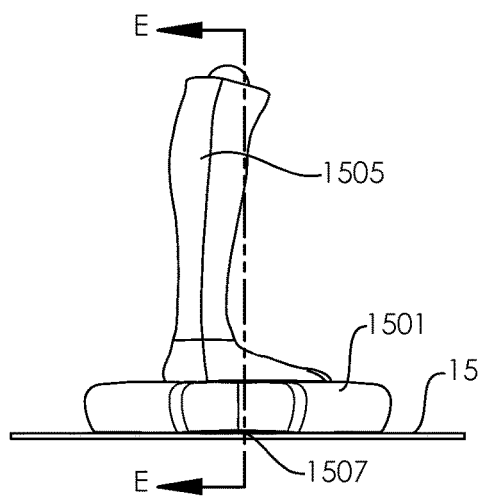

FIG. 15D is a side view showing a user standing on a plastic structured standing platform on the floor.

Figure 15E:
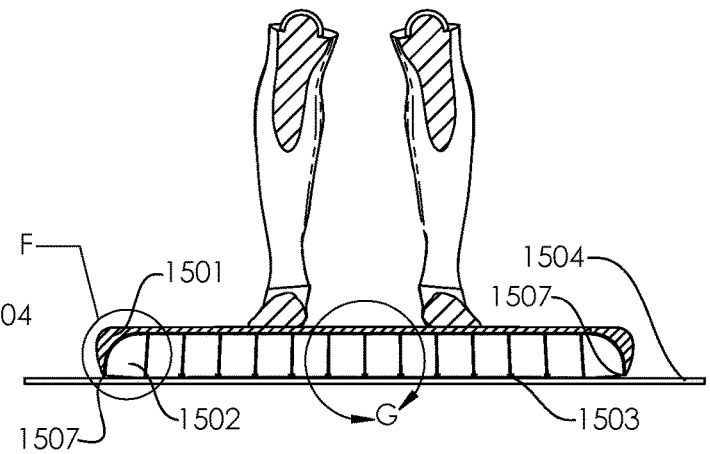

FIG. 15E is a front cross-section view along line E of the user standing on the standing platform of FIG. 15D.

Figure 15F:
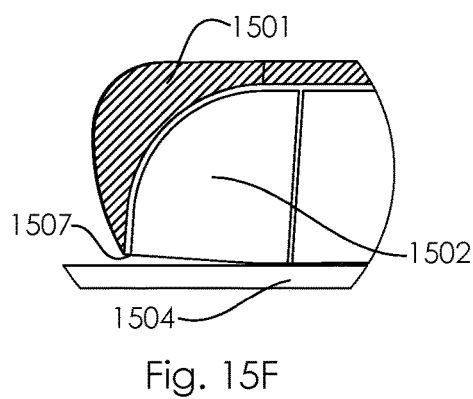

FIG. 15F is a front cross-section detailed view of the region within the area F of the edge of the standing platform of FIG. 15E.

Figure 15G:
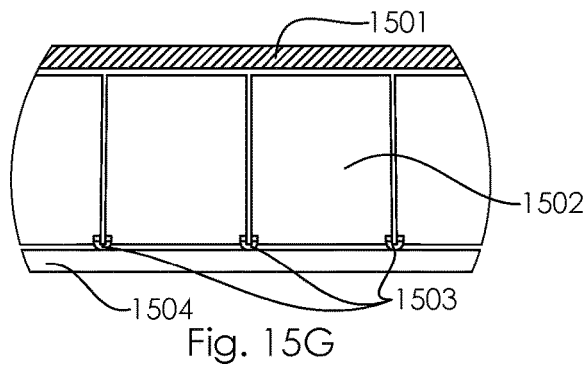

FIG. 15G is a front cross-section detailed view of the region within the area G of the center of the standing platform of FIG. 15E.

Figure 15H:
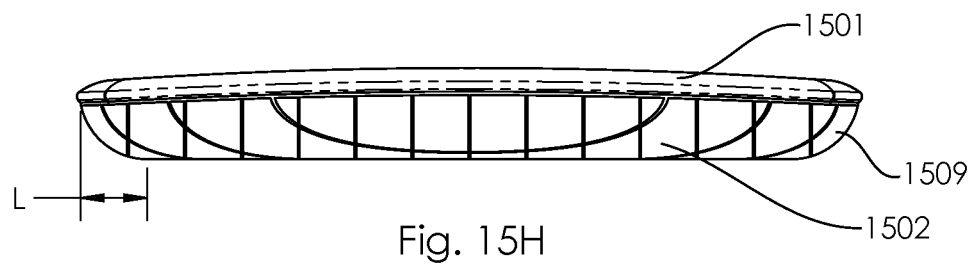

FIG. 15H is a front view of a plastic structured standing platform with a curved bottom edge.

Figure 15I:
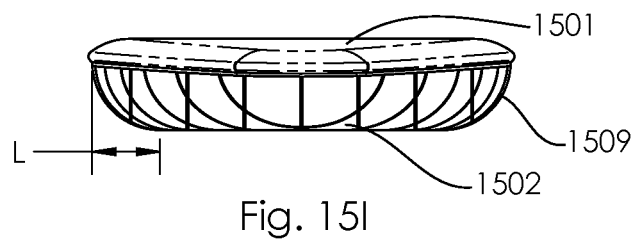

FIG. 15I is a side view of a plastic structured standing platform with a curved bottom edge.

Figure 15J:
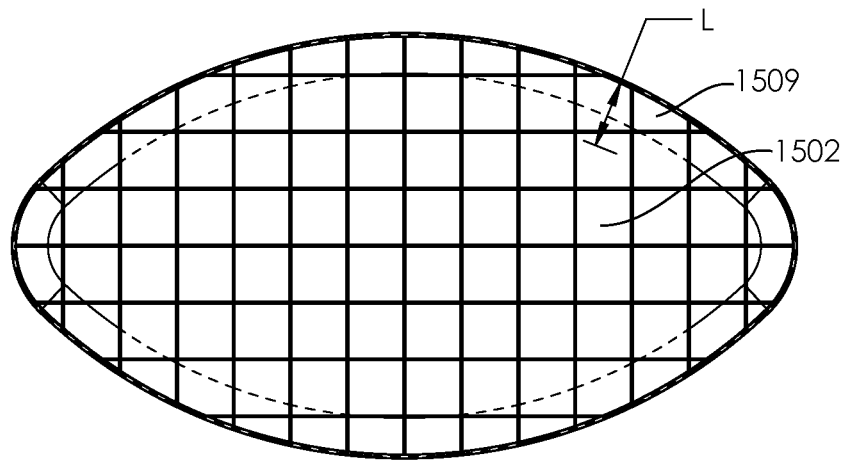

FIG. 15J is a bottom view of a plastic structured standing platform with a curved bottom edge.

Figure 15K:
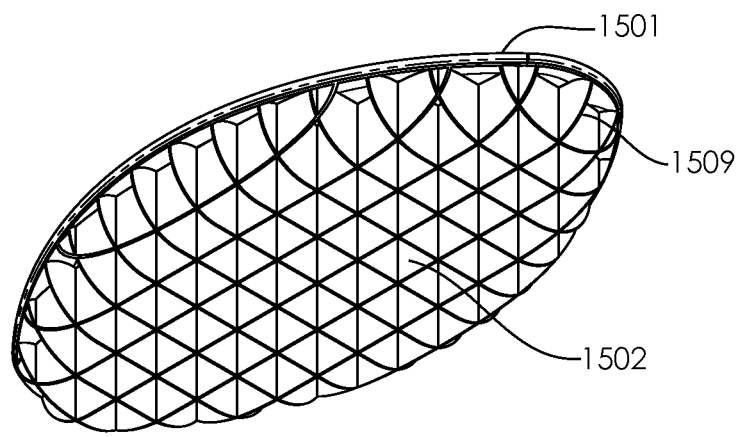

FIG. 15K is a lower isometric view of a plastic structured standing platform with a curved bottom edge.

Figure 16A:
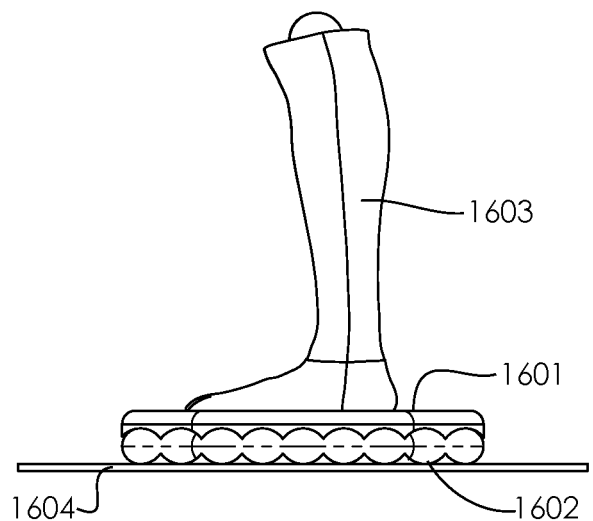

FIG. 16A is a side view of a user standing on a standing platform with a ridged bottom surface.

Figure 16B:
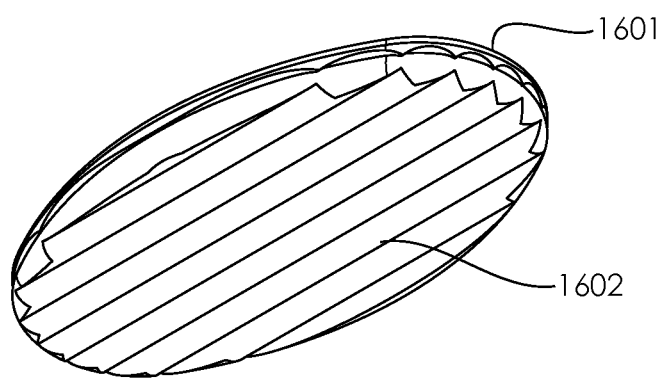

FIG. 16B is a lower isometric view of the standing platform of FIG. 16A.

Figure 16C:
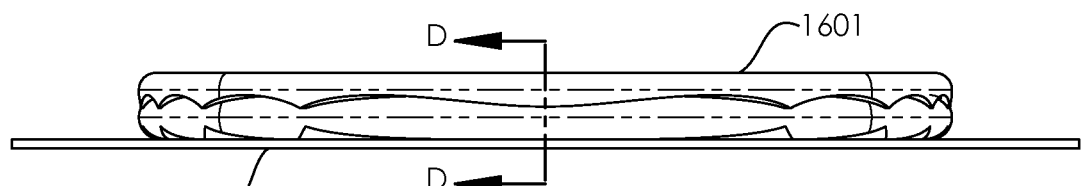

FIG. 16C is a front view of the standing platform of FIG. 16A.

Figure 16D:
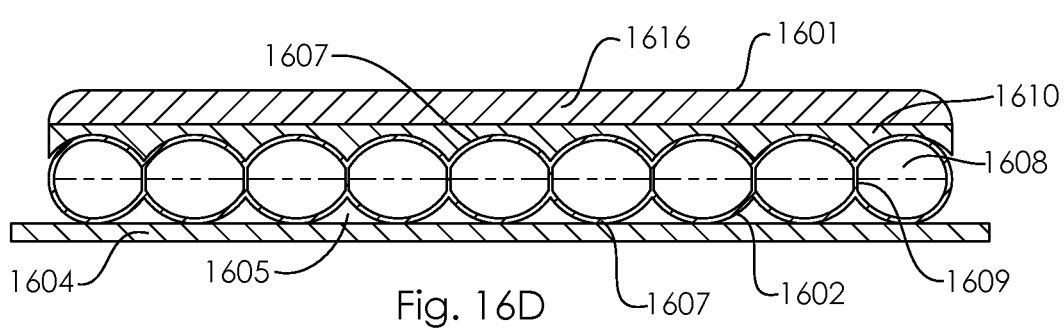

FIG. 16D is a cross-section view along line D of the standing platform of FIG. 16C.

Figure 16E:
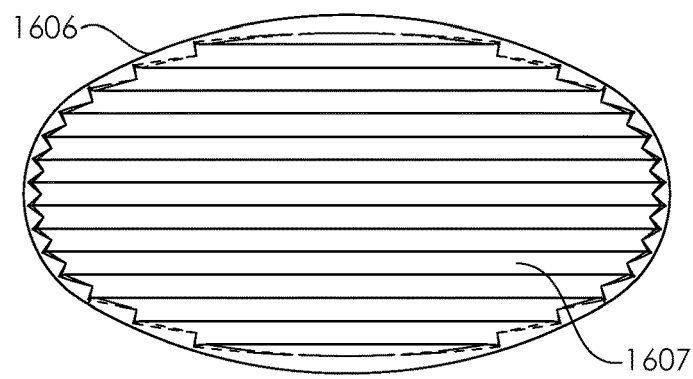

FIG. 16E is a bottom view of an inflatable tube standing platform.

Figure 16F:
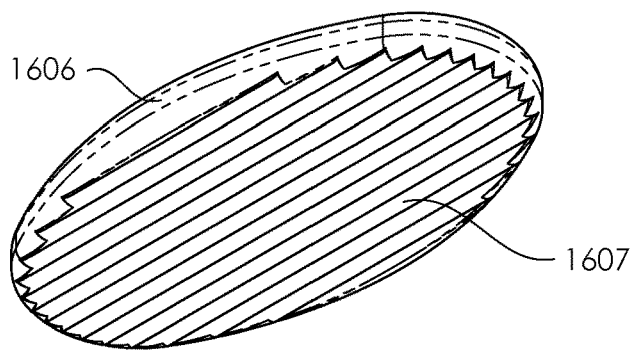

FIG. 16F is a lower isometric view of the standing platform of FIG. 16E.

Figure 16G:
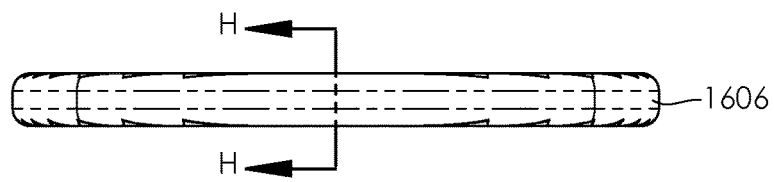

FIG. 16G is a front view of the standing platform of FIG. 16E.

Figure 16H:
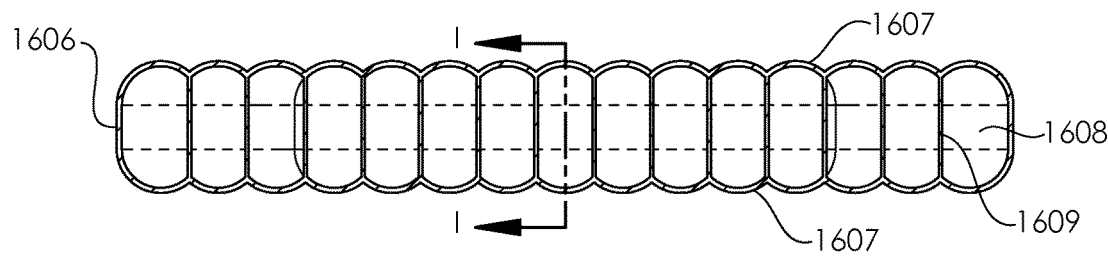

FIG. 16H is a side cross-section view along line H of the standing platform of FIG. 16G.

Figure 16I:
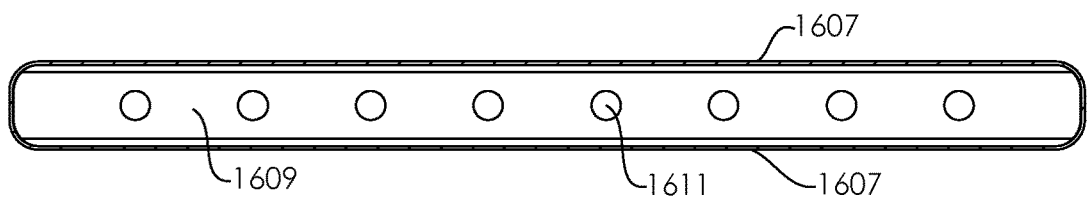

FIG. 16I is a front cross-section view along line I of the standing platform of FIG. 16H.

Figure 16J:
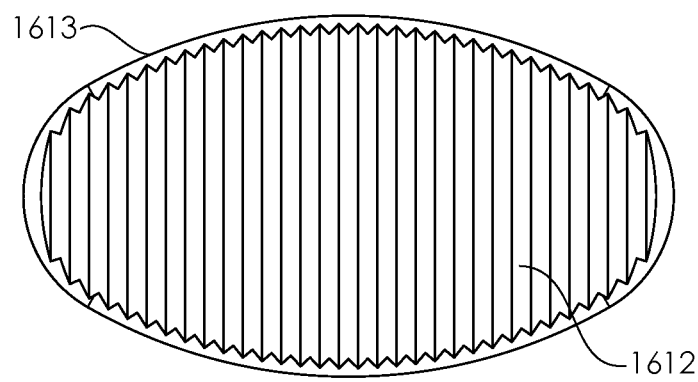

FIG. 16J is a bottom view of an inflatable transverse tube standing platform.

Figure 16K:
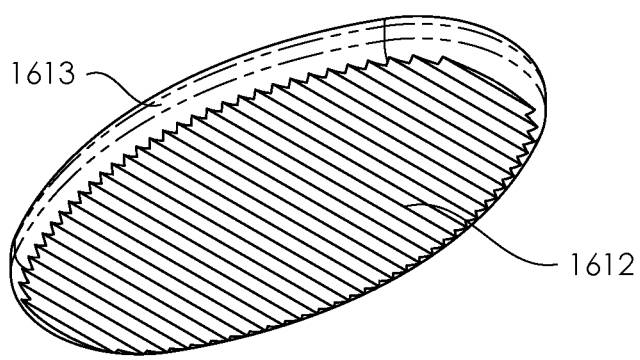

FIG. 16K is a lower isometric view of an inflatable transverse tube standing platform.

Figure 16L:
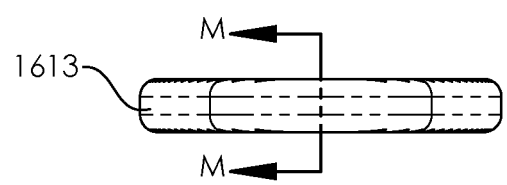

FIG. 16L is a side view of an inflatable transverse tube standing platform.

Figure 16M:
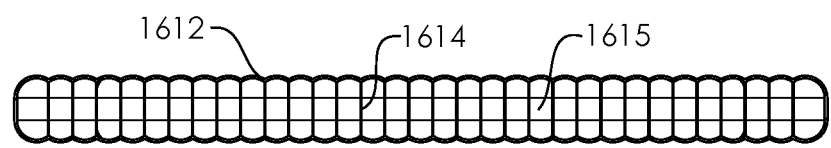

FIG. 16M is a front cross-section view along line M of the standing platform of FIG. 16L.

Figure 17A:
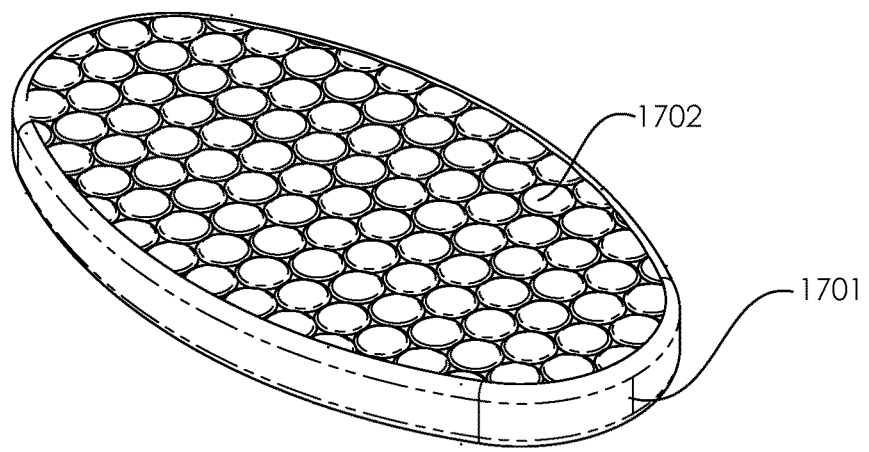

FIG. 17A is an upper isometric view of an inflatable platform that has vertical cylindrical air chambers.

Figure 17B:
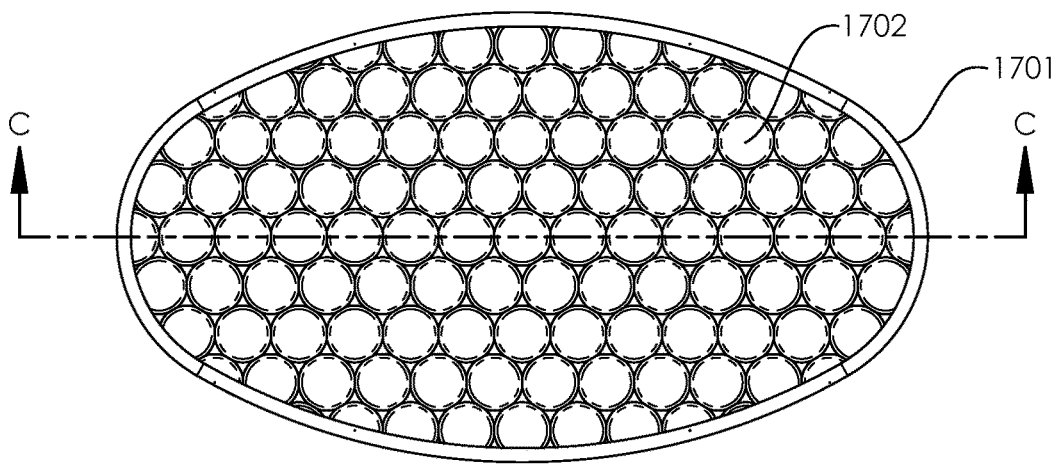

FIG. 17B is a top view of the inflatable platform of FIG. 17A.

Figure 17C:
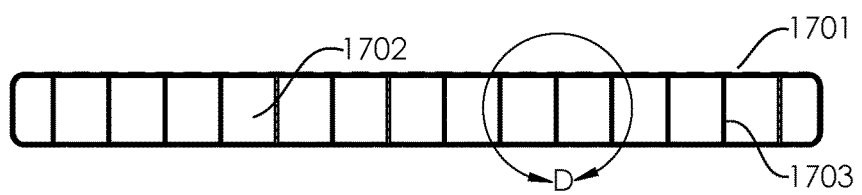

FIG. 17C is a front cross-section view along line C of the platform of FIG. 17B.

Figure 17D:
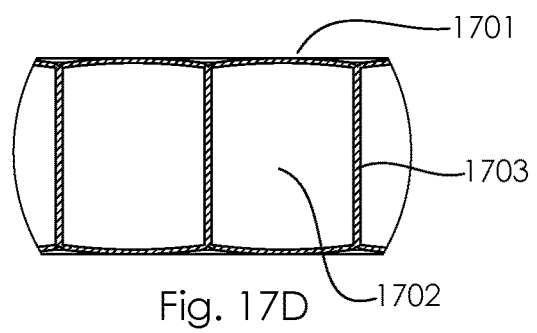

FIG. 17D is a front cross-section detailed view of the region within the area D of the platform of FIG. 17C.

Figure 17E:
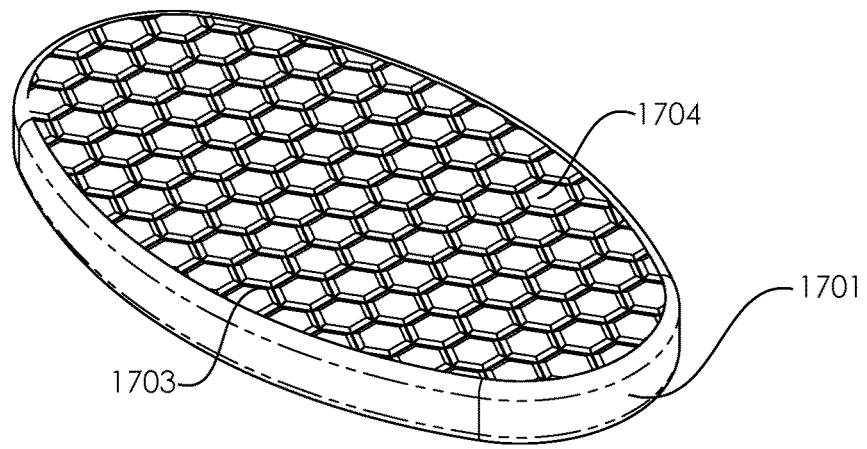

FIG. 17E is an upper isometric view of an inflatable platform that has vertical hexagonal air chambers.

Figure 17F:
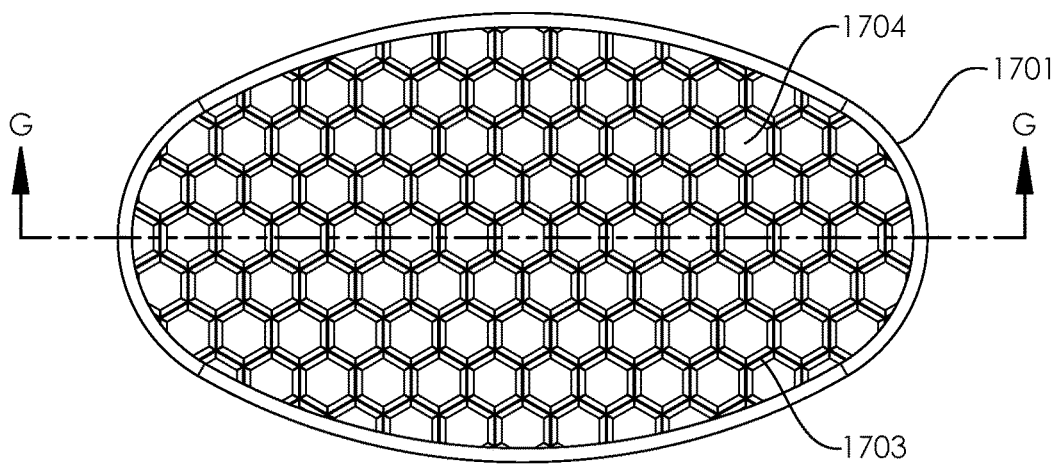

FIG. 17F is a top view of an inflatable platform that has vertical hexagonal air chambers.

Figure 17G:
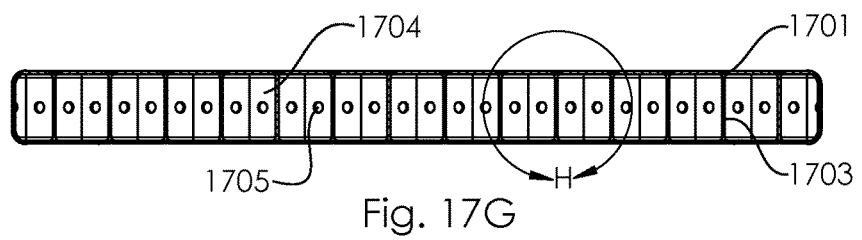

FIG. 17G is a front cross-section view along line G the platform of FIG. 17F.

Figure 17H:
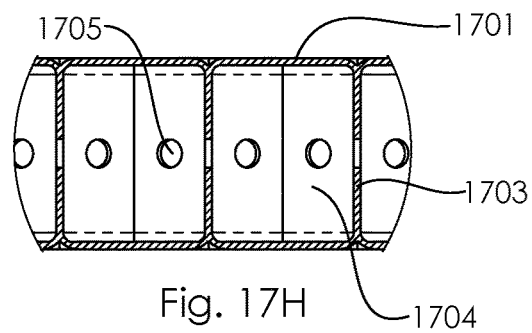

FIG. 17H is a front cross-section detailed view of the region within the area H of the platform of FIG. 17G.

Figure 18A:
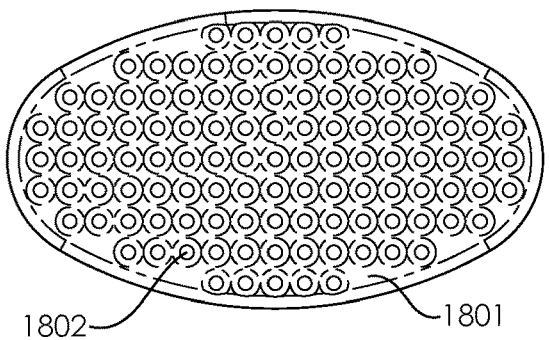

FIG. 18A is a bottom view of a ball filled standing platform.

Figure 18B:
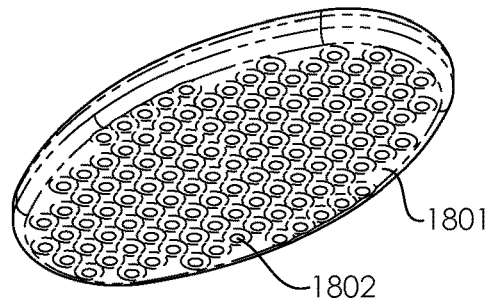

FIG. 18B is a lower isometric view of the ball filled standing platform of FIG. 18A.

Figure 18C:
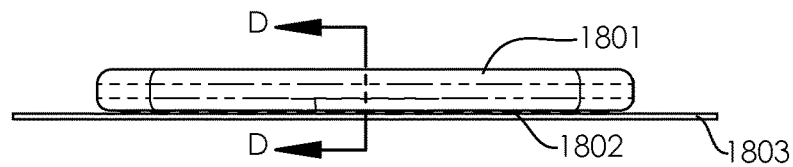

FIG. 18C is a front view of the ball filled standing platform of FIG. 18A on the floor.

Figure 18D:
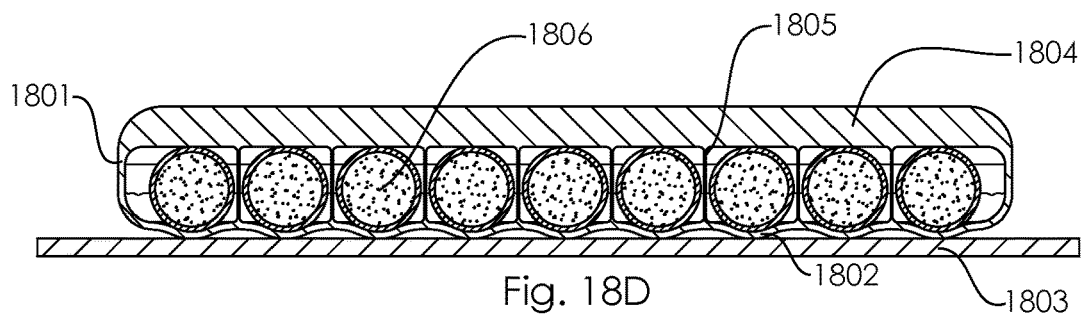

FIG. 18D is a side cross-section view along line D of the standing platform of FIG. 18C.

Figure 18E:
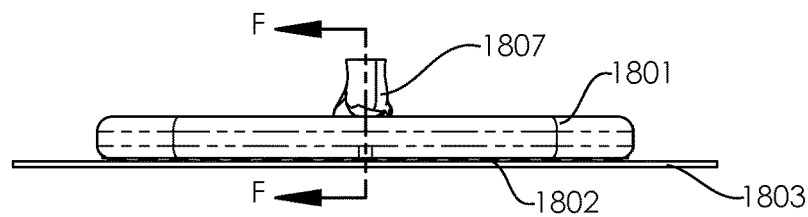

FIG. 18E is a front view of a ball filled standing platform on the floor with a foot applying force to the top of the platform.

Figure 18F:
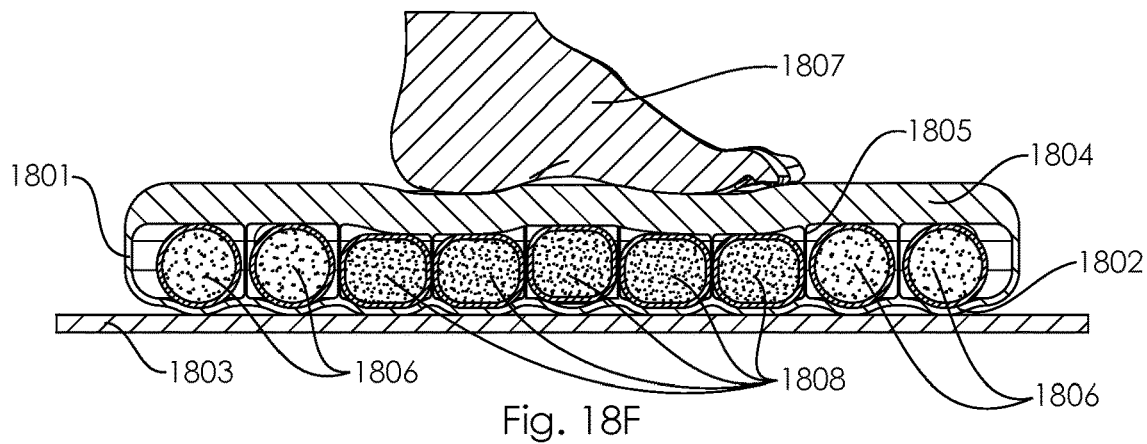

FIG. 18F is a side cross-section view along line F of the standing platform of FIG. 18E.

Figure 19A:
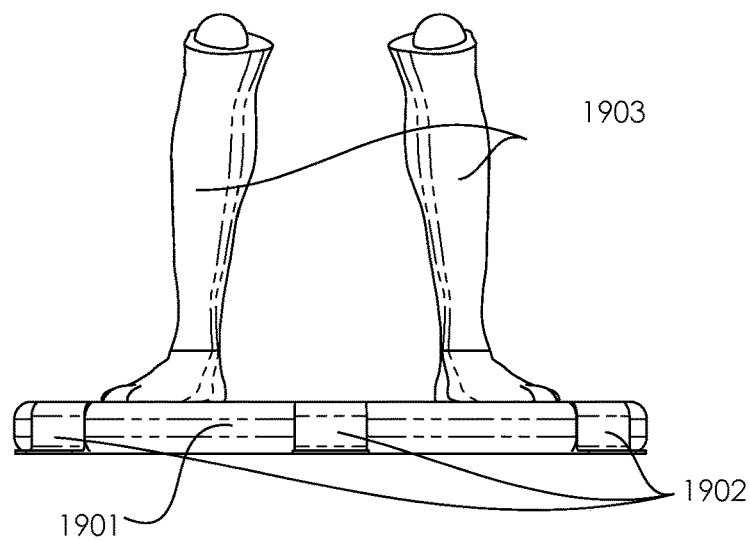

FIG. 19A is a front view of a user standing on a standing mat that has support clips attached to it.

Figure 19B:
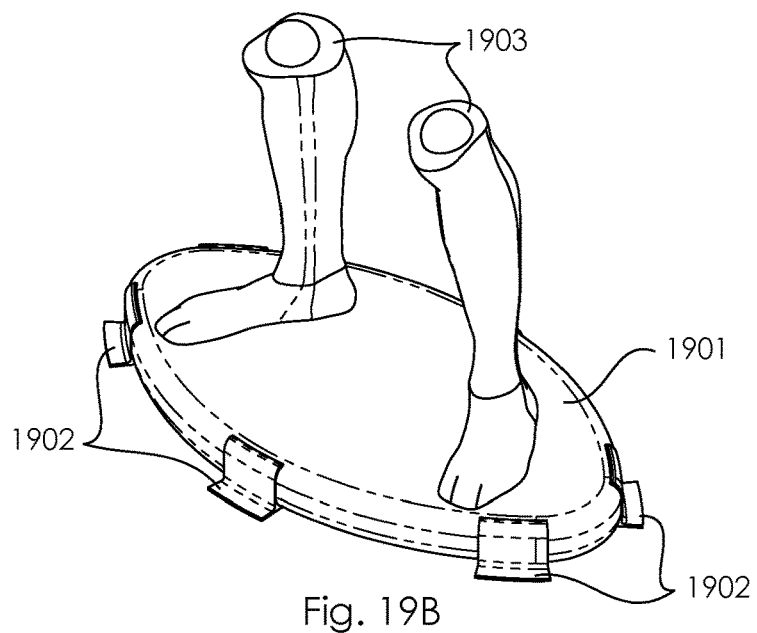

FIG. 19B is an upper isometric view of the user standing on the standing mat of FIG. 19A that has support clips attached to it.

Figure 19C:
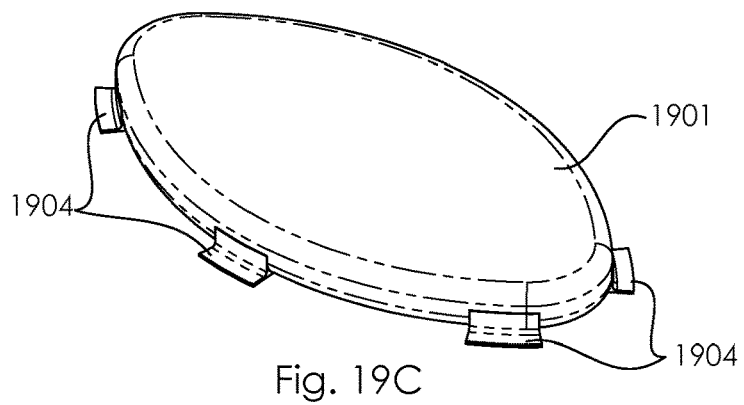

FIG. 19C is an upper isometric view of the standing mat of FIG. 19A that has low profile support clips attached to it.

Figure 20A:
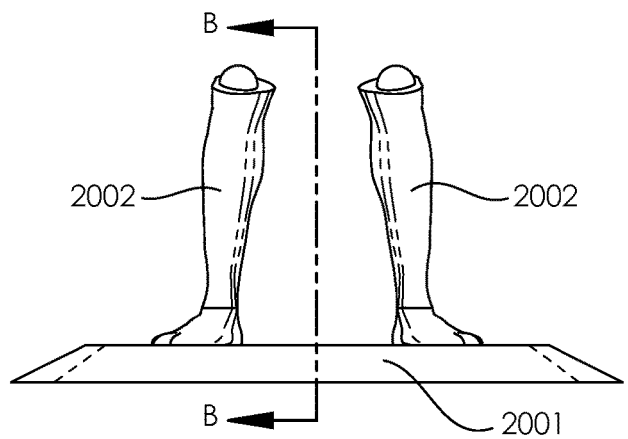

FIG. 20A is a front view of a user standing on a standing mat that has a ramp edge attached to it.

Figure 20B:
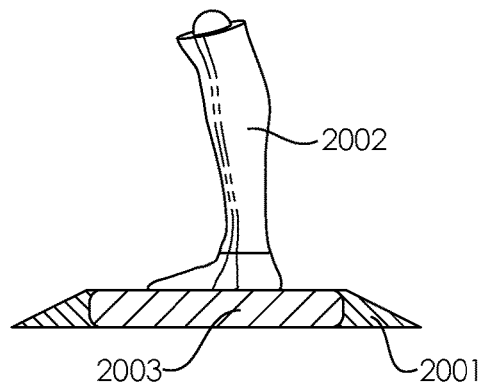

FIG. 20B is a side cross-section view along line B of the user standing on the standing mat of FIG. 20A.

Figure 20C:
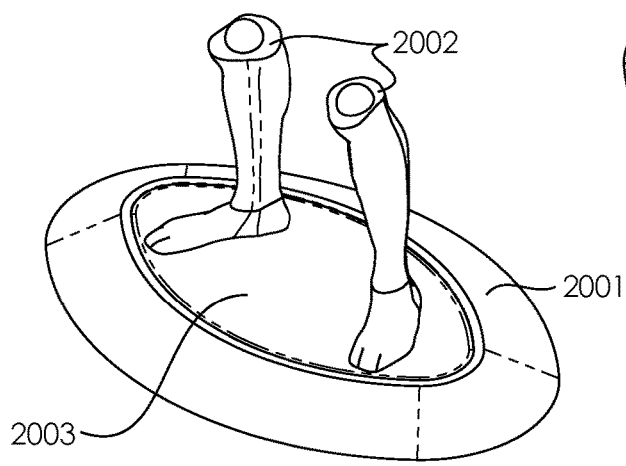

FIG. 20C is an upper isometric view of a user standing on a standing mat that has a ramp edge attached to it.

Figure 20D:
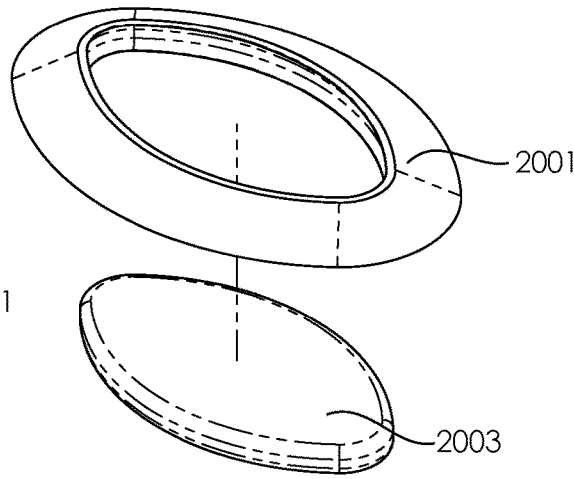

FIG. 20D is an exploded upper isometric view showing the ramp edge removed from the standing mat.

Figure 20E:
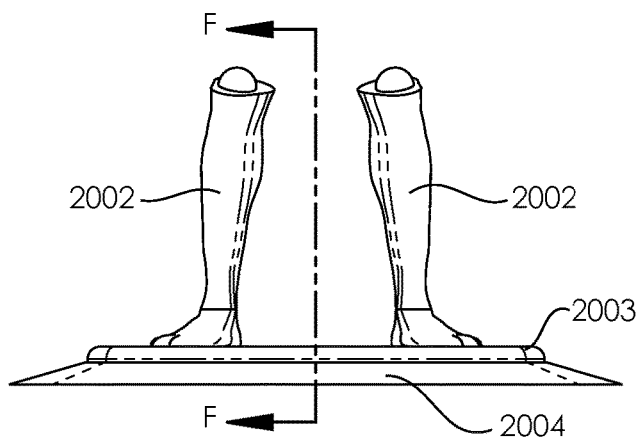

FIG. 20E is a front view of a user standing on a standing mat that has a partial height ramp edge attached to it.

Figure 20F:
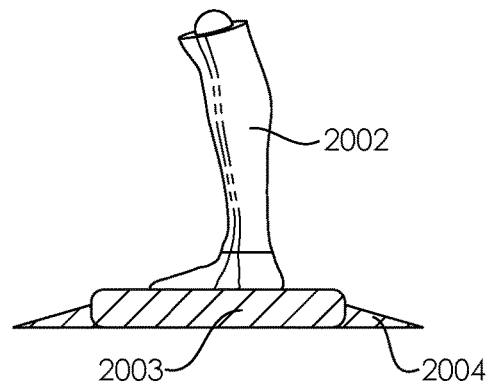

FIG. 20F is a side cross-section view along line F of the user standing on the standing mat of FIG. 20E.

Figure 21A:
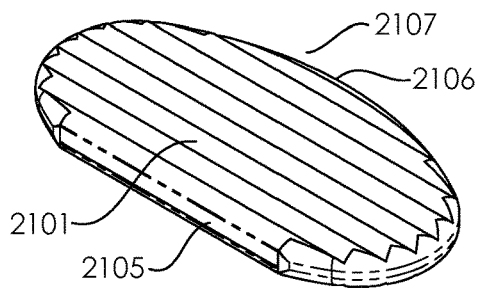

FIG. 21A is an upper isometric view of a spring filled inflatable platform.

Figure 21B:
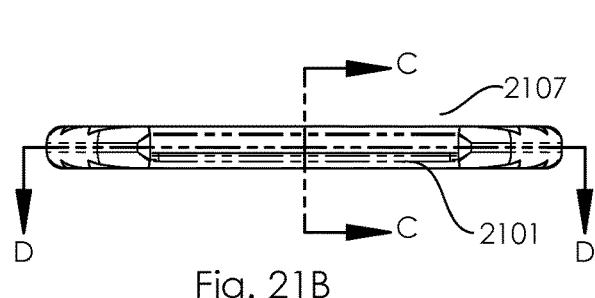

FIG. 21B is a front view of a spring filled inflatable platform.

Figure 21C:
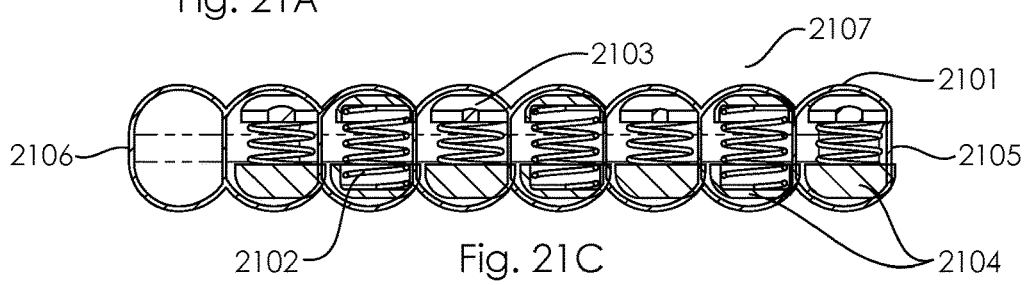

FIG. 21C is a side cross-section view along line C of the spring filled inflatable platform of FIG. 21B.

Figure 21D:
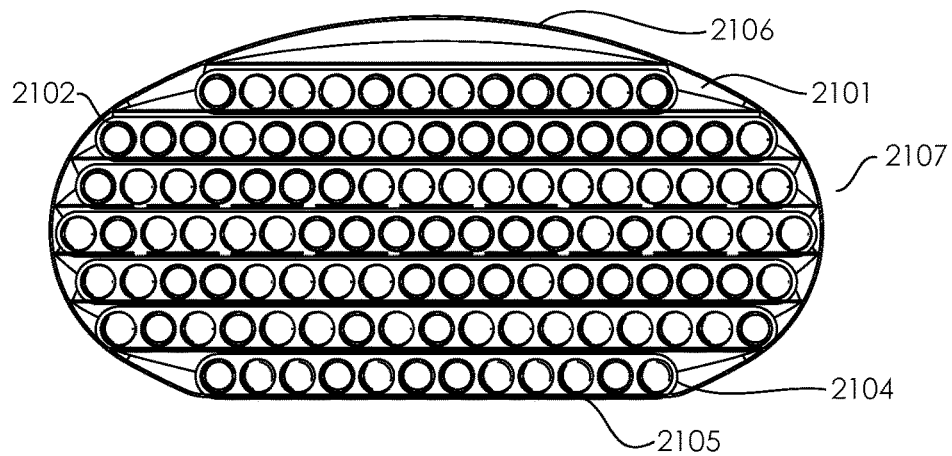

FIG. 21D is a top cross-section view along line D of the spring filled inflatable platform of FIG. 21B.

Figure 21E:
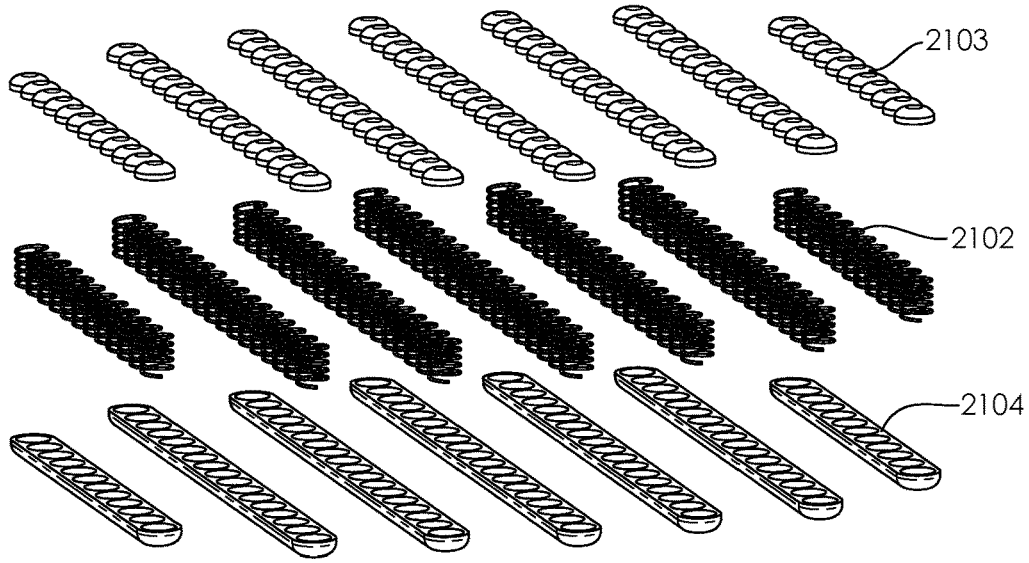

FIG. 21E is an exploded top angled view of the spring assemblies.

Figure 22A:
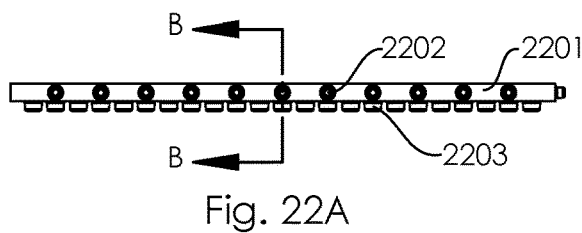

FIG. 22A is a front view of an interlocking foam piece.

Figure 22B:
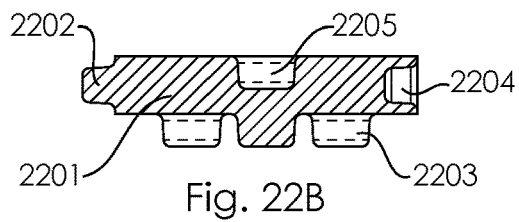

FIG. 22B is a side cross-section view along line B of the foam piece of FIG. 22A.

Figure 22C:
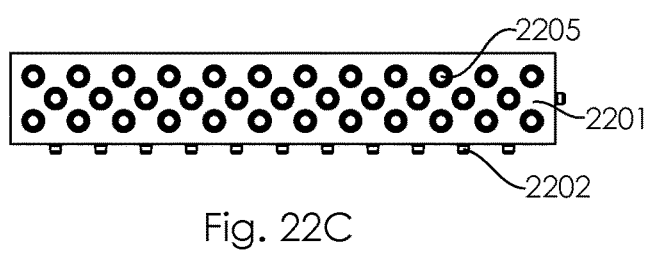

FIG. 22C is a top view of an interlocking foam piece.

Figure 22D:
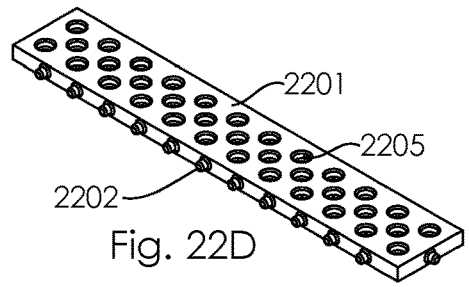

FIG. 22D is an upper isometric view of an interlocking foam piece.

Figure 22E:
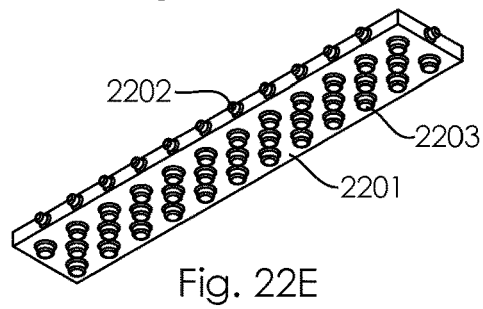

FIG. 22E is a lower isometric view of an interlocking foam piece.

Figure 22F:
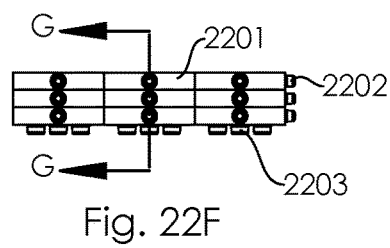

FIG. 22F is a side view of an assembled stack of nine interlocking foam pieces.

Figure 22G:
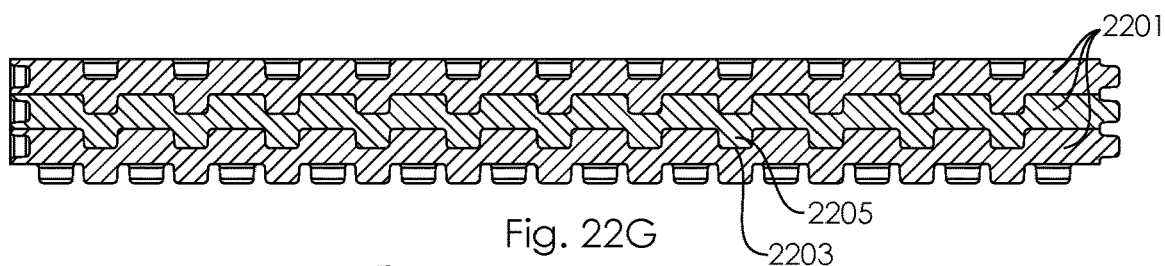

FIG. 22G is a front cross-section view along line G of the stack of foam pieces of FIG. 22F.

Figure 22H:
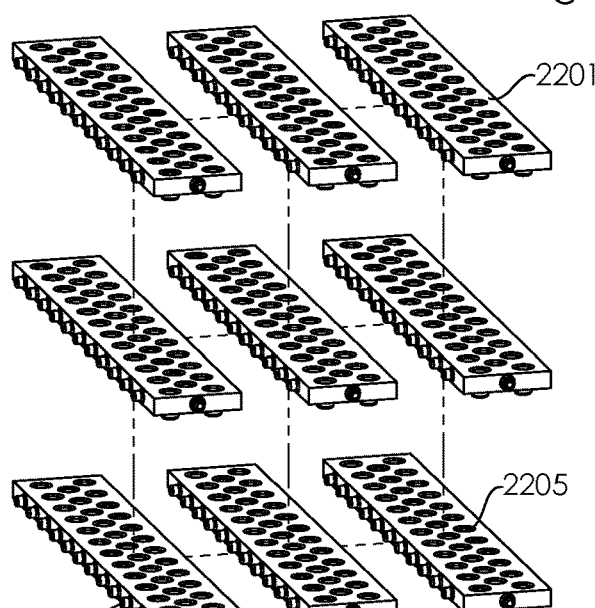

FIG. 22H is an exploded top angled view of the assembled stack of interlocking foam pieces.

Figure 22I:
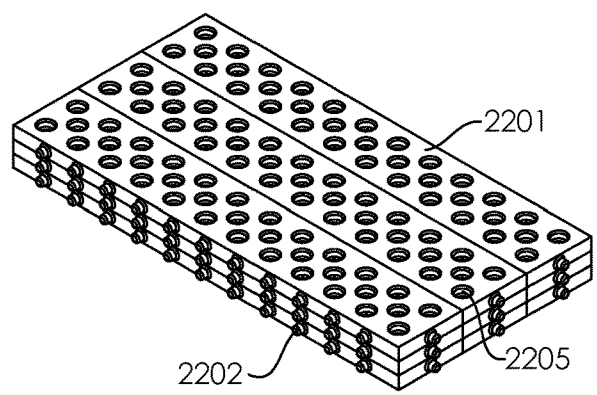

FIG. 22I is an upper isometric view of an assembled stack of interlocking foam pieces.

FIG. 22J is an upper isometric view of an assembled stack of interlocking foam pieces of two different sizes.

FIG. 22K is a side view of an assembled stack of interlocking foam pieces of two different sizes.

FIG. 22L is a front cross-section view along line L of the stack of foam pieces of FIG. 22K.

FIG. 22M is an upper isometric view of an assembled stack of interlocking foam pieces of three different sizes.

FIG. 22N is an upper isometric view of an assembled stack of interlocking foam pieces wrapped with a layer of material.

FIG. 22O is an exploded top angled view of an assembled stack of interlocking foam pieces of two different sizes.

FIG. 22P is an exploded top angled view of an assembled stack of interlocking foam pieces of three different sizes.

Figure 23A:
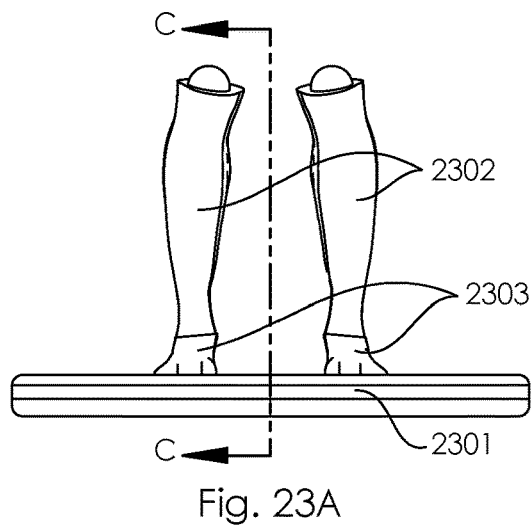

FIG. 23A is a front view of a user standing on a rigid or semi-rigid discs and foam(s) platform with a linear compression modulus.

Figure 23B:
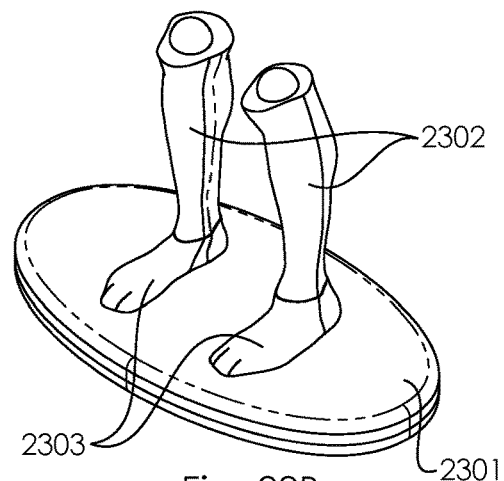

FIG. 23B is an upper isometric view of a user standing on a rigid or semi-rigid discs and foam(s) platform with a linear compression modulus.

Figure 23C:
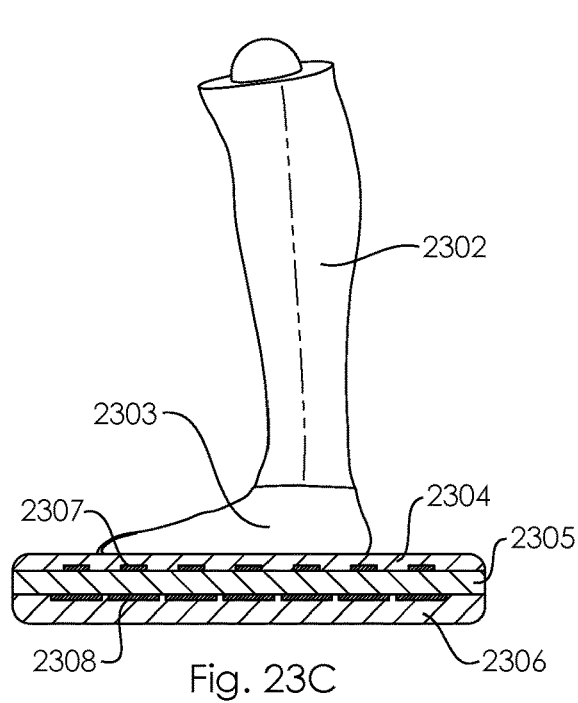

FIG. 23C is a side cross-section view along line C of the user standing on the foam platform of FIG. 23A.

Figure 23D:
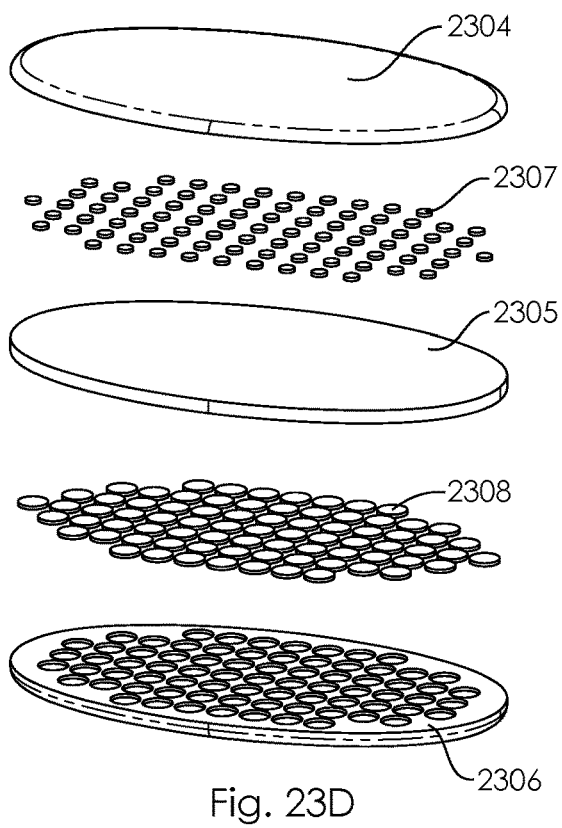

FIG. 23D is an exploded top angled view of a rigid or semi-rigid discs and foam(s) platform with a linear compression modulus.

Figure 23E:
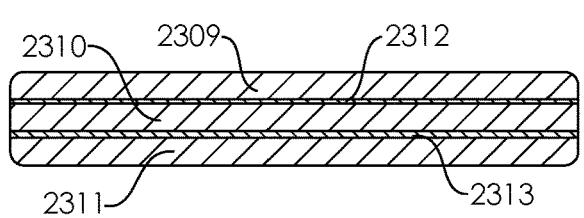

FIG. 23E is a front cross-section view of a rigid or semi-rigid sheets and foam(s) platform with a linear compression modulus.

Figure 23F:
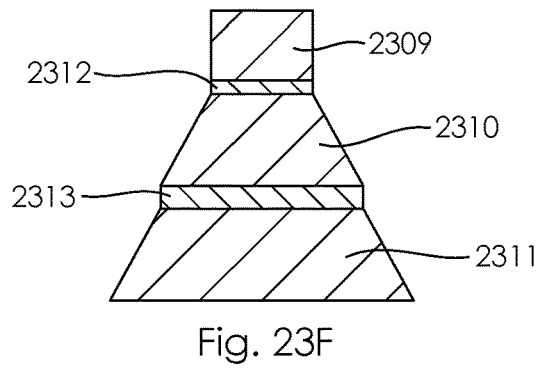

FIG. 23F shows the load path of the sheets and foam(s) platform of FIG. 23E.

Figure 24A:
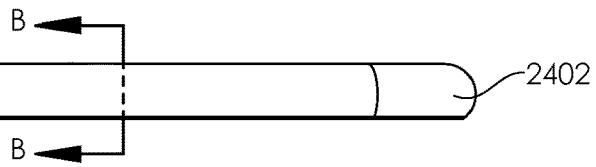

FIG. 24A is a front view of a spring-loaded standing platform in the loosest setting.

Figure 24B:
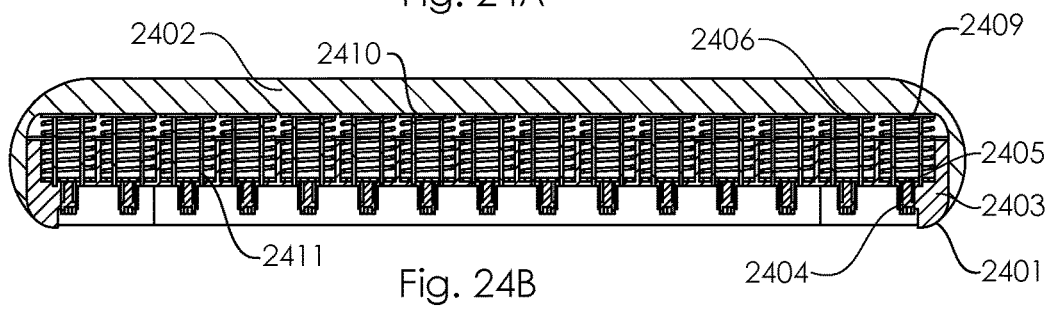

FIG. 24B is a side cross-section view along line B of the standing platform of FIG. 24A.

Figure 24C:
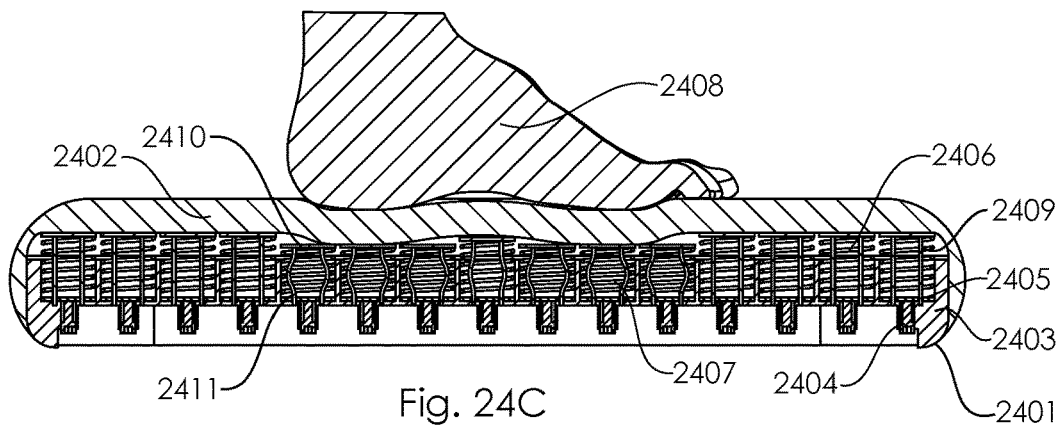

FIG. 24C is the side cross-section view of FIG. 24B showing a foot stepping on a spring-loaded standing platform when the springs are set at the loosest setting.

Figure 24D:
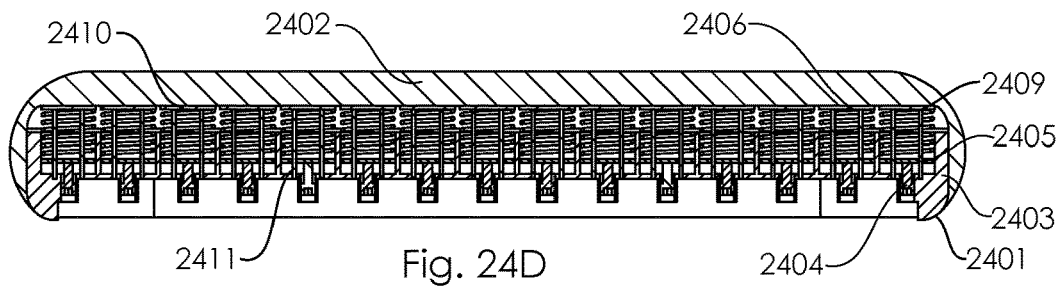

FIG. 24D is the side cross-section view of FIG. 24B showing a spring-loaded standing platform set to a medium preload setting.

Figure 24E:
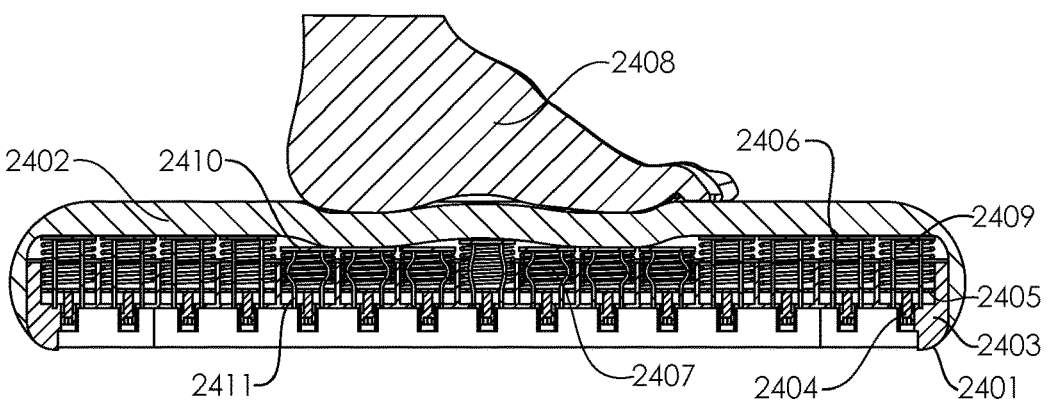

FIG. 24E is the side cross-section view of FIG. 24D showing a foot stepping on a spring-loaded standing platform when the springs are set at a medium preload setting.

Figure 25A:
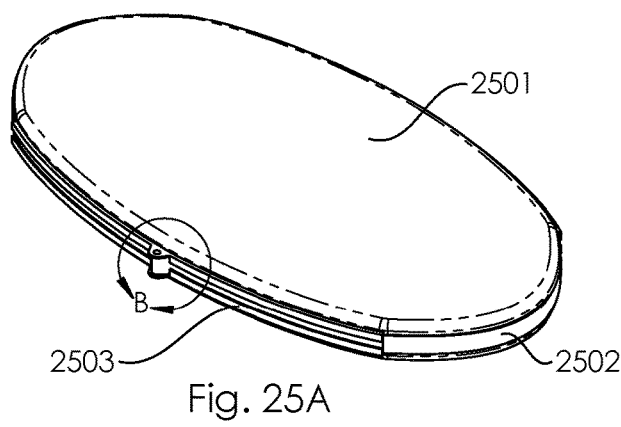

FIG. 25A is an upper isometric view of an adjustable firmness foam pad with perimeter strap.

Figure 25B:
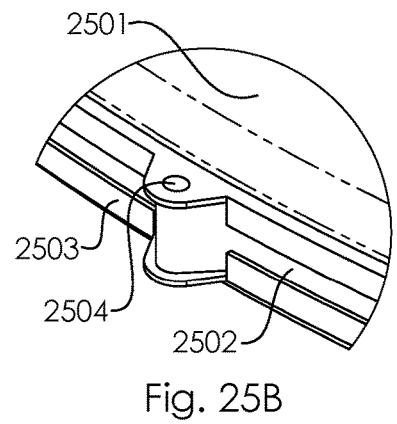

FIG. 25B is a detailed view of the region within the area B of the adjusting buckle on the foam pad of FIG. 25A.

Figure 25C:
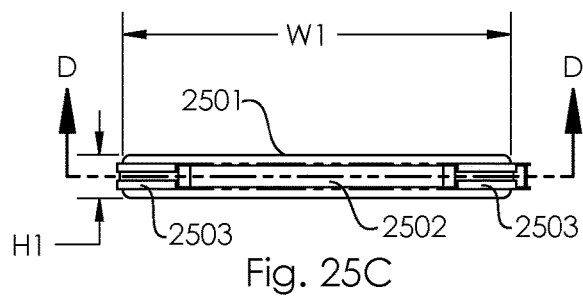

FIG. 25C is a side view of an adjustable firmness foam pad with perimeter strap in a relaxed setting.

Figure 25E:
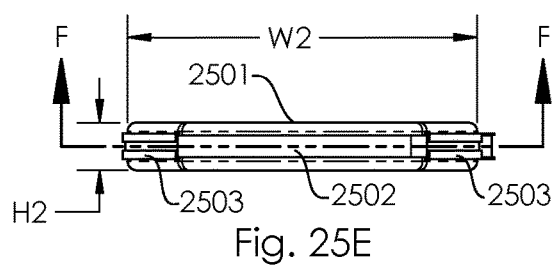
Figure 25D:
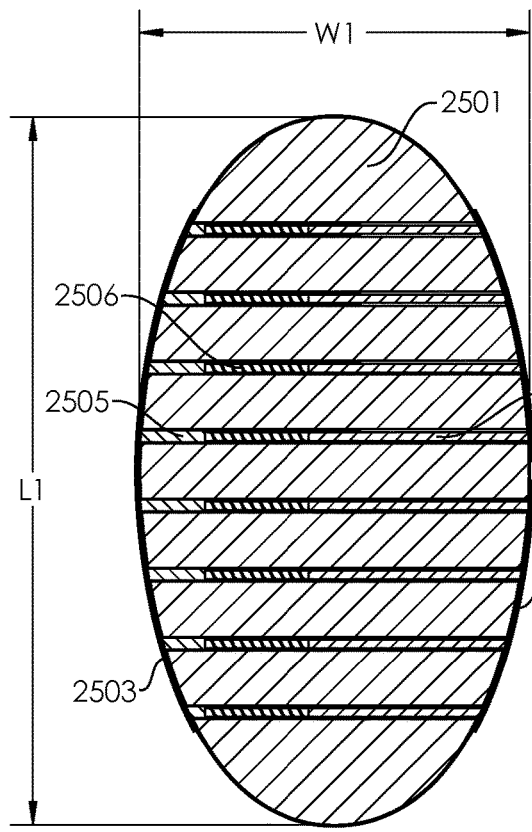

FIG. 25D is a top cross-section view along line D of the foam pad of FIG. 25C.

FIG. 25E is a side view of an adjustable firmness foam pad with perimeter strap in a tight setting.

Figure 25F:
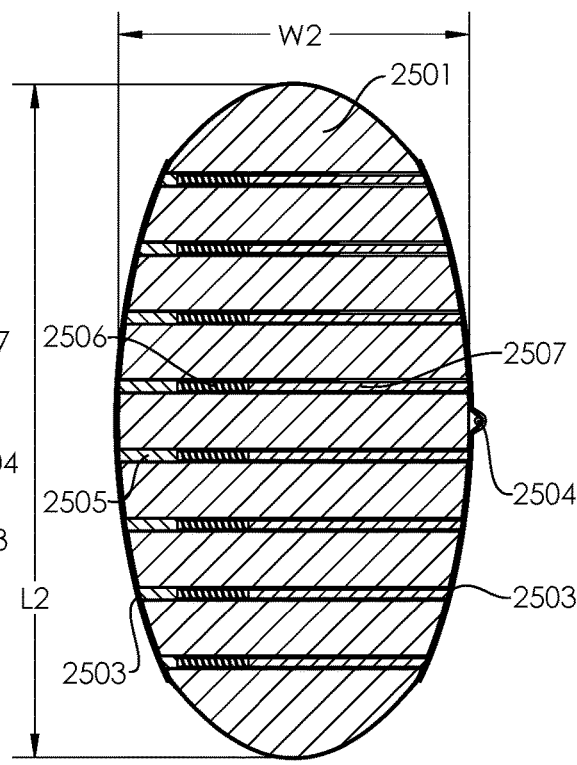

FIG. 25F is a top cross-section view along line F of the foam pad of FIG. 25E.

FIG. 26A is an upper isometric view of an adjustable firmness foam pad with longitudinal tensioners.

FIG. 26B is a side view of an adjustable firmness foam pad with longitudinal tensioners.

FIG. 26C is a top view of an adjustable firmness foam pad with longitudinal tensioners in a relaxed setting.

FIG. 26D is a top view of an adjustable firmness foam pad with longitudinal tensioners in a tight setting.

FIG. 26E is a front cross-section view along line E of the foam pad of FIG. 26C.

FIG. 26F is a front cross-section view along line F the foam pad of FIG. 26D.

Figure 27A:
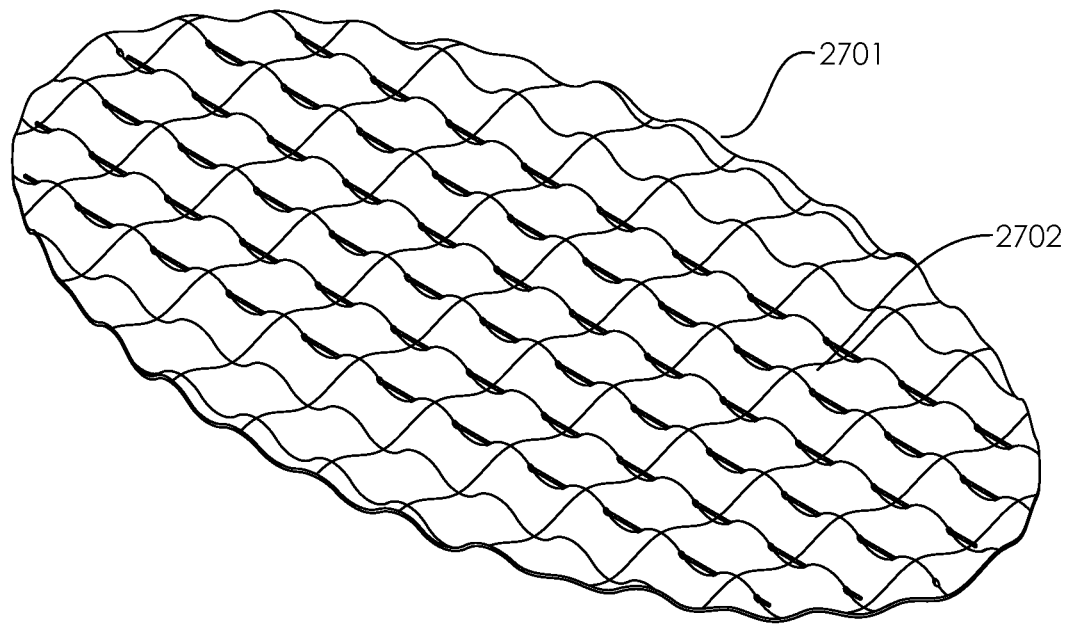

FIG. 27A is an upper isometric view of an adjustable firmness semi-rigid pad.

Figure 27B:
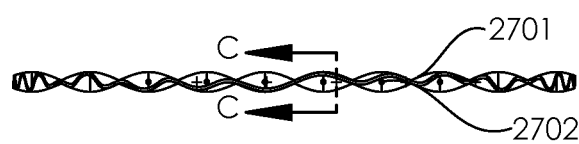

FIG. 27B is a side view of an adjustable firmness semi-rigid pad.

Figure 27C:
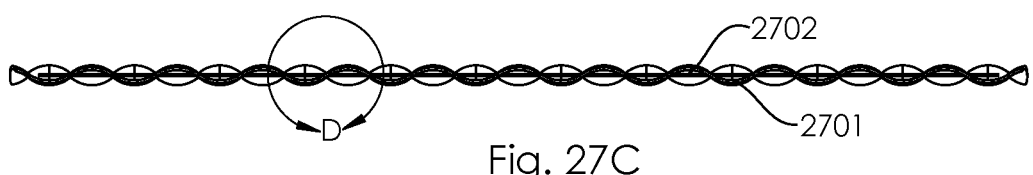

FIG. 27C is a front cross-section view along line C of the pad of FIG. 27B.

Figure 27D:
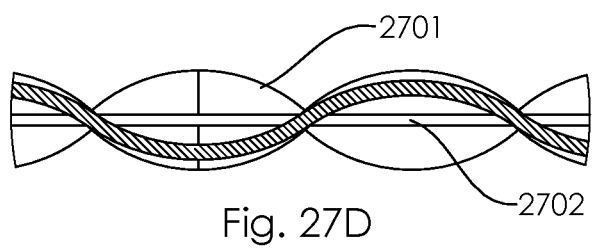

FIG. 27D is a detailed front cross-section view of the region within the area D of the pad of FIG. 27C.

FIG. 28A is a top view of a drop stitch inflatable mat with a valve installed on the top surface.

FIG. 28B is a front cross-section view along line B of the mat of FIG. 28A.

FIG. 28C is a top view of a drop stitch inflatable mat with a needle air valve installed on the side surface.

FIG. 28D is a front cross-section view along line D of the mat of FIG. 28C.

FIG. 28E is a close up front cross-section view of the region within the area E of the mat of FIG. 28D.

FIG. 28F is a close up front cross-section view (corresponding to the view along line E of FIG. 28E) of a drop stitch inflatable mat with a protected needle air valve installed on the side surface.

Figure 28G:
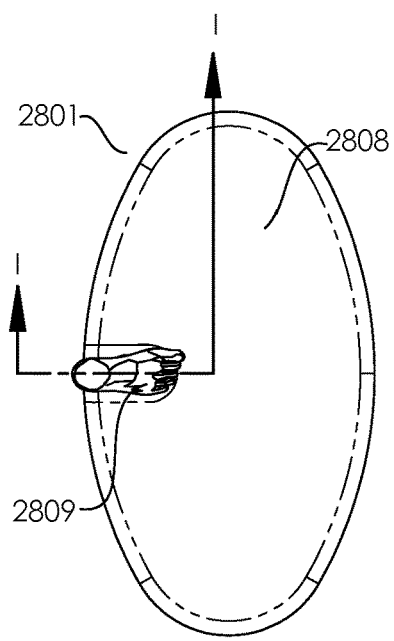

FIG. 28G is a top view of a foot stepping on an air valve that is installed on a top surface of a drop stitch inflatable standing platform.

Figure 28H:
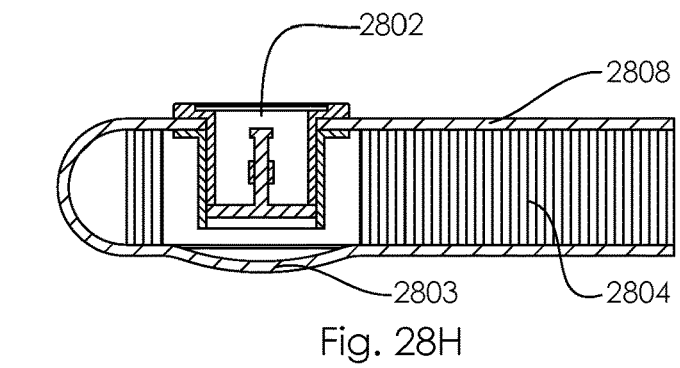

FIG. 28H is a side cross-section view (corresponding to the view along line I of FIG. 28G) of a drop stitch inflatable mat with an air valve installed on the top surface.

Figure 28I:
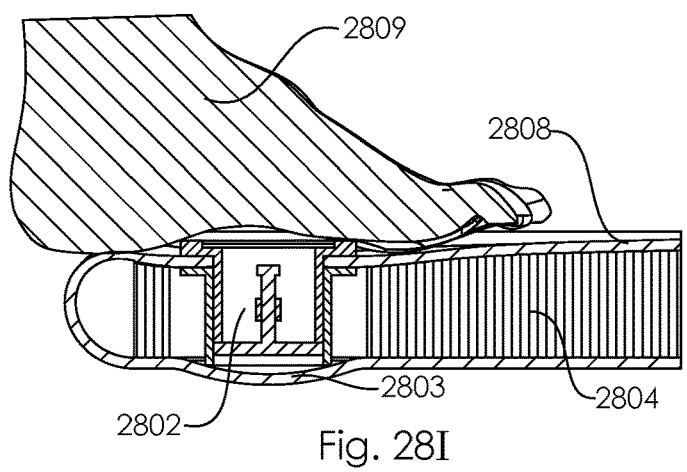

FIG. 28I is a side cross-section view along line I of the foot stepping on the air valve of the mat of FIG. 28G.

Figure 28J:
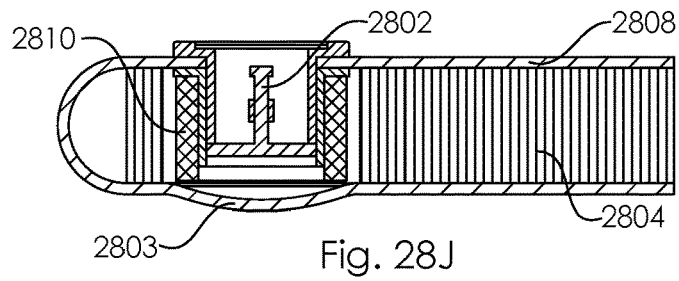

FIG. 28J is a side cross-section view (corresponding to the view along line I of FIG. 28G) of a drop stitch inflatable mat with an air valve with a protective bumper installed on the top surface.

Figure 28K:
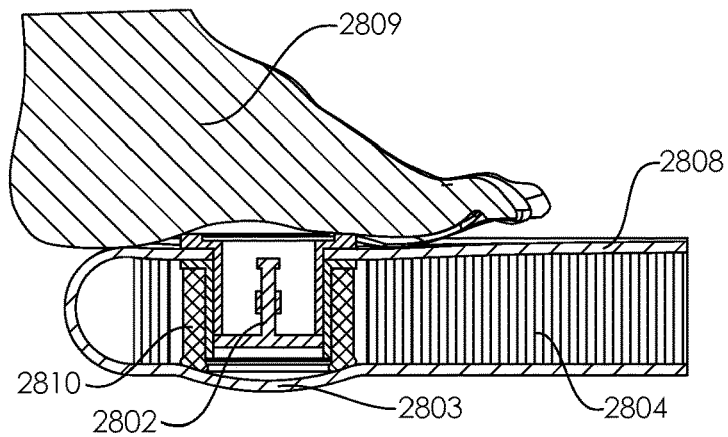

FIG. 28K is a side cross-section view (corresponding to the view along line I of FIG. 28G) of a foot stepping on a valve with a protective bumper that is installed on the top surface of a drop stitch inflatable mat.

Figure 29A:
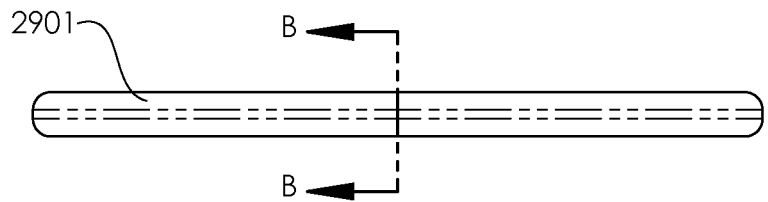

FIG. 29A is a front view of a standing platform with multi density cores.

Figure 29B:
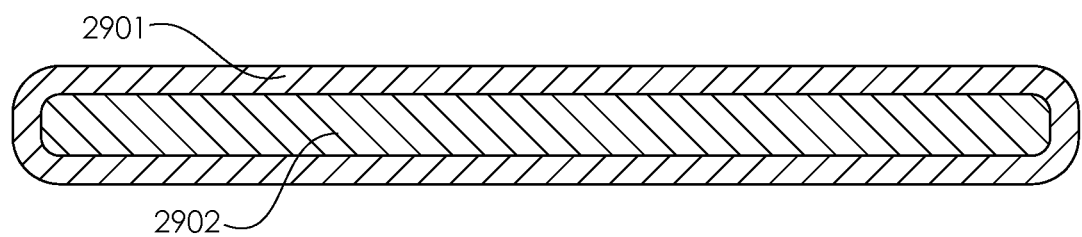

FIG. 29B is a front cross-section view along line B of the standing platform of FIG. 29A with an inner core and an outer layer.

Figure 29C:
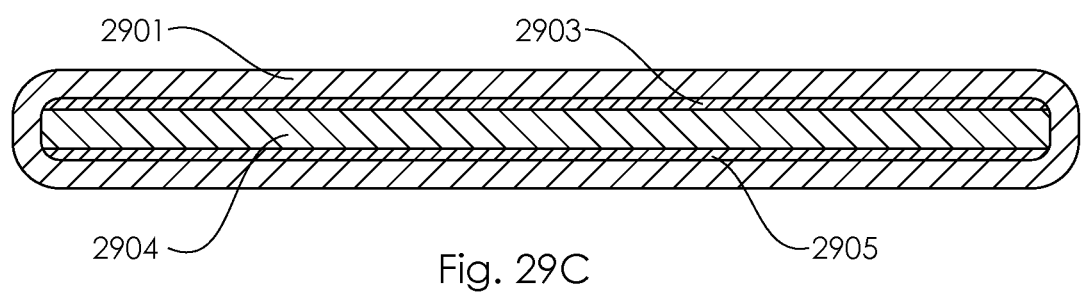

FIG. 29C is a front cross-section view (corresponding to the view along line B of FIG. 29A) of a standing platform with multiple inner cores and an outer layer.

Figure 29D:
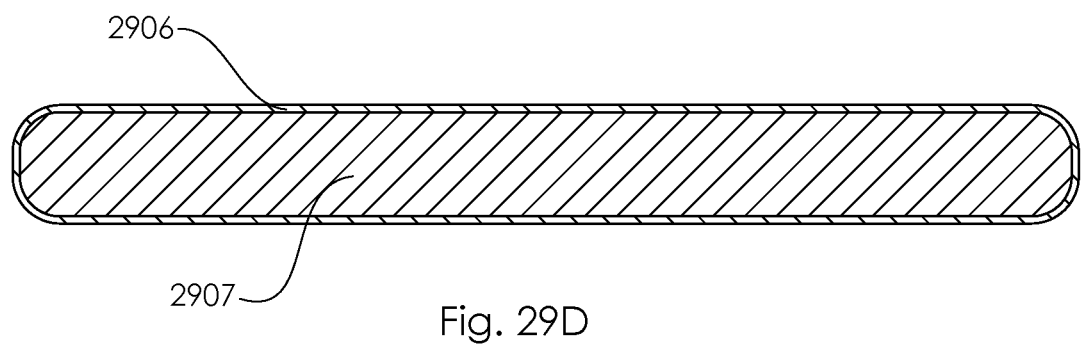

FIG. 29D is a front cross-section view (corresponding to the view along line B of FIG. 29A) of a standing platform with a large inner core and a thin outer layer.

FIG. 30A is a front view of a user standing on a curved surface standing platform with a centered stance.

FIG. 30B is an angled view of a user standing on a curved surface standing platform with a centered stance.

FIG. 30C is a front view of a user standing on a curved surface standing platform with one leg lifted in an offset stance.

FIG. 30D is a front view of a user standing on a curved surface standing platform with one leg depressing the end of the board in an offset stance.

FIG. 30E is an angled view of a user standing on a curved surface standing platform with one leg lifted in an offset stance.

FIG. 30F is an angled view of a user standing on a curved surface standing platform with one foot depressing the end of the board in an offset stance.

FIG. 30G is a front view of a user standing with both feet in the middle of the curved surface standing platform.

FIG. 30H is an angled view of the user with both feet standing in the middle of the curved surface standing platform of FIG. 30G.

FIG. 31A is a front view of a user standing on a two layer sandwiched curved surface standing platform with a centered stance.

FIG. 31B is a front view of a user standing on the two layer sandwiched curved surface standing platform of FIG. 31A. One foot is depressing the end of the board and the other is lifted in a wide centered stance.

FIG. 31C is an angled view of a user standing on the two layer sandwiched curved surface standing platform of FIG. 31B. One foot is depressing the end of the board and the other is lifted in a wide centered stance.

FIG. 31D is a front view of a user standing on a flattened three layer sandwiched curved surface standing platform. The user has a wide centered stance and is depressing both ends of the board with their feet.

FIG. 31E is an angled view of a user standing on the flattened three layer sandwiched curved surface standing platform of FIG. 31D. The user has a wide centered stance and is depressing both ends of the board with their feet.

Figure 32A:
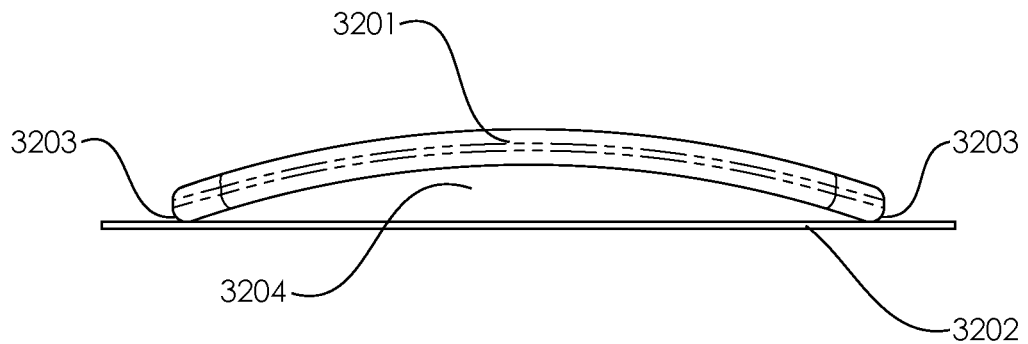

FIG. 32A is a front view of an inverted curved surface standing platform.

Figure 32B:
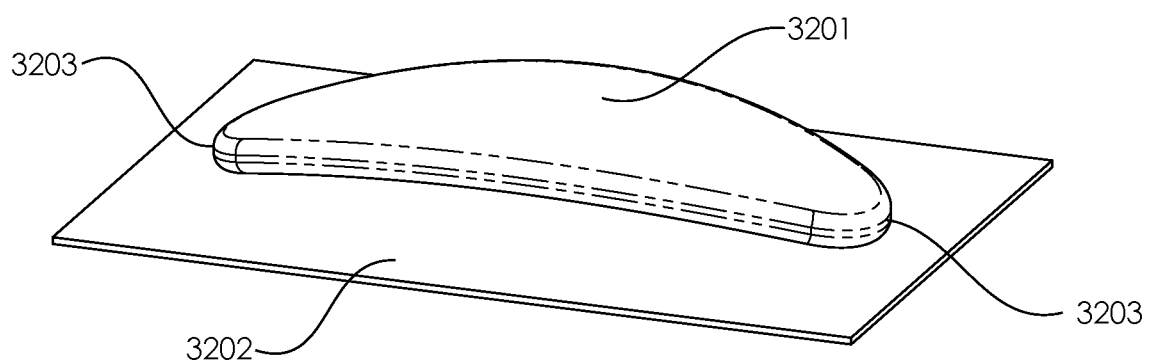

FIG. 32B is an angled view of an inverted curved surface standing platform.

Figure 32C:
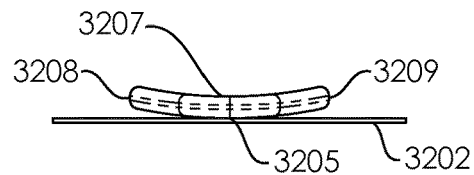

FIG. 32C is a side view of a standing platform with a curved surface along the minor axis.

Figure 32D:
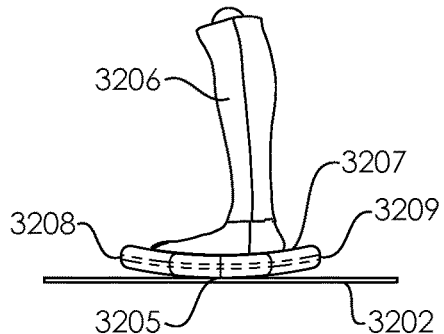

FIG. 32D is a side view of a user standing on a standing platform with a curved surface along the minor axis.

Figure 32E:
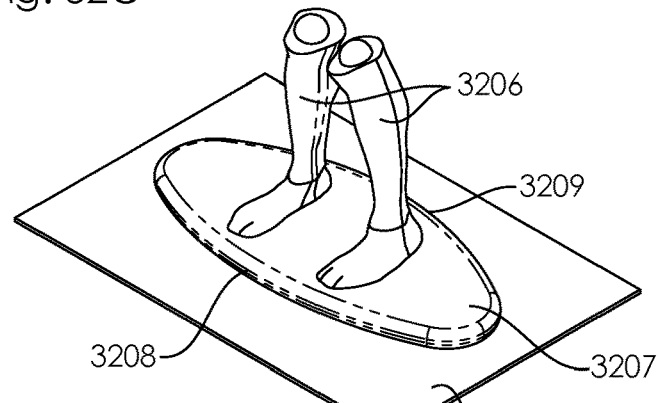

FIG. 32E is an angled view of the user and the standing platform of FIG. 32D.

Figure 32F:
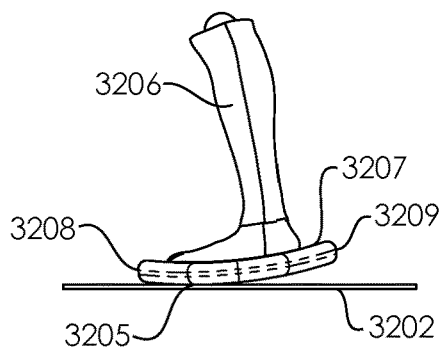

FIG. 32F is a side view of a user standing and rocking forward on a standing platform with a curved surface along the minor axis.

Figure 32G:
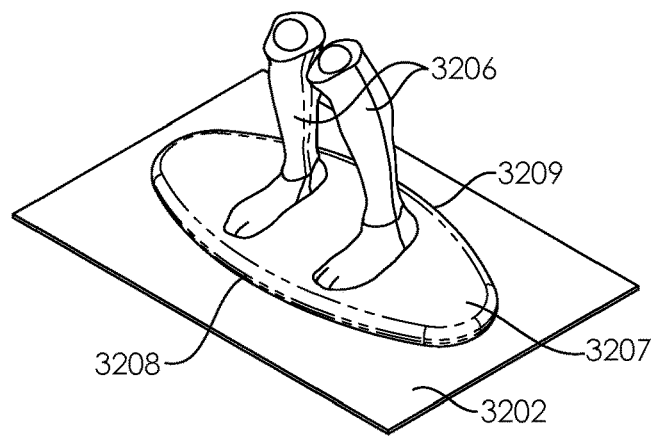

FIG. 32G is an angled view of the user and the standing platform of FIG. 32F.

Figure 32H:
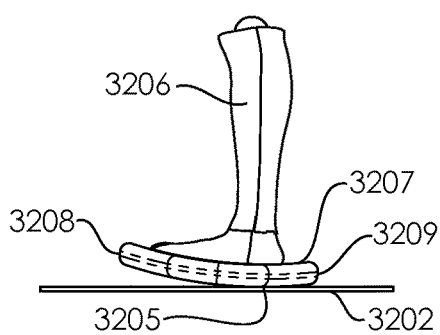

FIG. 32H is a side view of a user standing and rocking backward on a standing platform with a curved surface along the minor axis.

Figure 32I:
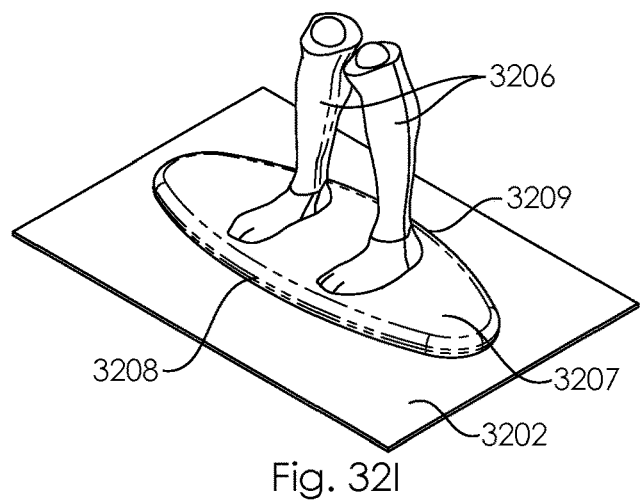

FIG. 32I is an angled view of the user and the standing platform of FIG. 32H.

FIG. 33A is a front view of a user standing on a standing platform and holding exercise bands in a relaxed position.

FIG. 33B is an upper isometric view of a user standing on a standing platform and holding exercise bands in a relaxed position.

FIG. 33C is a front view of a user standing on a standing platform and holding exercise bands in a tensioned position.

FIG. 33D is an upper isometric view of a user standing on a standing platform and holding exercise bands in a tensioned position.

Figure 33E:
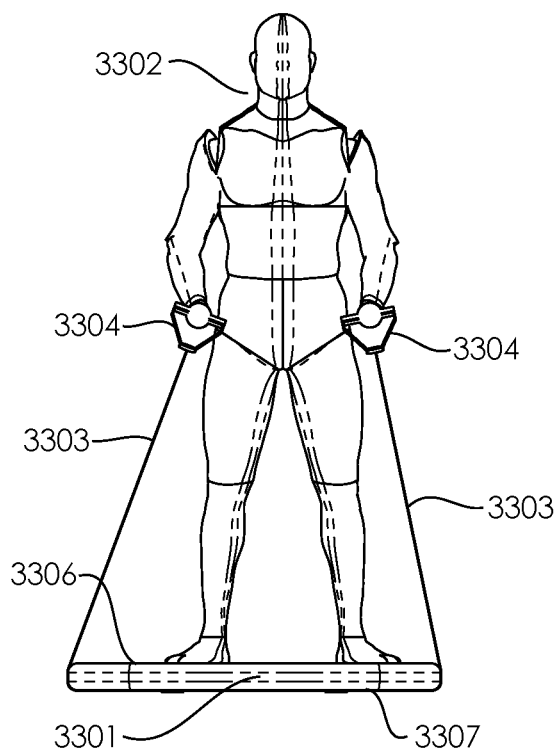

FIG. 33E is a front view of a user standing off-center on a standing platform while holding under-board exercise bands in a relaxed position.

Figure 33F:
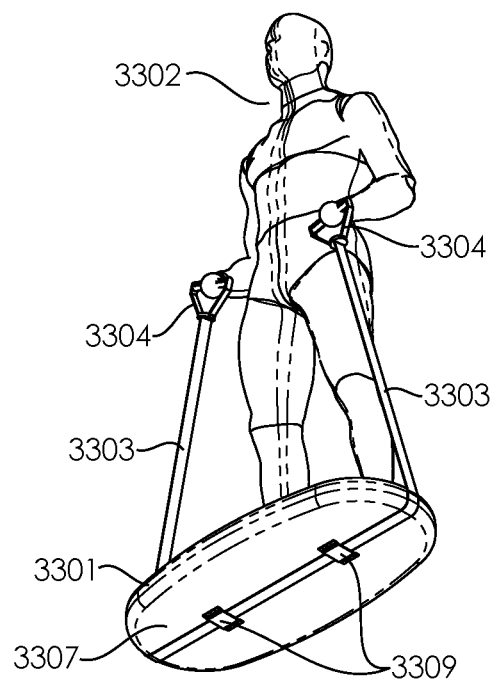

FIG. 33F is a lower isometric view of a user standing off-center on a standing platform while holding under-board exercise bands in a relaxed position.

Figure 33G:
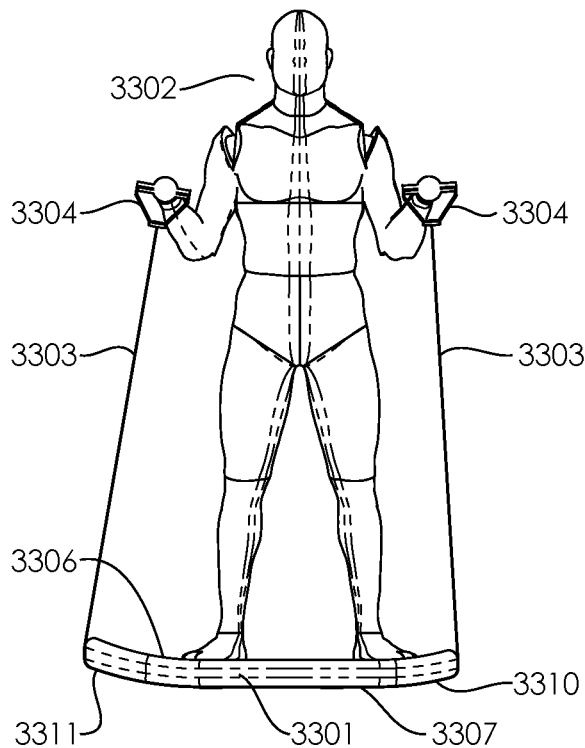

FIG. 33G is a front view of a user standing off-center on a standing platform while holding under-board exercise bands in a tensioned position.

Figure 33H:
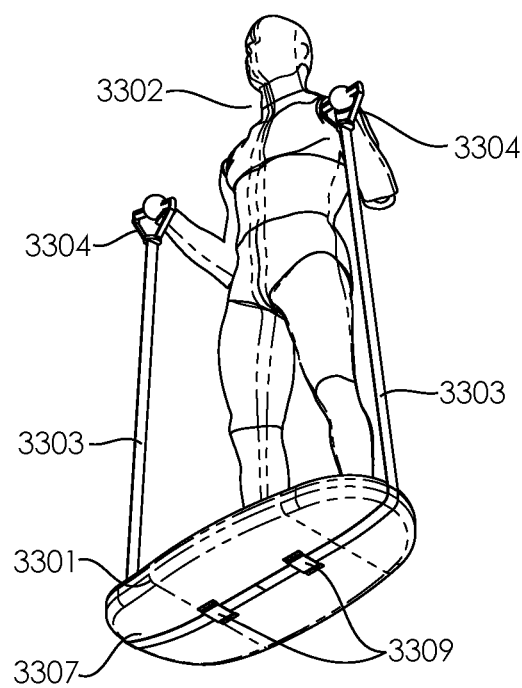

FIG. 33H is a lower isometric view of a user standing off-center on a standing platform while holding under-board exercise bands in a tensioned position.

Figure 33I:
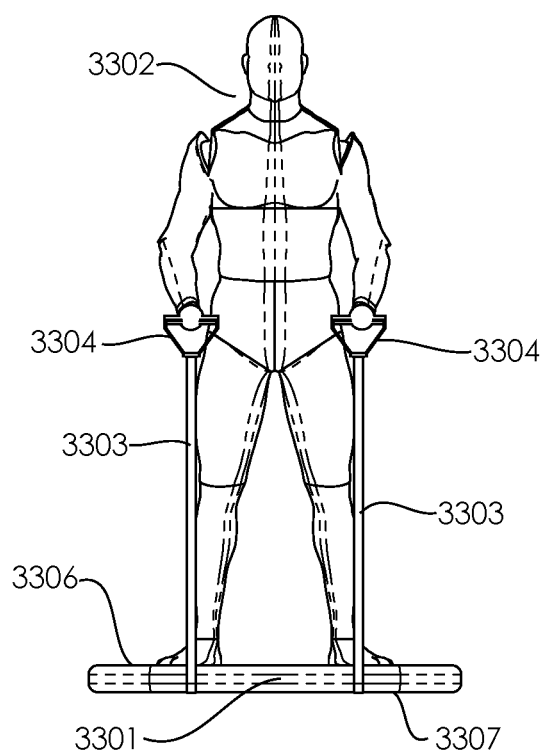

FIG. 33I is a front view of a user standing on a standing platform while holding front exercise bands in a relaxed position.

Figure 33J:
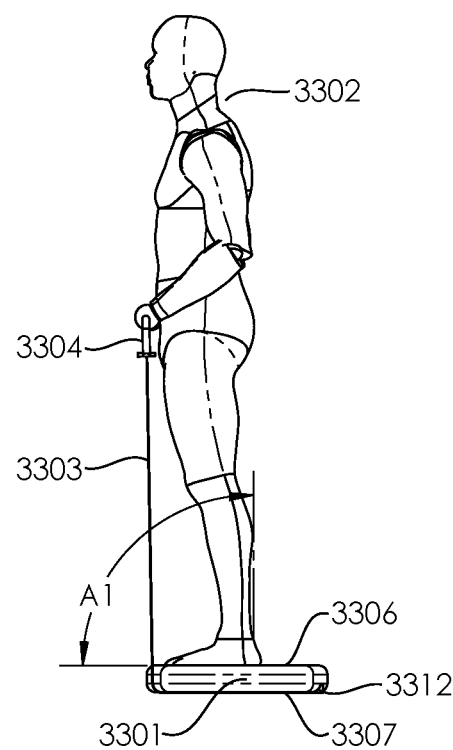

FIG. 33J is a side view of a user standing on a standing platform while holding front exercise bands in a relaxed position.

Figure 33K:
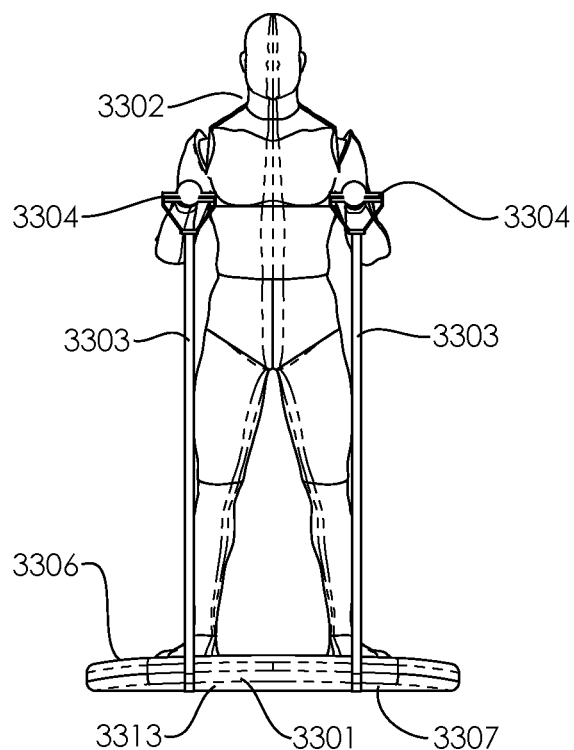

FIG. 33K is a front view of a user standing on a standing platform while holding front exercise bands in a tensioned position.

Figure 33L:
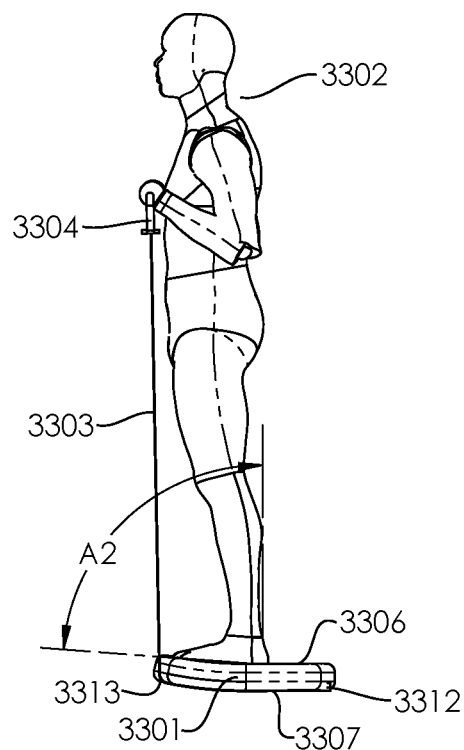

FIG. 33L is a side view of a user standing on a standing platform while holding front exercised bands in a tensioned position.

Figure 34A:
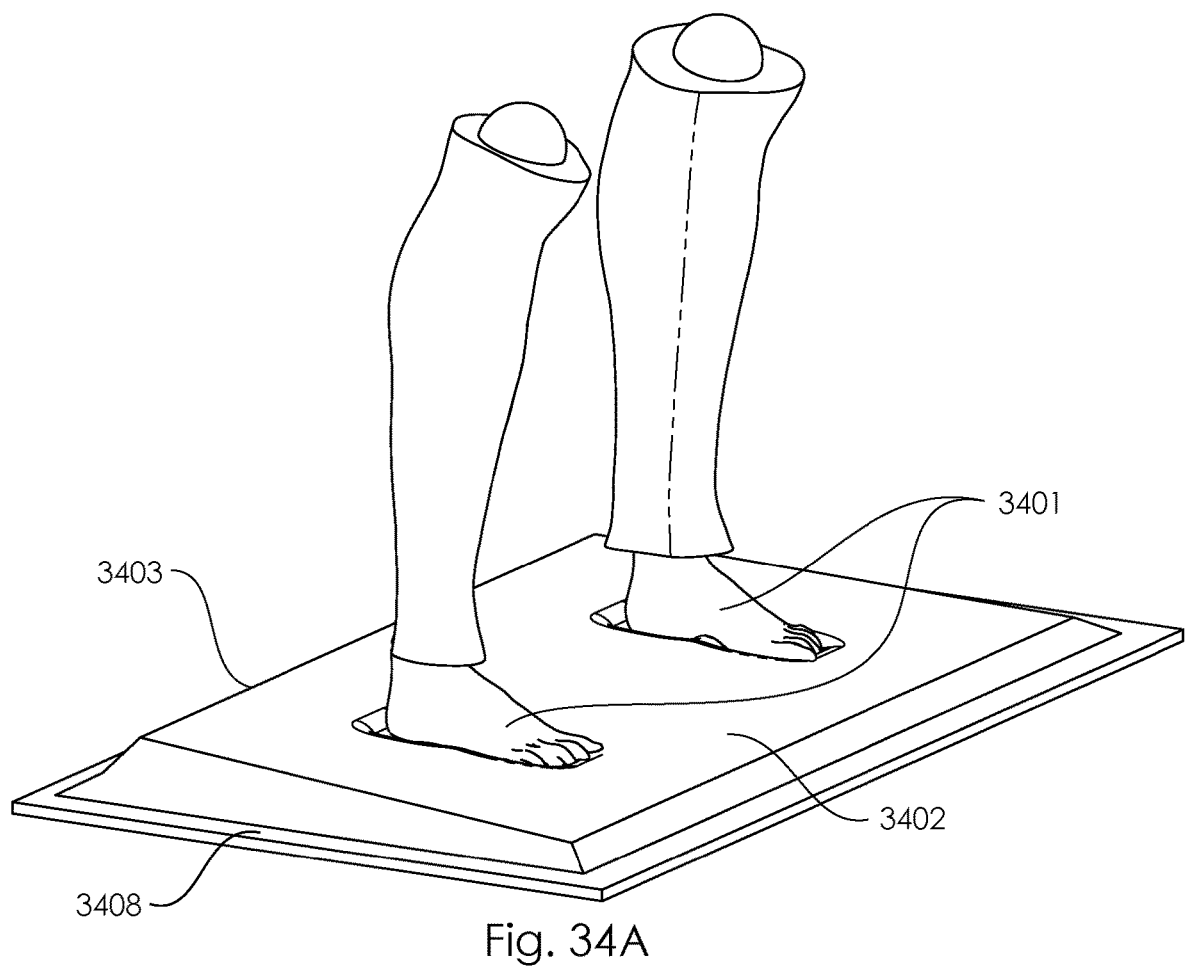

FIG. 34A is an upper isometric view of feet standing on a sloped mat.

Figure 34B:
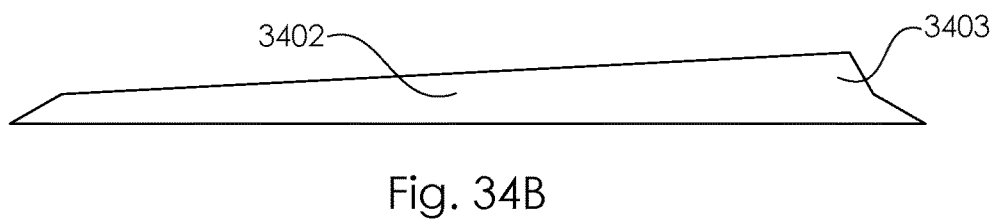

FIG. 34B is a side view of the sloped mat of FIG. 34A.

Figure 34C:
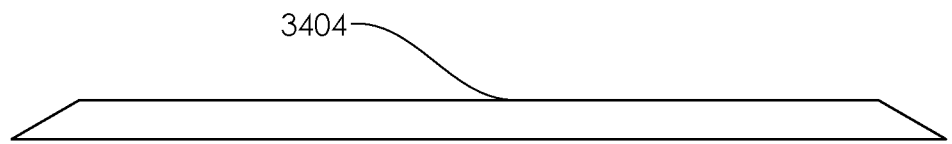

FIG. 34C is a side view of a flat mat.

Figure 34D:
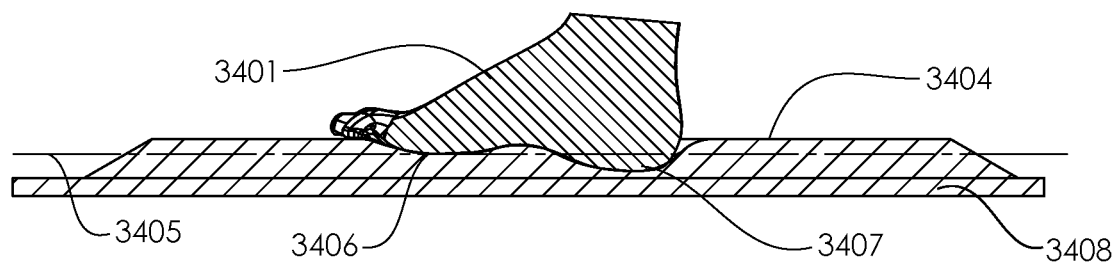

FIG. 34D is a side cross-section view of a foot standing on the flat mat of FIG. 34C.

Figure 34E:

FIG. 34E is a side view of the sloped mat of FIG. 34A.

Figure 34F:
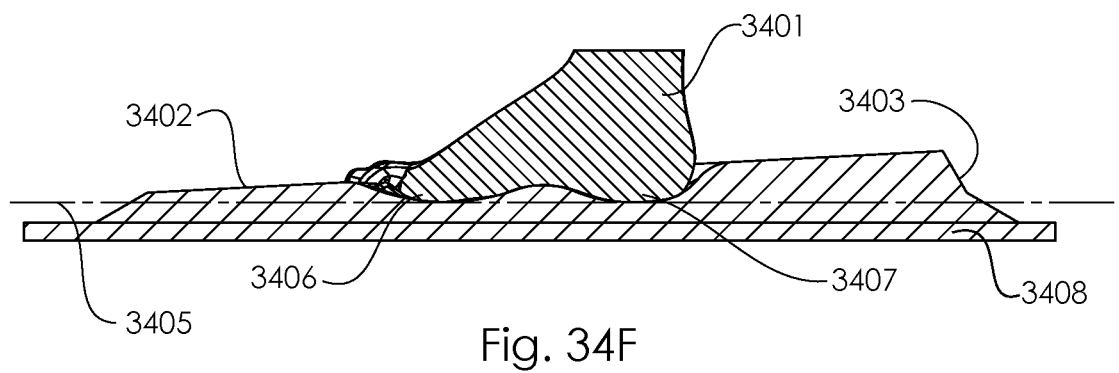

FIG. 34F is a side cross-section view of a foot standing on the sloped mat of FIG. 34A.

Figure 35A:
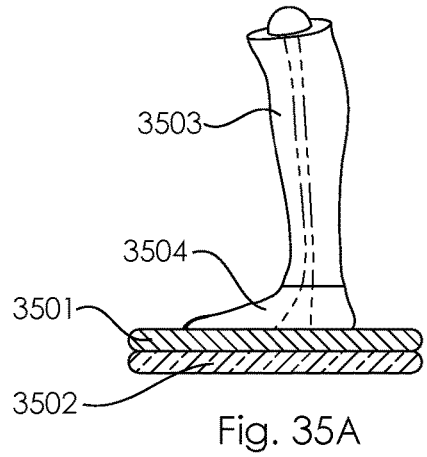

FIG. 35A is a side cross-section view of a user standing on an adjustable dual chamber sloped tilting standing platform with it in the neutral position.

Figure 35B:
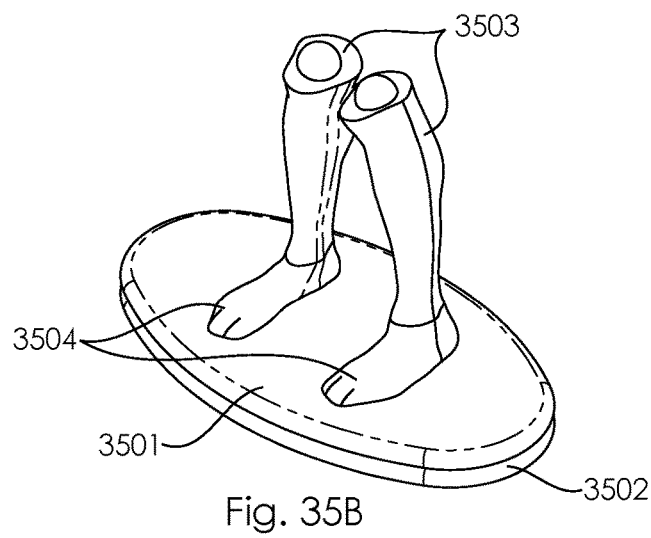

FIG. 35B is an upper isometric view of the user standing on the standing platform of FIG. 35A.

Figure 35C:
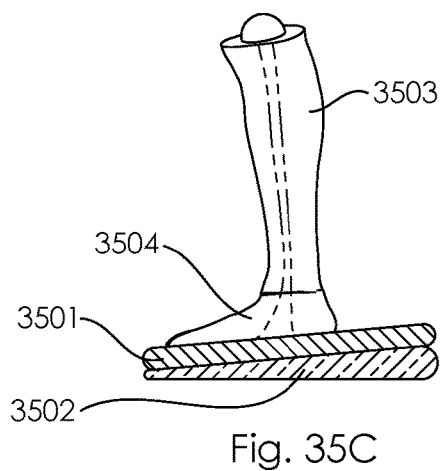

FIG. 35C is a side cross-section view of a user standing on an adjustable dual chamber sloped tilting standing platform with it in the forward tilted position.

Figure 35D:
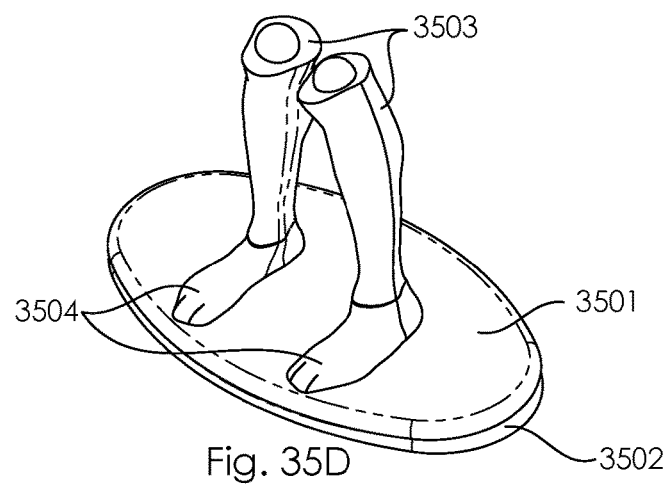

FIG. 35D is an upper isometric view of the user standing on the standing platform of FIG. 35C.

Figure 35E:
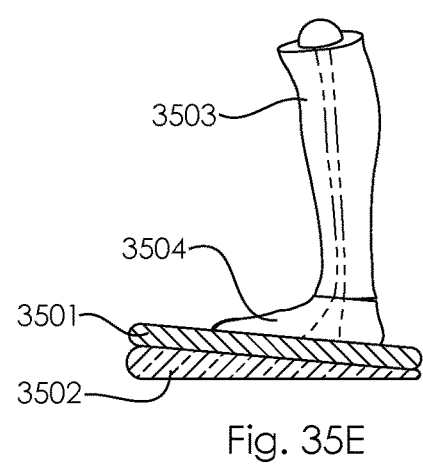

FIG. 35E is a side cross-section view of a user standing on an adjustable dual chamber sloped tilting standing platform with it in the backward tilted position.

Figure 35F:
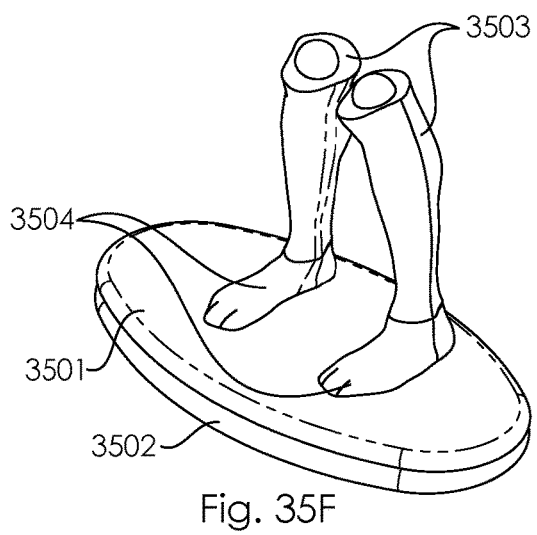

FIG. 35F is an upper isometric view of the user standing on the standing platform of FIG. 35E.

Figure 36A:
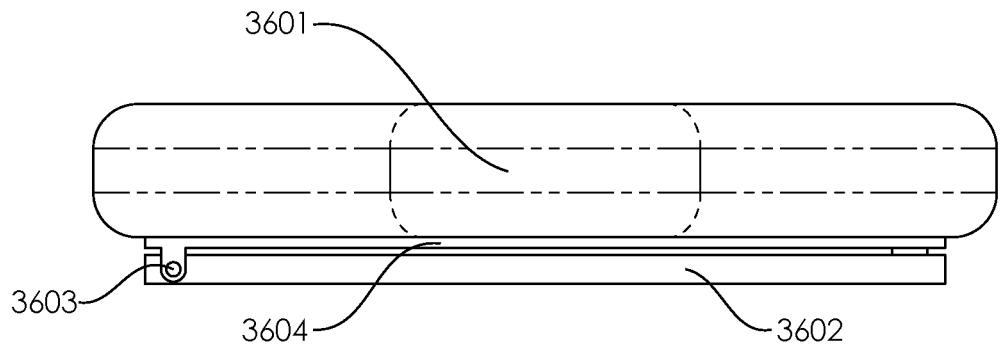

FIG. 36A is a side view of a tilting standing mat set to the flat position.

Figure 36B:
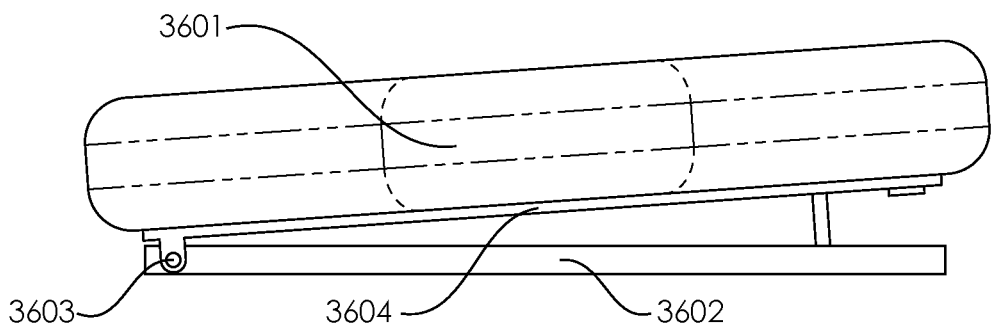

FIG. 36B is a side view of a tilting standing mat tilted to an angle of 4 degrees.

Figure 36C:
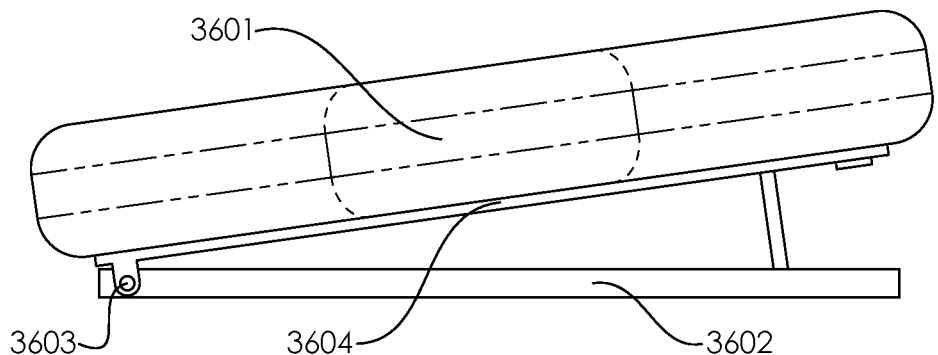

FIG. 36C is a side view of a tilting standing mat tilted to an angle of 8 degrees.

FIG. 37A is a front view of a variable rear hump standing platform.

FIG. 37B is a side cross-section view along line B of the standing platform of FIG. 37A.

FIG. 37C is an upper isometric view of the standing platform of FIG. 37A.

FIG. 37D is a top view of the standing platform of FIG. 37A.

Figure 38A:
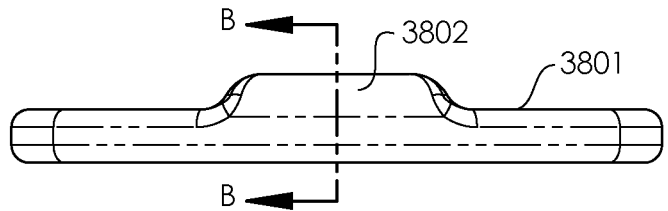

FIG. 38A is a front view of a front hump standing platform.

Figure 38B:
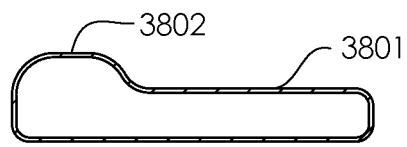

FIG. 38B is a side cross-section view along line B of the standing platform of FIG. 38A.

Figure 38C:
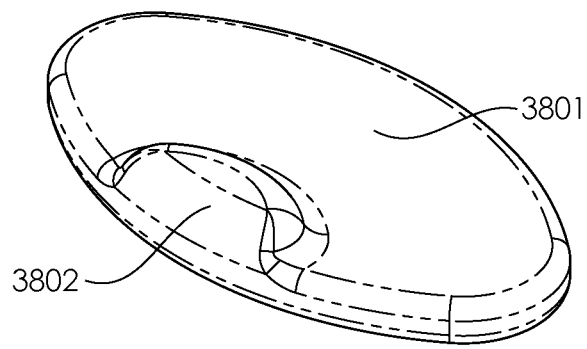

FIG. 38C is an upper isometric view of the standing platform of FIG. 38A.

Figure 38D:
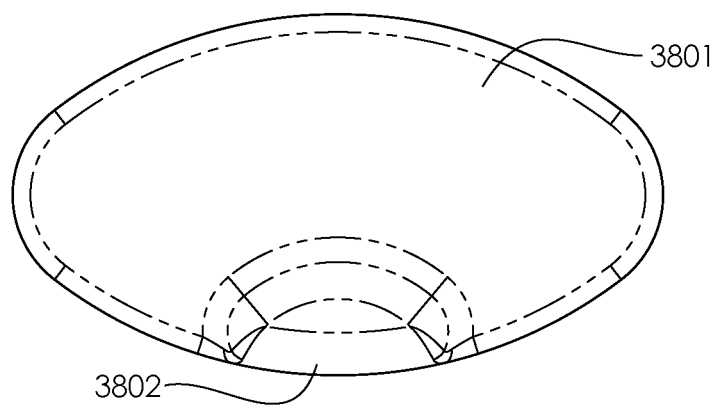

FIG. 38D is a top view of the standing platform of FIG. 38A.

FIG. 39A is a front view of a standing platform with a center bump.

FIG. 39B is a side cross-section view along line B of the standing platform of FIG. 39A.

FIG. 39C is an upper isometric view of the standing platform of FIG. 39A.

FIG. 39D is a top view of the standing platform of FIG. 39A.

FIG. 40A is a front view of a rear hump standing platform.

FIG. 40B is a side cross-section view along line B of the standing platform of FIG. 40A.

FIG. 40C is an upper isometric view of a rear hump standing platform.

FIG. 40D is an upper isometric view of a rear hump standing platform, with legs showing a user standing on it.

FIG. 40E is a top view of a rear hump standing platform.

Figure 41A:
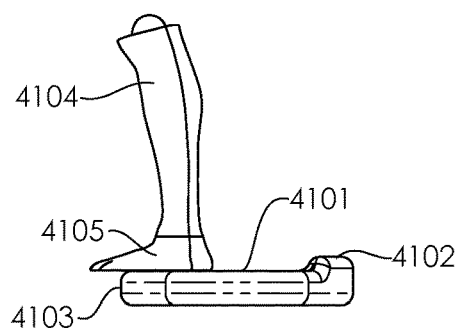

FIG. 41A is a side view of legs standing on a rear hump standing platform with the feet positioned on the front edge spaced shoulder-width apart.

Figure 41B:
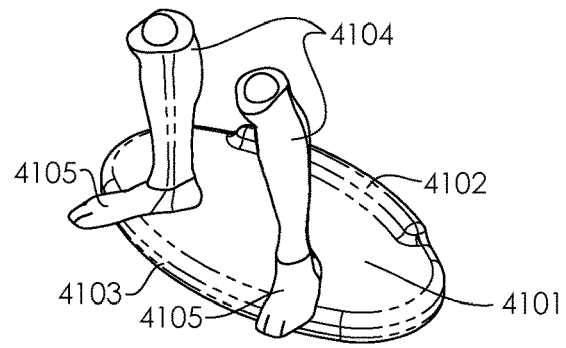

FIG. 41B is an upper isometric view of legs standing on a rear hump standing platform with the feet positioned on the front edge spaced shoulder-width apart.

Figure 41C:
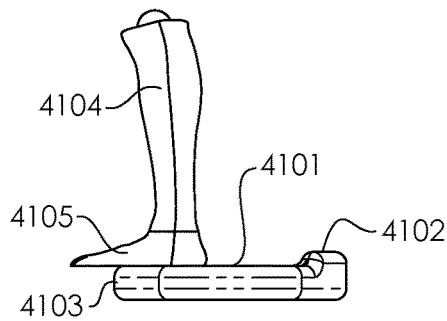

FIG. 41C is a side view of legs standing on a rear hump standing platform with the feet positioned on the front edge with the feet close together.

Figure 41D:
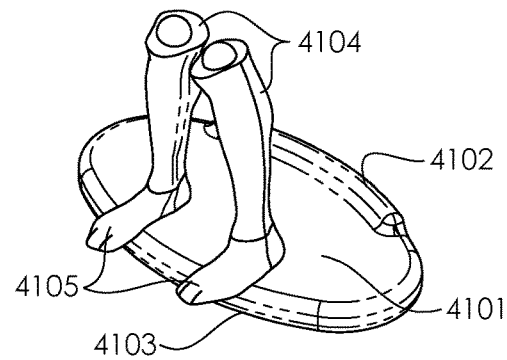

FIG. 41D is an upper isometric view of legs standing on a rear hump standing platform with the feet positioned on the front edge with the feet close together.

Figure 41E:
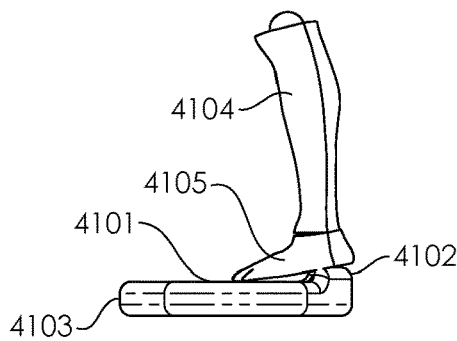

FIG. 41E is a side view of legs standing on a rear hump standing platform, with the feet positioned on the rear hump.

Figure 41F:
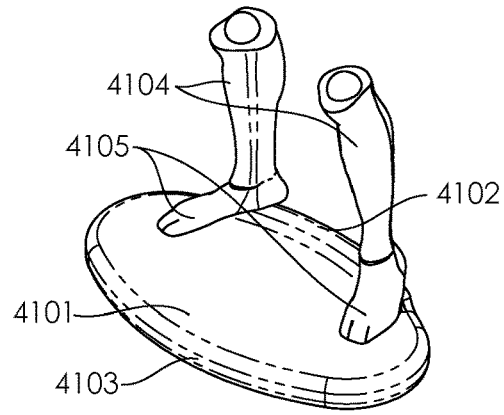

FIG. 41F is an upper isometric view of legs standing on a rear hump standing platform, with the feet positioned on the rear hump.

Figure 41G:
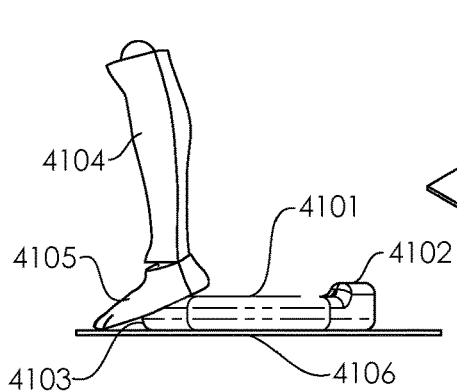

FIG. 41G is a side view of legs standing on a rear hump standing platform, with the feet resting on the front edge and on the floor.

Figure 41H:
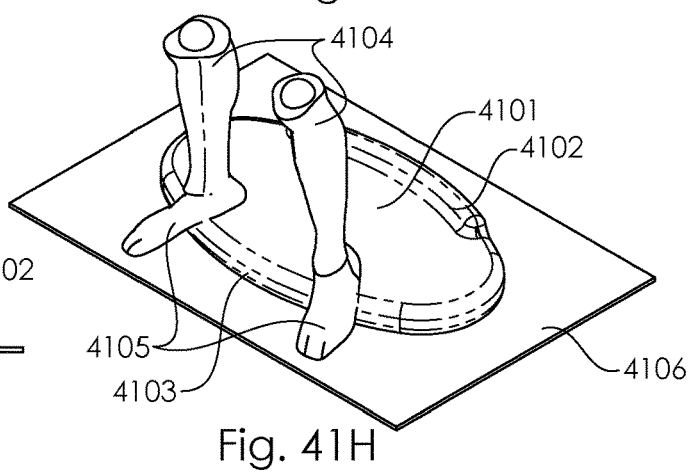

FIG. 41H is an upper isometric view of legs standing on a rear hump standing platform with the feet resting on the front edge and on the floor.

Figure 42A:
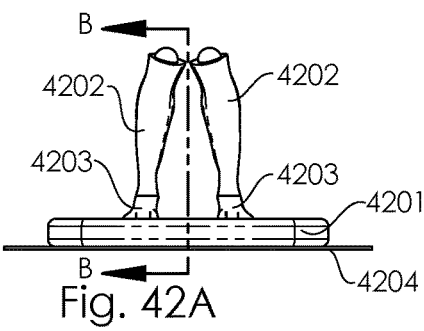

FIG. 42A is a front view of legs standing on a ring hump platform.

Figure 42B:
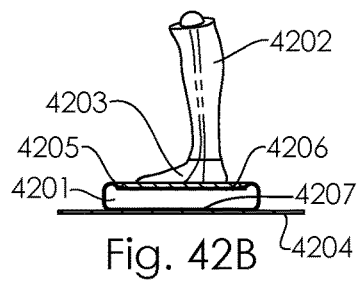

FIG. 42B is a side cross-section view along line B of the legs standing on the platform of FIG. 42A.

Figure 42C:
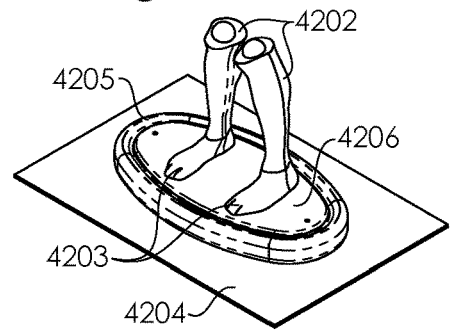

FIG. 42C is an upper isometric view of legs standing on a ring hump platform.

Figure 42D:
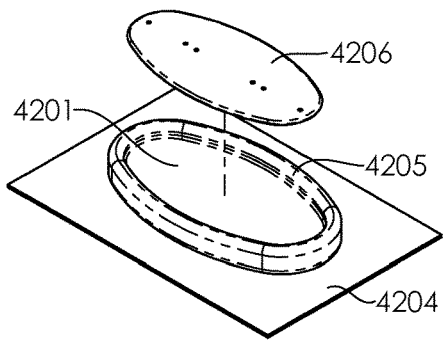

FIG. 42D is an exploded upper isometric view of a ring hump platform.

Figure 42E:
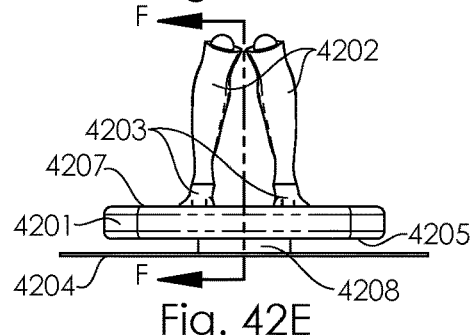

FIG. 42E is a front view of legs standing on an inverted ring hump platform in a configuration using a front-to-back roller.

Figure 42F:
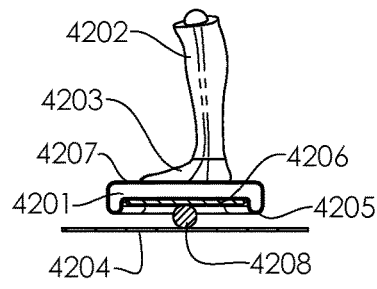

FIG. 42F is a side cross-section view along line F of the legs standing on the platform of FIG. 42E.

Figure 42G:
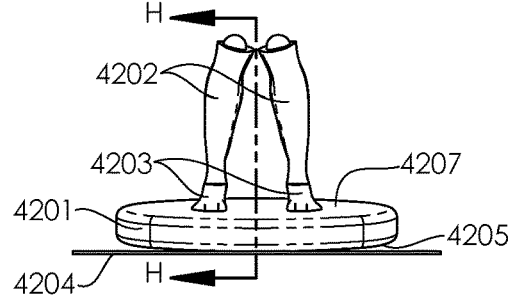

FIG. 42G is a front view of legs standing on an inverted ring hump platform when it is tilted with an adjustable spacer.

Figure 42H:
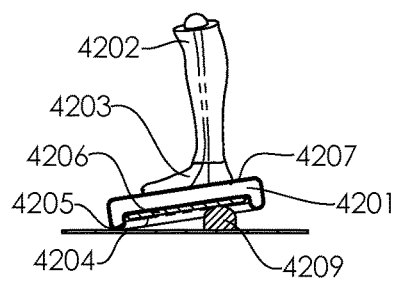

FIG. 42H is a side cross-section view along line H of the legs standing on the platform of FIG. 42G.

Figure 42I:
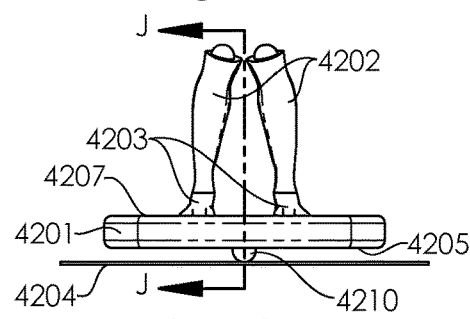

FIG. 42I is a front view of legs standing on an inverted ring hump platform in a configuration using a side-to-side roller.

Figure 42J:
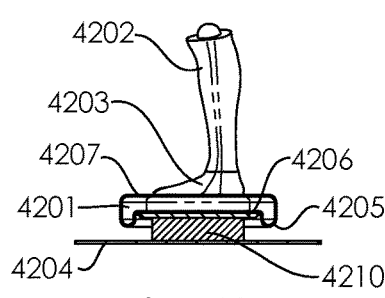

FIG. 42J is a side cross-section view along line J of the legs standing on the platform of FIG. 42I.

FIG. 43A is an upper isometric view of a ring hump platform with attachment holes.

FIG. 43B is an exploded upper isometric view of a ring hump platform with attachments.

FIG. 43C is an upper isometric view of a ring hump platform with attachments.

FIG. 43D is an upper isometric view of a ring hump platform with D shape pads attached.

FIG. 43E is an upper isometric view of a ring hump platform with V shape pads attached.

FIG. 43F is an upper isometric view of a ring hump platform with dome pads attached.

Figure 44A:
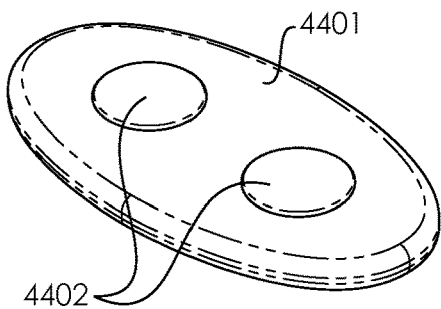

FIG. 44A is an upper isometric view of a standing platform with corrective foot pads on the top surface.

Figure 44B:
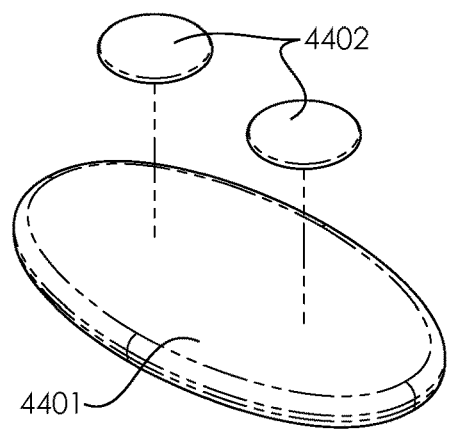

FIG. 44B is an exploded upper isometric view of a standing platform with corrective foot pads on the top surface.

Figure 44C:
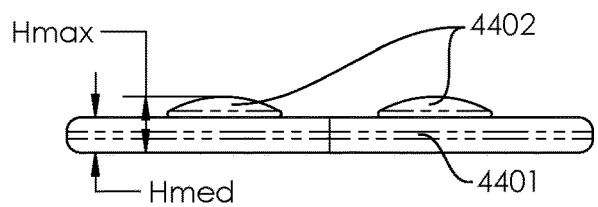

FIG. 44C is a front view of a standing platform with corrective foot pads on the top surface.

Figure 44D:
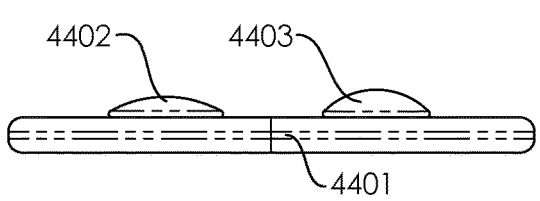

FIG. 44D is a front view of a standing platform with two different size corrective foot pads on the top surface.

Figure 44E:
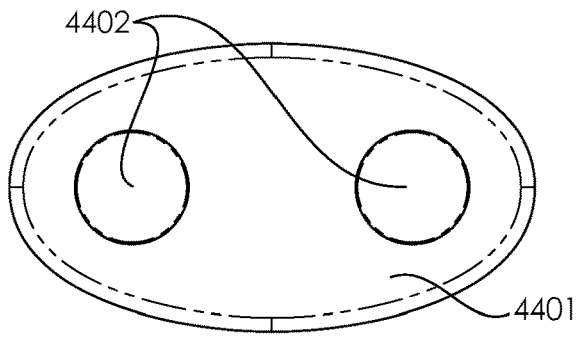

FIG. 44E is a top view of a standing platform with corrective foot pads on the top surface placed in a wide stance.

Figure 44F:
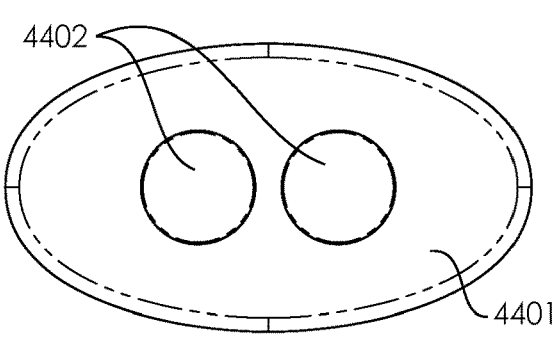

FIG. 44F is a top view of a standing platform with corrective foot pads on the top surface placed in a narrow stance.

Figure 44G:
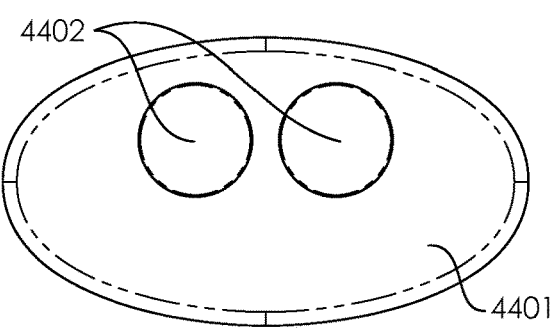

FIG. 44G is a top view of a standing platform with corrective foot pads on the top surface placed in a rear position.

Figure 44H:
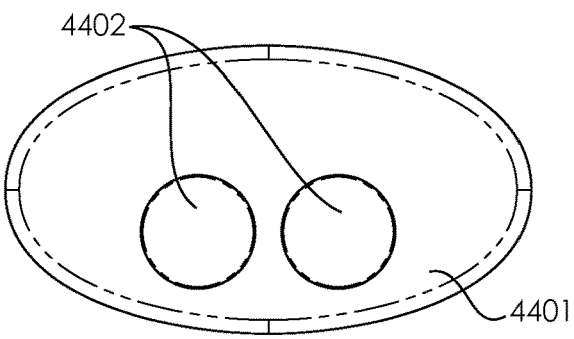

FIG. 44H is a top view of a standing platform with corrective foot pads on the top surface placed in a forward position.

Figure 44I:
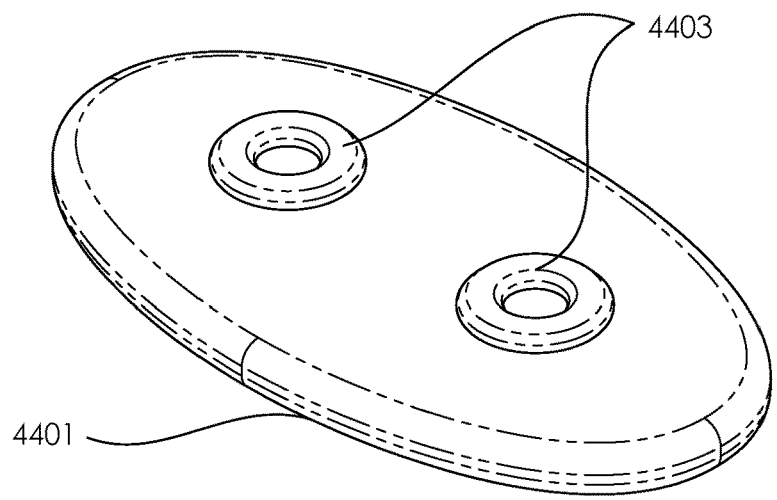

FIG. 44I is an upper isometric view of a toroidal foot pad.

Figure 44J:
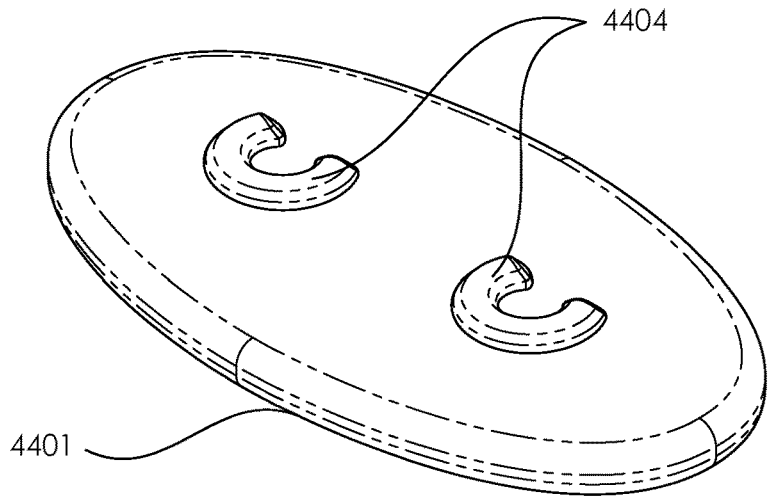

FIG. 44J is an upper isometric view of a horseshoe shaped foot pad.

Figure 44K:
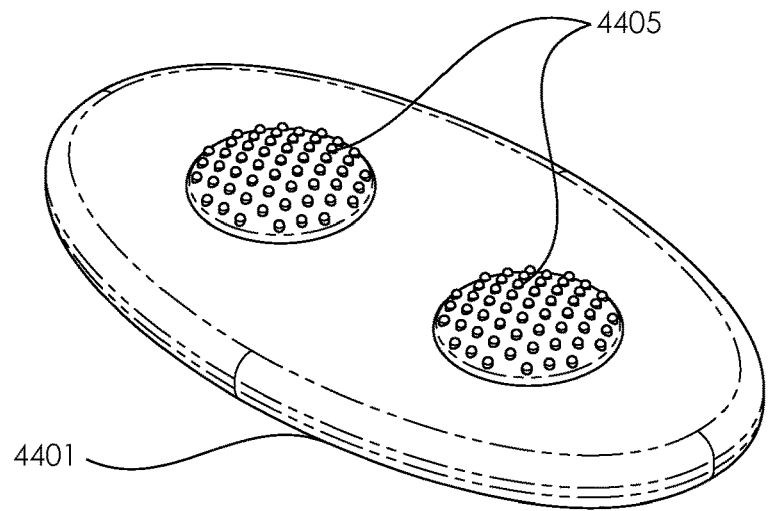

FIG. 44K is an upper isometric view of a foot pad with massage protrusions.

Figure 44L:
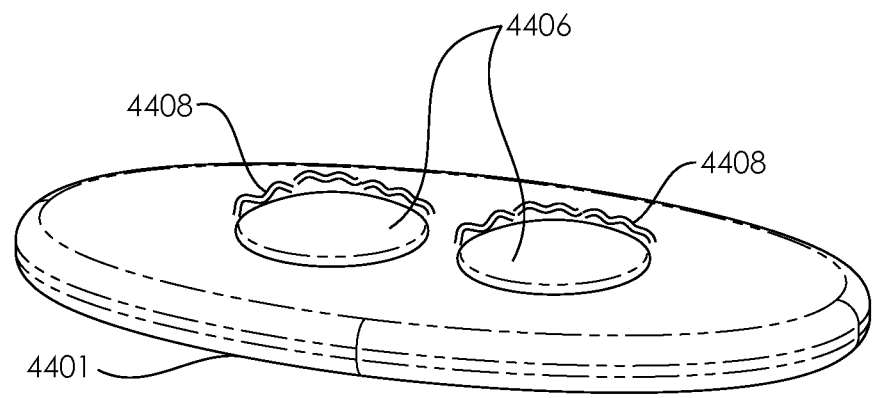

FIG. 44L is a top angled view showing a foot pad that vibrates.

Figure 44M:
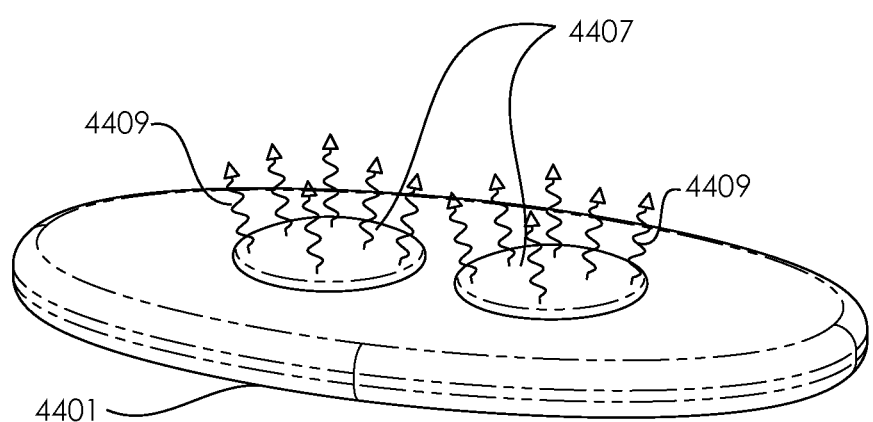

FIG. 44M is a top angled view of a foot pad that is heated.

FIG. 45A is a top view of a user standing on a platform with a partial rigid top plate.

FIG. 45B is an upper isometric view of a user standing on a platform with a partial rigid top plate.

FIG. 45C is an exploded upper isometric view of a user standing on a platform with a partial rigid top plate.

Figure 46A:
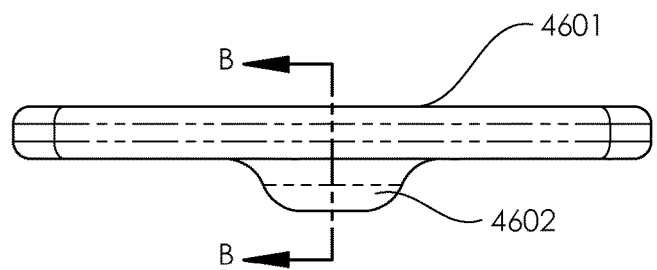

FIG. 46A is a side view of a bottom dome standing platform.

Figure 46B:
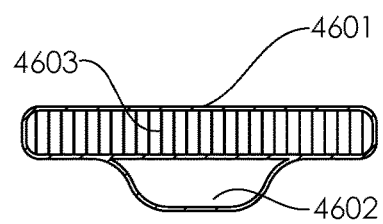

FIG. 46B is a side cross-section view along line B of the standing platform of FIG. 46A.

Figure 46C:
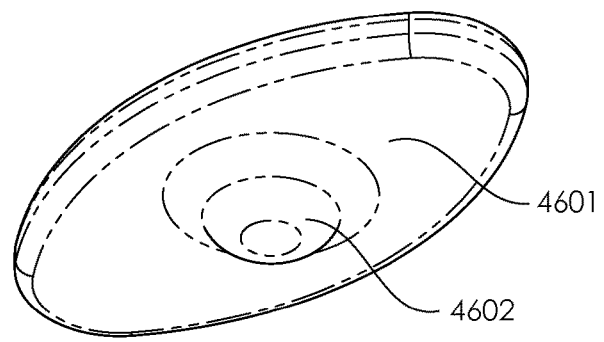

FIG. 46C is a lower isometric view of the standing platform of FIG. 46A.

Figure 46D:
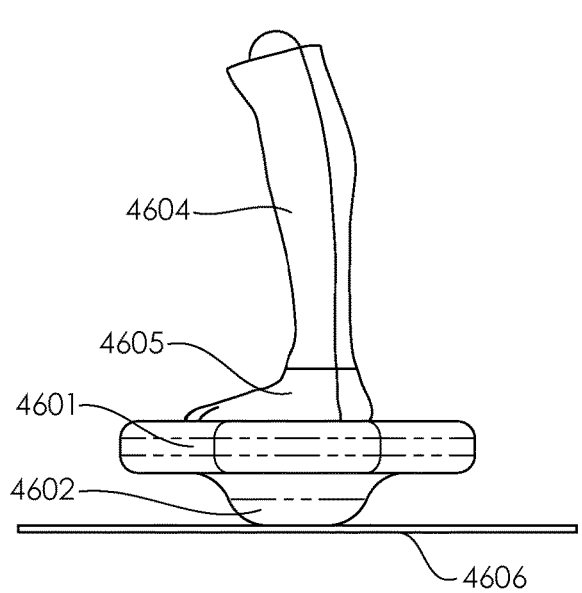

FIG. 46D is a side view of legs standing balanced on a bottom dome standing platform.

Figure 46E:
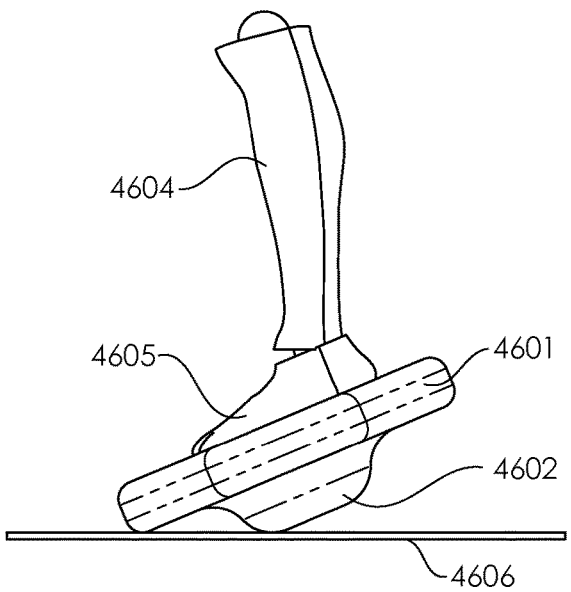

FIG. 46E is a side view of legs standing on a bottom dome standing platform, with the platform tilted forward.

Figure 46F:
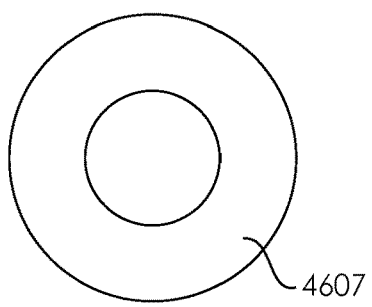

FIG. 46F is a top view of a damping toroidal foam ring.

Figure 46G:
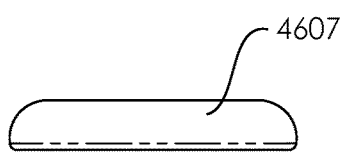

FIG. 46G is a front view of a damping toroidal foam ring.

Figure 46H:
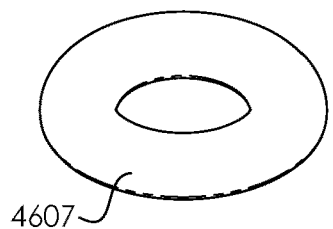

FIG. 46H is an upper isometric view of a damping toroidal foam ring.

Figure 46I:
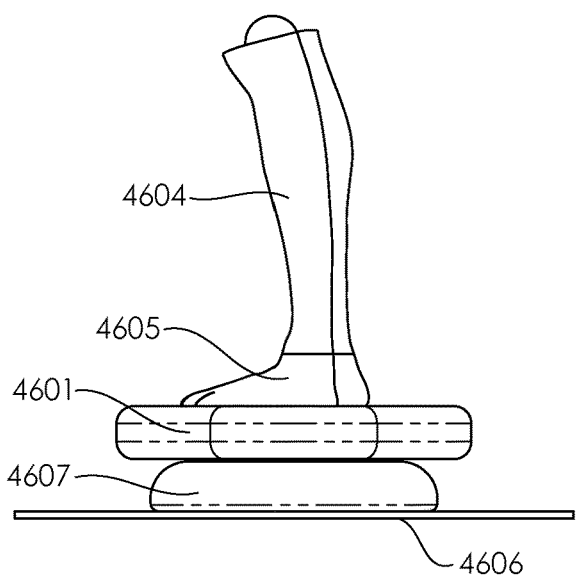

FIG. 46I is a side view of a user standing on a bottom dome standing platform with a damping toroidal foam ring.

Figure 46J:
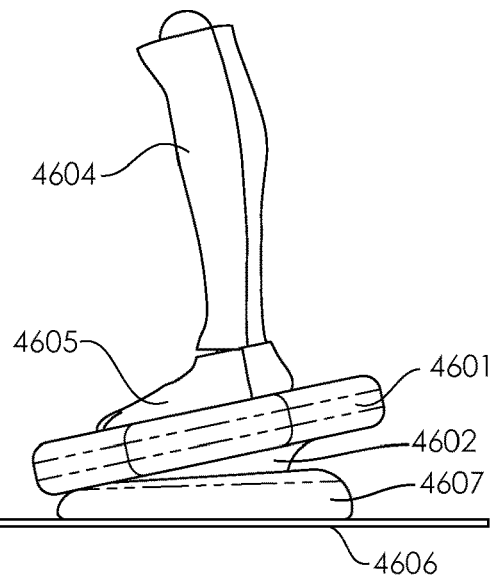

FIG. 46J is a side view of a user tilting forward on a bottom dome standing platform with a damping toroidal foam ring.

Figure 46K:
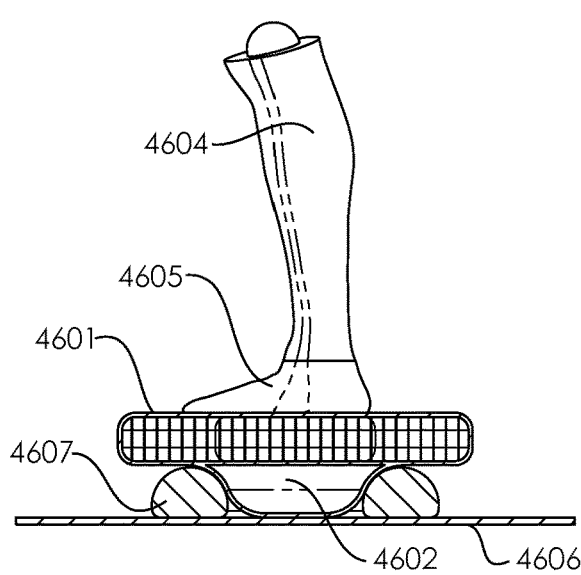

FIG. 46K is a side cross-section view of the standing platform of FIG. 46I.

Figure 46L:
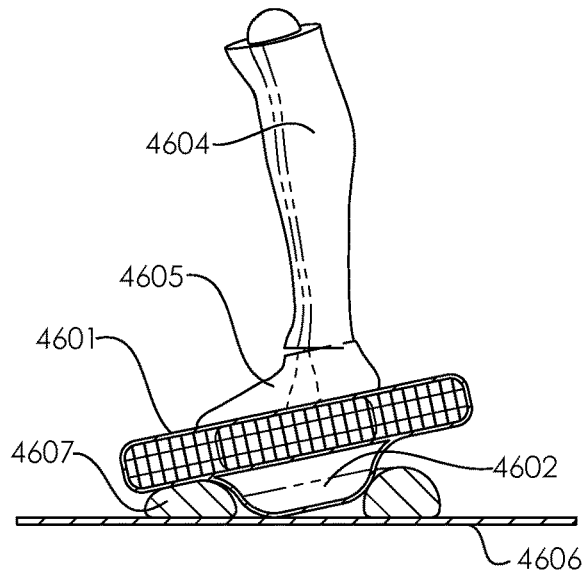

FIG. 46L is a side cross-section view of the standing platform of FIG. 46J.

Figure 47A:
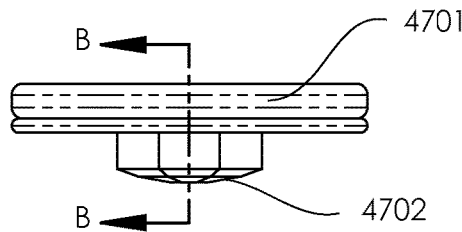

FIG. 47A is a front view of a faceted bottom dome standing platform.

Figure 47B:
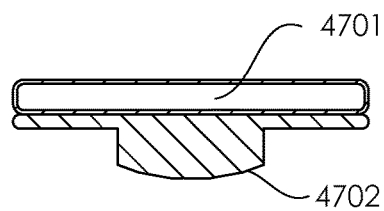

FIG. 47B is a side cross-section view along line B of the standing platform of FIG. 47A.

Figure 47C:
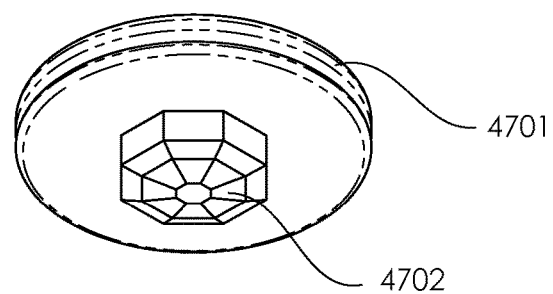

FIG. 47C is a lower isometric view of a faceted bottom dome standing platform.

Figure 47D:
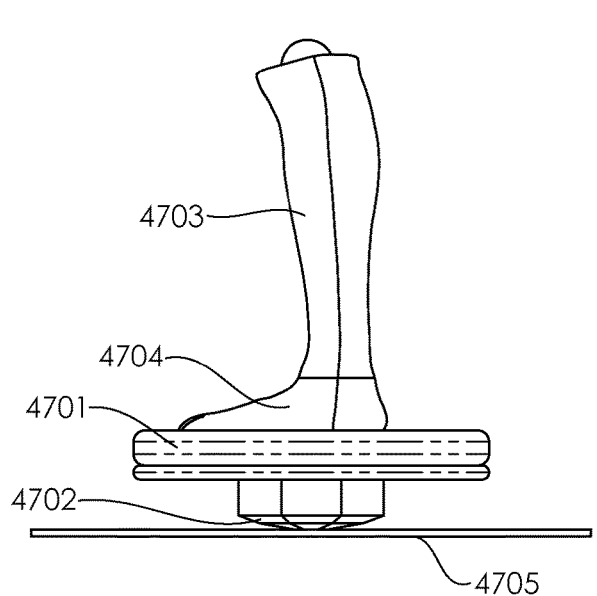

FIG. 47D is a side view of legs standing balanced on a faceted bottom dome standing platform.

Figure 47E:
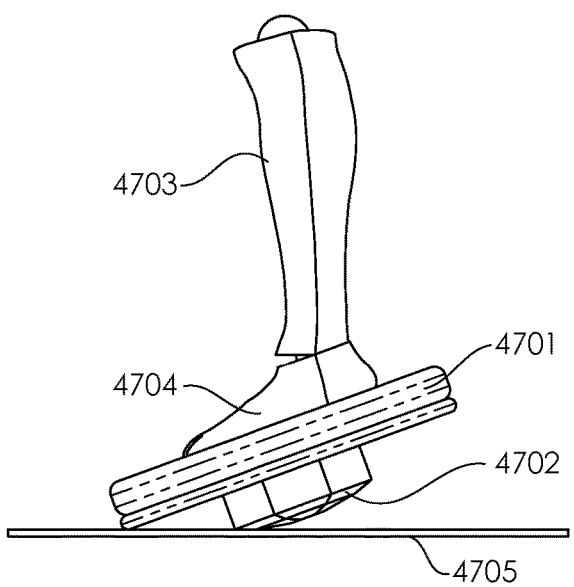

FIG. 47E is a side view of legs standing on a faceted bottom dome standing platform with the platform tilted forward.

Figure 48A:
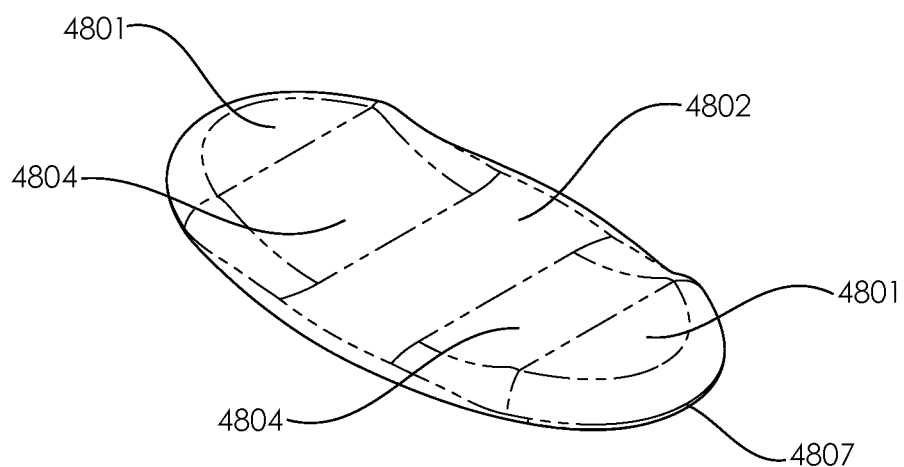

FIG. 48A is an upper isometric view of a standing platform with the ends gradually increasing in thickness.

Figure 48B:
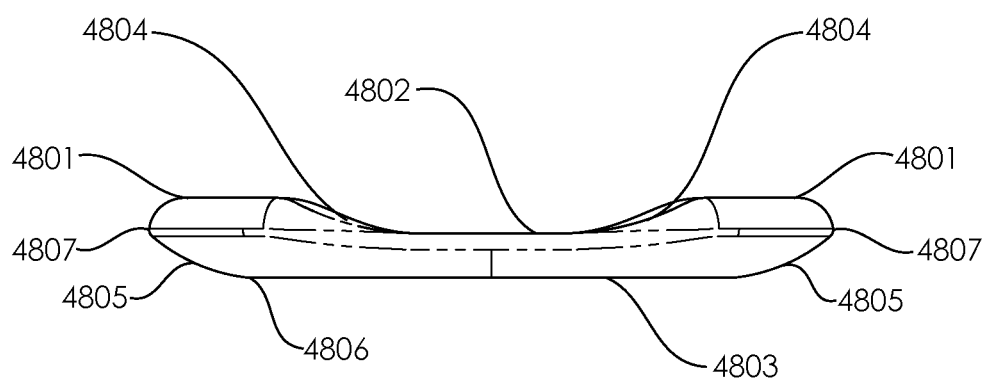

FIG. 48B is a front view of a standing platform with ends that are thicker than the middle.

Figure 49A:
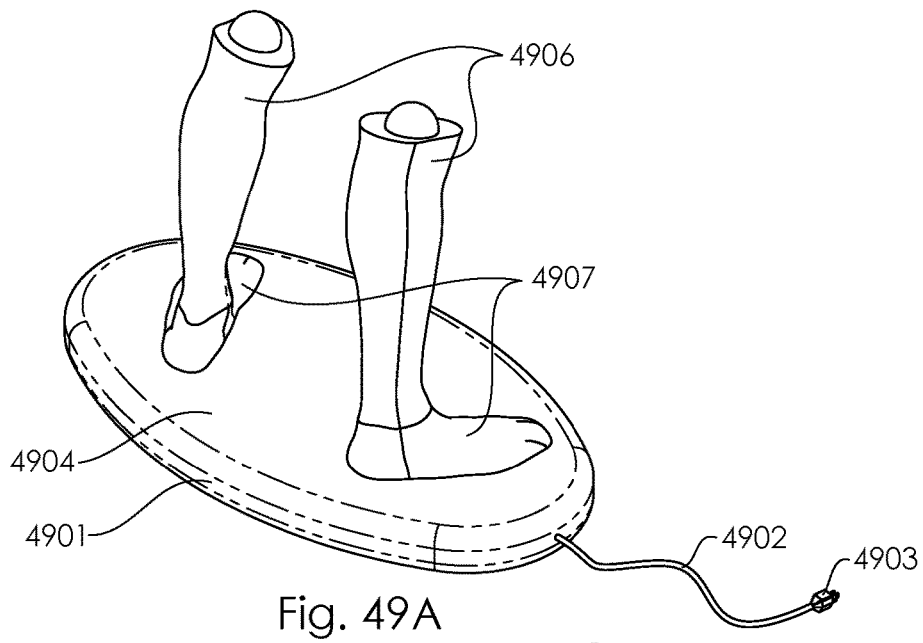

FIG. 49A is an upper isometric view of legs standing on a grounded platform with a conductive top connected to a grounding plug.

Figure 49B:
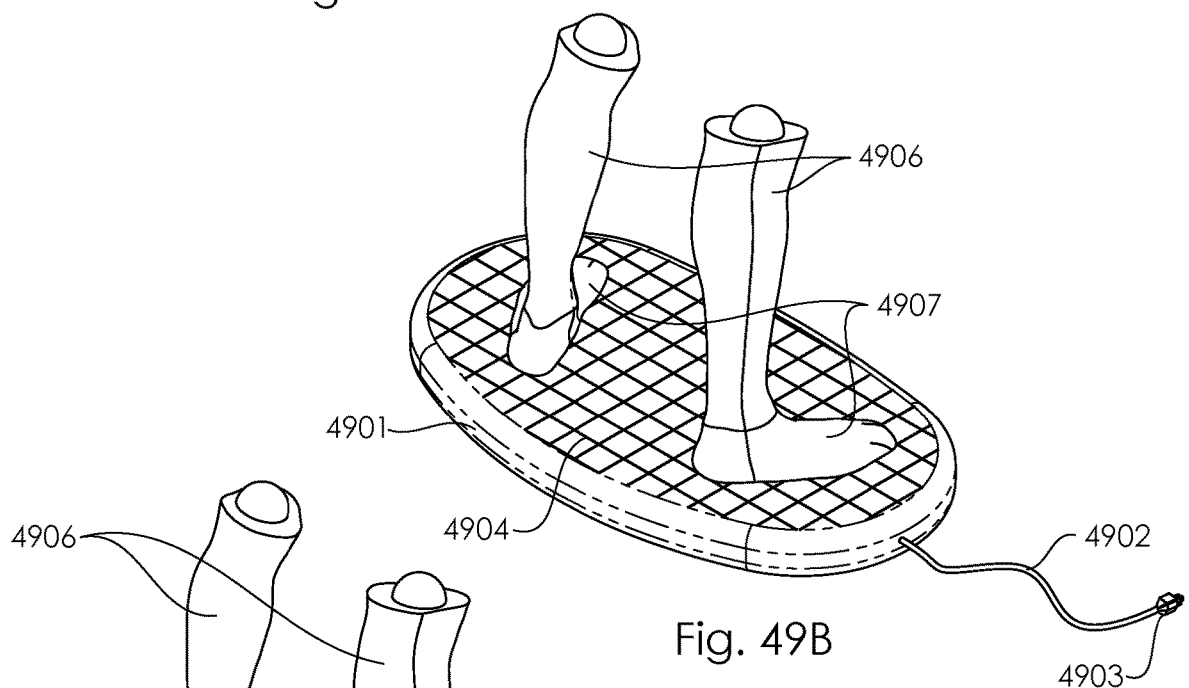

FIG. 49B is an upper isometric view of legs standing on a grounded platform with conductive threads on the top surface connected to a grounding plug.

Figure 49C:
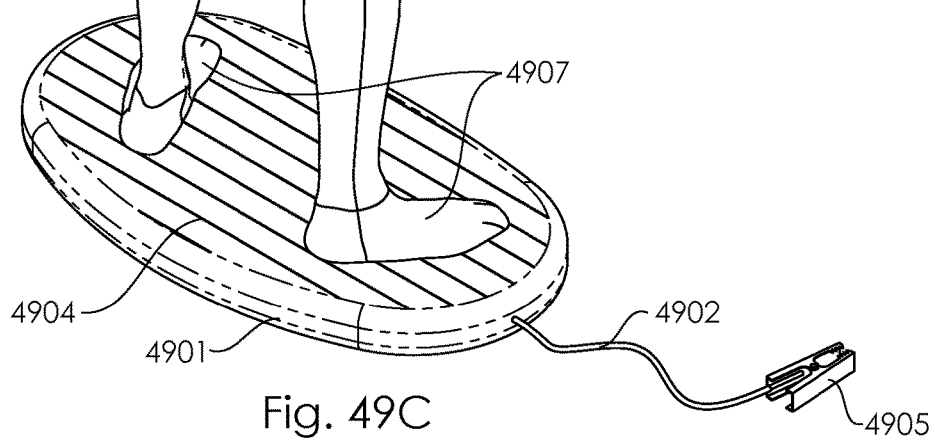

FIG. 49C is an upper isometric view of legs standing on a grounded platform with conductive threads going across the top surface connected to a grounding clamp.

Figure 49D:
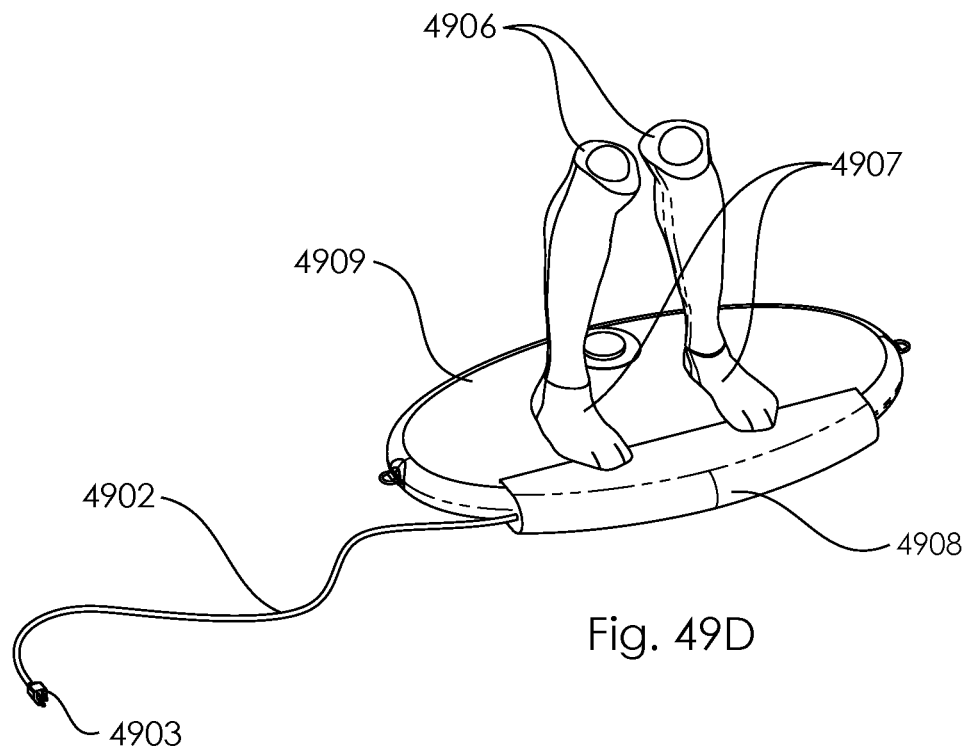

FIG. 49D is a top angled view of a user standing on a grounding bar for a standing platform.

Figure 49E:
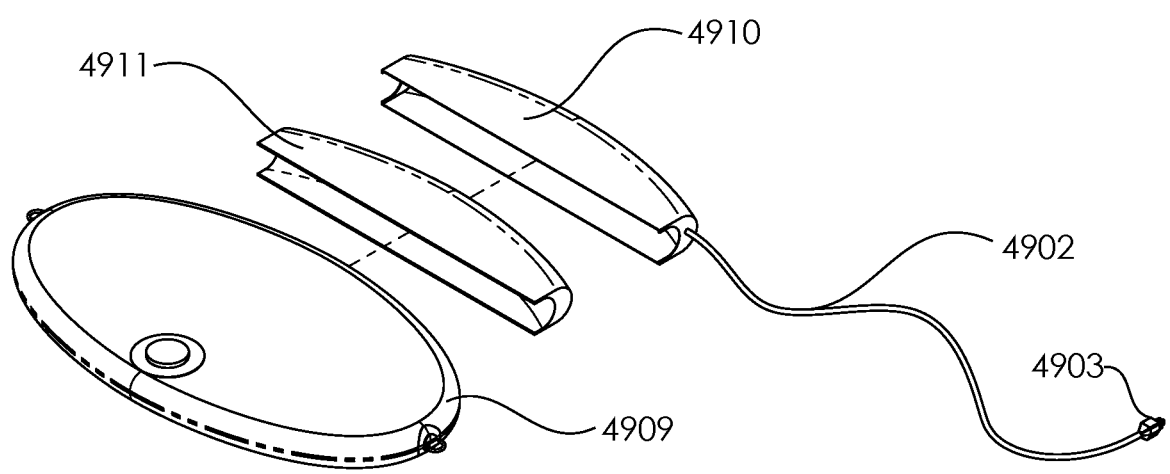

FIG. 49E is an exploded upper isometric view showing how the grounding bar attaches to a standing platform.

Figure 50A:
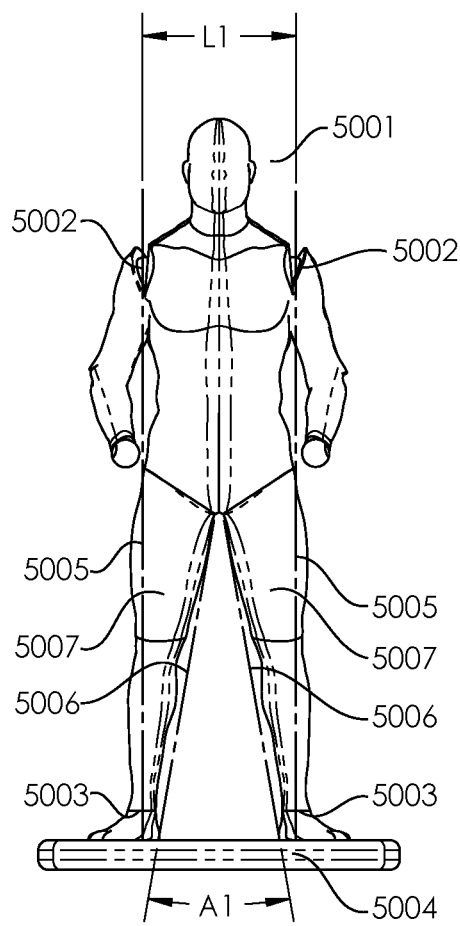

FIG. 50A is a front view of a user standing on a standing platform with their feet approximately shoulder-width apart.

Figure 50B:
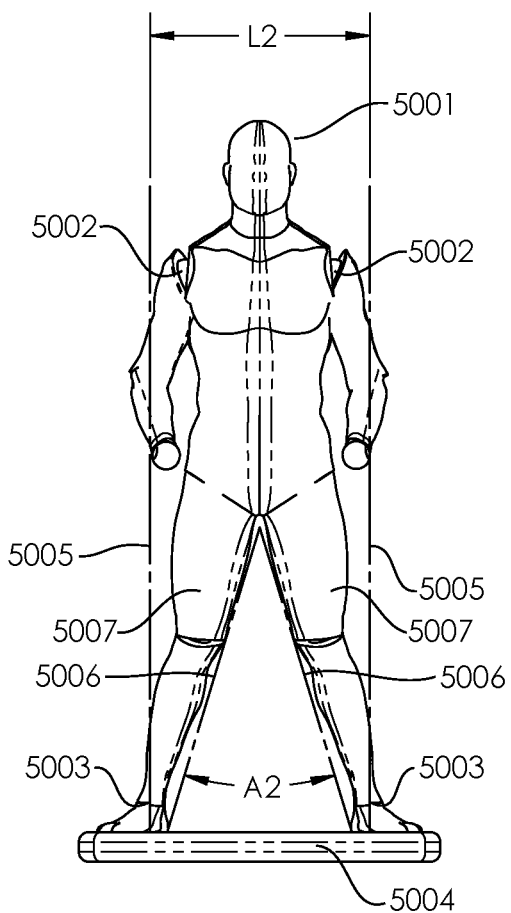

FIG. 50B is a front view of a user standing on a standing platform with their feet positioned in a wide stance such that the feet are wider than shoulder-width apart.

FIG. 51A is a top view of a standing platform.

FIG. 51B is a top view showing further details of the region within the area B of the standing platform of FIG. 51A.

FIG. 51C is a front view of the standing platform of FIG. 51A.

FIG. 51D is a front view showing further details of the region within the area D of the standing platform of FIG. 51C.

FIG. 51E is a top view of the standing platform of FIG. 51A with an edge band.

FIG. 51F is a top view showing further details of the region within the area F of the standing platform of FIG. 51E.

FIG. 51G is a top view of the standing platform of FIG. 51A.

FIG. 51H is a top view showing further details of the region within the area H of the standing platform of FIG. 51G.

Figure 51I:
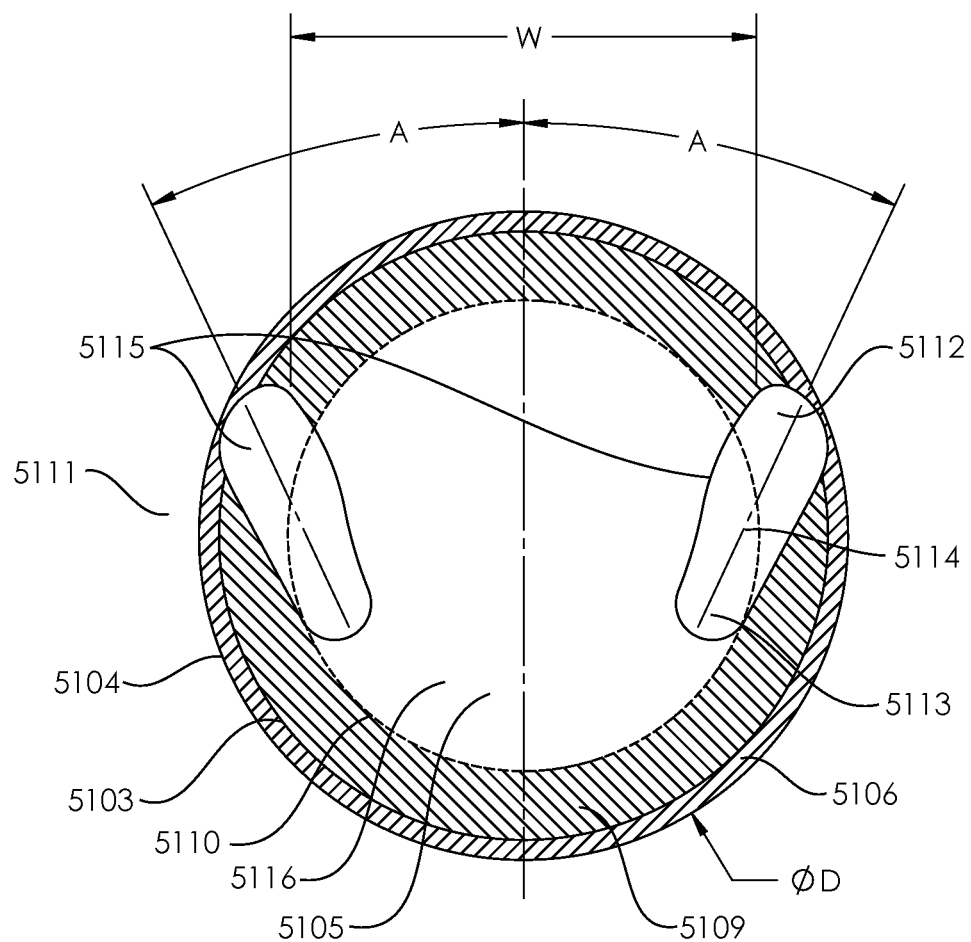

FIG. 51I is a top view of a 99th percentile male user standing with a comfortable stance on a circular standing platform.

Figure 52A:
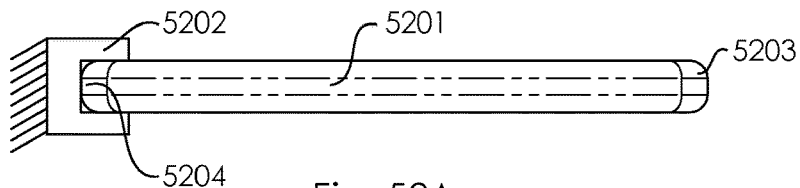

FIG. 52A is a front view of a standing platform clamped on one end and held in a cantilever position.

Figure 52B:
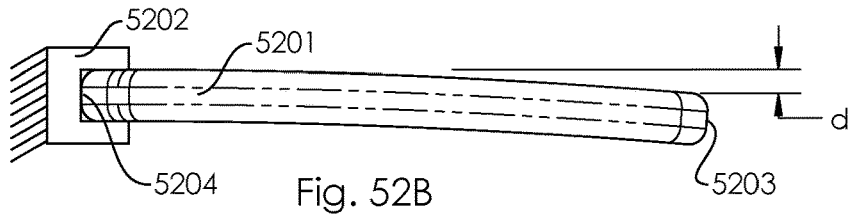

FIG. 52B is a front view of a standing platform clamped on one end and held in a cantilever position while deflecting under its own weight or mass.

Figure 52C:
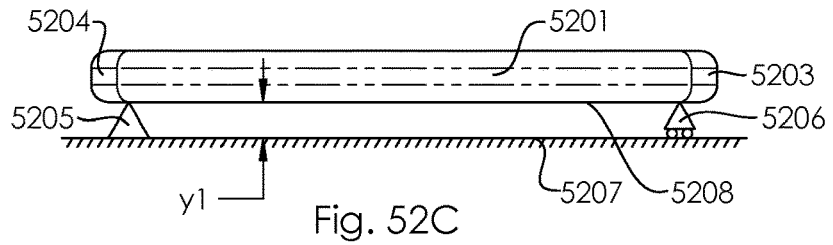

FIG. 52C is a front view of a standing platform supported at its two ends.

Figure 52D:
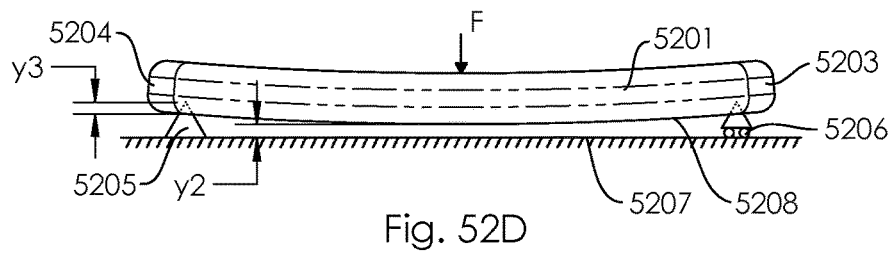

FIG. 52D is a front view of a standing platform supported at its two ends and bending due to a centrally applied load.

Figure 52E:
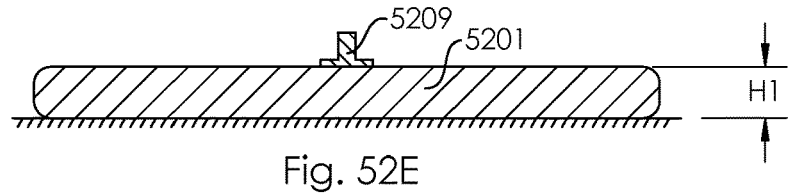

FIG. 52E is a cross-section view of a standing platform with a mat thickness or height of "H1" and an unloaded impactor.

Figure 52F:
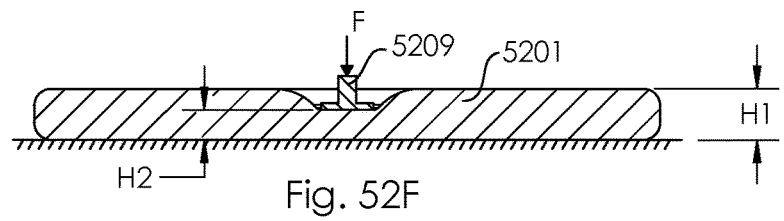

FIG. 52F is a cross-section view of a standing platform being deformed by a loaded impactor.

Figure 52G:
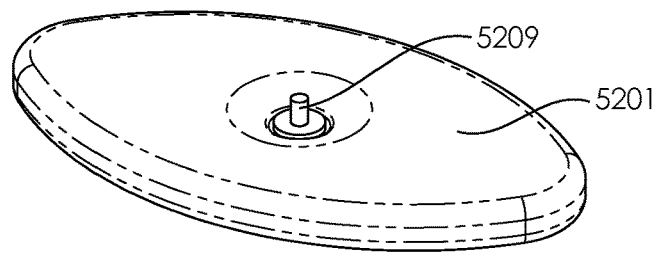

FIG. 52G is an angled view of the standing platform of FIG. 52F.

Figure 53A:
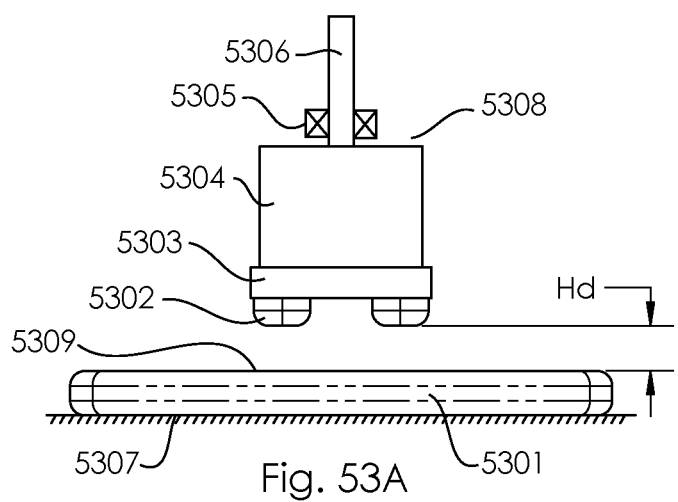

FIG. 53A is a front view of a drop test impactor positioned above a standing platform on the ground with the impactor raised to initial drop height, Hd.

Figure 53B:
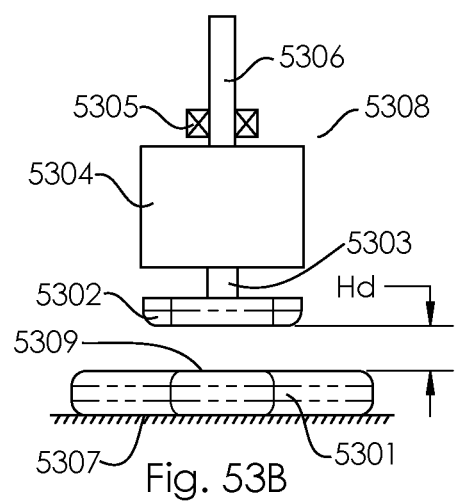

FIG. 53B is a side view of a drop test impactor positioned above a standing platform on the ground with the impactor raised to initial drop height, Hd.

Figure 53C:
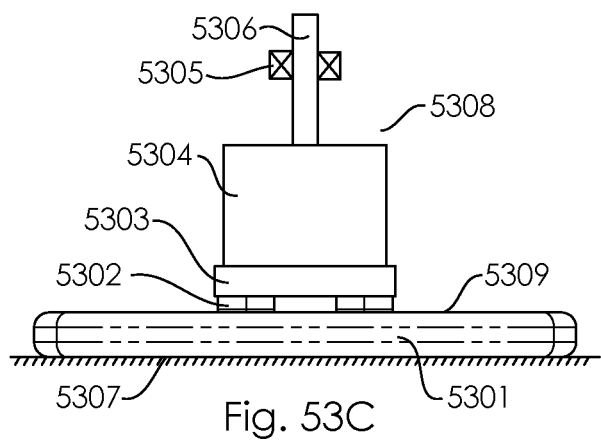

FIG. 53C is a front view of a drop test impactor that has been dropped and is impacting a standing platform on the ground.

Figure 53D:
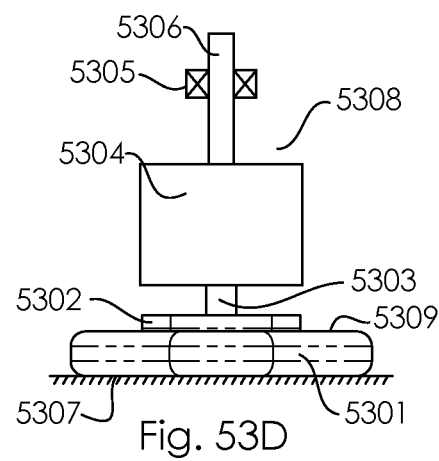

FIG. 53D is a side view of a drop test impactor that has been dropped and is impacting a standing platform on the ground.

Figure 53E:
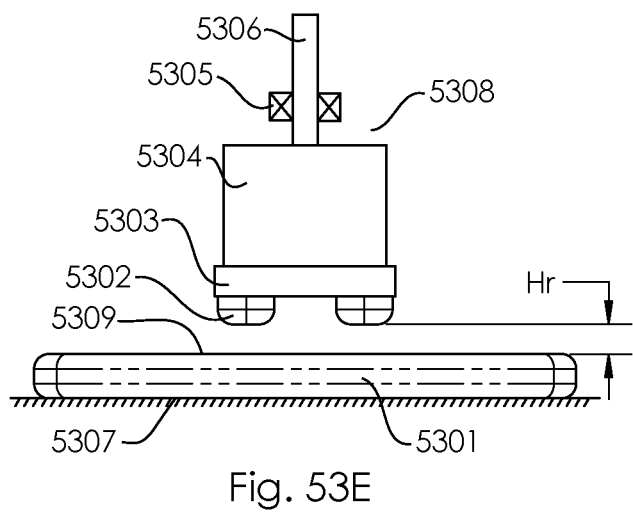

FIG. 53E is a front view of a drop test impactor that has rebounded to a height of Hr after impacting a standing platform on the ground.

Figure 53F:
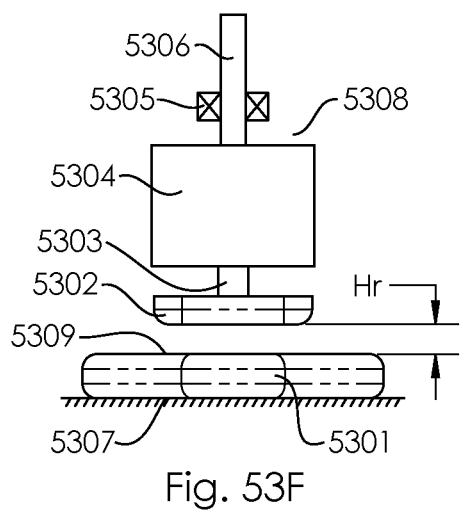

FIG. 53F is a side view of a drop test impactor that has rebounded to a height of Hr after impacting a standing platform on the ground.

Figure 54A:
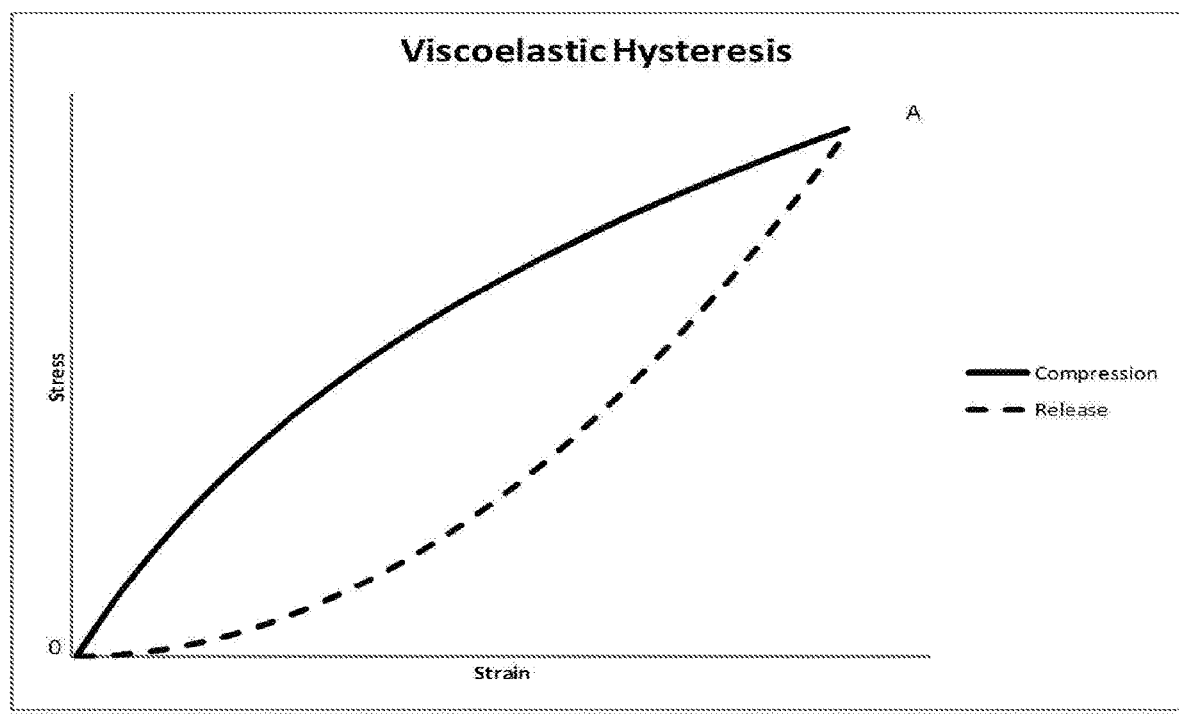

FIG. 54A is a graph showing the stress strain response of a viscoelastic material.

Figure 55A:
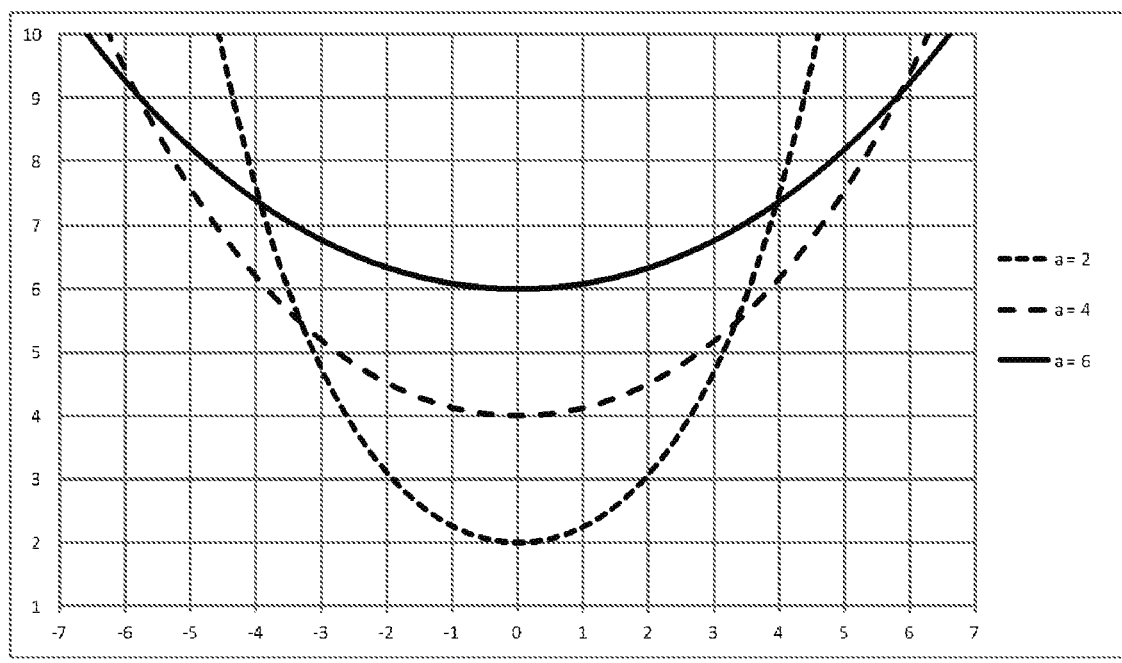

FIG. 55A is a graph showing catenary curves with different "α" values.

Figure 56A:
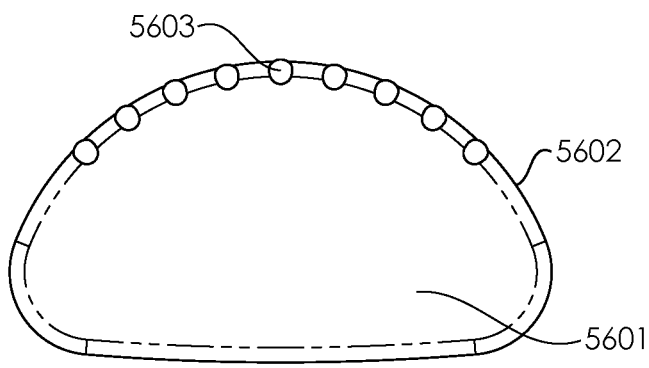

FIG. 56A is a top view of a standing platform with massage protrusions on its front edge.

Figure 56B:
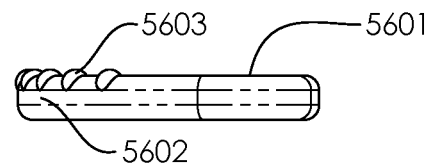

FIG. 56B is a side view of a standing platform with massage protrusions on its front edge.

Figure 56C:
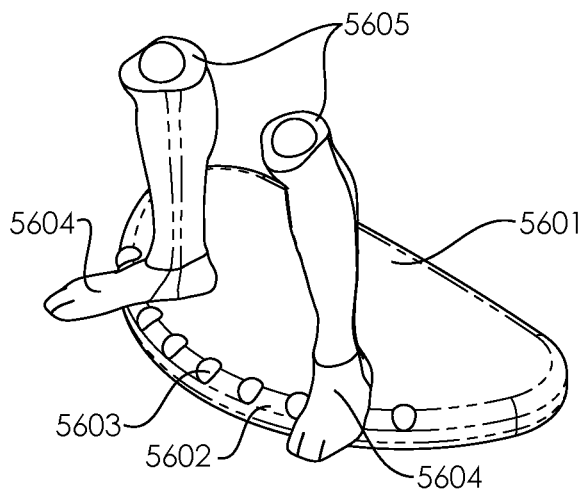

FIG. 56C is an upper isometric view of a user standing on a standing platform with massage protrusions on its front edge.

Figure 56D:
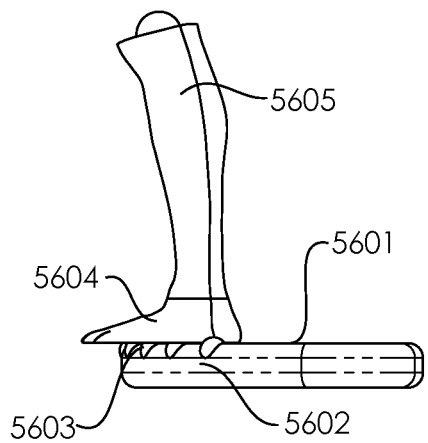

FIG. 56D is a side view of a user standing on a standing platform with massage protrusions on its front edge.

Figure 56E:
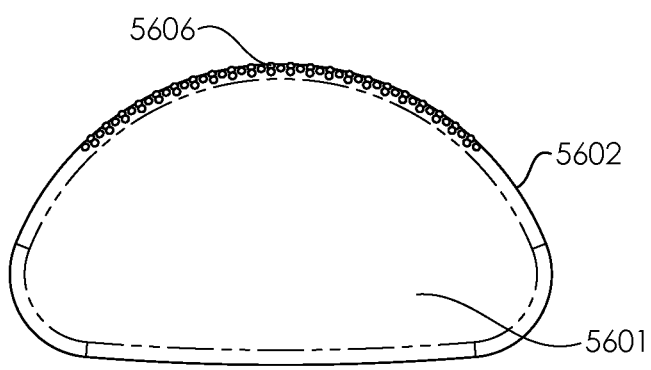

FIG. 56E is a top view of a standing platform with smaller massage protrusions on its front edge.

Figure 56F:
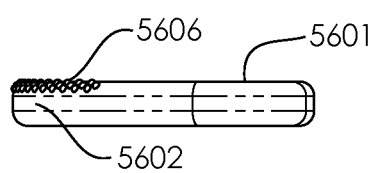

FIG. 56F is a side view of a standing platform with smaller massage protrusions on its front edge.

FIG. 57A is an upper isometric view of a rigid or semi-rigid standing platform with an array of slats creating a textured surface.

FIG. 57B is an upper isometric view of the array of slats being used in a slightly different manner than in FIG. 57A.

FIG. 57C is an upper isometric view of an array of slats that are perpendicular to the array of slats in FIG. 57A.

FIG. 57D is an exploded upper isometric view of the array of slats of FIG. 57A.

Figure 58A:
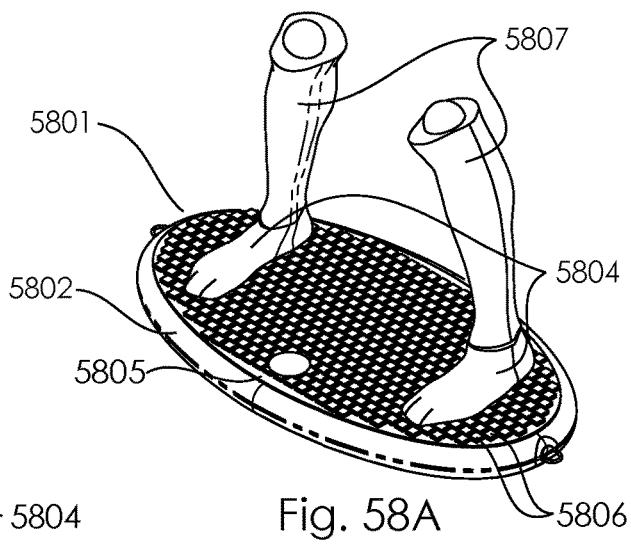

FIG. 58A is an upper isometric view of a rigid or semi-rigid standing platform with an array of squares.

Figure 58B:
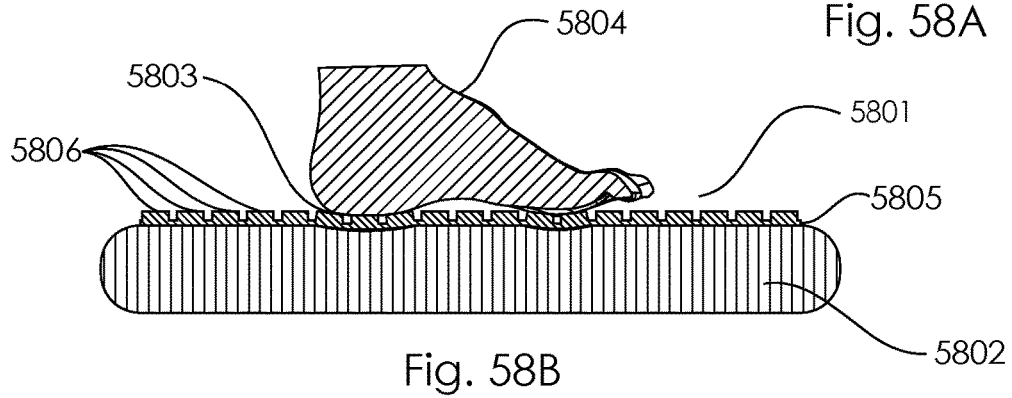

FIG. 58B is a cross-section of the standing platform and array of squares with a user stepping in the center.

Figure 58C:
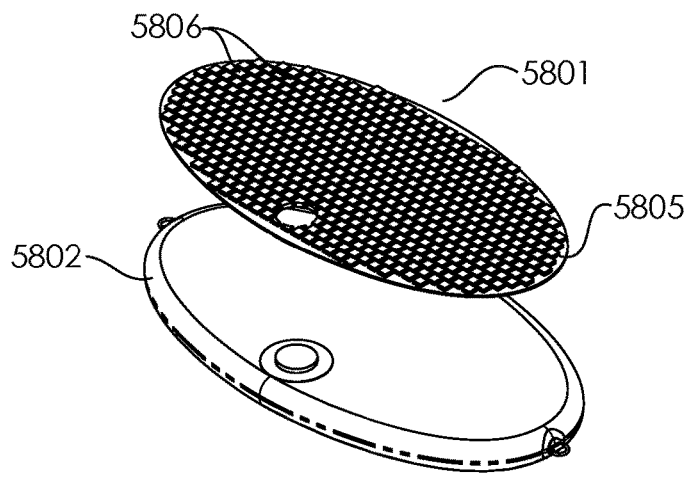

FIG. 58C is an exploded upper isometric view of the array of squares.

Figure 58D:
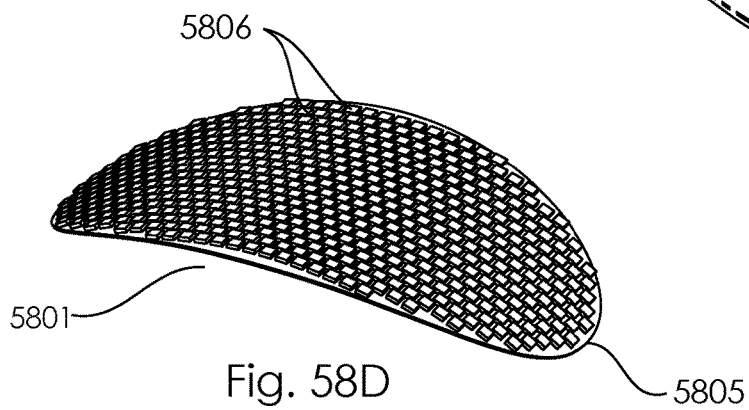

FIG. 58D is an upper isometric view of the array of squares that may be attached to a flexible base.

FIG. 59A shows an upper isometric view of individual heel platforms resting on a standing platform.

FIG. 59B is an upper isometric view showing a pair of offset cupped heel platforms with the stiletto of the heel off center.

FIG. 59C is an upper isometric view showing another way the platforms can be placed.

FIG. 59D is an exploded upper isometric view that shows that the heel platforms just rest on the standing platform and, that the heels simply rest on the heel platforms.

FIG. 59E is a large upper isometric view of only the cupped heel platform.

FIG. 59F is a cross-section view of the cupped heel platform show further detail of the cupped heel platform.

Figure 60A:
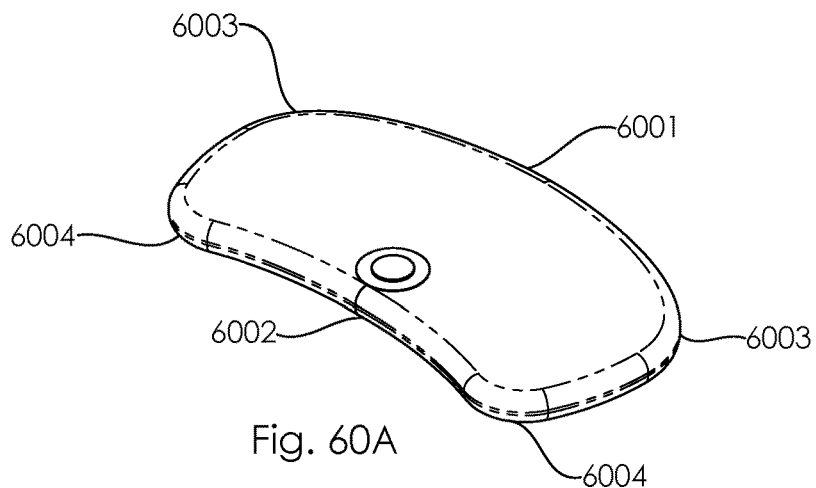

FIG. 60A is an upper isometric view of a standing platform with multiple different curves that a user can use to their advantage.

Figure 60B:
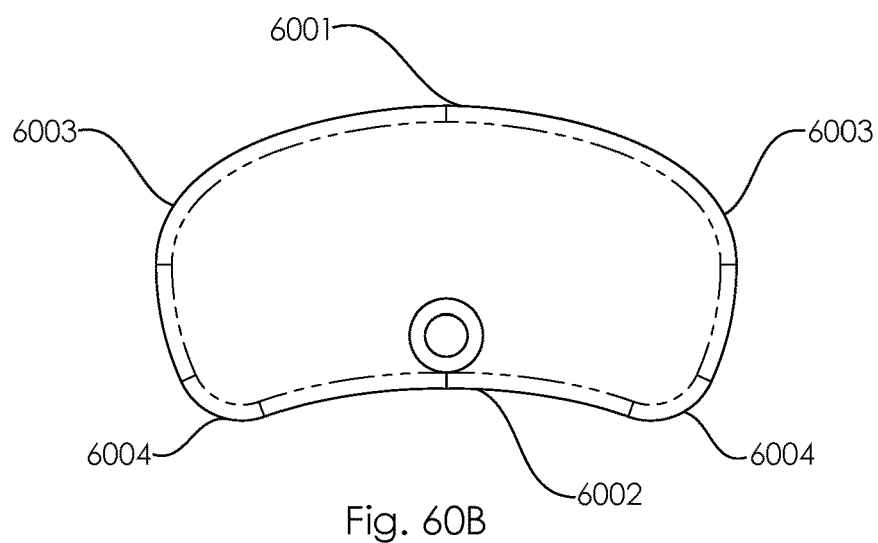

FIG. 60B is a top view of the standing platform of FIG. 60A.

Figure 60C:
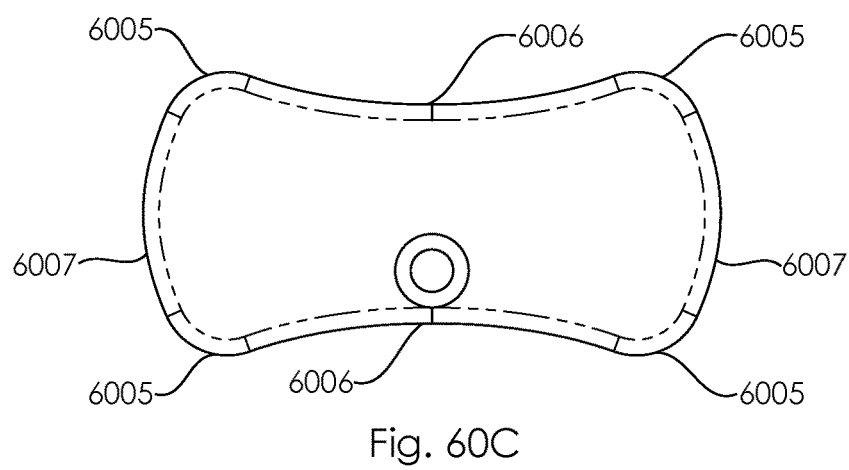

FIG. 60C is a top view of a standing platform with a different set of curved edges.

Figure 60D:
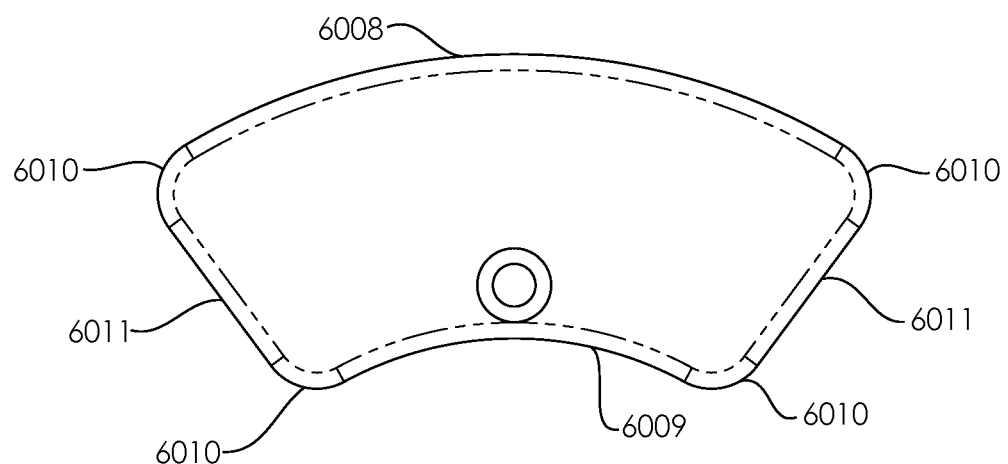

FIG. 60D is a top view of a standing platform with concentrically curved edges and equal radius corners.

Figure 60E:
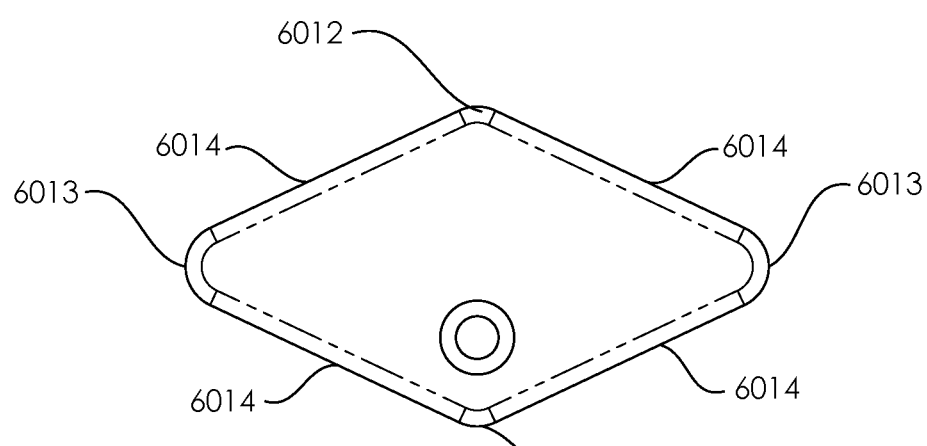

FIG. 60E is a top view of a diamond shaped standing platform.

Figure 60F:
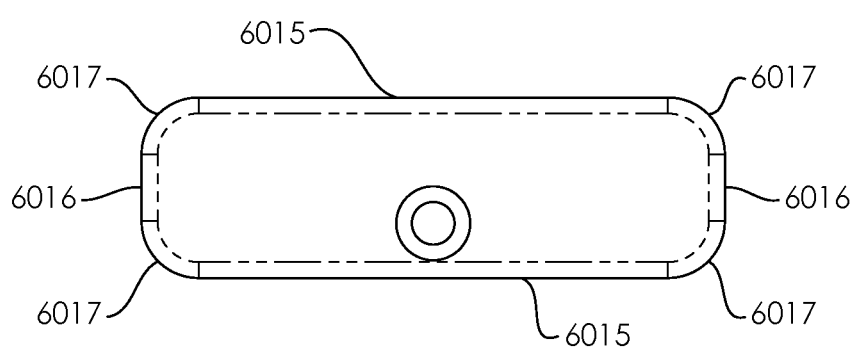

FIG. 60F is a top view of a narrow rectangle shaped standing platform.

Figure 60G:
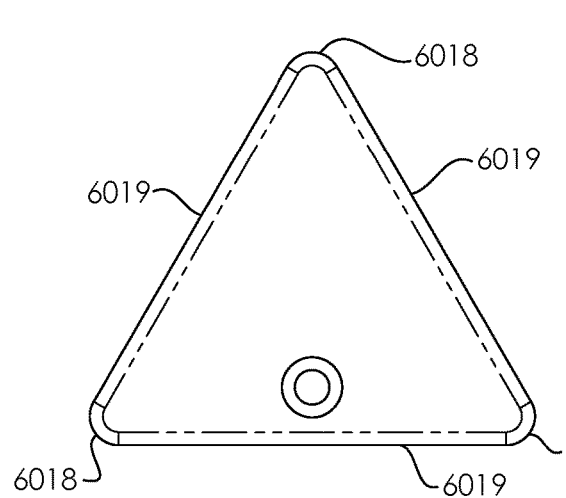

FIG. 60G is a top view of a triangular shaped standing platform.

Figure 60H:
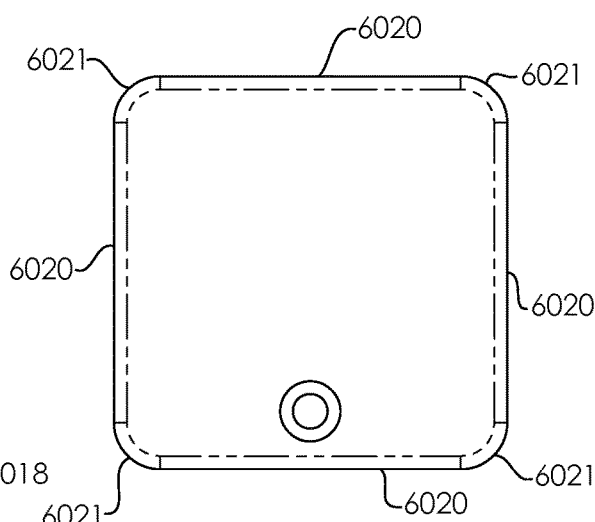

FIG. 60H is a top view of a square shaped standing platform.

Figure 60I:
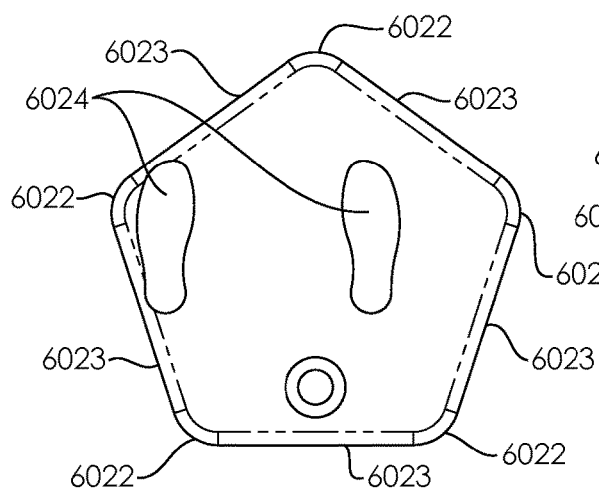

FIG. 60I is a top view of a pentagonal shaped standing platform.

Figure 60J:
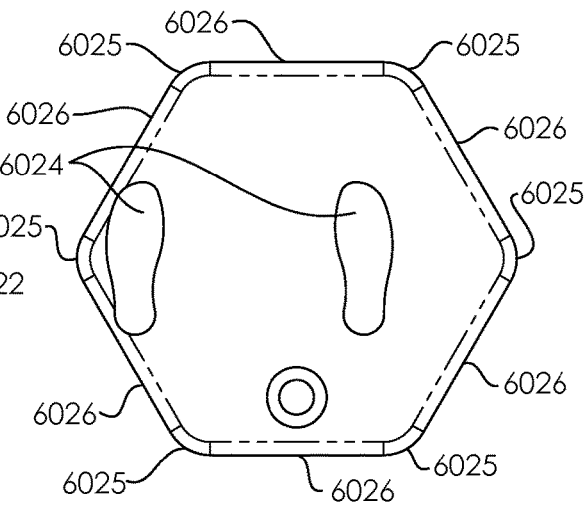

FIG. 60J is a tip view of a hexagonal shaped standing platform.

Figure 60K:
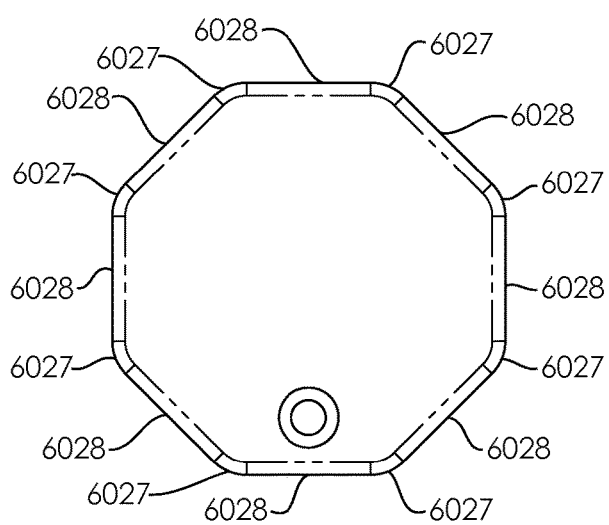

FIG. 60K is a top view of an octagonal shaped standing platform.

Figure 61A:
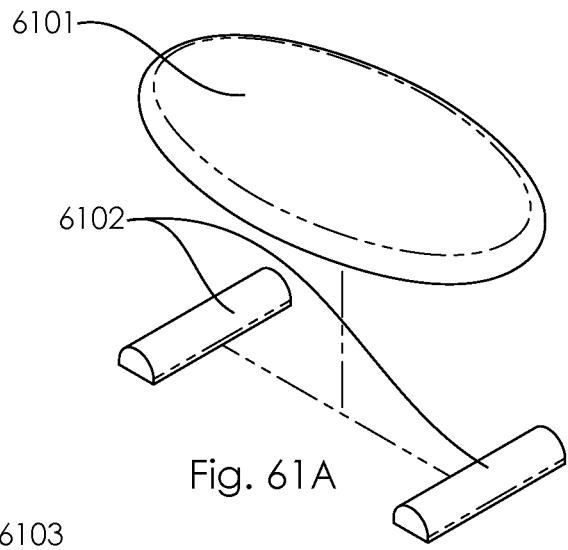

FIG. 61A shows an exploded upper isometric view of a flex control system that allows the user to control the contour of a standing platform.

Figure 61B:
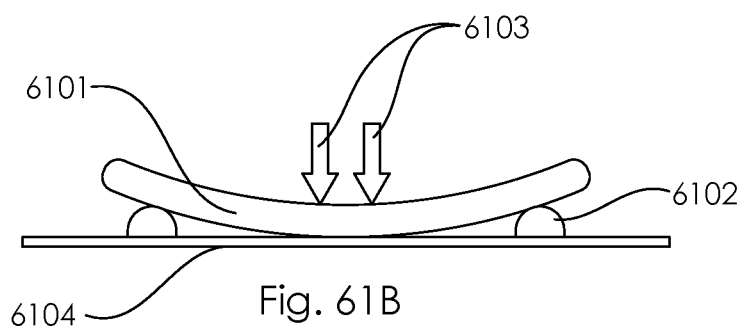

FIG. 61B is a front view that shows how the flex system can be used to create a concave standing surface.

Figure 61C:
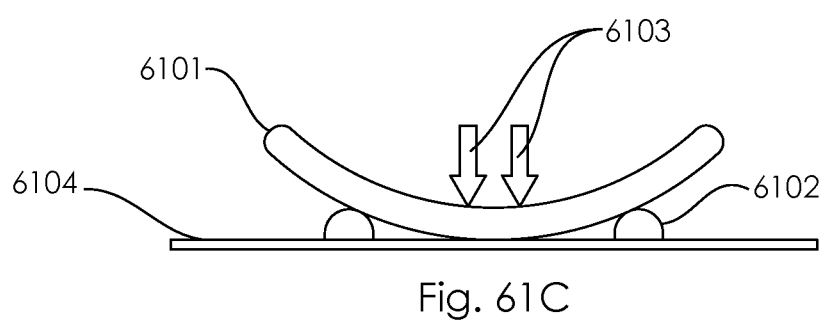

FIG. 61C is a front view that shows how the flex system can be used to create a more concave standing surface.

Figure 61D:
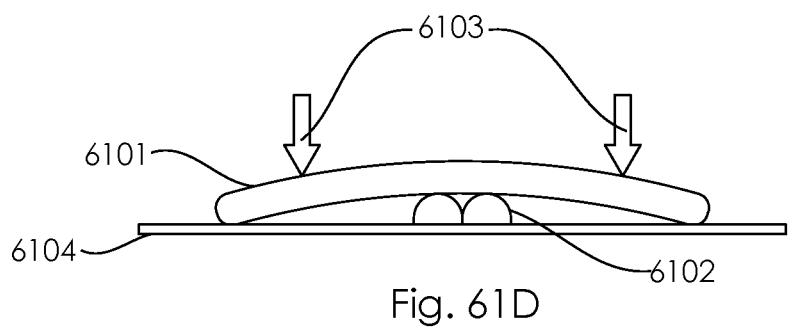

FIG. 61D is a front view that shows how the flex system can be used to create a convex standing surface.

Figure 62A:
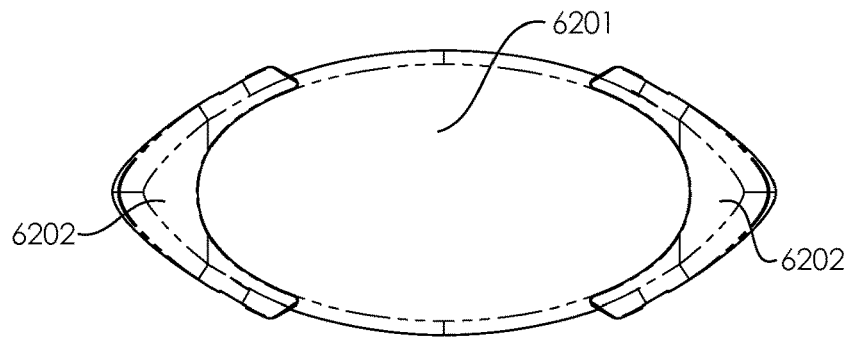

FIG. 62A is a top view of a standing platform with curved end attachments.

Figure 62B:
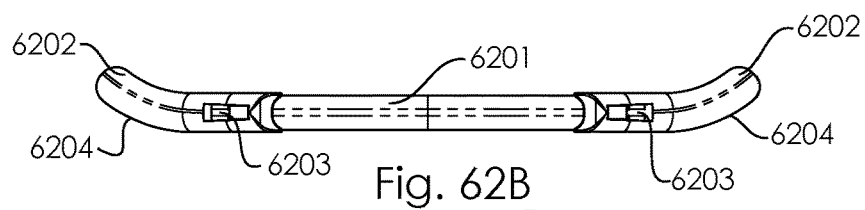

FIG. 62B is a front view of a standing platform with curved end attachments.

Figure 62D:
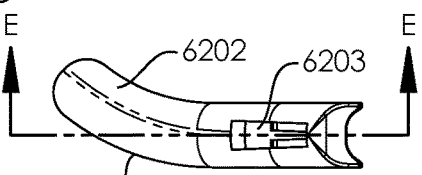
Figure 62C:
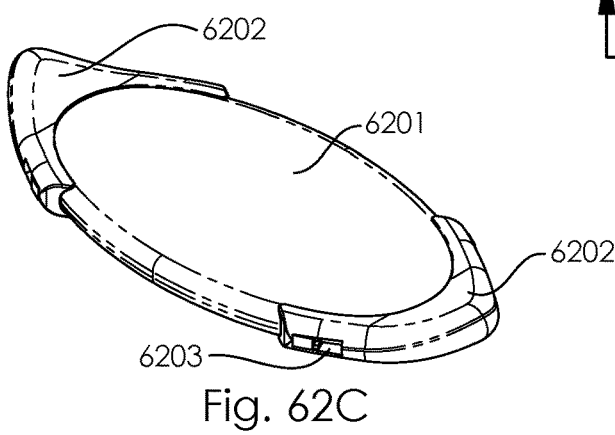

FIG. 62C is an upper isometric view of a standing platform with curved end attachments.

FIG. 62D is a front view of a curved end attachment.

Figure 62E:
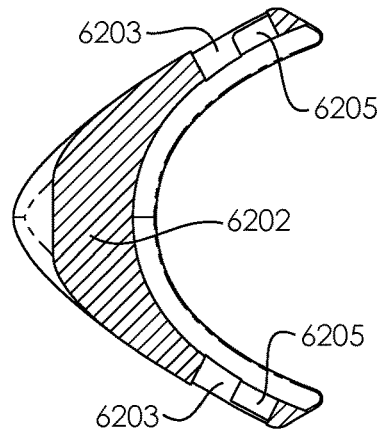

FIG. 62E is a top cross-section view along line E of the curved end attachment of FIG. 62D.

Figure 62F:
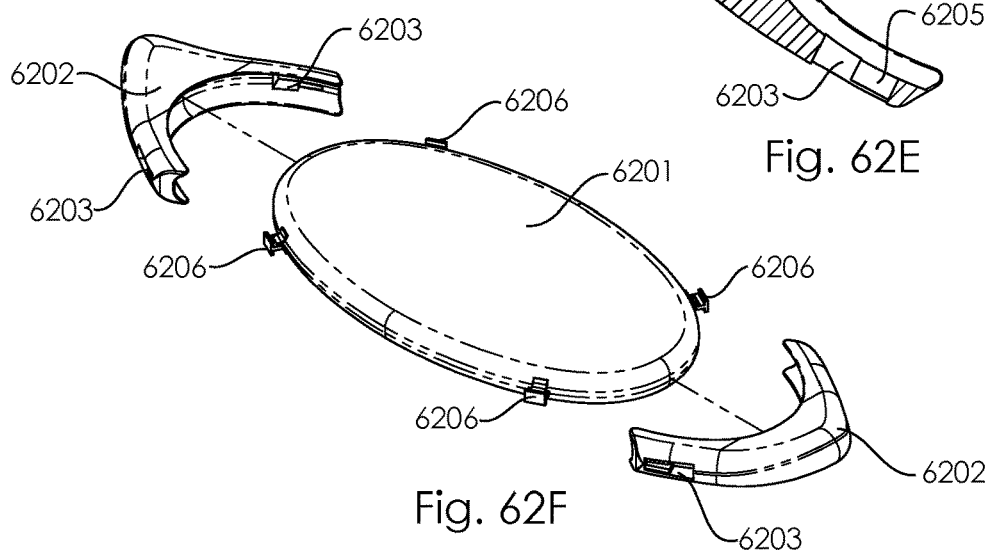

FIG. 62F is an exploded upper isometric view of a standing platform with curved end attachments.

FIG. 62G is a top view of a standing platform with angled end attachments.

FIG. 62H is a front view of a standing platform with angled end attachments.

FIG. 62I is a right view of a standing platform with angled end attachments.

FIG. 62J is a partial front section view along line J of the standing platform of FIG. 62I.

FIG. 62K is an exploded upper isometric view of a standing platform with angled end attachments.

Figure 63A:
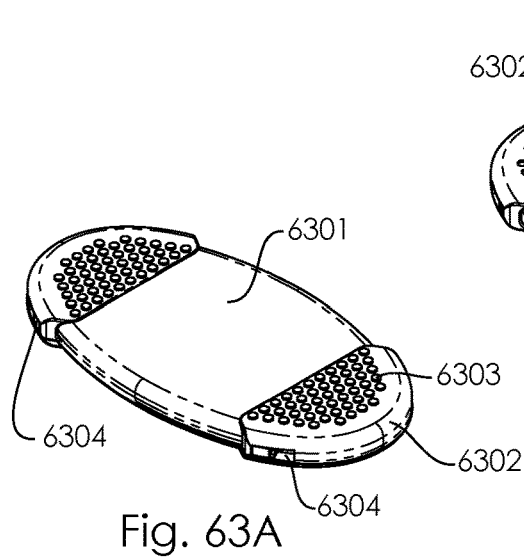

FIG. 63A is an upper isometric view of a standing platform with button end attachments.

Figure 63B:
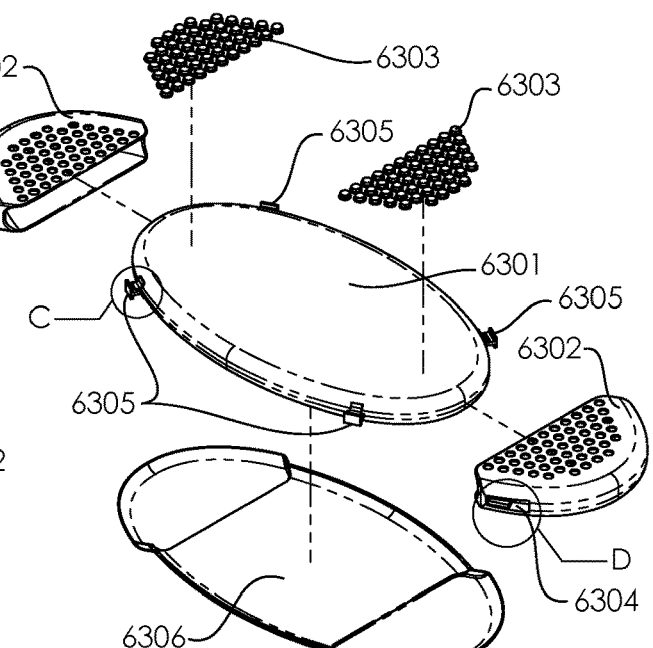

FIG. 63B is an exploded upper isometric view of a standing platform with button end attachments.

Figure 63C:
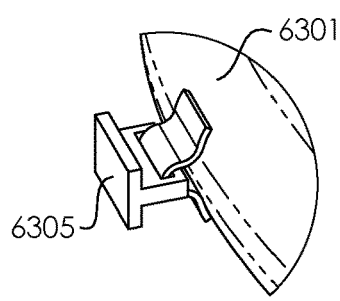

FIG. 63C is a detailed view of the region within the area C of the T-connector attachment point of the standing platform of FIG. 63B.

Figure 63D:
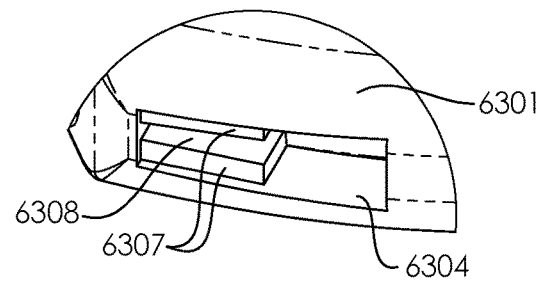

FIG. 63D is a detailed view of the region within the area D of the T-slot connection point on the end attachment of the standing platform of FIG. 63B.

Figure 63E:
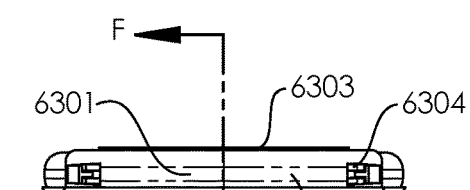

FIG. 63E is a side view of a standing platform with button end attachments.

Figure 63F:
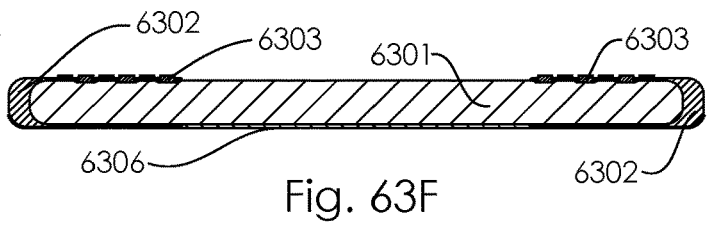

FIG. 63F is a front cross-section view along line F of the standing platform of FIG. 63E.

Figure 63G:
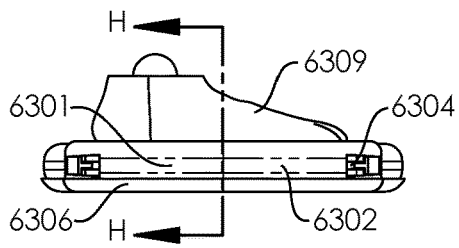

FIG. 63G is a side view of two feet on the button end attachments connected to a standing platform.

Figure 63H:
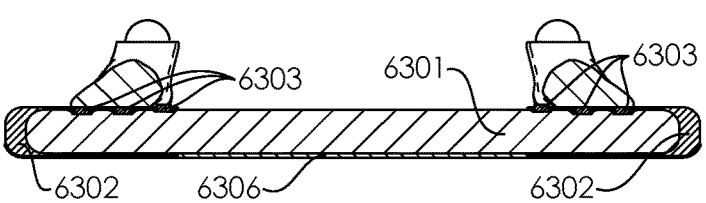

FIG. 63H is a front cross-section view along line H of the standing platform of FIG. 63G.

Figure 64A:
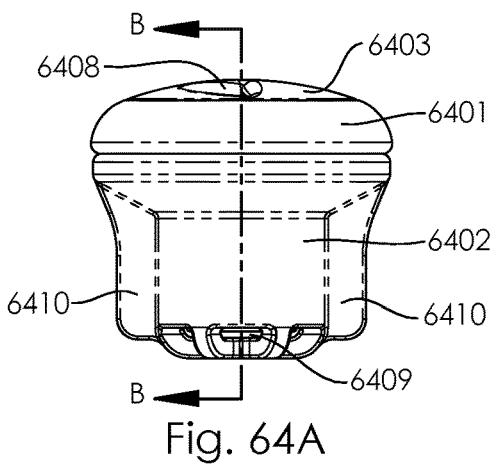

FIG. 64A is a front view of a Schrader type core valve.

Figure 64B:
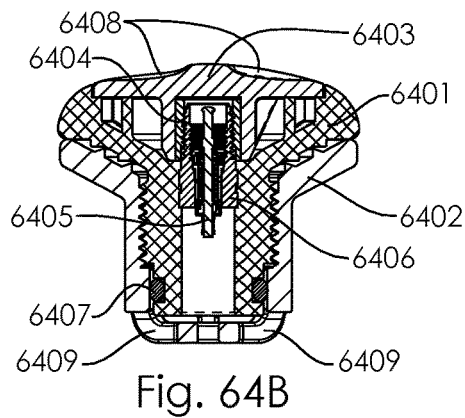

FIG. 64B is a side cross-section view along line B of the Schrader type core valve of FIG. 64A.

Figure 64C:
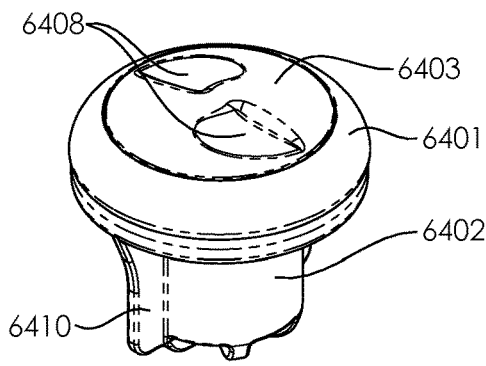

FIG. 64C is an upper isometric view of a Schrader type core valve.

Figure 64D:
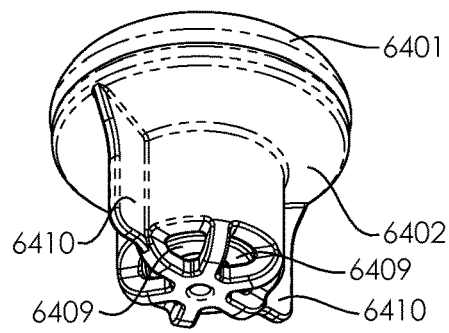

FIG. 64D is a lower isometric view of a Schrader type core valve.

Figure 64E:
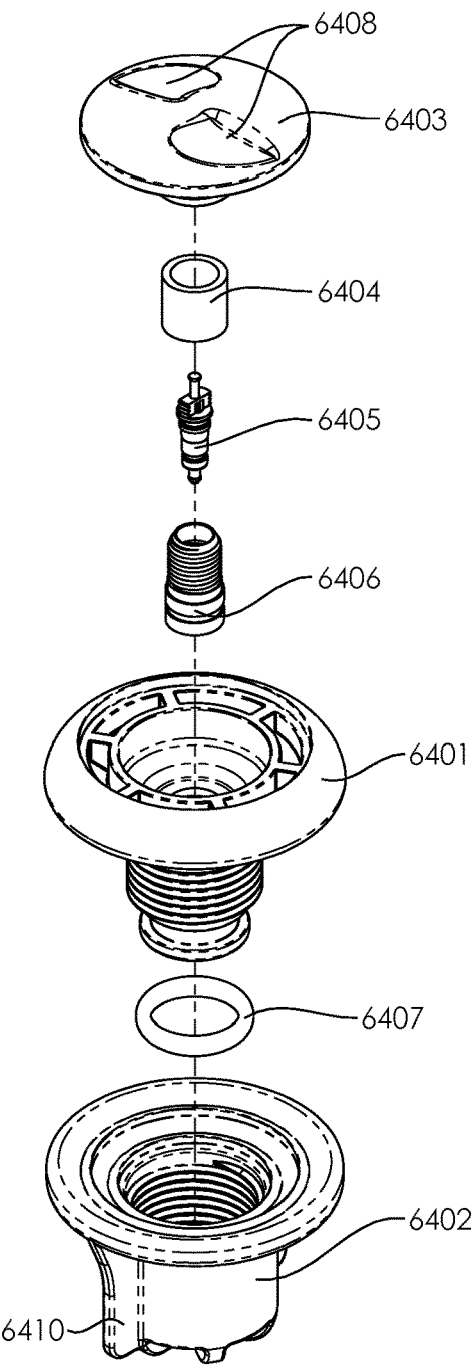

FIG. 64E is an exploded upper isometric view of a Schrader type core valve.

Figure 64F:
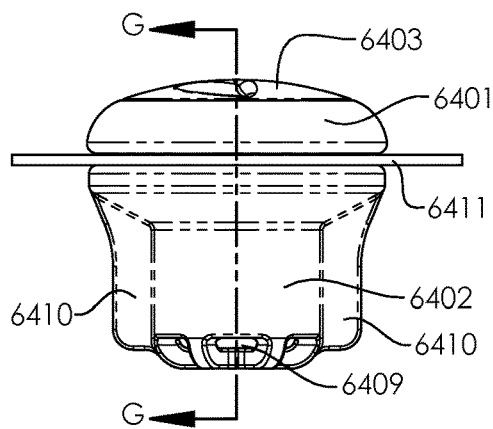

FIG. 64F is a front view of a Schrader type core valve with a top sealing gasket.

Figure 64G:
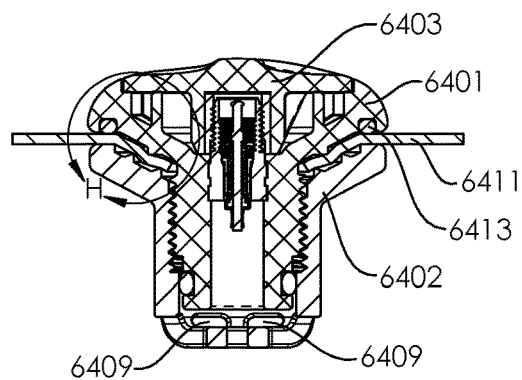

FIG. 64G is a side cross-section view along line G of the Schrader type core valve of FIG. 64F.

Figure 64H:
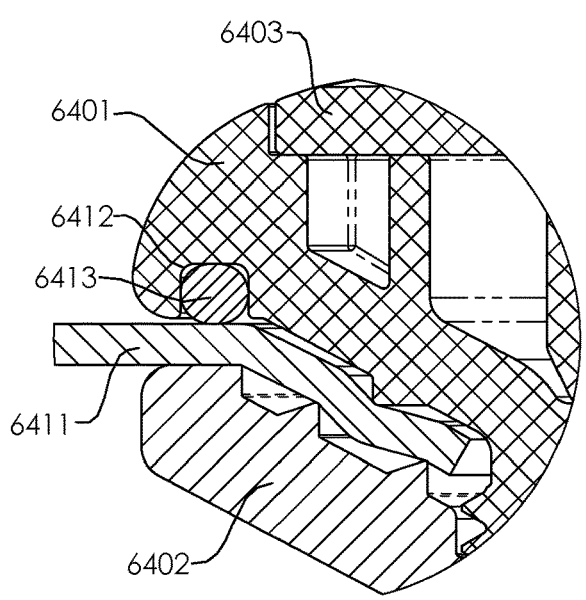

FIG. 64H is a detail side cross-section view of the region within the area H of the Schrader type core valve of FIG. 64G.

Figure 64I:
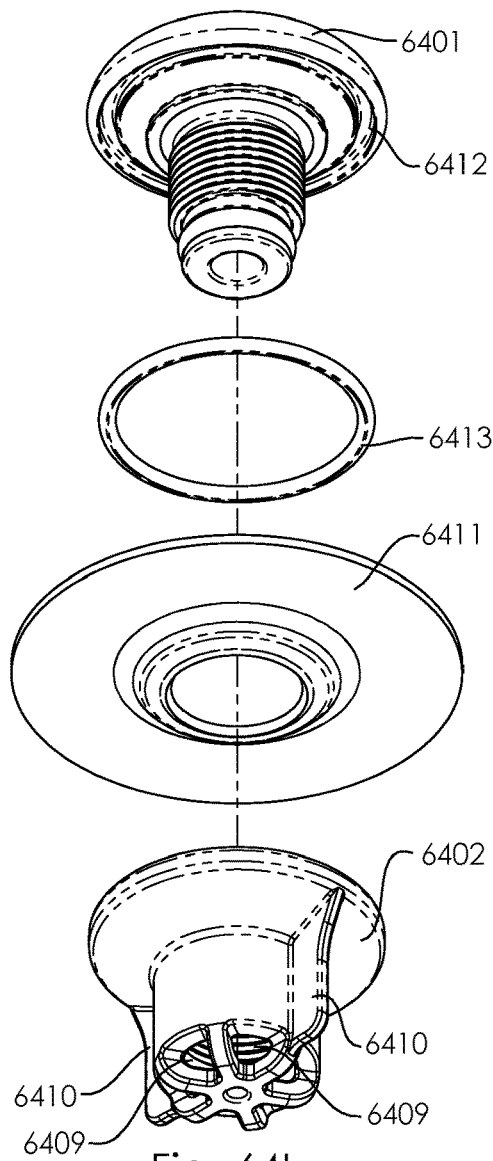

FIG. 64I is an exploded lower isometric view of a Schrader type core valve with a top sealing gasket.

Figure 65A:
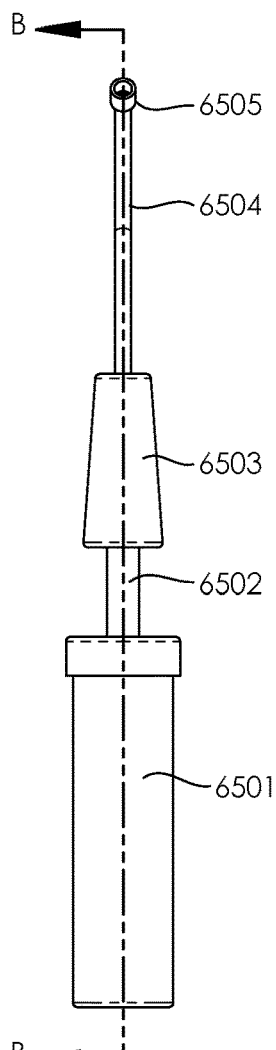

FIG. 65A is a side view of a hand pump with attachment hose.

Figure 65B:
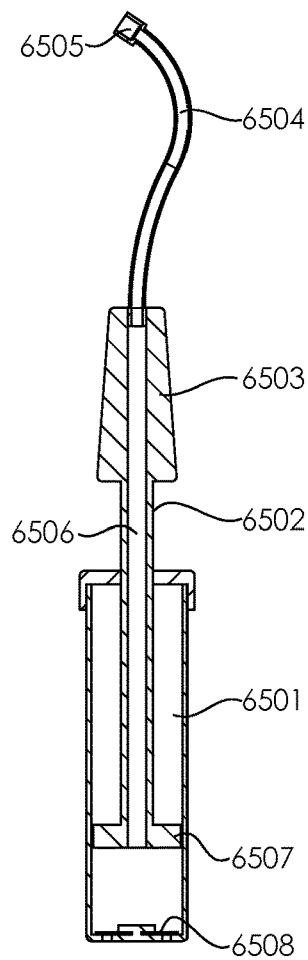

FIG. 65B is a front cross-section view along line B of the hand pump of FIG. 65A.

Figure 65C:
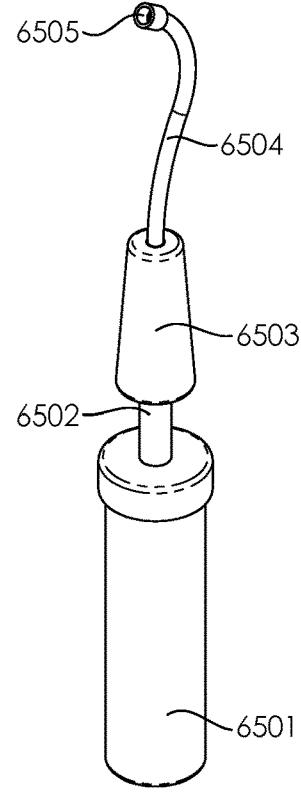

FIG. 65C is an upper isometric view of a hand pump with attachment hose.

Figure 65D:
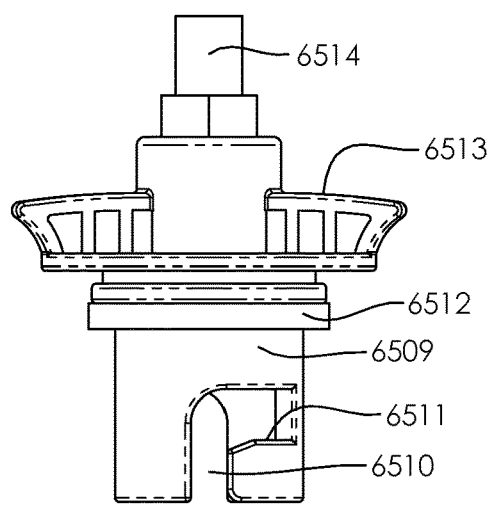

FIG. 65D is a front view of a quarter turn adapter fitting for quarter turn air valves.

Figure 65E:
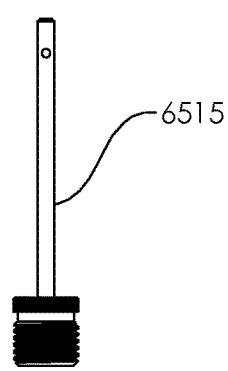

FIG. 65E is a front view of an air inflation needle.

Figure 66A:
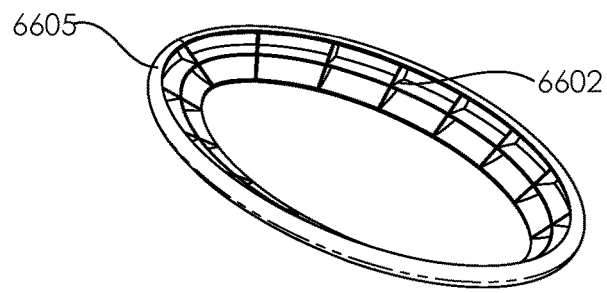

FIG. 66A is an upper isometric view showing a reinforced rigid or semi-rigid edge that may be attached to inflatable fabric.

Figure 66B:
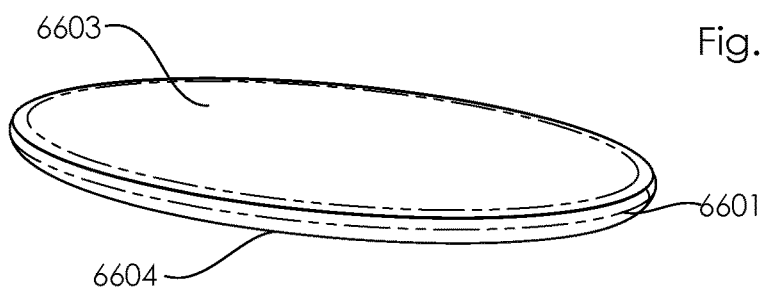

FIG. 66B is an upper isometric view that shows what a reinforced rigid or semi-rigid edge looks like when attached with inflatable fabric to create a standing platform.

Figure 66C:
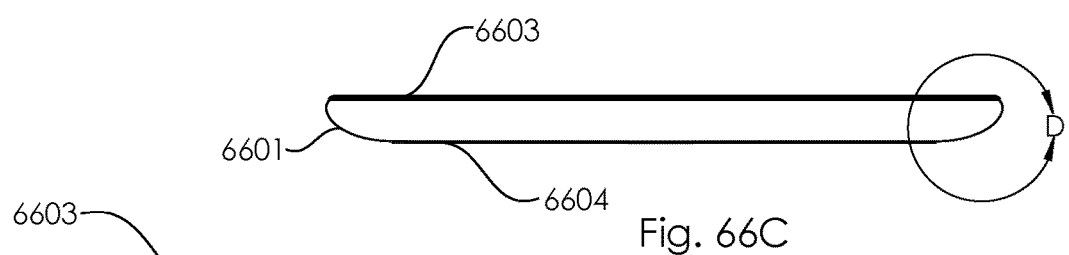

FIG. 66C is a front view that shows the front view of an inflatable standing platform that is attached to a rigid or semi-rigid edge.

Figure 66D:
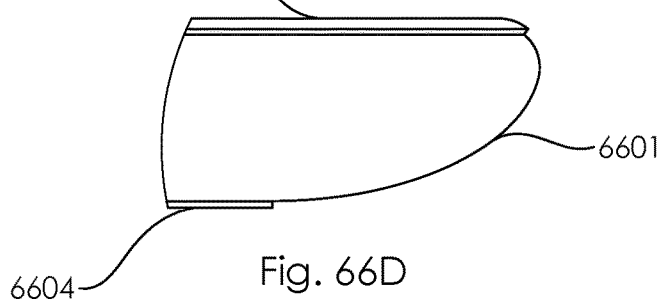

FIG. 66D is a detailed view of the region within the area D of the inflatable standing platform of FIG. 66C and shows the rigid or semi-rigid edge attached to a top layer of inflatable fabric and a bottom layer of inflatable fabric.

Figure 66E:
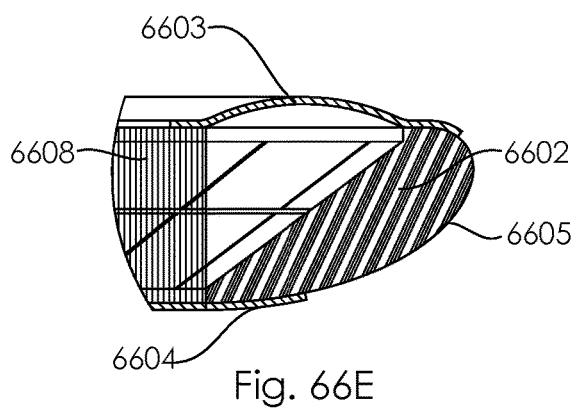

FIG. 66E is a section view showing the top and bottom of a rigid or semi-rigid edge that do not line up, and the effect on an inflatable standing platform.

Figure 66F:
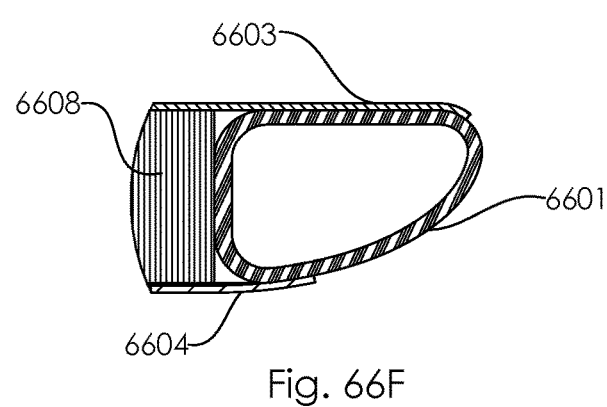

FIG. 66F is a detailed cross-section view showing a closed rigid or semi-rigid edge attached to a top layer of inflatable fabric and bottom layer of inflatable fabric.

Figure 66G:
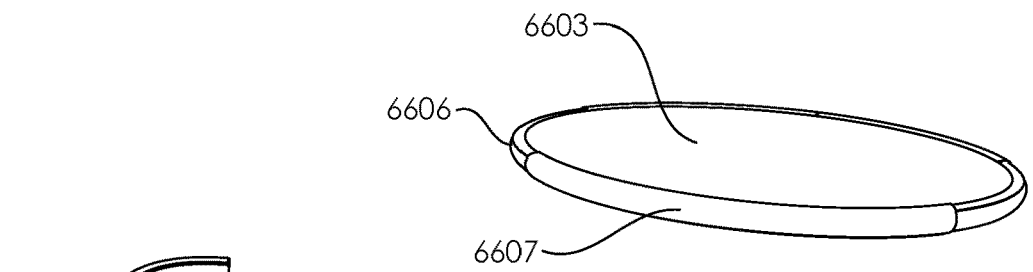

FIG. 66G is an upper isometric view of what using two separate rigid or semi-rigid edges look like when attached to a top, bottom, and two side layers of inflatable fabric.

Figure 66H:
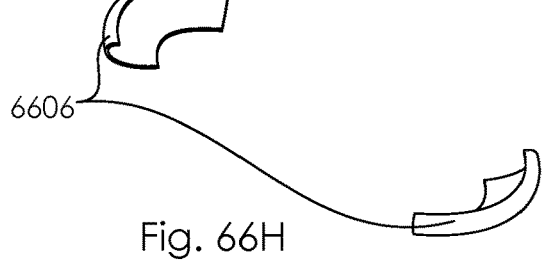

FIG. 66H is an upper isometric view that shows two separate rigid or semi-rigid edges that can bond to inflatable fabric.

Figure 66I:
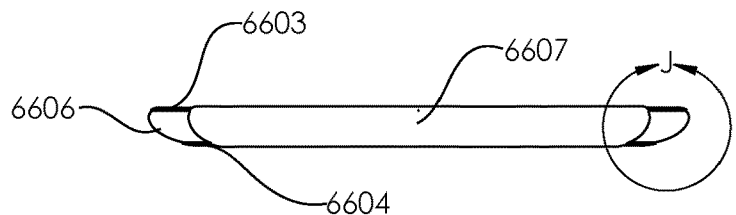

FIG. 66I is a front view of two separate rigid or semi-rigid edges that are attached to inflatable fabric.

Figure 66J:
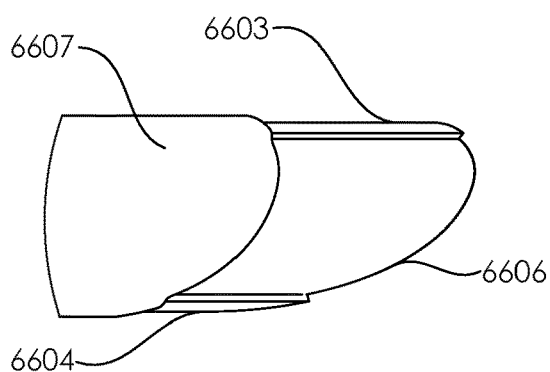

FIG. 66J is a detailed view of the region within the area J of FIG. 66I showing the rigid or semi-rigid edges attached to a top, bottom, and two side layers of the inflatable fabric.

Figure 66K:
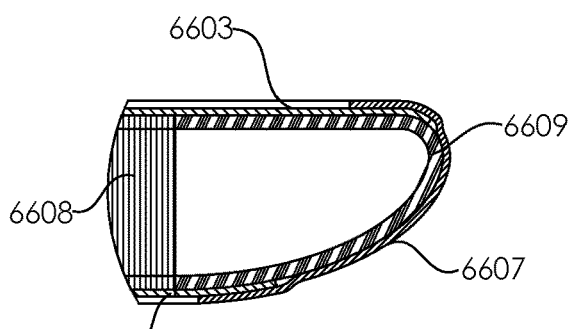

FIG. 66K is a detailed section view of the side layer overlapped and attached to the rigid or semi-rigid edge, the top layer of inflatable fabric, and the bottom layer of inflatable fabric.

Figure 66L:
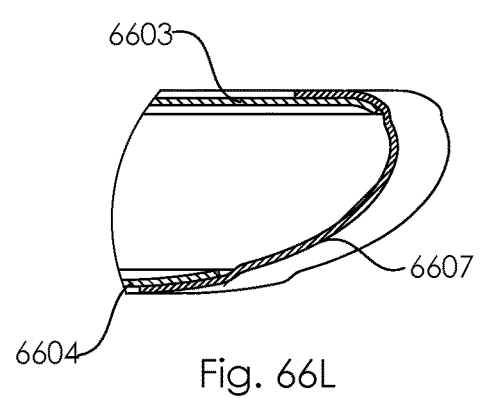

FIG. 66L is a detailed section view of the side layer attached to the top layer and bottom layer where there is no rigid or semi-rigid edge.

FIG. 67A is an upper isometric view of a wireless power transfer system, using magnetic resonance wireless power transfer, resting on top of a standing platform.

FIG. 67B is an exploded upper isometric view showing the magnetically attached power cord, top cover, bottom cover and coil array used to transmit power wirelessly.

FIG. 67C is an exploded upper isometric view showing the wireless power transfer system resting on a standing platform.

FIG. 67D is an upper isometric view showing that the wireless power transfer system can be used under the standing platform to power devices on the standing platform.

FIG. 67E is an upper isometric view that shows that the wireless power transfer system can be integrated into the standing platform.

FIG. 67F is a front cross-section view showing how the wireless power transfer system can be integrated into the standing platform.

Figure 68A:
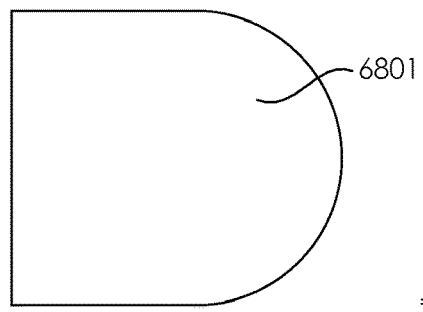

FIG. 68A is a detailed partial front view of a curved edge of a standing platform when it is flat on the ground.

Figure 68B:
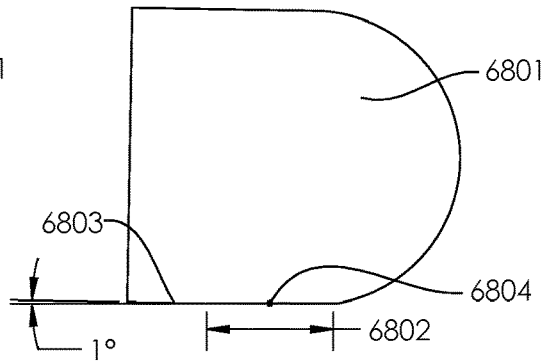

FIG. 68B is a detailed front view of a curved edge of a standing platform when it is tilted up 1 degree.

Figure 68C:
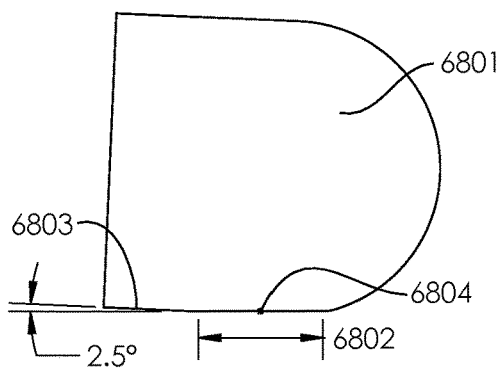

FIG. 68C is a detailed front view of a curved edge of a standing platform when it is tilted up 2.5 degrees.

Figure 68D:
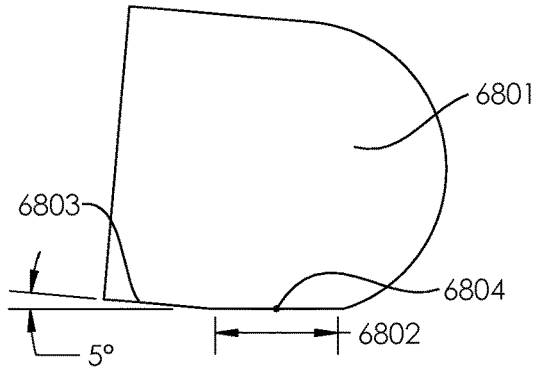

FIG. 68D is a detailed front view of a curved edge of a standing platform when it is tilted up 5 degrees.

Figure 68E:
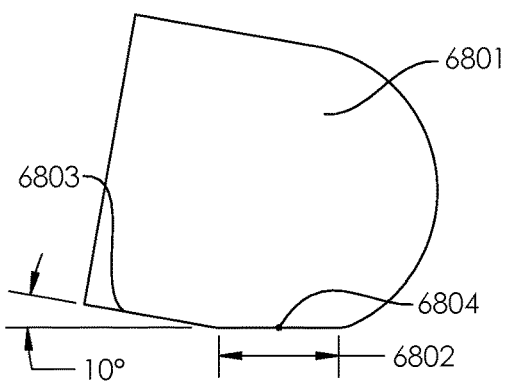

FIG. 68E is a detailed front view of a curved edge of a standing platform when it is tilted up 10 degrees.

Figure 68F:
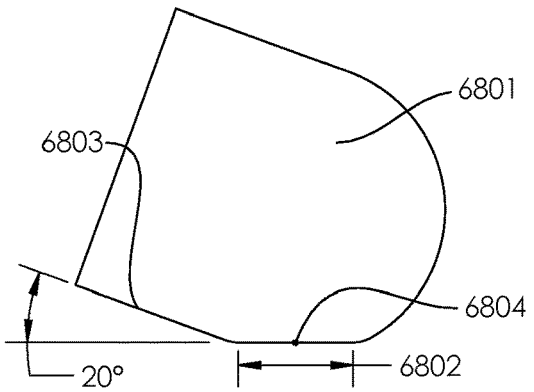

FIG. 68F is a detailed front view of a curved edge of a standing platform when it is tilted up 20 degrees.

Figure 68G:
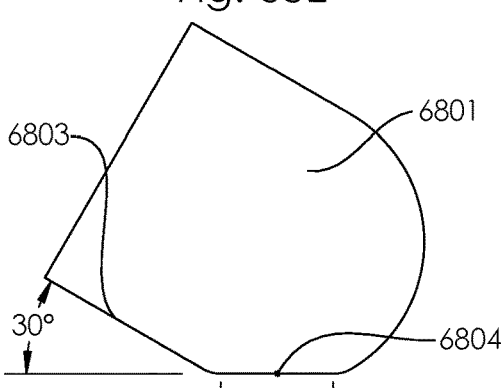

FIG. 68G is a detailed front view of a curved edge of a standing platform when it is tilted up 30 degrees.

Figure 68H:
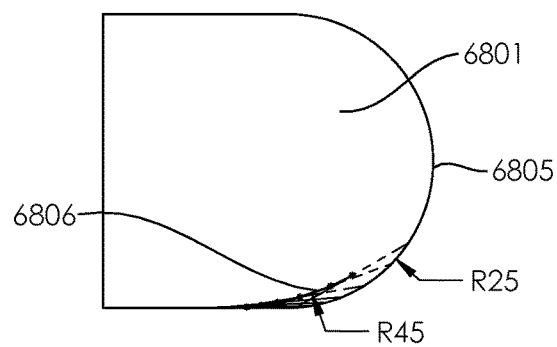

FIG. 68H is a detailed front view of a curved edge of a standing platform, showing the equivalent curve and the contact points for angles ranging between a 1 to 30 degree tilt.

Figure 69A:
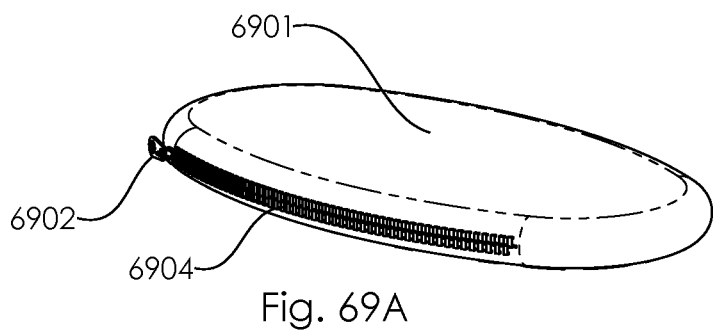

FIG. 69A is an upper isometric view of a standing platform cover with a zipper.

Figure 69B:
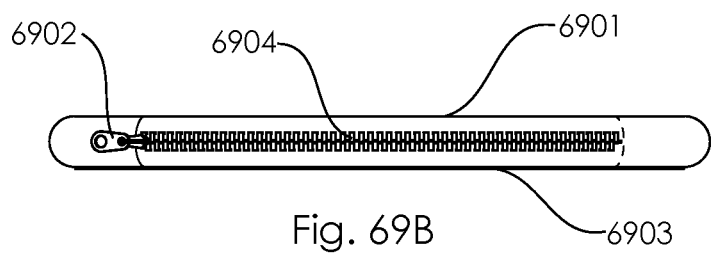

FIG. 69B is a front view of the standing platform cover of FIG. 69A.

Figure 69C:
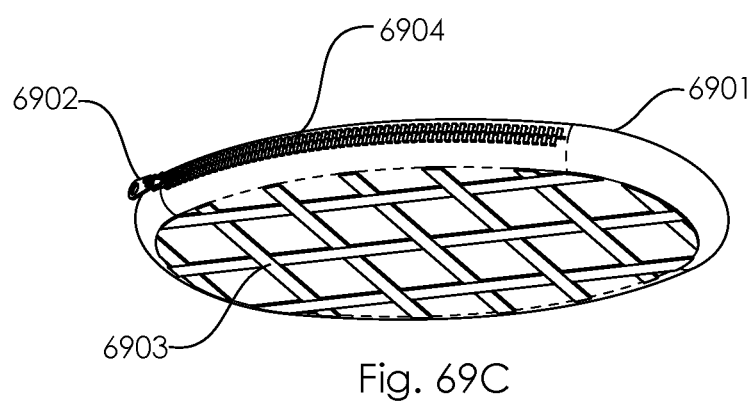

FIG. 69C is a lower isometric view of the standing platform cover of FIG. 69A showing elastic bands attached to the cover.

Figure 69D:
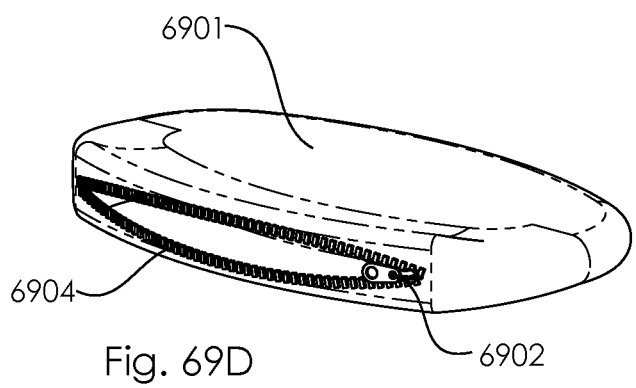

FIG. 69D is an upper isometric view of the standing platform cover of FIG. 69A showing the zipper unzipped and opened.

Figure 70A:
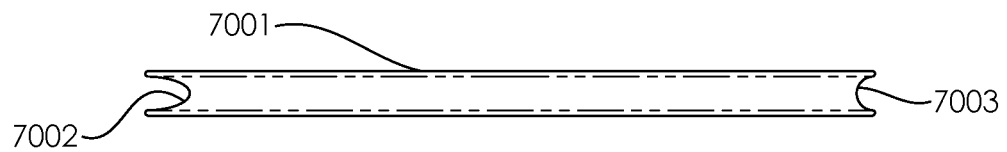

FIG. 70A is a front view of a standing platform with concave edges.

Figure 70B:
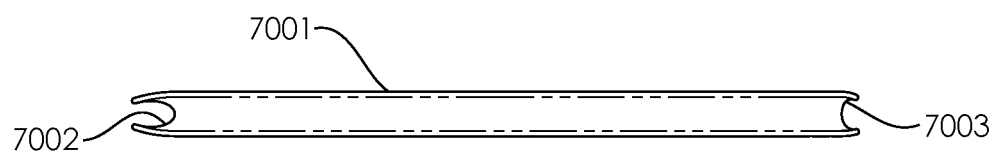

FIG. 70B is a front view of a standing platform with flexed concave edges.

Figure 70C:
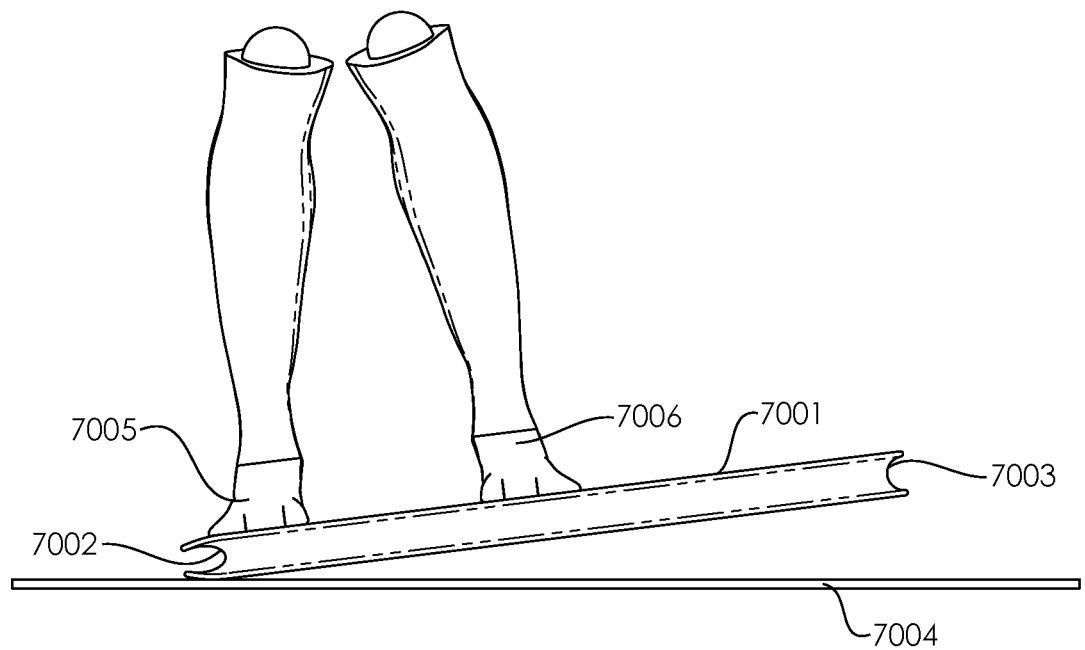

FIG. 70C is a front view of a user tilting up a standing platform with concave edges.

DETAILED DESCRIPTION

1. Table of Contents

1. Table of Contents
2. Introduction
3. Key Metrics and Term Definitions
4. Advantageous Key Metric Ranges and Limits
   4.1. Rigidity and self-supporting
   4.2. Coefficient of restitution and compression modulus
   4.3. Collapsing and conforming edge
   4.4. Slope of platform surface
   4.5. Bowing arc when exercise attachments added
   4.6. Elliptical or convex curvature and shape
   4.7. Low friction surface for sliding
5. Adjustability of Key Metrics
6. Advantageous Qualities Afforded by Key Metric Ranges
   6.1. Friction and rigidity
   6.2. Different orientations for foot placement of curved perimeter
   6.3. Mat manipulation and storage
   6.4. Mat thickness
   6.5. Rocking ability
7. Various Embodiments of Devices
   7.1. Multi layered mat
   7.2. Spring-loaded mat
   7.3. Balance board with rebounding top
   7.4. Multi chambered gas mat
   7.5. Internal threaded air mat
   7.6. Surface terrain
   7.7. Curved surface platform
   7.8. Rocking, noise, and temperature control
8. Beneficial Applications of Devices
   8.1. Exercise
   8.2. Safer impact for a falling person on it
   8.3. Surgical/medical applications
   8.4. For high tech environments
9. Further Details of Certain Disclosed Embodiments 2. Introduction Having tested numerous products on the market today that are representative of the kinds of standing platforms available and also evaluated currently existing designs, none have been found that satisfy the optimal metrics for performance of the disclosed devices detailed herein.

The trampoline-like standing movement mats disclosed herein adapt to a person's stance whether the legs are in a narrow stance, as in closer to each other, or in a wider stance, as when the feet are further apart. Biomechanically, it is typical that when a person stands with their feet further apart, the feet tend to point outward at a greater angle (FIG. 40D, 4005) than when their feet are closer together (FIG. 41D, 4105) where the stance with some results in a "pigeon toed" orientation (FIG. 41D, 4105). The disclosed devices that have gently curved perimeters following a generally oval and curved oblong shape accommodate the wider angle of the feet when in a wide stance. If a user desires to have part of their feet on the mat and part off the mat (to increase circulation or to put pressure under the arch for a massaging effect), the curved perimeter shape allows for the feet to be at wider angles in a wide stance such that the part of their foot that is off and on the mat (FIG. 41B, 4105) stays substantially the same as if the feet were closer together (FIG. 41D, 4105) despite the change of angle caused by the alteration of the foot stance. Additionally, the size and shapes disclosed permit a user to stand at the ends of the oval such that the balls of their feet are at or near the front edge of the mat, and their heels are at or near the rear edge of the mat. The oval shape may be sized to adapt to different shoe or foot sizes of various users. Foot angle, toe up or toe down, may be achieved without having to rotate the mat, by standing astride the rear or forward (FIGS. 8C-8D, 8A-8B) edge respectively.

The disclosed embodiments of a trampoline-like standing mat encourage users to move more frequently by actively responding to a user's input. Such embodiments operate to offset the negative effects of gravity on the feet, back and body of a standing person, while still allowing for improved blood flow and circulation, by providing a dynamic and highly responsive rebound surface response. The disclosed embodiments may be employed as anti-fatigue mats and provide additional exercise benefits beyond that currently available in a traditional anti-fatigue mat, due in part, to their improved rebounding characteristics. Certain disclosed embodiments may also be employed as exercise mats.

The disclosed devices have been found to be more comfortable. The resilient and trampoline-like bouncy rebounding surface tends to encourage a more proper stance and posture (e.g., one where a user does not lock their knees). This is believed to be due to the additional support and micro foot adjustments that occur on a more resilient surface. The disclosed devices address this challenge in an effective manner compared to other devices.

Additionally, over-pronation is a common problem for many standing users. Over-pronation is the rotation of the medial bones in the midtarsal region of the foot inward and downward so that when walking, the foot tends to come down on its inner margin. This effect also occurs in differing degrees when a person is standing. Normal pronation provides an important shock absorbing function for the human foot, but some users suffer from excessive pronation (colloquially referred to as "flat feet") in varying degrees, which can create additional fatigue to a user's foot, as well as cause other physical discomforts. The disclosed devices are believed to be effective at supporting users who suffer from excessive pronation by providing disclosed shapes and dimensions that permit a user to position their feet in various ways that counter-act over-pronation (and under-pronation and other foot problems) by providing users with places to reposition and support their feet for more optimal standing posture to improve comfort and reduce potential discomfort. The conforming edge and rebound provided by the disclosed platforms have been found to be very comfortable to such users and allows them to utilize the conforming edges as well to provide additional and pleasing support underfoot along the contour of the medial longitudinal arch portion of the foot. Although three distinct arches function to support the foot, the medial longitudinal arch has been found to be the arch of clinical significance in preventing injury due to flat feet (described in *Pes Cavus and Pes Planus: Analyses and Treatment* by Abby Herzog Franco, Physical Therapy Journal, Vol. 67, No. 5, May 1987, Pages 688-94). The greater height of the surface from the floor of disclosed embodiments permits a user to extend their heel towards the floor surface while keeping their forefoot on the mat surface, which helps stretch the ligaments and muscles of the calf area; as well as do other exercises that can help alleviate or help rehabilitate improper pronation related conditions, such as posterior tibial tendon stress or the like, as one example. This in turn, helps increase the productivity of such a person when working. Tired feet (especially feet that are in a less than optimum stance) are a common complaint of many standing users.

Current anti-fatigue mats dissipate or dampen compression energy or force (exhibit significant viscoelastic hysteresis) and therefore return or release significantly less energy (lower coefficient of restitution) with a slower and less dynamic response (reduced compression secant modulus) than exhibited by the disclosed devices and their embodiments. Significantly, such dampening characteristics (lower coefficient of restitution) discourage users from moving because they deaden and do not significantly return the energy that the user puts into the mat. Prolonged standing without significant movement has been shown by many studies to lower user energy and productivity and to be detrimental to health. (For example see: *Arbeitsbedingungen and gesundheitliches befinden aus der sicht der erwerbstatigen* by Buchberger, J., Soz prauentiumed, Vol. 2 (Suppl.), 1993, Pages 87-91 (in German); *Biomechanical risk factors for occupationally related low back disorders* by Marras, W. S., Lavender, S. A., Leurgans, S. E., Fathallagh, F. A., Ferguson, S. A., Allread, W. G., Rajulu, S. L., Ergonomics, Vol. 38, 1995, Pages 377-410; *Occupational risk factors associated with soft tissue disorders of the shoulder: a review of recent investigation in the literature* by Sommerich, C. M., McGlothlin, J. D., Marras, W. S., Ergonomics, Vol. 36, 1993, Pages 697-717; *A comparison of the effects of floor mats and shoe in-soles on standing fatigue* by Phyllis M. King, Applied Ergonomics, Vol. 33, 2002, Pages 477-84; *Investigating the Physiological Effects of Standing, Using a Sit/stand Stool and Standing with a Footrest During Static Tasks* by Sari *Julia* Sartika and Siti Zawiah Dawal, Vol. 5, No. 7, Australian Journal of Basic Applied Sciences. 2011, Pages 516-22; *A Review on Health Effects Associated with Prolonged Standing in the Industrial Workplaces* by Isa Halim and Abdul Rahman Omar, Vol. 8, No. 1, International Journal of Research and Reviews in Applied Sciences, July 2011, Pages 14-9) The disclosed devices better offset the negative effects of long term standing because they are more responsive (less dampening) underfoot for a standing user, thus encouraging contract-relax leg muscle activity, while still providing sufficient compression modulus for long term standing comfort.

Some of the features of the disclosed mats are especially designed to benefit persons working at a standing desk or in a home, work, or office environment where they stand facing in one direction for long periods of time. It is common for such persons to vary their standing and sitting times while working.

The disclosed improvements are achieved by optimizing the standing mats or platforms to meet certain optimal ranges for key metrics. The disclosed devices may achieve such ranges within the key metrics by utilizing combinations of elastomeric foams, rubbers, springs (coil, leaf, wave, gas, metal, fiberglass, carbon fiber, plastic, etc.), and/or gas or fluid filled chambers.

3. Key Metrics and Term Definitions

Certain metrics and terms within the descriptions of the disclosed devices have specific meanings and definitions.

These metrics and terms shall have the meanings as defined below, whether used in capitalized or lower-case forms.

Trampoline-like: The ability of a mat to return a sufficient amount of energy so as to provide some rebound or spring back effect to a user deflecting a surface of the mat.

User: A user is defined as any sized person able to stand on the disclosed devices or to perform exercises upon one of them, and to achieve a rebound response. A user may bend or flex or otherwise move on one of the disclosed platforms on their feet or other body part, or move and manipulate such a device to some degree with their feet or other body part to reposition it. The disclosed devices are usable by any person of any size. The adult and adult sized users of the disclosed devices are usually individuals between a height of 4 feet 7 inches and 6 feet 10 inches, with a weight range between 70 lb to 500 lb, though generally, the common user falls within the range of normal weights of the general population. Children between the ages of 4 to 8 may also use one of these devices, but their bodyweight is generally lighter, between 30 to 80 lb. Young people between the ages of 8 and 16 can vary greatly in weight and size, from 50 lb to in excess of 400 lb. The disclosed devices are configurable, and in many embodiments adjustable, to enable optimization for individuals in these various weight ranges and age groups.

Edge Band: In general, composed of the points that represent where the surface begins to transition to the edge surface and the slope starts to change (i.e., the rate of change of the slope or second derivative is non-zero) substantially increases near the perimeter. For example, for a generally flat mat having a generally vertically oriented edge surface or a tapered edge surface, the edge band is composed of the points where the surface near the perimeter begins its transition to the slope of the edge surface. In embodiments where all or a significant area of the surface is sloping toward the perimeter (e.g., a bottom surface with a large rocking region such as shown in FIGS. 9A-9H, 9K, 9S, 30A-30H, 31A-31E, and 32C-32I or a domed top surface such as shown in FIGS. 6B, 7A-7F, and 32A-32B), the edge band is located where the sloping surface last exceeds 30 degrees from horizontal as it approaches the perimeter.

Near Edge Area: In general, composed of the points that are inside and near (e.g., within up to three inches) where the surface begins to transition to the edge surface and the slope starts to change (i.e., the rate of change of the slope or second derivative is non-zero) substantially increases near the perimeter, including the Edge Band (i.e., all points on the surface between edge band and line given below). For example, for a generally flat mat having a generally vertically oriented edge surface or a tapered edge surface, the near edge area includes the points that are just inside (e.g., within up to three inches) of where the surface near the perimeter begins its transition to the slope of the edge surface. The Near Edge Area extends inward up to the line delineating where the compression modulus reaches 90% of the center compression modulus. The near edge area corresponds the surface portion where the board compresses more easily than the central region, providing the user with a noticeably softer region. This area is more unstable and less supportive and thereby causes users to rock their feet into the softer area, which encourages users to move more and increases the health benefits of standing. In embodiments with an adjustable compression modulus, the line delineating where the compression modulus reaches 90% of the center compression modulus may vary with adjustment of the compression modulus.

Center Area: The points on the surface of a mat in the one or more regions where the compression modulus is greater than or equal to 90% of the center compression modulus.

Surrounding Edge: In general, composed of the outermost points that are outside of the surface Edge Band (e.g., all points between a top edge band on a top surface and a bottom edge band on a bottom surface, including the perimeter). For example, for a generally flat mat having a generally vertically oriented edge surface or a tapered edge surface, the surrounding edge is composed of the points that are outside of where the surface slope first begins its transition to the slope of the edge surface and includes the edge surface.

Central Region: The points on the surface of a mat at or within a one inch radius of a center-of-mass of an assumed constant density surface that are delineated by the edge band.

Rocking Region: In general, composed of the outermost points adjacent to the perimeter that extend outwardly from where the bottom surface first begins to measurably rise away from the floor in a convex manner along the curved edge. For example, see the rocking region of length L in FIG. 9P. In devices with a collapsing and conforming edge, the rocking region effectively extends inward beyond where the unloaded bottom surface first begins to measurably rise away from the floor to also include those points inward, up to where the bottom surface first begins to measurably collapse and conform under a given rocking load. The rocking region thus varies with the load. This produces an effective rocking region whose radius of curvature is greater and has a greater extent than the non-deformed, unloaded curved edge. For example, see rocking regions 807, 808, 809, and 810 in FIGS. 8E, 8G, 8I and 8J. The effective rocking region is the portion where the board collapses enough to provide the user a noticeable feel of the rocking motion and feel as if it is rocking on its edge.

Bending Rigidity: A mat's ability to resist bending deflection. This is determined by the force required, applied by an approximately three-inch diameter impactor on the top surface over the central region, to deflect a mat divided by the amount of bending deflection at its central region while the mat is supported at each end, where such support extends inward from each end by approximately 0.75 to 1.75 inches to create a span over an unsupported middle region $$\left(k_b = \frac{F}{\delta}\right).$$

The amount of total deflection includes any compression deflection at its support points with the bending deflection. Subtracting out the compression distance from the total deflection gives the amount of bending deflection. Note: A self-supporting mat has some significant advantages, as disclosed below.

Flexural Rigidity: The bending rigidity times the cube of the length of the span of the unsupported middle region when determining the bending rigidity, divided by a constant of 48. The flexural rigidity is an approximation for the elastic modulus times the moment of inertia. The flexural rigidity formula is derived from the max bending deflection equation for a simply supported beam (i.e., has a pinned/fixed support at one end and a roller support at the other end) with a constant cross-section and a point load at the center. The relationship for flexural rigidity in symbolic form is $$\text{Flexural Rigidity} = EI = \frac{k_b * l^b}{48}.$$

Compression Modulus: For a given range of strain, the slope of the best fit straight line, so that the linear curve fit is of the form y=mx+b, where the x-axis is the strain and the y-axis is the stress. Strain is the deflection of the material divided by the original thickness of the material in the direction of the applied force. The Compression Modulus is a stress to strain curve, between the points representing the strain and the required stresses to achieve those strain values. The strain points correspond to at least one hundred and fifty sample strain values spread evenly across the portion of the available strain that includes the given range of strain. The stresses are applied using a circular impactor of a given surface area on the upward facing top surface of a mat whose bottom surface is supported by a generally horizontally oriented floor-like plane underneath. Such sample points are obtained by at least measuring the stress for the strain corresponding to each 0.000833 inches of deflection. Therefore this requires more than 150 sample points when the available strain represents a range that exceeds an eighth of an inch. Unless otherwise specified, the circular impactor can be assumed to have a diameter of 3.0 inches and the range of strain can be assumed to be the last 50% of the available strain.

Linear Compression Modulus: For a given range of strain and a given $R^2$ (coefficient of determination), the compression modulus is linear if the best fit straight line of the compression modulus for the given range has a computed $R^2$ value greater than or equal to the given $R^2$ value. Unless otherwise specified, the given $R^2$ value can be assumed to be 0.90.

Compression Secant Modulus: The slope of the secant line between the origin and the point representing the strain (strain is the deflection of the material divided by the original thickness of the material in the direction of the applied force) that requires 50 psi of stress applied using a three-inch diameter impactor on the upward facing top surface of a mat whose bottom surface is supported by a generally horizontally oriented floor-like plane underneath.

Edge Compression Modulus: The compression modulus as measured by an impactor whose center is positioned within the near edge area of a mat.

Linear Edge Compression Modulus: The linear compression modulus as measured by an impactor whose center is positioned within the near edge area of a mat.

Edge Compression Secant Modulus: The compression secant modulus as measured by an impactor whose center is positioned within the near edge area of a mat.

Center Compression Modulus: The compression modulus as measured by an impactor whose center is positioned within the central region of a mat.

Linear Center Compression Modulus: The linear compression modulus as measured by an impactor whose center is positioned within the central region of a mat.

Center Compression Secant Modulus: The compression secant modulus as measured by an impactor whose center is positioned within the central region of a mat.

Compression Secant Modulus Ratio: The edge compression secant modulus divided by the center compression secant modulus.

Linear Compression Modulus Ratio: The linear edge compression modulus divided by the linear center compression modulus for a given range of strain and a given $R^2$ (coefficient of determination).

Available Strain: The range of strain permitted by a mat under forces (stresses) that are attainable by a human being and that do not cause damage to the mat. Many of the disclosed mats have an available strain ranging between 0% strain and approximately 95% strain.

Mat mass: The mass or weight of a mat.

Mat density: The mass of a mat divided by its volume.

Mat thickness: The median height (median distance) of the standing surface of a mat top above its bottom surface (e.g., mat thickness or median height (limed) shown measured in FIG. 44C).

Surface Pressure: For a mat whose bottom surface is supported by a generally horizontal floor-like plane underneath, the mat mass divided by the area of the portion of the mat bottom surface that is in contact with the supporting floor-like plane underneath.

Coefficient of Restitution: The square root of the ratio of the height of rebound (Hr) to the height of drop (Hd) onto the top surface 5309 of a mat 5301. As shown in FIG. 53, this is measured by dropping a 200 lb weight 5304 solid rigid impactor 5308 having two shaped wooden ovals 5302 spaced 8 in apart center to center that are of length 10.5 in and width of 3.75 in with a 1 in radius on the entire bottom edge that have a surface area and shape similar to that of two human feet from a height Hd of 3 in above the top surface of a mat that is resting on a rigid floor surface 5307. The maximum rebound height Hr of the impactor is then measured.

Unloaded Friction Force: The force required to overcome the static friction of the mat in contact with a typical smooth (uncarpeted) workplace floor and when unloaded.

Loaded Friction Force: The force required to overcome the static friction of the mat in contact with a typical smooth (uncarpeted) workplace floor and when loaded with 70 lb over a 15 square inch area over the central region of the top surface.

Wet Friction Force: The force required to overcome the static friction of the mat in contact with a typical smooth (uncarpeted) workplace floor covered with approximately a 0.5 mm film of water and when loaded with 70 lb over a 15 square inch area over the central region of the top surface.

Surface Lateral Shear: The amount of lateral deflection resulting from a 45 lb vertical deflection force applied to a square rigid 45 square inch surface plate placed upon and surrounding the central region and another 14 lb lateral pulling force applied to the same surface as measured when approximately centered over the central region of the mat.

Pushback Force: The force required to press the raised end of a tilted mat down so that it touches the floor. For this metric, we modeled, using the flexural rigidity, the result of fixing one end of the board such that the board is tilted up at an 8-degree angle to compute a pushback force. The pushback force is applied at the tip of the raised end of the board, perpendicular to the board's top surface.

Adjustment Mechanism: A mechanism by which one or more of a mat's characteristics may be adjusted by a user (i.e., to be softer or harder) and that may permit a decrease or increase in the mat's compression modulus, bending rigidity, flexural rigidity, and/or mat thickness. Examples of an adjustment mechanism include: lateral compression frame, spring pre-tensioning adjustment set screws 2404, inflation pressure with valves 2802 or 2806, tension perimeter strap 2502, elastic or inelastic tensioners 2702, wires/bungees/other tensioners 2603, selection of different density blocks 2201 and/or layers, etc. Such example adjustments may be affected by a compressing, reducing, relaxing, or configuring in one direction of adjustment (e.g., a decrease) and may be affected by an expanding, increasing, tensioning, or alternate configuration in the opposite direction of adjustment (e.g., an increase).

Ground Surface: Any generally horizontally oriented, substantially flat surface such as a floor or floor covering and including carpet, wood, stone, tile, linoleum, cement, ground, etc.

The device may interchangeably be referred to as a trampoline, mat, platform, board and the like. Similarly, the device may be described as being for working, exercising, standing and the like, including their variants.

In view of the many possible embodiments to which the principles of the disclosed standing platforms may be applied, it should be recognized that the illustrated embodiments are only examples of the standing platforms disclosed herein and should not be taken as defining the scope of the invention.

It is noted that this disclosure describes standing mats and exercise pads generally interchangeably, as the disclosed devices are able to perform both in many embodiments. Some embodiments that contain the same feature benefits may be more specifically geared towards an exercise device or more geared to a standing mat, but the principles disclosed apply to both applications; often simultaneously in the same mat. It is one of the key benefits of the disclosed devices that they are able to serve a dual purpose for a standing user in a manner not previously available. Currently, users are generally compelled to choose between an anti-fatigue mat designed to absorb standing pressure underfoot or to instead forgo that in favor of a specialized exercise device that is less suited to serve as an anti-fatigue platform. The disclosed devices provide all of the standard benefits of a typical anti-fatigue mat along with significant improvements. They also provide a more sports oriented exercise device in the same product.

The embodiments utilizing fibers 2804 may also interchangeably be referred to as drop stitch inflatable mats or string mat inflatables among other variants. Other terms for describing fibers 2804 include space yarn, denier space yarn, drop stitch core, drop stitched, dropstitch, polyester filaments, fabric filaments, and/or tensile filaments.

Note that the American Society of Testing and Materials (ASTM) standard for Indentation Force Deflection (IFD) is not employed as a metric because it is not well suited to characterize the disclosed devices. For example, the ASTM IFD definition D3574 measures the amount of force required to deflect a 50 square inch surface by 25% of the mat thickness. A 25% deflection corresponds to a single 0.25 strain whereas the disclosed devices are characterized by their behavior across the available strain, typically ranging from 0.00 to 0.95. The IFD is commonly used for comparing mattress surfaces and thus works with a large 50 square inch surface area to be deflected, whereas an average human foot is much smaller at approximately 15 square inches. Similarly, the ASTM D2230 standard for shore durometer hardness is not utilized because it is also not well suited to characterize the disclosed devices. The shore durometer measures the depth of indentation for a standard impactor and a given force to produce a dimensionless hardness value. The D2230 standard has various types that employ an impactor with diameters ranging from 0.031 to 0.47 inches with the impactor shaped as a cone, sphere, or disk. Such an impactor is significantly smaller than an average human foot. Further, none of these standards address the linear quality of the compression modulus over a range of strains for the disclosed devices.

4. Advantageous Key Metric Ranges and Limits

Each of the following ranges and limits has been shown to be optimal by modeling, experimentation and testing. However the ranges may vary with slightly less optimal characteristics, or may vary for highly specific uses. For each of these ranges and limits, a user and/or manufacturer may adjust the key metrics of the disclosed embodiments to configure and adjust for advantageous operation, such as by an adjustment mechanism.

The disclosed mats advantageously have a mat thickness, which may be adjustable, in the range 0.5-4.0 inches and for a significant portion of users the optimum range is between 0.75-2.0 inches in order to achieve the best combination of support and performance. One of the reasons mat height may be advantageously employed relates to the length of the user's foot as there are certain advantages in foot positioning, exercise, and support by having an appropriately sized platform height. For example, a mat that is too thick prevents a user from placing the balls of their feet on the ground and the heels of their feet on the board while maintaining a comfortable angle of their foot to provide stretching or exercise benefits, or vice-versa with the balls of their feet on the board and the heels of their feet on the ground.

As shown in FIG. 41G, some of the disclosed mats advantageously have a generally vertically oriented edge 4103 containing a conforming and collapsible edge that substantially conforms to the bottom of a standing user's foot 4105, either shod or barefoot, when the edge is collapsed or compressed by weight or downward force by the user such that the user's foot 4105, straddling the edge 4103, is able to approach or contact the floor surface 4106. (This is also shown in FIGS. 8A-8H where feet 803 are in contact with floor surface 804 and conforming and collapsible edges 805 and/or 806, and thus are straddling the edge.) Some embodiments have a curved, convex or circular perimeter shape (as viewed from above when placed on the floor surface). Together, the mat thickness, generally vertically oriented edge, and/or curved perimeter shape facilitate the mat edge's adaptability to conform under a user's foot in different positions in order to stimulate the foot in more than one manner, such as is disclosed in section 6.2—Different orientations for foot placement of curved perimeter. Such a generally vertically oriented edge is substantially vertical and presents a face of sufficient area and shape that a user, when not standing on or loading the mat with weight, may easily push or move the mat out of the way—overcoming the static friction, by applying a force with their foot (or other body part or tool) to the edge without the foot easily sliding or deflecting off the mat edge. Further, the edge may be rounded inward as it approaches the bottom surface of the device in order to permit a user to insert the tip of their foot (or other body part or tool) between the floor and the facing edge in order to lift the device with their foot such as is disclosed in section 6.3—Mat manipulation and storage. For the purpose of easily moving a mat, a generally vertically oriented edge is distinguished from a tapered edge that is designed to prevent the mat from moving by increasing downward force against the mat edge as the foot is deflected upward. This metric is disclosed further in section 6.4—Mat thickness.

The disclosed mats advantageously have a bending rigidity within the range of 15-122 $lb \times in^{-1}$ and that may be adjustable within that range and for a significant portion of users most advantageously within the range of 34-109 lb×in$^{-1}$. A mat that cannot support at least its own weight without bending and collapsing before a load is applied does not satisfy this metric because its bending rigidity cannot be measured. This metric is disclosed further in section 4.1—Rigidity and self-supporting.

The disclosed mats advantageously have a flexural rigidity between 2,000 and 101,000 lb×in$^2$ and that may be adjustable within that range and for a significant portion of users most advantageously within the range of 8,000-63,000 lb×in$^2$. A mat that cannot support at least its own weight without bending and collapsing before a load is applied does not satisfy this metric because its bending rigidity cannot be measured. This metric is disclosed further in section 4.1—Rigidity and self-supporting. Because bending rigidity and flexural rigidity are related only by length, a device that satisfies both advantageous metric ranges (i.e., 15-122 lb×in$^{-1}$ and 2,000-101,000 lb×in$^2$) must necessarily have a length between 9.2 and 67.6 inches. Similarly, for a significant portion of users, a device that satisfies both most advantageous metric ranges (i.e., 34-109 lb×in$^{-1}$ and 8,000-63,000 lb×in$^2$) must necessarily have a length between 15.2 and 44.6 inches.

The disclosed mats advantageously have a linear compression modulus, for a 3.0-inch diameter circular impactor, which may be adjustable, in the range 40-100 lb×in$^{-2}$ and for a significant portion of users most advantageously within the range of 50-80 lb×in$^{-2}$. Employing the impactor, the disclosed mats advantageously have a linear center compression modulus, which may be adjustable, in the range 50-100 lb×in$^{-2}$ and for a significant portion of users most advantageously within the range of 62-80 lb×in$^{-2}$. Employing the impactor, the disclosed mats advantageously have a substantial linear edge compression modulus, which may be adjustable, in the range 43-88 lb×in$^{-2}$ and for a significant portion of users most advantageously within the range of 55-70 lb×in$^{-2}$. The disclosed mats' linear compression modulus ratio is roughly 0.87 (but at least advantageously within the range of 0.75-0.95 and for a significant portion of users most advantageously within the range of 0.85-0.90).

The prior paragraph disclosed advantageous linear compression modulus (also including both the linear center compression modulus and the linear edge compression modulus) and linear compression modulus ratio may be applied over all but the first 10% strain of the available strain such that it is a linear compression modulus for a given $R^2$ value of 0.90. It is useful to exclude the first 10% of the strain, because when a user stands motionless on a disclosed device in a neutral position it is advantageous that the static stress of their neutral standing results in at least a 5% to 10% strain and thus the range of linear deflection is most beneficial for the range of strain beyond the strain of the user's neutral position. And for some embodiments most advantageously over the whole range of available strain such that it is a linear compression modulus for a given $R^2$ value of 0.92. Mats satisfying a higher given $R^2$ value, for example, greater than 0.91, 0.92, 0.93, 0.94, 0.95, 0.96, 0.97, 0.98, or 0.99, provide an increasingly smoother rebound effect for the user.

For some embodiments, the above disclosed advantageous linear compression moduli may also be applied over the last 50% strain of available strain and a given $R^2$ value of at least 0.92. Mats satisfying a higher given $R^2$ value, for example, greater than 0.93, 0.94, 0.95, 0.96, 0.97, 0.98, or 0.99, provide an increasingly smoother rebound effect for the user.

For some embodiments, the above disclosed advantageous linear compression moduli may also be applied over the range of strain representing at least any 0.40 inches of the available strain and a given $R^2$ value of at least 0.85. For example, for a mat thickness of 3 inches and a range of strain from 0.50 to 1.00 inches, representing 0.50 inches of the available strain, the range of strain is represented by the range from 16.7% to 33.3% strain, corresponding to 0.50 and 1.00 inches out of the 3-inch 100% strain. Or, for a mat thickness of 1.0 inches and a range of strain from 0.00 to 0.40 inches, the range of strain is represented by a range from 0.0% to 40% strain, an embodiment like this can have 0.4 inches of an air filled bladder on top, a medium firmness foam layer of 0.30 inches underneath, and another 0.30 inches of a hard foam layer at the bottom. Mats satisfying a higher given $R^2$ value, for example, greater than 0.90, 0.94, 0.98, or 0.99, provide an increasingly smoother rebound effect for the user.

An example of one-hundred and fifty sample points spread evenly (within a reasonable error tolerance such as plus or minus 0.02%, i.e., for a target of 9.50% any point between 9.48% and 9.52% is acceptable) across an available strain of 0% to 95% is strains every 0.638% starting at 0.00% then 0.64%, etc. up to 94.36% and finally 95.00%.

A user is generally capable of attaining the lower ranges of strains, but the higher ranges of strains may not be attainable for a given device by some users due to the forces required being beyond their ability or weight. These metrics are disclosed further in section 4.2—Coefficient of restitution and compression modulus and section 4.3—Collapsing and conforming edge. Such disclosed mats do not exhibit a jarring or sudden stop or wall of force (i.e., a stress to strain curve with significantly increasing slope as the strain increases) in the range of stresses that a user applies to a mat surface.

The disclosed mats advantageously have a mat mass less than 10 lb and for some embodiments advantageously less than 5 lb. The disclosed mats advantageously have a mat density less than 0.013 lb×in$^{-3}$ and even more advantageously for some embodiments that have a density less than 0.006 lb×in$^{-3}$ and most advantageously for some embodiments that have a density less than 0.003 lb×in$^{-3}$. The disclosed mats advantageously exert an unloaded (i.e., without a user standing on the mat) bottom surface pressure less than 0.026 lb×in$^{-2}$ (psi) and even more advantageously for some embodiments that exert a surface pressure less than 0.013 lb×in$^{-2}$ (psi) and most advantageously for some embodiments that exert a surface pressure less than 0.007 lb×in$^{-2}$ (psi). A mat with sufficiently low mat mass may be easily manipulated when not loaded (e.g., not being stood upon by a user's feet) such as is disclosed in section 6.3—Mat manipulation and storage. Additionally, the low mat density and low surface pressure help ensure a low unloaded sliding friction due to the low mass per unit area (pressure) of the bottom surface where the friction is produced. Additionally, the low mass, low unloaded friction, self-supporting rigidity, and shock absorbing generally vertically oriented edge advantageously presents a reduced tripping hazard if a person's foot strikes the facing or leading edge of the mat during a walking motion. When striking the disclosed mats, a foot is less negatively affected. The initial impulse of foot impact is spread out over time (e.g., 0.1 seconds) by the shock absorbing nature of the edge so as present a reduced chance of foot or toe damage upon impact. Next, the mat's bending and flexural rigidity allow it to maintain its general shape and not bunch, crumple, or fold up upon itself as may occur with a foot striking the edge of a traditional mat. This bunching has potential to tangle the foot and cause a trip. Additionally, the force of the striking foot easily overcomes the low coefficient of static friction and thus the mat is more easily moved by the striking foot and thus does not present a significant obstruction. The small mat mass and momentum in comparison to the typical mass and momentum of a person's leg as the foot swings in a walking motion permit the easy deflection. This allows the person's leg to maintain most of its momentum and is therefore less likely to cause the person to trip.

The disclosed mats advantageously have an unloaded friction force between 0.5 and 3.0 lb and for some embodiments advantageously in the range 1.0-2.0 lb. The disclosed mats advantageously have a loaded friction force in excess of 20 lb and for some embodiments advantageously in excess of 25 lb. The disclosed mats have a wet friction force of at least 80% of the (dry) loaded friction force and for some embodiments advantageously at 85% of the (dry) loaded friction force. A mat with low unloaded friction force presents a reduced tripping hazard, as the force required to overcome the static friction and begin sliding is low relative to the force a striking foot provides. Additionally, a mat with a high loaded friction force presents a reduced risk that the mat slips out from under a user that is standing or stepping on it, causing a fall hazard. This is because the force required to break free and begin sliding is high relative to the forces a user of a mat applies during typical use, such as when stepping onto the mat. Likewise, a mat with a higher wet friction force presents a reduced fall hazard when used on a wet surface. The loaded friction force and wet friction force are measured (tested) with 70 lb load applied to a 15 square inch surface because an average human foot has approximately 15 square inches of surface contact when standing on a surface. The measure (test) approximates the effect of a 140 lb person standing with one foot on the surface and one foot off the surface, such as may occur momentarily as they step onto or off the device surface.

The disclosed mats have a coefficient of restitution advantageously greater than 0.70 and for some embodiments advantageously greater than 0.75. Having the coefficient of restitution within those ranges assures that the surface has a nice bouncy feel without creating a feeling of instability due to being too elastic. This metric is disclosed further in section 4.2—Coefficient of restitution and compression modulus.

The disclosed mats have a surface lateral shear advantageously less than 0.05 in and for some embodiments advantageously less than 0.025 in. The surface lateral shear is measured by affixing a mat on a flat horizontal surface (such as by clamping it down at points away from the mat central region to be tested) in order to hold the mat in place during test. A 45 lb mass is applied evenly over a 45 square inch surface area with a square rigid impactor when approximately centered over and surrounding the mat central region. Next a 14 lb lateral force is applied and the amount of lateral deflection resulting is measured, while ensuring that neither the mat nor the impactor has slipped. A surface lateral shear below the advantageous limit is shown by modeling, testing and experimentation to produce a mat surface with sufficient stability so as to give the user a feeling of standing on a more solid surface. Experimentation, modeling, and testing has shown that such a surface lateral shear limit is less than half of the surface lateral shear of a typical user's foot's heel tissue, so it does not produce any significant sense of instability to the user. A surface within this limit requires less significant cognitive processing by the user to maintain their stability, such as may be required with balance boards and instability boards which are more likely to distract from tasks requiring mental concentration.

The disclosed mats have a plasticity percentage advantageously less than 4% and for some embodiments advantageously less than 2%. A typical user may hold a fixed or nearly fixed position on a mat at times and the disclosed mats must not significantly permanently deform under such static loads. A plasticity percentage within the advantageous limit ensures a user will not experience significant plasticity under normal use of device. Plasticity percentage refers to whether a material exhibits non-reversible changes of shape in response to applied forces that cause deformation. Plasticity percentage is determined by applying a one square inch force of 20 lb for 3 hours repeated five times during the same timeframe over five days and after the fifth application, measuring the amount of permanent deflection and dividing that by the amount of original deflection to give a plasticity percentage.

The disclosed mats have a pushback force advantageously within the range of 5.6-9.9 pounds and for a significant portion of users falling most advantageously within the range of 6.4-8.7 lb. Having a pushback force within those ranges assures that when the mat is rocked (tilted) by the user, the underside of the user's foot that is elevated at the top of each rocking motion can feel the feedback of the pushback force during the rocking motion, such as is disclosed in section 6.5—Rocking ability. This helps create a pleasing rocking feeling and provide a sense of stability to the rocking user. The pushback force is calculated using the flexural rigidity (EI). Assuming that the effect of the changing cross-section of some of the mats is negligible, we approximate the pushback force using the formula:

$$F_{pushback} = \frac{3*(\text{Flexural Rigidity})*\tan(8^x)}{l^2}.$$

Satisfying the previously disclosed ranges and limits of the key metrics for mat mass, mat thickness, unloaded friction force, bending rigidity, and flexural rigidity helps ensure that a mat may be easily tipped on its edge (such as for storage) by the user with little effort, as is disclosed in section 6.3—Mat manipulation and storage. This is particularly important for people who cannot bend over easily or have difficulty lifting their legs.

Additionally, satisfying the prior disclosed ranges and limits of the key metrics for mat mass, bending rigidity, flexural rigidity, and pushback force helps ensure that when a user straddles the product with their feet at opposite edges and rocks the product back and forth under their feet, that even at the peak of each rocking motion, when the vast majority of a user's weight is shifted to one of the two sides, the opposite side rises up off the floor and applies a pushback force to the underside of the opposite foot. (See section 6.5—Rocking ability.) For very low values of bending rigidity and flexural rigidity, the opposite side may not lift off the floor when rocking, or if it does lift at all, it only applies a scant or minimal amount of force (if any) against the bottom side of the opposite foot. A mat with low values of bending rigidity and flexural rigidity therefore does not provide the same feel or benefit nor does it encourage users to rock and move more during use. As described, such motions benefit health when standing for long periods of time. A mat with very high values of bending rigidity and flexural rigidity is relatively hard/firm and unforgiving and thus lacks the resiliency to provide a responsive surface that encourages the user to move more by giving immediate feedback to the user's movement.

The combination of satisfying one or more of these metrics (e.g., light weight, disclosed bending rigidity, the generally vertically oriented edges that collapse and conform to a user's footfall, etc.), in concert with each other, produce a great advance in standing mat technology that is more trampoline-like. This results in an extremely beneficial experience for a standing worker or other kinds of user.

4.1. Rigidity and Self-Supporting

When an object's bending rigidity is referenced it pertains to an object's ability to resist bending deflection such as by the following disclosed test. Each mat being tested is simply supported (i.e., has a pinned/fixed support at one end and a roller support at the other end) near its ends (e.g., fixed support 5205 and roller support 5206 in FIGS. 52C-52D) and has ten different weights or forces applied by a three-inch diameter circular impactor on the top surface over the central region (e.g., force F in FIG. 52D) and the resulting bending deflections of the bottom surface below the central region are measured (e.g., the difference between the quantity of the loaded measure y2 plus an adjustment for loaded compression y3 in FIG. 52D and unloaded measure y1 in FIG. 52C), graphed, and given a best fit straight line that has a y-intercept equal to zero so that the linear curve fit is of the form y=mx. The bottom surface 5208 of the mat 5201 is supported at opposite ends 5203 and 5204 and the supports 5206 and 5205 are placed approximately 1.25 inches from each end 5203 and 5204. The weights range up to 5 lb. For each applied weight (force) the resulting bending deflection (e.g., the difference between the quantity of the loaded measure y2 plus an adjustment for loaded compression y3 and unloaded measure y1) is recorded. The bending deflection is tested using ten different load weights to permit graphing the bending deflection for each mat over a range of loads. The ten load weights are selected to be evenly spread out across the range from 1 lb to 5 lb. However, in the case that the resulting bending deflection for the 5 lb weight (force) causes the supported device 5201 to fall or collapse, the range of the selected weights is linearly scaled downward (e.g., all by ½) to an adjusted weight range such that the maximum weight of the range maximally deflects (e.g., 0.4 in) the device to the point just short (e.g., within 95% of the weight) of causing the supported device to fall or collapse.

An example of ten load weights spread evenly across the weight range of 1 lb to 5 lb is weights at 1.00, 1.44, 1.89, 2.33, 2.78, 3.22, 3.67, 4.11, 4.56, and 5.00 lb. Such load weights are selected to be within a reasonable error tolerance such as plus or minus 4%, e.g., for a target of 1 lb any weight between 0.96 lb and 1.04 lb is acceptable The bending rigidity is determined to be generally linear for the selected weight range if the best fit straight line for data representing the measurements for the ten sample weights in the selected weight range advantageously has an $R^2$ (coefficient of determination) value of at least 0.950 and for some embodiments advantageously has an $R^2$ value of at least 0.975. The bending deflection of the mat is measured from the bottom of the mat, for each of the applied weights (forces). A dial indicator or other measuring device that is accurate to 0.001 inches is recommended to use. The ten data points, evenly spread across the weight range, are recorded to analyze the data. For the analysis, the bending deflection is the x-axis (horizontal) and the applied force (weight) is the y-axis (vertical). The data gathered from this testing and experimentation is assumed linear and has a y-intercept equal to zero so that the linear curve fit is of the form y=mx. Any mat that does not have a generally linear bending rigidity for the disclosed load range does not fall within the disclosed ranges for bending rigidity. Any mat that deforms under its own weight, before any load weights are added, so much as to make it collapse and thus practically impossible for the tester to support the mat at its ends without clamping it to the test support points, does not fall within the disclosed ranges for bending rigidity. The slope (m) of the disclosed best fit straight line corresponds to the bending rigidity of the mat.

The lightweight and unique rigidity (both bending and flexural) of the mat, according to the disclosed advantageous ranges, is beneficial to its functionality as an improved anti-fatigue and exercise mat for a standing worker. The weight and rigidity of the mat is advantageous such that the mat may be held horizontally in a user's hand, extended in the air away from the user (e.g., corresponding to FIGS. 52A-52B). Thus, it is rigid enough that it is self-supporting, in that it maintains its generally horizontal or flat profile, when extended from only one location of support into an unsupported space. The opposing, unsupported end remains substantially horizontal. In this position the mat remains generally horizontal and flat though the only support is at one external end. For example, in FIGS. 52A-52B, the mat 5201 is rigid enough such that if it were held 5202 at edge 5204, the opposing unsupported edge 5203 remains substantially horizontal, deflecting downward a minimal distance d in FIG. 52B. In conducting our disclosed test, the bending rigidity was measured as the applied force divided by the central region bending deflection or $$k_b = \frac{F}{\delta}.$$

This measurement takes into account the material properties of the mat, the load which is the mat's own weight, and the geometry of the mat which include its length, cross-section dimensions, and mass distribution. A device that falls within the disclosed advantageous ranges for bending and flexural rigidity exhibits these disclosed qualities, such as remaining substantially horizontal (minimal bending deflection) when extended out into the air from a clamp or from a user's hand while only being clamped or held at one end.

When force is applied to the side/edge by a user's foot, hand, other body part, or tool, the mat is rigid enough such that the force necessary to initiate pad movement (i.e., overcome the static friction) does not significantly deform the mat. Thus the mat may begin moving before the edge starts significantly deforming from the force of the foot or hand. A bending and flexural rigidity greater than the minimum disclosed advantageous range values allows the mat to maintain its original shape while it is being moved with a user's foot.

4.2. Coefficient of Restitution and Compression Modulus

Anti-fatigue mats, even when made of material and gels that have some resilience, are designed primarily to absorb energy and neutralize shock. They are not well designed to enhance exercise activity in a positive manner, but rather to reduce discomfort by absorbing shock to create a low-impact surface on which individuals may move and shift while standing with lower compressive stress levels exerted on their body.

To neutralize shock and more evenly distribute pressure on the bottom of the feet, anti-fatigue mats are typically composed of materials suited primarily for that purpose;

materials such as soft vinyl, nitrile PVC rubbers, and foams made from various chemicals. While this construction helps to absorb, dampen, and neutralize impact forces when shifting stance or moving from side to side, and also equalize pressure along the bottom of the foot, it does not provide the ideal rebound metrics for standing that are provided by the disclosed devices falling within the disclosed ranges of the metrics. The disclosed devices have been designed and engineered to provide significant advantages in safety, rebound responsiveness, rockability and exercise functionality that encourages movement, ease of use and storage, customization, etc. for users over tested anti-fatigue mat designs. Numerous anti-fatigue mats and exercise pads representing the various materials, structures, and designs available on the market were tested and it has been found that none fell within all of the metrics. Satisfying the metrics provides the disclosed advantages to a standing desk user.

The compression modulus of the tested devices was measured utilizing a 1 kilo-pound Instron load cell S/N 31015 with Instron 4486 S/N 1131 3J (calibration traceable to NIST). The test assembly consisted of a device specimen under test, and a 3-inch diameter circular impactor, located in the central region of the device. Tests conducted at a free crosshead travel rate of 0.5 inches/minute, until 95% strain or 1,000 pounds of force was reached, where 1 pound of force was used for the beginning of strain measurement. Sample points were taken at every 0.000833 inches of deflection, which corresponds to 600 sample points per minute.

The disclosed devices and their variants provide a more resilient rebound surface due to their disclosed linear compression moduli and their active and highly responsive rebounding bounce-back and feedback with low viscoelastic hysteresis. These qualities do not occur with known anti-fatigue mat designs and applications. The feedback occurs whenever a user compresses the mat under their foot with force, as the mat compresses (deflects) the force required to compress the mat further increases linearly and proportional to the amount the mat is compressed. The trampoline-like feedback the mat provides is due to the mat's ability to act like a linear spring and return much of the energy stored by compressing the mat. When the user reduces the force on the mat it quickly rebounds back toward its original shape as the mat returns toward its original undeflected form.

Several of the disclosed devices are designed to approximate what has been determined to be key optimal rebound metrics for standing as opposed to a jumper on a full trampoline. Some of these embodiments include at least one gas filled chamber, and in such embodiments, the relationship between the gas pressure and compression (deformation) of the mat may be modeled by a polytropic process following the equation $P_1 V_1^n = P_2 V_2^n$. Where P is pressure, V is volume, and n is the polytropic constant of the process. The gas in the chamber may be assumed to be following an isothermal path. For a polytropic process following an isothermal path the constant n is equal to 1. Unlike currently existing anti-fatigue designs, as the user applies more force, the mat continues to compress (deflect) linearly for a greater portion of the available strain. During mat deflection, in response to the user's foot (bodily) force, the mat supplies feedback of counter acting force as the mat tries to return to its neutral, undeformed shape.

Dynamic rebounding (trampoline-like) capability has not been sought for current anti-fatigue mats. This is true even when an anti-fatigue mat is made of a cross-linked PVC compound or other compounds with similar characteristics, which while flexible and somewhat responsive, do not provide the responsive rebound, bounce-back, and more rapid feedback of many of the disclosed devices because such devices fall within the advantageous ranges for coefficient of restitution, compression secant modulus, and linear compression moduli over some of the disclosed impactors, ranges of strain, and $R^2$ values. Tested anti-fatigue mats do not provide an immediate rebound effect or feedback force to a user standing upon them, consequently, the user is not consciously or unconsciously motivated to move more due to the lack of responsiveness and feedback of the currently existing designs. Additionally, one may decrease the stability of the mat in small progressions by use of the adjustment mechanism to stimulate more micro adjustments by the user in their stance, often occurring unconsciously, which stimulates blood flow and improves the standing experience and benefits. This in turn, increases the likelihood that a user continues to stand longer without ill effect, which increases an individual's energy level and burns more calories, among other benefits.

As disclosed, current anti-fatigue mats fail to provide the trampoline-like dynamic surface response of the disclosed devices. The materials in current anti-fatigue mats absorb too much energy and rebound too slowly to their original shape to achieve the disclosed benefits, due to the viscoelastic hysteresis behavior found in many foam materials. Viscoelastic hysteresis is the loss in energy due to internal friction. This may be observed when the force required to compress a material significantly exceeds the force released when the material is allowed to return to its undeflected shape. As shown in the graph shown in FIG. 54A, the material takes significantly more energy to compress than the amount of energy it returns. The equation for the energy loss due to hysteresis is $\Delta E = \int_0^A F(x) dx - \int_A^0 F(x) dx$, which is the difference between the area under the Compression curve and the area under the Release curve.

Also, over time, common anti-fatigue mat materials described herein break down and become less shock absorbent and less responsive due to the nature of the materials used in these mats. An example of this is the response of certain materials that mold and compress when weight is placed on them, and where they slowly return to shape when the weight is removed. Even firm, high-grade anti-fatigue mats fail to provide the energetic responsiveness of the disclosed devices. However such a slow response is not as desirable or healthy for individuals that stand at a desk and move very little. This is why the higher energy return and the dynamic and much faster rebound or bounce-back of the disclosed devices is such a significant improvement for use with standing desks over all the current shock absorbing anti-fatigue mats on the market. And because it is a more responsive surface, such responsiveness may be reduced or increased by adjustment, thus permitting resiliency to be modulated and adapted to the needs of the user.

Any mat that nearly reaches 100% strain (e.g., above 97%) or nearly reaches the upper end of the range of the available strain (e.g., 95% of the upper end) for the compression secant modulus using 50 psi of stress does not fall within the disclosed ranges for compression secant modulus.

4.3. Collapsing and Conforming Edge

Another advantage of the disclosed mat constructions is that they allow for a collapsing and conforming near edge area 5109 and surrounding edge 5106 when load is applied, as when a user's foot, either shod or barefoot, is over the edge and this also results in a larger effective rocking region. An example of a collapsing and conforming edge (e.g., 805 and 806) is shown in FIGS. 8A-8H with resultant rocking regions 807, 808, 809, and 810.

The typical anti-fatigue mat is designed to minimize and prevent the near edge area 5109 and surrounding edge 5106 from collapsing. A collapsing edge is counterintuitive to such a design. In a typical anti-fatigue mat, the edge is angled for a smooth tapered transition from a thin perimeter at the ground surface that then gradually transitions to a full thickness towards the center of the mat. Unfortunately, the desired bouncy response is degraded at the tapered edge perimeter area, in contrast to the disclosed mat designs, whose linear compression modulus ratio is roughly 0.87. Thus, the exercise and other benefits of the faster rebound or bounce-back of the disclosed mats are retained, which allow for more movement and rebound on the surface.

Nearly all anti-fatigue mats are designed with tapered edges to prevent tripping, but for standing desk use, this is a less important feature than currently assumed. Users are generally not moving on and off the mat during focused work with their hands or some other physical activity that may distract them from being aware of stepping on and off the anti-fatigue mat. Thus a collapsing and compressive edge can be used to great benefit for standing desk users because it permits them to exercise their feet without having to step off the disclosed mats. These realities coupled with the other properties of the disclosed devices, create a lower tripping risk device while still allowing a user to beneficially utilize the edges in contrast to avoiding them as occurs with tapered edge designs.

A rebounding surface with a conforming near edge area that collapses and compresses more easily than the central region (having a linear compression modulus ratio of roughly 0.87) is markedly different from conventional standing anti-fatigue mats. Furthermore, such rebounding surface can also be advantageously applied to the top of a skateboard, surfboard, wake board, stationary central pivot rocker balance board, roller rocker balance boards (e.g., Indo® board), or a scooter, such that the responsiveness of the device is dampened so that manipulation of these devices by a user's feet or other body part is transferred to the hard surface below over a larger surface area and more slowly. This dampening is especially advantageous for beginners who have not yet developed the highly sensitive motor skills required to manipulate such devices at a more advanced level. Having said that, highly advanced users can use this rebounding surface to create new ways and methods to manipulate these devices in highly advanced and skilled ways. There are several ways to affix such surfaces to a hard underlying platform such as wood, fiberglass, carbon fiber, aluminum, and other rigid and semi-rigid materials. For example, glues, bottom surface mounted nuts that permit bolt attachments, two sided tape, microsuction tape, Velcro®, or straps that are attached to fixed grommets on the surface may be employed, to attach such a surface.

The disclosed devices have an edge area that is able to provide excellent dynamic surface response, characterized by a linear compression modulus, and also permits edge partial collapse that allows the edge to dynamically conform to a user's foot shape, allowing the user to change the angle of their feet off the edge and to have a smooth transition to the floor surface. The smooth transition is effected by the transition of the force required to deflect, deform, compress, or partially collapse the mat for points in the central region of the mat and transitioning to a lesser required force out towards its edge band. At points closer to the edge band and further away from the central region, a lesser force is required to achieve the same amount of deflection (as quantified by the edge compression secant modulus) as compared to points further away from the edge band and closer to the central region (as quantified by the center compression secant modulus). Typical anti-fatigue mats have a constant compression secant modulus across the entire surface. The disclosed devices have a unique property where the edge compression secant modulus is substantially softer (lower value) than the center compression secant modulus of the mat. This multi zone mat allows for a stable platform in the center while still providing a more engaging edge that may be stood on when the user wants to push into the mat more. The compression secant modulus ratio, CR, is the edge compression secant modulus of the mat divided by the center compression secant modulus of the mat, or $$CR = \frac{K_{CE}}{K_{CM}}.$$

CR typically ranges from 0 to 1, where most anti-fatigue mats are close to 1 because in such mats there is no difference between the compression secant modulus at the central region of such mats and at the near edge area. Some of the disclosed mats advantageously have a compression secant modulus ratio, CR, and/or a linear compression modulus ratio within the disclosed advantageous ranges, which testing and experimentation have shown to provide two enjoyable zones, without the edge being too soft or the middle being too firm.

One contributing factor to this effect in gas filled embodiments is the tension provided by the inflation pressure. Closer to the central region of the mat a downward force is counter acted by the tension force as the mat deflects. Closer to the central region, the more the mat deflects the more the tension force counteracts the downward force. When a downward force is applied closer to the edge band of the mat, the vertical components to the tension force cancel out. Closer to the edge band of the mat the surface tension force does not act in a direction as to oppose the downward force. Instead, the edge surface is oriented in line with the downward force, which causes the material under the force at the edges to buckle easily. The opposing force at the edges is only due to the material itself. The user continues to have a bouncy rebounding action when the feet are more centrally located on the mat. This also applies to the rocking edges disclosed in section 6.5—Rocking ability.

Disclosed are embodiments where the perimeter edge area may include a separate fluid, gel, or gas filled membrane or tube that runs along the edge and that may have a generally circular cross-sectional shape that provides an advantageous compression secant modulus ratio and/or linear compression modulus ratio within the disclosed advantageous ranges and an advantageous rounded edge shape to better conform to the shape of a user's underfoot arch.

In embodiments with a generally curved vertically oriented edge, the top edge curvature shape may advantageously closely conform to the shape of a user's arched underfoot and as the edge is compressed, such a curved edge tends to more readily conform to the shape of the user's arched underfoot and may deform by buckling outward to permit contact with a greater portion of the user's foot.

Typical anti-fatigue mats may angle or taper their edge for a smoother transition to the floor surface, but the protection of the padding provided by these mats is also degraded and lost by this tapering at the edge. Thus, such a mat is not designed or intended for a user to stand at its edge; nor is the user encouraged to have part of their foot both on and off the mat, as that stance undermines the anti-fatigue purpose of the mat due to the thinner, and therefore less cushioning, tapered edge. In contrast, the disclosed devices, whose mat thicknesses are greater than the minimum of the disclosed advantageous ranges, allow a user to extend a portion of their foot over the edge of such a device to exercise or work the arch of the foot or to stand on one's toes on the floor surface, and stretch the toes by standing, so the foot is positioned as if the user were wearing high heels, (at the front) or one may drop their heel off of the backside towards the floor surface, enabling them to better stretch their calves.

With the disclosed mats, different mat thicknesses may be employed to create different elevations above the floor surface. For example, a larger foot size can derive advantage from a greater mat thickness even as thick as seven inches and a smaller foot size can derive advantage from a lesser mat thickness even as thin as half an inch. Certain advantages can be derived by any size thickness, but not all the advantages are available, unless the thickness is appropriate to the foot size as disclosed. The edge collapse may be made to be gradual so that the transition is smooth. For these types of exercises, a smaller elevation is more advantageous for small feet and the mat thickness may be adjusted upward in small progressions to optimize the stretch and positioning of larger feet (when wanting to step off partially so that a portion of the foot is both on the mat and in contact with the floor surface, e.g., FIG. 8A) by either having the mat thickness thicker or thinner. This may also be accomplished by having the mat thickness be the same size for all foot sizes, but having resilient or non-resilient layers added (which may be attached at the bottom plane) that elevate the upper platform that is stood upon, further from the floor surface in order to accommodate larger feet. This permits a better extension and stretching action for the different foot sizes.

Another advantage of the disclosed curved edge is that it permits a barefoot user standing on the device to curl their toes around the top edge and clench it and grip it with their foot and permitting them to apply an upward pulling force with their clenched foot. This allows the user to exercise by rocking their weight back and forth between their left and right feet and alternately pulling and pushing the top edge that is gripped by their toes (e.g., pushing with their left foot while pulling with their right foot). Such use is not viable with existing anti-fatigue mat designs.

Many of the disclosed devices have a linear compression modulus for various impactor areas, ranges of strain, and coefficient of determination values within the disclosed advantageous ranges. It is advantageous for the stress to strain graph to have a linear shape so that the rebound cycle of the device provides a smooth feel to the user as they move up and down. The smooth rebound effect is due to the fact that the device responds proportionally and linearly to the amount of force the user applies with their feet or other body part. Typical devices in the market are characterized by a non-linear stress to strain curve shape that begins with a softer feel (lower slope) that becomes proportionately much harder (higher slope) as the user deflects further into the device (especially in the second half of the available strain). This non-linear curve makes the rebound cycle feel uneven and less comfortable for the user. For some disclosed embodiments, the device advantageously has or is adjustable to have a range of linear deflection that includes the last 0.5 inches of deflection of available strain. The range of linear deflection is the greatest contiguous portion of the available strain for which there is a linear center compression modulus with an $R^2$ value of at least 0.95. It is also advantageous that for the range of forces achievable by most users when standing and pushing the balls or heels of their feet into the device as they shift their weight from one leg to another, that 80% of their deflection remains within a range of linear deflection and that the downward span of the linear deflection is at least 0.5 inches.

Having a linear compression modulus for various impactor areas, ranges of strain, and coefficient of determination values within the disclosed advantageous ranges is advantageous in that it provides a more stable platform to the user such that they are less apt to get off balance. It also provides a smooth stress on the body and knees due to its deflection and rebounding force being uniform, linear, and smooth. It is advantageous that the total range of linear deflection is at least one inch of the deflection of the available strain and has no harsh or abrupt moments during such deflection (i.e., it is linear) and does not bottom out at the limits of deflection, such limits of deflection being beyond the typical forces applied by a user (e.g., beyond the available strain).

4.4. Slope of Platform Surface

Anti-fatigue mats were originally designed to neutralize and equalize pressure for a standing person that is physically moving or using most of their body to perform manual labor. Thus, anti-fatigue mats are generally composed of materials suited primarily for that purpose, for example, materials such as soft vinyl, nitrile PVC rubbers, and gel filled, and are of various thickness of the same type of materials. While this construction helps to neutralize downward pressure and equalize the pressure points on the foot, it also embodies drawbacks in its current design and use. It was found during design and testing of products during development of the disclosed devices, that standing for long periods of time on current anti-fatigue mats resulted in negative physical responses with back discomfort and foot fatigue. One way to address these challenges is by utilizing a more rapid rebound or bounce response as afforded by many of the key metric ranges and limits.

It has been found by testing and experimenting that one of the negative aspects of standing on a typical anti-fatigue pad is due to the foot heel sinking below the level of the foot ball (e.g., foot heel 3407 is lower than foot ball 3406 in FIG. 34D). In a large percentage of users, this contributes to poor back posture, discomfort, and foot fatigue. If a person stands on the floor, their feet heels and feet balls remain level with each other when barefoot (i.e., the heel area of the foot remains at or near the same level as the forefoot); or, when shod, their feet remain at the angle of their shoe where the shoe heel height often provides foot heel elevation above the foot ball, if only slightly. Because elevated heels are common, a slightly elevated heel stance is a normal and customary position for many standing users. Standing on a standard anti-fatigue mat counteracts this in cases where the heel is permitted to sink lower than the forefoot when standing (e.g., as shown in FIG. 34D). This then results in an uneven and uncustomary pressure distribution across the foot because the heel receives a higher pressure or load than the forefoot, which is counter to what most users have unconsciously trained their bodies to perform.

This effect occurs even with highly resilient and firm standing mats. Further, this problem has not been properly diagnosed or addressed in current anti-fatigue mat designs because these mats were larger and originally designed for use in physically active environments and not for standing in one place for a long period of time with little to no movement. Also, the problem has not been addressed historically due to ignorance or a lack of interest in improving anti-fatigue mats beyond a generally horizontal orientation. The sloped solution is not apparent due to the larger expectation and historical habit that a mat is generally flat for a standing user, not sloped. Further, a sloped mat 3402, such as is shown in FIG. 34A, may present an edge 3403 that is tall enough to have the potential to present a tripping hazard if improperly designed with key metric(s) outside the disclosed advantageous ranges. However, now that standing desks are in much greater use and standing desk users don't move as much as the intended users of traditional anti-fatigue mats, there is a need for something better suited to current conditions. It has been assumed that a flat mat is the optimal type of mat to have at least to the extent that it is substantially horizontal in orientation—because it was seen as much safer to have a level surface to move around on and to move on and off of as a user works. This is true whether or not there are terrain elevations such as bumps or ridges along or part of the surface of the mat; it is still horizontal in orientation or relatively flat for the user.

A generally flat mat or one with a substantially planar surface is one where for every given pair of 3-inch diameter circular sample areas that are each completely inside a portion of the center area, the average height (mean distance) of the two given sample areas is within a ½-inch tolerance of each other. The average height for a given sample area of the standing surface is the average distance between the mat top in the given 3-inch circular area and a supporting floor surface underneath the mat.

It has also been assumed that standing mats need to be flat in order to be safer for work surfaces where anti-fatigue mats have been employed. For example, a mat in front of the sink in a kitchen has been seen as needing to be flat because persons are moving around the kitchen constantly and it has been thought that unwanted stumbles or tripping are best avoided by having a flat mat surface. This is true in commercial applications in restaurants, warehouses and for general commercial use. Thus, the same basic assumptions have been, by default, applied to an anti-fatigue mat for a standing desk worker, without recognizing that standing desk workers have unique needs and challenges. A worker standing at a desk or an elevated workspace faces in the direction of the work surface and where the technology of work like computers and laptops are resting. This results in the worker standing for long periods of time in a single orientation. Recognizing this fact and addressing it permitted the inventor(s) to overcome the prejudice towards a substantially horizontal plane for an anti-fatigue mat.

The traditional thought process is additionally shown in how mat edges are designed. Current anti-fatigue mats typically have some sort of beveling, tapering or reduction of material on their edges for the entire perimeter of the mat edge; this is for the precise purpose of reducing unintended tripping or stumbles when stepping on and off the mat during use. However, none of these methods and habits are necessarily optimum for an office employee using a standing desk where they spend a majority of their time standing in only one place in front of their personal workspace, which often has a computer and keyboard. Such modern office workers move around the office, but most of their standing is stationary, oriented forward towards their workspace, and static with little movement. It was found through testing and experimentation that a mat where the slope is angled between 2 to 5 degrees (with a general maximum no more than 13 degrees) in one direction permits a user to stand where their foot heel does not sink or descend into the mat surface below the level of the toes or forefoot.

Disclosed is a sloped anti-fatigue mat where a standing user's heel descends to a level equal to and not below the toes or arch and forefoot. This orientation has resulted in a reduction to the back and foot discomfort during long periods of standing in a small area and oriented in one direction, even when utilizing current anti-fatigue mat materials. The mat may be reversed in orientation so that the toes are higher than the heels for temporary changing of body position, but it has been found that a slight forward angle of the mat where the heel cannot descend below the level of the toes is optimum for long periods of stationary standing, as is common in an office environment.

Experimental and experiential testing has shown that standing on such a sloped mat may be more comfortable in the long run because the heel is not permitted to descend such that it is lower than the forefoot. A user may still shift their stance, while still maintaining a better pressure equalization between the heel and the forefoot. The ideal shape of the surface angle depends on the type of cushioning used, how firm or soft, and what is optimum for a user's weight, foot length and size, and the like, as well as the standing angle to which the user is accustomed. For example, people that have worn high heels to work and to which their bodies have become accustomed, may need to start out at a higher angle, like 13 degrees. Different mats may be utilized depending on a user's weight so that the disclosed result occurs where the heel does not descend below the forefoot. The optimum result occurs where, when the heel sinks into the mat surface, the front of the foot remains at or below the height of the heel.

Disclosed is an improved mat wherein the standing surface slope of a mat may also be adjusted by altering the mat itself. There are multiple ways to achieve this adjustability. For example, by changing an adjustable tilting base 3602 so that the surface is sloped at a particular angle (FIGS. 36A-36C), or the addition of one or more wedged shaped foams, rubbers, and/or air bladders situated above or below the primary mat surface which permit adjustment of the slope by altering the added wedges.

Disclosed is an alternative form of slope adjustment. By adding and utilizing a multi-chambered gas system, the layer in contact with the user's feet may be maintained at a firmer pressure, while a lower chamber, closer to the floor surface but on the other side of the surface chamber, may be deflated slightly. This permits a user to apply pressure forward with their stance (toward the forefoot or balls of the feet), which slopes the mat forward. As the top chamber's inflation is unaffected, the entire surface tilts forward which equalizes the heel pressure more with the forefoot, without loss to the rebounding resiliency and bouncy response of the surface in contact with the user's feet. Additionally, a user may step back slightly towards the rear of the platform and the heel pressure results in the slope reversing such that the toes or forefoot is elevated. This process and shifting occurs while the entire surface bladder is in contact with the user. The user or manufacturer may make pressure adjustments to one or more of the gas chambers to permit further variability of the mat's behavior. The user or manufacturer is able to modulate the resiliency factor of the mat, and tailor and adjust the pressure and sloped tilting angle of the mat to the user's advantage.

Disclosed is a platform with one or more attachment points permitting the addition and subtraction of various accessories, such as elastic bands or straps for resistance exercise, as just one example. Other resistance exercise accessories may also be attached to the disclosed mat system. The mat disclosed is more responsive and resilient or "bouncy" due to its advantageous rebounding characteristics (interchangeable terms).

4.5. Bowing Arc when Exercise Attachments Added

Disclosed are mats with an advantageous bending rigidity that is sufficient to permit the mat to store enough potential energy to allow a user to exercise by flexing the mat at or near the extremities from a user's foot placement when resistance attachments are employed. As shown in FIG. 33 (comprising FIGS. 33A-33D), the edges of the mat 3305 flex such that the mat helps absorb some of this energy, which in turn, modulates and smoothes out the force in a more elastic manner. For example, elastic bands 3303 or straps of some type may be attached to the standing mat for exercise and strengthening. In the disclosed devices, the mat may be configured by adjustment to permit the mat to flex upward at or near the attachment point of an exercise band to the mat. When a user utilizes elastic bands, this compliant mechanism stores the work done by the user as potential energy in the deflection of the mat. Traditional mats are compliant and bend easily, and cannot store enough potential energy to make exercise effective due to their lack of bending rigidity. The elastic potential energy put into the platform elastic band system is $U_B = 1/2 k_{eq} x^2$ where $k_{eq}$ is the equivalent spring rate (the derivative or slope of the force versus deflection graph for the given loading condition) when combining two springs in series. In the case of a standing platform with an elastic exercise cord attached, it is determined by the balance between the spring rates of the two springs, $k_p$ (platform spring rate) and $k_e$ (elastic cord spring rate). If the two springs have the same spring rate, the equivalent spring rate, $k_{eq}$, is equal to half of the spring rate of one of the individual springs. As the difference between the two springs increases, the spring with the lower spring rate becomes the driving factor, and the equivalent spring rate ends up closer to the spring rate of the softer spring. In the case of standing mats, a rigid platform serves the function to hold an elastic cord and store the elastic energy required to perform a workout. For a rigid platform, $k_p >> k_e$ so $k_{eq} \approx k_e$. This means that the equivalent spring rate of the elastic cord and platform system is the same as just the cord alone, so the board adds no value to the workout. For a non-rigid anti-fatigue platform, $k_p < k_e$, so $k_p < k_{eq} < k_e$. This means that the equivalent spring rate of the elastic cord and platform system is driven by the low spring rate of the platform, which renders it almost useless for exercise. In this case, the mat deflects excessively, and it is not possible to increase the resistance of a workout because the equivalent spring rate of the system is still driven by the soft mat even when changing to higher spring rate elastic cords. The disclosed system has a ratio of $$\frac{k_p}{k_e}$$

between 10 and 100.

This zone provides a balance where the board is rigid enough to withstand the workout, but it is also soft enough to deflect and contribute to the dynamic of the exercise.

The platform elastic band system is adjustable because the $k_p$ (platform spring rate) is adjustable by the user and its value correlates with the bending rigidity and flexural rigidity of the platform. This alteration may be made by an adjustment mechanism.

Traditional mats are generally heavier, and when a pulling force is applied tend to bend more sharply, making an angle pointing toward the pulling force and pulling up at the edges, while the rest of the mat remains relatively flat on or near the floor surface. For traditional mats, $k_p$ is small, and allows large deflections, which causes the angle between the floor and the bottom of the platform to approach 90 degrees with very little force. Many of the disclosed devices behave differently because as the edges pull up, the pulling force also pulls the mat up in an "arc" like flex (akin to the arc of a pulled bow); such that more of the bottom surface of the mat is released from the floor surface with a level of force that would only lift the edge area of a traditional mat. This is because such mats generally provide only gravitational force, and much less, if any, flexing force.

Also, as disclosed, attachable layers may be added to one of the surfaces of the mat with flex properties such that the flex arc of the mat more readily resembles a pulled bow. Traditional anti-fatigue mats are less suited for the disclosed use as a platform for exercise attachments because they lack the ability to store enough potential energy in their deflection in the advantageous manner just disclosed. The disclosed devices provide maximum support underfoot (like a traditional mat), while at the same time providing sufficient elasticity of movement to absorb some of the potential energy of attachments engaged by a user.

4.6. Elliptical or Convex Curvature and Shape

Disclosed are devices embodying a curved, elliptical, rounded, or convex shape along their edge perimeter. The perimeter shape is selected in order to adapt itself more readily to the standard stances of a range of users from the population and to permit the conforming, generally vertically oriented edge to fit under one or more portions of the user's one or more feet and thus more comfortably shape or conform to the bottom of a user's foot, whether barefoot or shod. Additionally, the disclosed devices may be shaped of one of any polygonal or non-polygonal shapes. In some embodiments, such as shown in FIG. 1C, the disclosed device employs a roughly elliptical curve along one half or side of the perimeter and a roughly trapezoidal shape along the other side of the perimeter to create a "D" like shape where the long side of an ellipse on one side abuts or faces the trapezoidal portion on the other side. The standard stance of a standing worker is with their feet about shoulder's width apart with their feet planted nearly parallel to each other and pointing forward with their toes oriented outward and further apart than their heels such that their feet line up to suggest a slight "V" shape. Traditional mats are generally rectangular or square in form. Testing, experimentation, and use of the disclosed devices has resulted in a shape-specific design that both capitalizes on how a variety of humans stand, and takes better advantage of the properties of the disclosed mats.

Many of the disclosed devices advantageously have a greatest span along the upper surface of the device where the length of the greatest span is substantially longer than any width along the upper surface, where the width is measured perpendicularly to the greatest span. The greatest span and the greatest width are measured across the upper surface from one extreme outside edge point to another, as viewed from above the upper surface. For example, a greatest span of length L1 in FIG. 25D and a greatest width W1 in FIG. 26C. The length is selected to fit the anatomy of a user to permit a selected range of users (e.g., of common height ranges) to comfortably straddle the mat along its length as described in Section 6.5—Rocking ability and in the table described herein. The mat is shaped such that a range of widths are present in the mat to permit a range of users to position one or more of their feet so as to select the mat feel under the front and/or heel of their foot to have a distinct feeling as compared to other foot positions and/or to the center of their foot. In certain embodiments, the greatest width is selected to be less than or equal to 25 inches and in some embodiments greater than or equal to 9.6 inches. In some embodiments, widths smaller than 9.6 inches may be employed.

Some of the disclosed devices have 90-degree (i.e., tetrad or fourfold) rotational symmetry (e.g. a regular octagon, square, or circle) and thus have a greatest span along the upper surface of the device where the length of the greatest span is the same as the greatest width, where the width is measured perpendicularly to the greatest span. For devices that are regular in shape and have a non-doubly-even number of sides (e.g., 3, 5, 6, 7, 9, 10 sides) and thus do not have four-fold rotational symmetry, the greatest span is somewhat longer than the greatest width, although as the number of sides increases, the difference diminishes and the width approaches being substantially the same as the length. In devices where the length is the same as or only slightly longer than the width, the length is selected to be large enough to permit the user to stand with their feet at least shoulder width apart. For a circular shaped device, a $99^{th}$ percentile male adult requires a diameter of 32 inches to stand at shoulder width apart and have their feet remain completely inside the surrounding edge.

A $99^{th}$ percentile adult (male or female) user has an average foot length of 11.7 inches and accounting for wearing typical shoes that add no more than 10% to their foot length gives a maximum total shoe length of approximately 13 inches. The minimum width required for a 13 inch shoe length of a user to permit their foot, that is oriented to span the width, to remain completely inside the near edge area (e.g. inside a typical 3-inch near edge area and a typical 0.75-inch surrounding edge) and thus completely over a center area, that is characterized by any portion of which having a compression modulus that is at least 90% of the center compression modulus, is approximately 19 inches. A maximum buffer area of 20% of foot length or 2.3 inches for an 11.7 inch foot on either end of the foot is generally sufficient to permit a user ample room to shuffle their feet and shift their stance during use and remain completely inside the near edge area with little cognitive load, hence a maximum width of 25 inches is advantageous.

For children, an average 5-year old user has an average foot length of 6.7 inches. The minimum width required for a 6.7 inch foot length of a user to permit their foot that is oriented to span the width to remain completely inside the edge band (e.g., inside a typical 0.75 inch surrounding edge) and thus completely over the surface of a mat is approximately 8.2 inches. A minimum buffer area of 10% of foot length or 0.7 inches for a 6.7 inch foot on either end of the foot is generally sufficient to permit a user minimal room to shuffle their feet and shift their stance during use and remain completely over the surface of the mat with acceptable cognitive load, hence a minimum width of 9.6 inches is advantageous.

The range of widths include those that permit the user to place their foot such that it remains entirely within the perimeter of the mat and away from the near edge area, or it straddles the near edge area of the mat with at least one of the front or heel of their foot while having at least the center of their foot remain completely or substantially within the perimeter of the mat and away from the mat near edge area and closer toward the center of the mat. The near edge area has a compression modulus that is less than 90% of the center compression modulus so as to provide a less stable location on the mat surface for a portion of the foot straddling, over or approaching the near edge area. When the foot extends over the surrounding edge, the compression modulus under that portion of the foot is further reduced and an even less stable location is provided. A reduced compression modulus under at least one portion of a foot facilitates the user to more easily rock and depress that portion of the foot into and out of the mat surface due to the lesser force required by the reduced compression modulus, thereby providing an area of less stability under that portion of the foot and thus encouraging, stimulating, and permitting more user movements.

In some embodiments, it is advantageous that given a line that is parallel to the greatest span (e.g., axis 102 in FIGS. 1D-1F), a user may position their foot in a plurality of locations each of which exhibits the line intersecting the same point of the foot's centerline at the same angle (e.g., perpendicularly or 80 degrees). At least a first of the plurality of locations is entirely within the perimeter of the mat and a second such location is characterized by the foot's heel being in the near edge area. The first location is in the stable center area of the mat where the compression modulus at all points under the foot is at least 90% of the center compression modulus. The second location is in a less stable area of the mat where the compression modulus under at least the heel of the foot is less than 90% of the center compression modulus. Alternatively, the second location may be where the compression modulus under at least the ball of the foot is less than 90% of the center compression modulus. Alternatively, the second location may be where the compression modulus under at least the ball and the heel of the foot is less than 90% of the center compression modulus. In some embodiments, the second location also exhibits a compression modulus under the center of the foot that is at least 90% of the center compression modulus. The less stable second location permits the user to rock at least one of the heel or ball of their foot more easily into the board due to the lower compression modulus in the near edge area where the heel is positioned which facilitates more user movement of their foot as the user needs less force to depress their foot's heel or ball when it is over the near edge area.

It has been found that a generally circular, elliptical, oval, oblong, or ovoid (egg shaped where each end of the mat are different sizes) convex shape that contains a continuous slope (no vertices) permits the most flexibility for a user to take full advantage of the disclosed device. Other polygonal shapes with vertices also perform well, but a smooth curvature perimeter on at least one side provides additional benefits not available to other shapes, such as the more common rectangular or square shapes of a typical anti-fatigue mat. It is noted that when using the term "round, circular, curved, elliptical or oval", unless the context dictates otherwise, the terms denote a perimeter curvature of generally continuous slope (i.e., having no vertices) and advantageously convex along the surface, edge, and/or perimeter of the mat to facilitate the conforming function under a user's foot, and in a manner more beneficial and adaptable for a user's varied foot stances on the mat.

The external curvature of the edge itself (as opposed to the curved perimeter when viewed from above) may be generally vertical and rounded, following a curved path from the floor side of the mat or platform to the upper side of the mat where a user's feet may stand. The edge may be more or less curved or even vertical or tapered in different forms. The edge is also advantageously convex in shape.

Figure 3A:
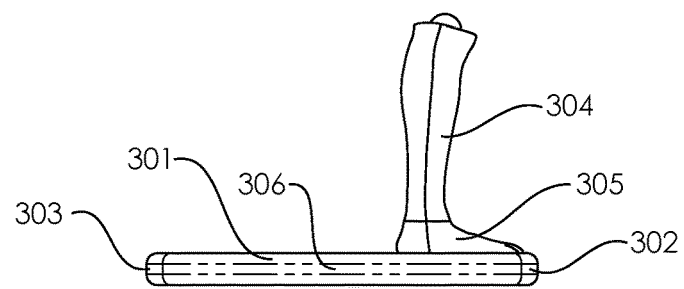
FIG. 3A is a side view of a user standing on one end of a standing platform in the lengthwise direction.
Figure 3B:
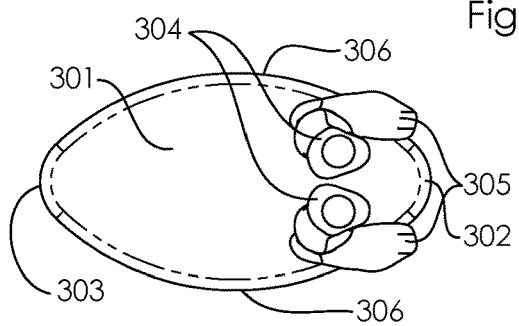
FIG. 3B is a top view of the user standing on one end of the standing platform in the lengthwise direction of FIG. 3A with their feet oriented straight out.
Figure 3C:
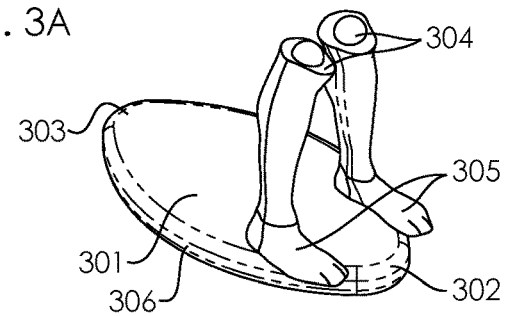
FIG. 3C is an upper isometric view of the user standing on one end of the standing platform in the lengthwise direction of FIG. 3A with their feet oriented straight out.
Figure 3D:
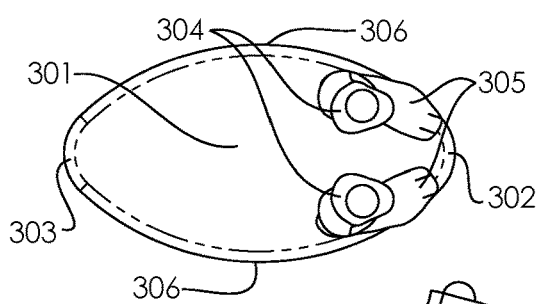
FIG. 3D is a top view of the user standing on one end of the standing platform in the lengthwise direction of FIG. 3B with their feet oriented in along the edge of the platform.
Figure 3E:
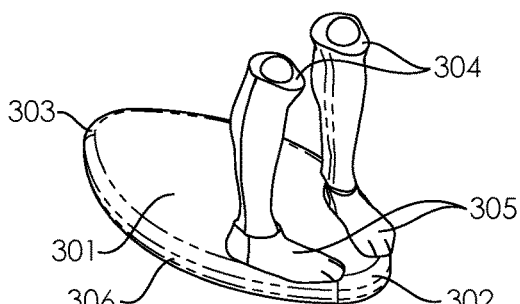
FIG. 3E is an upper isometric view of the user standing on one end of the standing platform in the lengthwise direction of FIG. 3C with their feet oriented in along the edge of the platform.
Figure 3F:
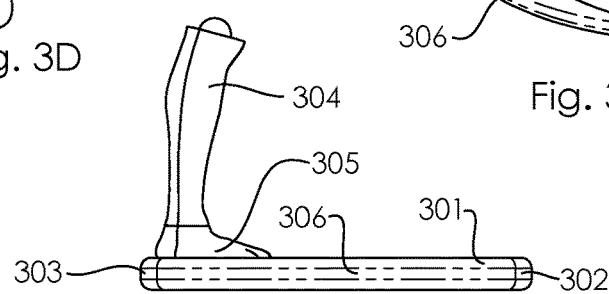
FIG. 3F is a side view of the user standing on the opposite end of the standing platform in the lengthwise direction of FIG. 3A.
Figure 3G:
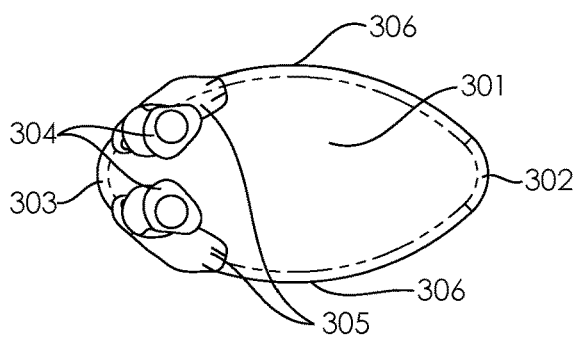
FIG. 3G is a top view of the user standing on the opposite end of the standing platform in the lengthwise direction of FIG. 3B with their feet angled out along the edge of the platform.
Figure 3H:
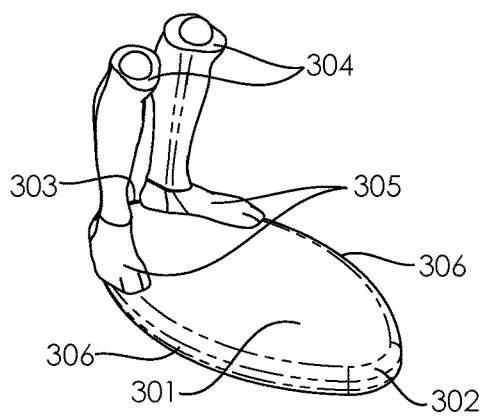
FIG. 3H is an upper isometric view of the user standing on the opposite end of the standing platform in the lengthwise direction of FIG. 3C with their feet angled out along the edge of the platform.
Figure 3I:
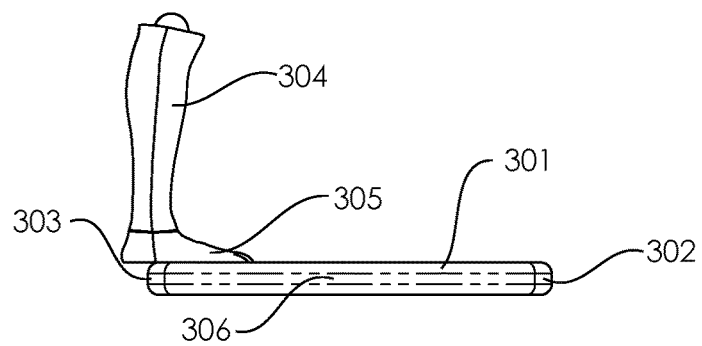
FIG. 3I is a side view of the user standing on the opposite end of the standing platform in the lengthwise direction of FIG. 3A with their feet oriented straight ahead.
Figure 3J:
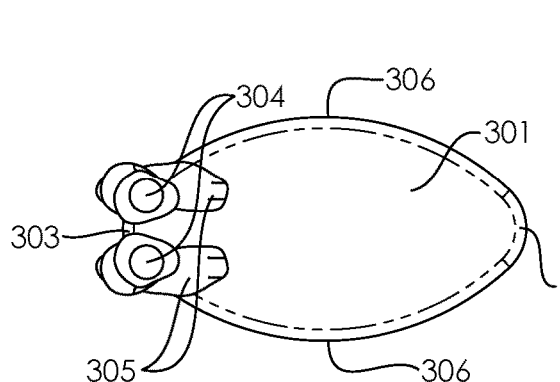
FIG. 3J is a top view of the user standing on the opposite end of the standing platform in the lengthwise direction of FIG. 3B with their feet oriented straight ahead.
Figure 3K:
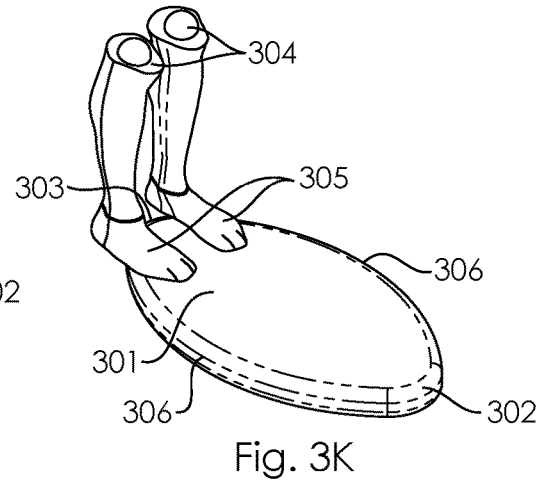
FIG. 3K is an upper isometric view of the user standing on the opposite end of the standing platform in the lengthwise direction of FIG. 3C with their feet oriented straight ahead.
Figure 11A:
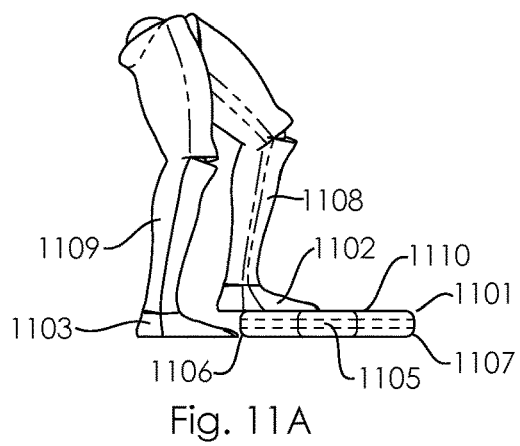
FIG. 11A is a side view of a user placing their left foot on the end of a standing platform.
Figure 11B:
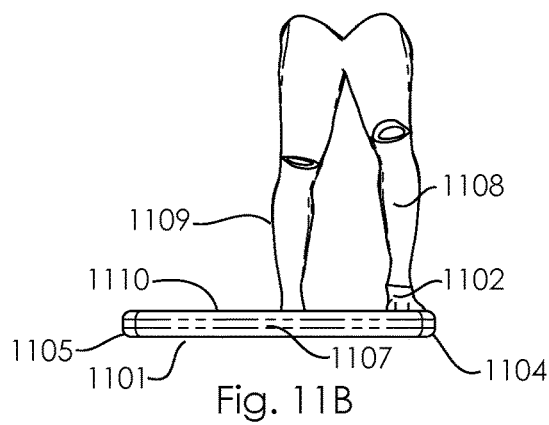
FIG. 11B is a front view of the user and the standing platform of FIG. 11A.
Figure 11C:
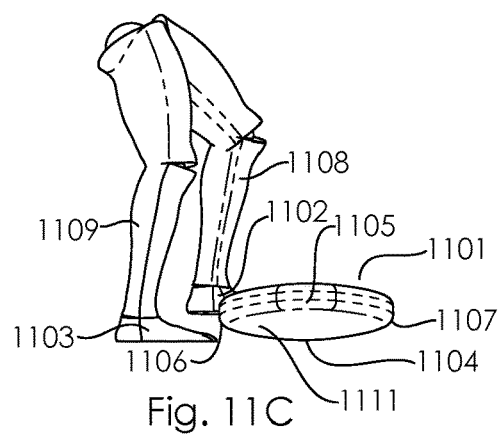
FIG. 11C is a side view of a user pushing with their left foot on the end of a standing platform, which raises the other end off the floor.
Figure 11D:
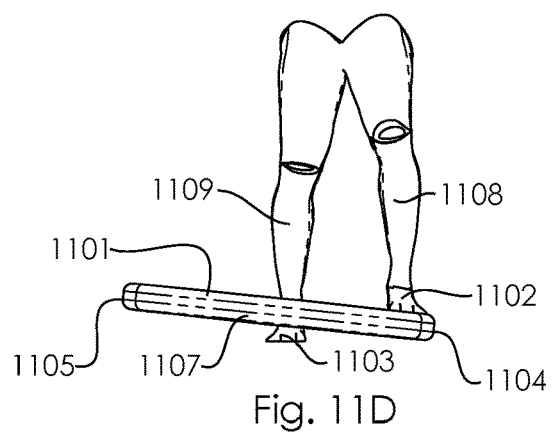
FIG. 11D is a front view of the user pushing the standing platform of FIG. 11C.
Figure 11E:
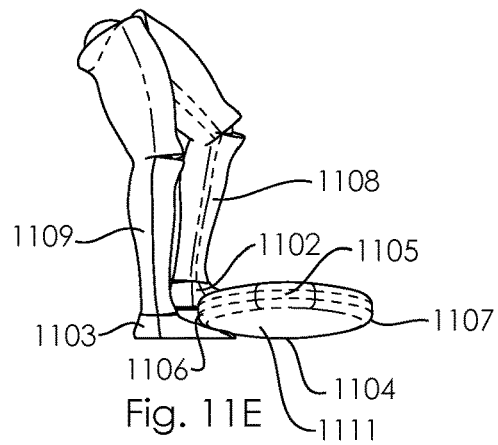
FIG. 11E is a side view of a user slipping their right foot underneath the raised end of a standing platform while they have their left foot pushing down on the other end.
Figure 11F:
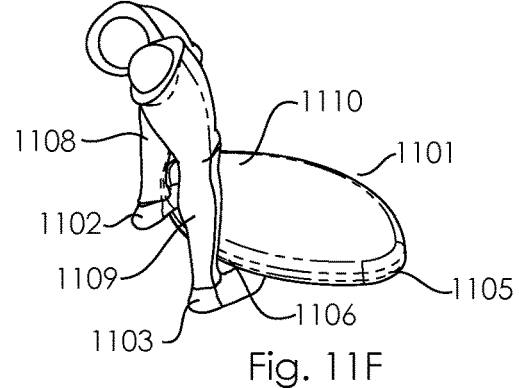
FIG. 11F is a rear upper isometric view of the user slipping their right foot underneath the standing platform of FIG. 11E.
Figure 11G:
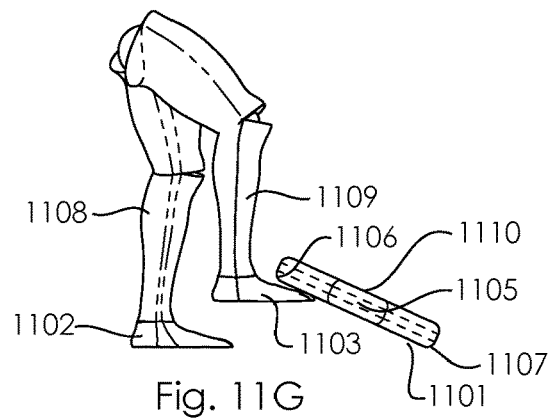
FIG. 11G is a side view of a user flipping a standing platform up using their right foot to raise the bottom of the board.
Figure 11H:
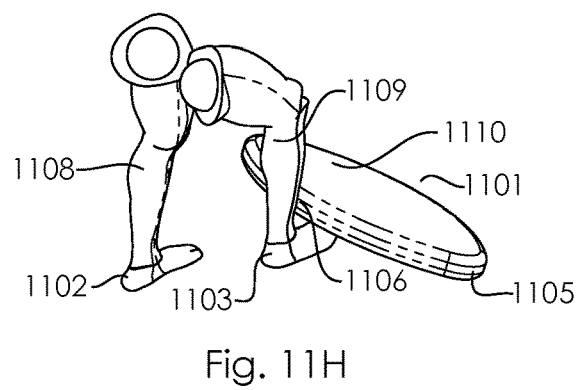
FIG. 11H is a rear upper isometric view showing the user flipping the standing platform of FIG. 11G.

By utilizing an approximately elliptical (advantageously close to an ellipse with an eccentricity approximately between 0.84 and 0.87) and less circular shaped platform, as shown in FIG. 3K, a user may place their feet such that their forefeet 305 are pointed towards the wider middle portion of the mat 301, while their heels are situated at the tapered ends 303 so that they permit the mat edge to deform towards the floor surface. This position allows the mat to conform more readily to the arches of a user's feet, providing arch support and a pleasing sense of support. It also provides a secondary benefit in making the mat more easily manipulated by a user's feet without the need to bend over at the waist. This foot conforming effect occurs whether the person has high arches, which can lead to over-supination; or pronates more towards a flatter foot stance. The low weight and density and general rigidity of the disclosed mat permits the user to easily move the mat to various orientations underfoot with ease not possible with traditional anti-fatigue mats. Such manipulation may be easily effected by stepping off the mat and using one's foot to orient and position the mat as desired, obviating the need to bend over and use one's hands to position the mat as disclosed and shown in FIGS. 11G and 11H.

Additionally, by utilizing a generally more elliptical and less circular shaped platform, a user may adjust the mat's location relative to their workstation such that a desired distance between their feet may be accomplished with the mat's edges lining up with their feet to employ the various disclosed conforming edge maneuvers. This adjustability comes from the elliptical shape of the mat and that opposite edges are of varying distances at different positions along the ellipse like shape due to its eccentricity, which advantageously is approximately between 0.84 and 0.87.

4.7. Low Friction Surface for Sliding

Figure 12A:
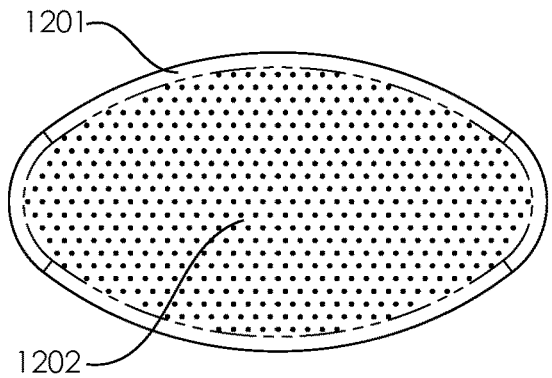

Another improvement with the disclosed devices is the utilization of divots or bumps of a very slight size that permit the mat to slide more easily (reduced friction due to less surface area contact) when in an unweighted/unloaded condition when a user is not standing upon the mat which is positioned upon a dry surface. Additionally, on a wet surface, such as one upon which coffee or other drink has been spilled, the utilization of divots are believed to provide added safety by providing for increased friction due to the need for any liquid to fill the divots before the whole surface can hydroplane and cause a slipping hazard. The disclosed devices optionally incorporate very slight dimpling or other surface features to achieve these advantages. It has been found that such dimpling appears to permit a user to more easily "slide" or move their mat along a ground surface due to the reduced friction achieved by reduced overall surface contact of the mat to the floor or surface. The dimples slightly elevate a subset of the mat's bottom surface such that friction is reduced through fewer points of contact. In an advantageous embodiment, as shown in FIG. 12A, the dimples at 1202 are tiled triangularly such that each dimple forms the vertex of an equilateral triangle and each dimple is itself surrounded by a hexagon of six other adjacent dimples. While such dimpling is generally slight, the effect is positive. The increased slipperiness of the mat in dry situations allows for easy sliding of the mat along the floor surface. However, when load is applied from above, such as when a user stands on any portion of the mat, the friction is increased by way of more points or area of contact between the mat and the floor such that the mat does not readily slide or move when in a weighted condition, requiring a greater force to overcome the now greater friction effect that is compounded by the greater load. Testing and experimentation confirms that the frictional force for embodiments of the disclosed devices increases at a greater than linear rate when a standing person applies downward pressure on the platform. Surface tension or friction is such that the mat slides and moves easily when unweighted, but friction increases and the mat becomes more non-sliding when weight or pressure is applied. Thus when a user steps off of the top surface, the dimples rise up at the bottom surface lessening the area of contact with the floor and thus reduce the surface tension (or friction).

The disclosed devices' surface pressure is less than 0.007 psi, such that the mat slides easily over any ground surface.

The level of "stickiness" or lack of movement due to friction (coefficient of static friction) when loaded is high; yet the mat moves more easily when load on the mat is relieved or withdrawn, making the platform easier to slide than typical mats. This effect is due to the non-linear response whereby the coefficient of static friction increases with the load applied to the mat. Thus, a user gains the benefit of a more easily moveable device that still stays safely stationary and immobile when force or weight is applied downward, such as when a user is standing on the mat. The low weight and low density of the mat, coupled with its high self-supporting rigidity, greatly enhances this affect.

The friction force that must be overcome when a person strikes the mat parallel to the floor is governed by the equation $F=\mu_s N$. Where F is the force, $\mu_s$ the coefficient of static friction, and N is the normal force. In the case where no external load is applied to the mat, the normal force is equal to the weight of the mat and the resulting force is the unloaded friction force. It has been found through modeling, testing, and experimentation that a 3 pound reaction force against a person's foot mid stride is the threshold where tripping will start to occur. Therefore, the unloaded friction force is advantageously below that limit.

5. Adjustability of Key Metrics

The disclosed dynamic rebounding response mats are advantageously designed to permit alteration of the coefficient of restitution, compression secant modulus, linear compression moduli, bending rigidity, and/or flexural rigidity (these metrics are felt in the mat's bounciness, resilience, and/or rigidity) affecting the rebounding characteristics in order to adapt to different users (e.g., different weights, different shoe sizes, etc.) and to adapt to a user desiring different dynamics for rebound, shock-absorption, or feedback response to their applied pressure. This alteration may be made by the adjustment mechanism. Such adjustability advantageously permits the user to optimize the product for themselves by varying the disclosed key metrics along the disclosed advantageous ranges of bending rigidity, flexural rigidity, compression secant modulus, linear compression moduli, and the coefficient of restitution. This rebounding effect is described by the resilience of a material or the coefficient of restitution and energy absorption or compression energy and the return energy necessary to optimize the use of the mat for an adult sized user in relationship to each other.

The disclosed mats can be adjusted, such that each mat may be made very firm to very soft. Such adjustments may control the underfoot/body firmness of some of the entire devices or at one or more locations or subsections of some of the devices. Less firm (e.g., reducing the adjustment mechanism) mats are believed to be characterized by a lower bending rigidity, a lower flexural rigidity, a lower compression secant modulus, and/or lower linear compression moduli, than more firm mats. Disclosed are spring-tensioned mats (e.g., FIGS. 24A-24E) that embody these characteristics in various degrees. Disclosed are compression frame encased mats (e.g., FIGS. 25A-25F) that embody these characteristics in various degrees. Disclosed are gas filled mats, with adjustable pressure in, one or more gas filled chambers (e.g., FIGS. 28A-28K) that embody these characteristic in various degrees.

The disclosed embodiments permit the attachment of additional layers covering most or all of a single surface which may be made of rigid, semi-rigid, flexible, or softer materials of varying shapes which help to adjust how the device itself functions. For example, a semi-rigid but responsive layer may be added on either the bottom or top surface or both with a catenary or highly eccentric elliptical like (such as shown in the bottom edge of 908 in FIG. 9K cross-sectional view of a mat) surface curvature path that permits a user to stand substantially flat when their feet are towards the middle of the platform, but permits easier tipping and lifting of the platform at the edges when the feet are oriented further toward the ends of the device or its edges.

The disclosed mats may be adjustable in a variety of ways. A spring-loaded mat may be adjusted by changing the pretensioning of the springs. A gas filled mat may be adjusted by changing air pressure. A non-gas filled or partially gas filled mat may also be adjusted by utilizing differing foam or rubber densities. Moreover, surfaces of various properties may be interchanged on an existing mat to adapt to different sized users of any weight conceivable. So, a small child weighing less than 30 pounds may benefit, up to an adult weighing in excess of 400 pounds. But users at these extremes of light or heavy weight are not the typical adult weight user that utilizes such mats. Such typical users are generally between the weights of 75-275 pounds.

6. Advantageous Qualities Afforded by Key Metric Ranges

6.1. Friction and Rigidity

The disclosed mats leverage controlling friction to enhance the usability and convenience for a user, particularly in an office work environment and on any ground surface.

For almost 30 years, since their advent, anti-fatigue mats have been and continue to be more "floppy" (not rigid) and flexible enough such that they can be rolled up to some degree as opposed to only being able to fold, pinch, or crease when a person attempts to reduce its size for transport or movement. One cannot readily flip such a mat on its side or easily push out of the way when desired. Additionally, it has been the industry standard to taper edges on the mat to reduce tripping against what is a substantially non-sliding or moving surface. In fact, tapered surfaces are regularly "recommended" as something to look for when purchasing or acquiring an anti-fatigue mat.

The disclosed mats completely reverse this rationale. They retain and even exceed all of the common benefits of current anti-fatigue mats, but do so with a lighter weight and a more rigid mat and surface, and where the edges are intentionally not tapered. Each mat's edges are substantially vertical and non-tapered. The edges may be curved or rounded to varying degrees, but a sufficiently vertical side or face is generally presented. The light weight and rigidity, coupled with the outright removal of tapered edges creates a mat that is extremely easy to move when the user is not standing on it, but stays in place when force and weight is applied in an amount much less than that applied by a standing individual.

Another key aspect of the disclosed devices was to control their friction aspects. One great downside of current anti-fatigue mats is that they are relatively difficult to move around. This poses a challenge in that standing workers also need to sit down during the workday. Non-stop or excessive standing is not generally recommended, especially in an office environment. A key behavior is to change positions, move, etc. Current mats are not very easy to move or slide around, or reorient to be placed out of the way of the now sitting user. The disclosed devices successfully address this common defect. When a user/worker lowers their standing desk so that the worker may sit, they must either move the mat out of the way, or ignore the fact that their work chair may be impinged by it if it remains in its original location. Additionally, such mats cover enough area such that fitting them under desks can be more challenging. If wires, outlets, garbage cans, briefcases or other items are stowed under the desk, then sliding a standard anti-fatigue mat under the desk becomes even more difficult if not impossible.

6.2. Different Orientations for Foot Placement of Curved Perimeter

In embodiments utilizing a generally oval perimeter shape, the user faces their work space with the oval mat pointing forward along the horizontal plane toward the back of the desk or work space (i.e., such that the longer axis of the elliptical shape points toward their work area), while, as shown in FIG. 3K, the user is standing on the "rear" orientation of the mat close to or at the extremity of the mat, on or near its edge. Thus the majority of the mat may be extended under the workspace or desk when the user is facing their workspace (or computer keyboard, display monitor, etc.). As shown in FIG. 3C, this orientation may be reversed so that the mat now extends behind the user while their foot stance is at the front end of the mat. In this stance, the majority of the mat extends behind the user, and not towards or under the work surface. In this reversed orientation, the mat edge conforms to the feet such that the user's forefeet collapse on the edge towards the floor while the heel portion of their feet extends towards the middle portion of the mat. This allows the user to have a different feeling of support and alters the pressure under foot while still allowing the mat to conform more comfortably under the user arches.

By being able to change their stance during standing, a user increases blood flow and their overall comfort while working and while standing. The oval shape of the mat makes these arch conforming alterations easier to perform at the ends of the mats. And, as disclosed, the relatively high rigidity of the mat coupled with its relatively low weight and density, permits the user to move off and shift the mat easily and readily to make these adjustments, possibly making such adjustments by manipulating the mat with their feet, which are facilitated by the low friction of the mat when unloaded. Current anti-fatigue mats are more difficult and cumbersome to shift and move in this manner. They are designed to stay relatively fixed and stationary in one place and not moved around. The disclosed devices allow for the opposite result by intent. Easy movement of the standing mat permits the user greater flexibility in adapting the mat to their desires and comfort, and allows these alterations to occur swiftly and with much less difficulty and often even without the need to bend over.

6.3. Mat Manipulation and Storage

Disclosed is a mat that is sized to fit under a standard desk or an elevating desk so that a user may more easily move the mat under the desk surface for relatively unimpeded foot placement when sitting. A key goal in the development of the disclosed devices was that they be easy and convenient to move out of the way when a standing user changed to a sitting position at their workstation. This feature has been generally ignored in the current market but is a key requirement for the disclosed devices and their various embodiments. The resulting mat is sized generally smaller than most anti-fatigue mats designed for the workplace, whether commercial or office. For the office or desk use environment, many scientific studies have found that it is healthier for a person to neither stand nor sit continuously for any extended duration of time, but rather to transition between both positions regularly during work. However, when a worker desires to sit, they often need to move or shift the mat out of the way to better accommodate their chair. Current anti-fatigue mats, especially the heavier more shock absorbing designs, are more difficult to shift and move than the disclosed devices described herein. The difficulty and annoyance of moving the mat tends to reduce the frequency of changing between a sitting and standing position to the detriment of the worker The most advantageous sizes are generally between 21 and 39 inches along the major axis; for a significant portion of adult users a most advantageous size of 25-34 inches along the major axis has been found to be excellent for platforms utilizing the disclosed technology described. Curved surface embodiments (e.g., FIGS. 30A-30H, 31A-31E, and 32A-32I) of the device may be as large as 39 inches at their greatest length (e.g., major axis). The disclosed devices are an improvement over these traditional mats because they are so much easier to move around according to the user's needs. Additionally, this size range generally fits within the stance width range for most standing persons such that their feet may be more easily placed at or near the ends or edges of the mat in order to rock, tip, or otherwise manipulate the platform and utilize the other benefits of the design.

Advantageously, the shape is roughly elliptical with an eccentricity approximately between 0.84 and 0.87. Such size is advantageously generally elliptical in shape and sized between 825 mm×450 mm with about 0.84 eccentricity and 720 mm×360 mm with about 0.87 eccentricity. Larger sizes may be employed but some of the advantages of the smaller sizes are reduced in such cases.

Easier mat manipulation also benefits users with physical challenges, or for whom bending over is difficult due to injury or prior condition. Ironically, the recommendation to switch regularly between standing and sitting during work can exacerbate the chance of injury or strain. To make room for a chair or stool to sit, the mat must be moved out of the way each time. Users risk discomfort and injury whenever they bend over at the waist to grab the mat with their hands. Moving current anti-fatigue mats often require hand manipulation because they are less rigid (more "floppy"), have greater floor friction, and of such a weight that moving with feet are difficult. The disclosed mats reduce the risk of discomfort or injury because their light weight, low ground friction, and wide edges permit easy foot manipulation and movement without a user needing to bend at the waist or engage their hands. As a result, users are more likely to follow the sensible recommendation to regularly rotate between sitting and standing during the workday.

With the generally vertically oriented edges that include a curvature and that are more vertical (i.e., non-tapered) coupled with the light weight and rigidity of the disclosed devices, the user may manipulate the mat with their feet (e.g., as shown in FIG. 10) such that they may flip the mat onto its edge and lean it against the inside of the desk, wall, or against a trash can or other nearby vertical objects.

Additionally, the generally vertically oriented edges that include a curve may provide a slight space between the edge and the floor where the edge approaches the underside of the device. As shown in FIGS. 10E and 10G, this permits a user to place their toes into the gap under the bottom edge 1004 and apply a lifting force in order to pivot, hinge, or rock the mat about the opposite bottom edge 1005, as shown in FIGS. 10F and 10H, so as to permit the user to grab the lifted edge now in the air without bending over or to lean it against an upright surface by manipulating with their feet. Alternatively, as shown in FIGS. 11A-11D, a user may step with leg 1108 on the edge 1104 to roll, pivot, rock, or hinge the edge 1104 and cause the opposing edge 1105 (opposite side) to lift off the floor, enabling the user to grab it with their hand without bending over or to continue, as shown in FIGS. 11E-11H, by lifting the mat 1101 underside with their other leg 1109 at adjacent side edge 1106 causing it to pivot about opposite edge 1107.

Additionally, the disclosed devices offer safety for any user that manipulates them with their feet, as there is no aspect or area of the disclosed devices upon which a user's foot can be caught within or tangled up with. The improvement results from the disclosed devices being generally rigid with a generally convex macro scale surface, and that each mat may be thought of as a generally convex body and thus provide a much reduced chance for the foot to get entangled with the mat body. A convex macro scale surface disregards any micro concave cavities of the device that are smaller than ½ the diameter of the smallest toe on an average person's foot. In advantageous embodiments, such micro concave features all have a depth of less than 0.1 inches and the span across such micro concave features are all less than 0.2 inches. Examples of micro concave features in an advantageous embodiment include the dimpled pattern (e.g., dimples 1204 on bottom surface 1202 shown in FIG. 12) that is employed to favorably decrease the friction of the device and the lips where layers of covering fabric overlay and are affixed to make a seam.

Being so effective for the office and work environment does not, however, exclude the disclosed devices from non-office environment related activities. For example, the disclosed mat can be used by mechanics working next to a vehicle or machine; or by a coach, standing and observing their athletes; as well as other non-office related standing activities. Because it is so easy to handle and move, it is well suited to be carried or transported to various venues and locations, and to then be placed on the floor surface for immediate and beneficial use.

6.4. Mat Thickness

Another improvement disclosed is that the disclosed devices possess greater mat thickness. Traditional work mats generally have tapered edges that thin or taper substantially towards the floor to make the transition from floor to mat as graduated or smooth as possible to mitigate tripping; an important safety concern that has influenced the design of all current mats for the past 30 plus years. The disclosed devices go in the entirely opposite direction and instead permit an elevated edge line where the sides of each mat are not tapered but rather are substantially vertical in orientation. The disclosed mats are generally thicker (of greater height)

than tested anti-fatigue mats, which are at, or less than, one inch thick as used in the current market. The disclosed mats, falling within the disclosed advantageous ranges of mat thicknesses, make them the most elevated anti-fatigue mats ever sold for general use that still possesses a conforming edge with all thicknesses. The edges are not tapered, as is common in traditional standing mats, but may be curved slightly. Despite any edge curvature or alternative shape, a much more vertical orientation of the edge is disclosed. This edge remains conformable under foot, and is not a vertically rigid platform such as a hard plastic, wood or other rigid material.

At first, such a generally vertically oriented or thick edge might be seen as a tripping hazard in a work environment. However, the edge is employed in concert with a rigid but lightweight structure. The tripping risk is reduced because when struck, the mat readily slides or moves away from the point of impact. The reduced friction achieved where dimpling of the bottom is included, is believed to add to this effect. Thus, if a user or pedestrian inadvertently strikes or kicks the mat, it moves as opposed to resisting the strike. This differs from the counter force of a traditional and therefore higher friction mat and its lack of rigidity to weight that instead cause a stumble or trip when so struck. Current mats are designed to be slip resistant and therefore have higher friction coefficients. A high friction coefficient and relatively heavy weight increases the "push back" or resistance of the mat to movement when struck. For example, one is less likely to trip or stumble on a soccer ball when kicked because the ball lacks significant friction to stay in place upon impact but instead slides or moves away from the striking foot. Additionally, the ball's mass is relatively small and therefore provides little resistance to the momentum of the impacting foot.

As disclosed, when the device is struck accidently by a foot, it generally slides away, however, it is possible that a fixed barrier lies in its path of deflection, such as a table leg. In such cases, where a convex shape is employed, the shape advantageously has a high likelihood of striking the fixed barrier at an angle and deflecting around it to one side or the other. Additionally, in embodiments with a curved vertically oriented edge, were a fixed barrier to be encountered by the dislodged mat and the mat not deflected around the barrier, the user's foot has a high likelihood of deflecting around the top or bottom due to the generally vertically oriented edge's curvature.

Not only is the likelihood of tripping greatly reduced, the thicker mat and edging permits the various other benefits described in this disclosure. The mat is easier for a user to manipulate and move. The thicker mat also permits better rebound characteristics, improves circulation, and enhances the user's experience. And the mat has a more responsive and snappy feel than traditional mats. Additionally, it has been found that the mat conforms readily beneath a user's foot or shoe, adding to the general comfort of the device. And, as disclosed, the edge of the disclosed devices collapse and conform to a user when that user is standing on each mat at those edges, regardless of which portion of the foot (heel or forefoot) is extending at the edge of the mat. Thus a user may stand on the edges of the disclosed mat without difficulty even though the edges are substantially vertical in orientation and not tapered in the traditional manner. And, the user gains the additional benefit of having the mat conform to the inside of their foot or feet which adds comfort, support, and variation in ways to increase blood circulation and comfort.

6.5. Rocking Ability

Some of the disclosed mats operate to permit a rocking motion such that a user may tip the bottom surface of the mat off of the floor by shifting their weight from one side or end when applying pressure at the other side or end. The disclosed mats that include a collapsing and conforming edge, such as disclosed in section 4.3—Collapsing and conforming edge, have a rocking region that extends into the flat stable central area. It is a surprising and useful outcome of the rocker design that this collapsibility expands the rocking region into the flat central area, allowing for the dual purpose of both standing stationary and rocking near the perimeter where the flat stable central area overlaps the rocking region. For example, FIG. 8I shows an extended left side rocking region 807 and FIG. 8J shows an extended right side rocking region 808.

Some of the disclosed embodiments allow the user to maintain stability while moving, stepping, and/or shifting their weight across the vast majority of the central surface area (e.g., over more than 60%, 70%, 80%, or even 90% of the central surface area), yet also provide a rocking region along the perimeter that permits rocking. Some of the disclosed embodiments operate to permit a user to stand on a stable and "flat" platform when they need or desire to be still and/or steady, but to also be able to rock the mat back and forth by changing their foot position. Such disclosed devices permit this benefit due to a combination of one or more of the following characteristics: rocking region, mat thickness, mat length, mat width, rigidity, and curvature of perimeter, surface, and edge as disclosed. Rocking edges are advantageously accentuated due to substantially vertically oriented edges, where the edges are convexly rounded, with the mat thickness within the disclosed advantageous ranges.

Figure 8A:
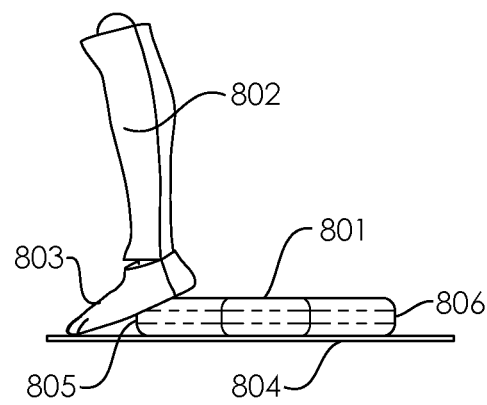
FIG. 8A is a side view of a user stretching their legs with their feet pointed down off the front of a standing platform.
Figure 8B:
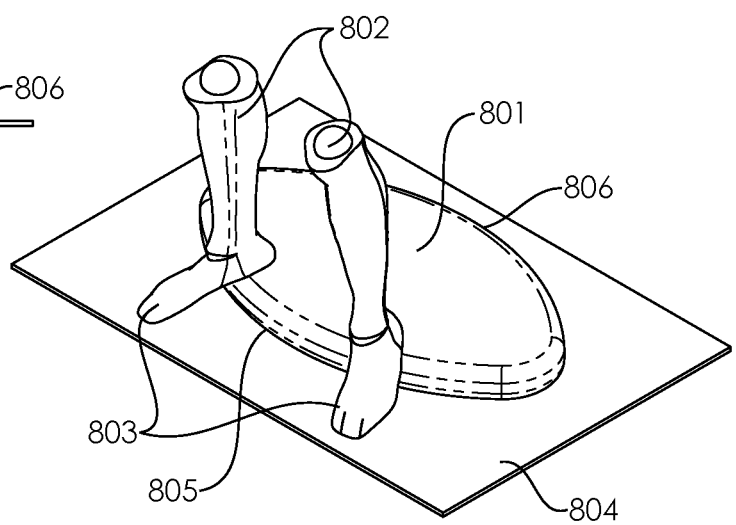
FIG. 8B is an upper isometric view of a user stretching their legs with their feet pointed down off the front of a standing platform.
Figure 8C:
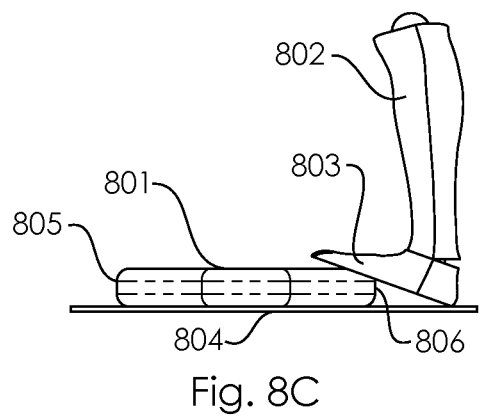
FIG. 8C is a side view of a user stretching their legs with their feet pointed up on the back of a standing platform.
Figure 8D:
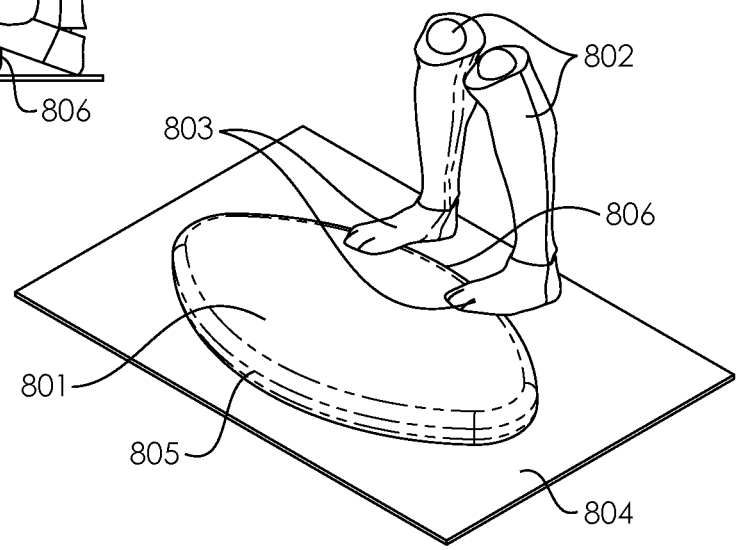
FIG. 8D is an upper isometric view of a user stretching their legs with their feet pointed up on the back of a standing platform.
Figure 8E:
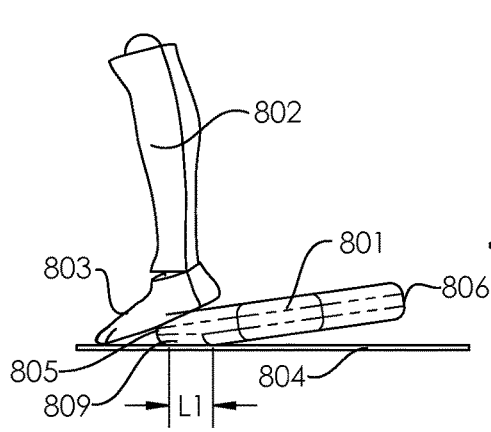
FIG. 8E is a side view of a user stretching their legs with their feet pointed down off the front of a standing platform while balancing the standing platform on its front edge.
Figure 8F:
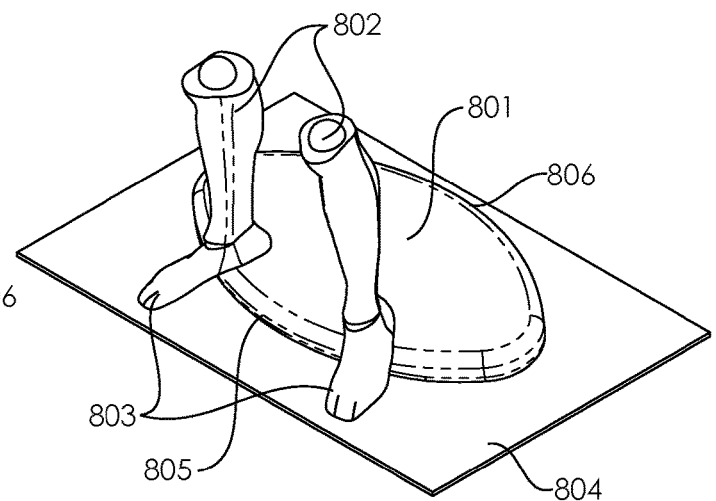
FIG. 8F is an upper isometric view of the user on the standing platform shown in FIG. 8E.
Figure 8G:
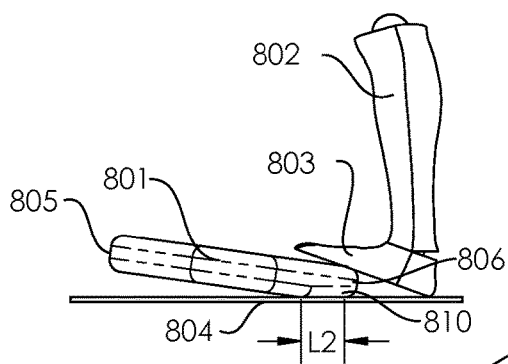
FIG. 8G is a side view of a user stretching their legs with their feet pointed up on the back of a standing platform while balancing the standing platform on its rear edge.
Figure 8H:
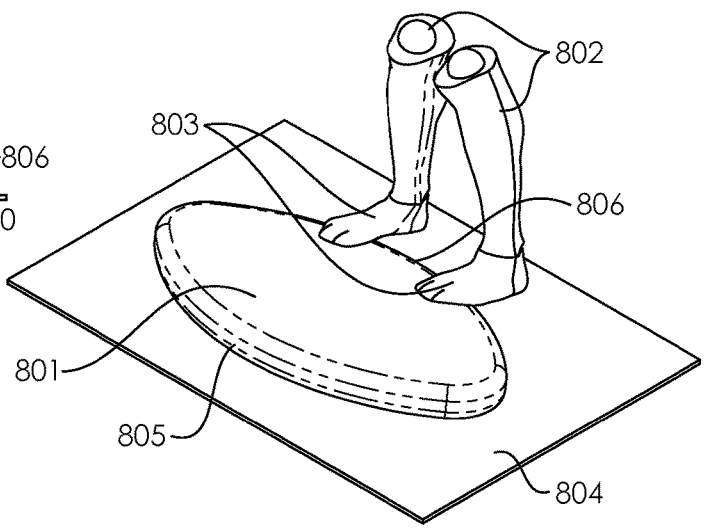
FIG. 8H is an upper isometric view of the user on the standing platform shown in FIG. 8G.
Figure 8I:
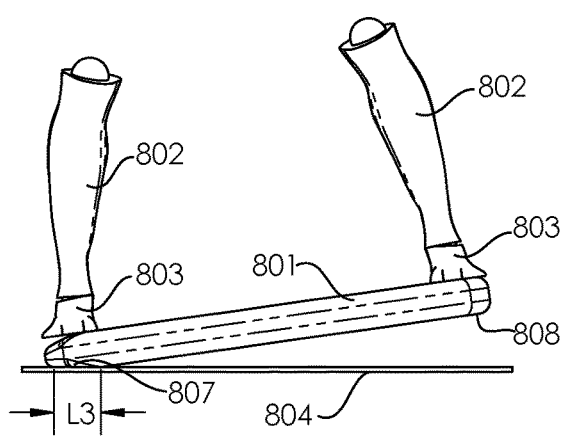
FIG. 8I is a front view of a user straddling a standing platform with their feet and rocking the standing platform up onto its rocking region on the user's right side.
Figure 8J:
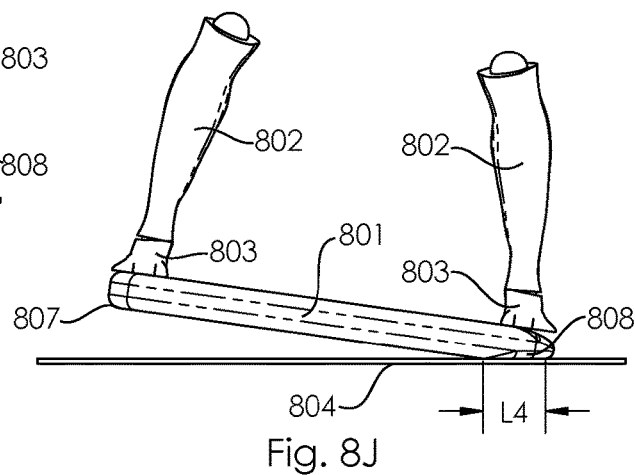
FIG. 8J is a front view of a user straddling a standing platform with their feet and rocking the standing platform up onto its rocking region on the user's left side.

As shown in FIGS. 8I-8J, the height of many of the disclosed embodiments permits a user's legs 802 to apply more leverage in a way that assists in elevating one end (e.g., right side rocking region 808 in FIG. 8I and left side rocking region 807 in FIG. 8J) of the mat 801 when user pressure is applied at the opposite end (e.g., left side rocking region 807 in FIG. 8I and right side rocking region 808 in FIG. 8J) of the same mat. This action permits the mat to more readily tilt upward at the non-pressured end. The user may then alternately apply pressure to the opposing end while releasing it on the originally pressured end to cause a rocking motion. Greater mat thickness provides greater leverage and thus makes rocking easier for a user; however, this benefit must be traded off against the downsides of a mat that is too thick (e.g., becomes more difficult to mount, or is uncomfortably elevated where a user could stumble off). Testing and experimentation have shown that a height between 1.5 and 3 inches provides a comfortable compromise between these competing benefits.

Additionally, a user may flex their feet forward and back (between forefoot and heel versus the side to side motion disclosed) to stimulate their muscles and feet differently. Alternatively, as shown in FIGS. 8E and 8F, a user may position their feet 803 at the front and rock the board 801 forward on its forward edge 805 and poise it on front side rocking region 809 to improve their balance. Or, as shown in FIGS. 8G and 8H, a user may rock the board 801 backward on its rear edge 806 and hold it on rear side rocking region 810 to improve their balance and stretch their calves. Also, a user may adjust the overall rigidity of the mat, as it has been found that a more rigid mat is more easily tilted or rocked in the manner disclosed. If the edges/ends are convexly more rounded and less squared (more circular or curved, such as an ellipse or other continuously sloped curved shape) it is easier for a user to rock the board onto its edge when shifting their weight. This permits the user to produce a slight up and down rocking motion which stimulates the user's muscles in a manner different than for those mats that cannot be rocked. The more ways a user can stimulate their muscles and stance and movement on a working mat, the better for their long-term comfort and health; this is especially true for a working environment where the user is standing (and sitting) at the same workstation for long periods of time. The ability to engage in this additional stimulation is very beneficial to the long-term comfort and health of the user.

By this motion, a user that rocks the device may cause their calf muscles to contract and relax similarly to how the calf muscles contract and relax when walking as one takes a new step forward. Such motion is therefore similar to a normal walking activity and helps to improve circulation and elevate energy levels for higher cognitive performance. In as even as few as ten rocking motions back and forth, users are believed to achieve these benefits. Thus, a method of exercise is available that is unique to this design. A user may utilize the described rockability by crafting tailored sets, each set containing one or more movements. For example, a method of rocking exercise may be initiated by a user rocking back and forth multiple times (constituting one set), and then repeat such sets multiple times. These exercise methods take advantage of the unique characteristics of the disclosed mats in a manner unavailable with other mats. By rocking towards a collapsing edge curvature, a user is benefited by a smooth and less extreme movement that still provides great benefits for coordination, stimulation, and muscle contraction. Additionally, the collapsing edge (see section 4.3—Collapsing and conforming edge) functionally extends the effective rocking region curve by collapse and conformation in the area of foot pressure, such that the effective radius of curvature is enlarged and the effective curvature elongated. A rocking region that spans the width of a user's foot placed near the perimeter makes it easier to both initiate and sustain a rocking motion. This functionally enlarged curvature, in turn, helps the user initiate a rocking motion to roll or pivot about what was once a flat surface; that through compression becomes part of the curved rocking region. Creating a rocking region from a flat device is a notable improvement in the standing mat art. More generally, this "rockability" is a key benefit the disclosed devices possess over current designs. The colloquial term "rockability" is short for rocking-ability and is alternatively used to describe this feature.

Existing rocking devices upon which users stand are designed such that the pivot point smoothly moves from the center of the device's lower surface outward to the edges as a user rocks on one of these devices. Thus they have a rocking region that originates from a center point and encompasses the entire lower surface. Such a shape basically follows the path of a rocking chair leg curvature to some degree. Another centrally located curvature is achieved by a protruding round middle dome of a platform, e.g., dome 4602 of FIG. 46. For example, a round ball like shape is centrally located on the bottom surface to permit the surface to readily tilt from a central pivot point.

In contrast, many of the disclosed devices have a "flattened" center portion of the lower surface to provide stability; in such cases, the rocking region begins further away from the center portion of the lower surface. In these devices, the pivot points (rocking region) are intentionally located away from the central location and toward the outward perimeter of the mats. This structure is uniquely beneficial to anti-fatigue mat devices for work where rocking can be distracting. The flat base central portion allows for little to no movement; but when rocking and movement is desired, a user may widen their stance and/or shift their center of mass closer to a perimeter edge and over the rocking region to begin rocking. This activating user action permits the mat to tilt or rotate upward, which initiates a rocking motion. Having both a flat stable center portion and an edge rocking region is advantageous compared to a continuous rocking action that results from devices with no flat stable region but instead having central rocking pivot points. Devices without a flat stable center portion do not give a user the choice to easily avoid a rocking action during their tasks by placing their feet interior to the rocking region and nearer to the center and over the flat stable center portion.

To permit rocking, the disclosed devices advantageously have a mat length (e.g., along the major axis) that allows a user to comfortably straddle the mat with one foot at one end, over the rocking region, and their other foot at the opposite end, over the opposite rocking region. Experimentation and testing has shown that for many users, a comfortable straddling stance for rocking is one where the legs are separated somewhere between a 30° and 40° angle (e.g., such as is measured in A1 and A2 in FIGS. 50A-50B). Smaller angles typically result in the feet being less than shoulder-width apart and thus allow little rocking before a user's center of gravity begins to cross past the outside edge of their feet and the rocking motion must end to maintain balance. Larger angles tend to result in an uncomfortable stance that begins to feel awkward and unnatural. Some of the disclosed devices are elliptically shaped so as to allow a user to place their feet at the opposite sides of the mat length and have the toe area of their feet extending into the rocking region of the front edge and the heel area of their feet extending into the rocking region of the rear edge. Such a stance allows the user to either rock the board side-to-side or to rock their feet front-to-back without shifting their foot position. Such motion additionally helps to activate and exercise the hips. A mat that is too long along the major axis does not permit a user to place both their left and right feet in a fixed position such that they can rock both ends of the mat in succession. If the major axis is too long, the user's feet are unable to straddle enough of the mat to simultaneously place their left and right feet in the rocking region at the opposite ends of the mat (i.e., the ends at the extremes of the major axis).

In embodiments that can provide a rocking motion, a minimum length of a flat region between rocking regions of 20.6 inches is advantageous, so as to match a minimum comfortable straddling stance of a 99th percentile male user with legs shoulder-width apart and legs at a 32.9° angle which positions the feet on opposite ends of the standing platform and over the rocking regions. Additionally, a maximum length of a flat region between rocking regions of 29.6 inches is advantageous, so as to match a maximum comfortable straddling stance of a 99th percentile male user with legs shoulder-width plus two single foot widths apart and legs at a 47.7° angle. Similarly, a maximum length of a flat region between rocking regions of 19.5 inches is advantageous, so as to match a maximum comfortable straddling stance of a $1^{st}$ percentile female user and with legs shoulder-width plus two single foot widths apart and legs at a 41.3° angle which positions the feet on opposite ends of the standing platform and over the rocking regions, and a minimum of 13.5 inches with legs shoulder-width apart and legs at a 28.5° angle. Because these two ranges (i.e., the ranges for the 99th percentile male and the 1st percentile female) do not overlap with each other, multiple board sizes are needed to meet the needs of the extremes of the average user population. The bottom surface includes edge curve 911 of length L that forms a rocking region and may effectively be extended to also include straight sections that form a portion of a flat center section if base 910 of FIGS. 9M-9P is compressible. An example of an extended rocking region is also shown in FIG. 68. Additionally, the platform requires a sufficient bending and flexural rigidity to afford rockability.

|  | 1% | 50% Male | 99% | 1% | 50% Female | 99% | 50% 5-Year-Old |
|---|---|---|---|---|---|---|---|
| Shoulder Width | 15.8" | 18.3" | 20.6" | 13.5" | 16.1" | 18.0" | 10.6" |
| Angle (of leg spread) | 30.8° | 32.6° | 32.9° | 28.5° | 30.8° | 31.2° | 32.3° |
| Foot Width | 3.4" | 3.9" | 4.5" | 3.0" | 3.5" | 4.1" | 2.7" |
| Foot Length | 9.1" | 10.4" | 11.7" | 8.3" | 9.5" | 11.7" | 6.7" |
| Required Foot Span | 21.2" | 23.1" | 25.1" | 20.0" | 21.8" | 25.1" | 17.6" |
| Shoulder plus 2 feet | 22.6" | 26.1" | 29.6" | 19.5" | 23.1" | 26.2" | 15.9" |
| Angle (of leg spread) | 44.2° | 46.8° | 47.7° | 41.3° | 44.5° | 45.7° | 49.3° |
| Shoulder plus 4 feet | 29.4" | 33.9" | 38.6" | 25.5" | 30.1" | 34.4" | 21.4" |
| Weight | 100.3 lb | 172 lb | 244 lb | 93 lb | 137.5 lb | 217.6 lb | 39.4 lb |
| Bending Rigidity | 50.2 | 86 | 122 | 46.5 | 68.8 | 108.8 | 19.7 |
| Flexural Rigidity | 18,363 | 48,375 | 100,782 | 11,035 | 26,957 | 63,054 | 2,662 |

| Angle (of leg spread) | 1% Female | 99% male |
|---|---|---|
| 25° | 11.8 | 15.7 |
| 26° | 12.3 | 16.3 |
| 27° | 12.8 | 17.0 |
| 28° | 13.2 | 17.6 |
| 29° | 13.7 | 18.2 |
| 30° | 14.2 | 18.8 |
| 31° | 14.7 | 19.4 |
| 32° | 15.1 | 20.1 |
| 33° | 15.6 | 20.7 |
| 34° | 16.1 | 21.3 |
| 35° | 16.5 | 21.9 |
| 36° | 17.0 | 22.5 |
| 37° | 17.5 | 23.1 |
| 38° | 17.9 | 23.8 |
| 39° | 18.4 | 24.4 |
| 40° | 18.8 | 25.0 |
| 41° | 19.3 | 25.6 |
| 42° | 19.8 | 26.2 |
| 43° | 20.2 | 26.8 |
| 44° | 20.7 | 27.4 |
| 45° | 21.1 | 28.0 |

The above table lists the distances (in inches) between the inside edges of the left and right feet (e.g., distance between guidelines 5005 in FIGS. 50A-50B) for various angles (in degrees) of leg separation (e.g., A1 and A2 in FIGS. 50A-50B). These are shown in FIGS. 50A-50B and are based upon a user 5001 facing forward with their legs 5007 spaced apart at the angle formed at the apex of the divergence of the two legs 5007 and measuring the distance from the inside of one foot 5003 to the inside of the other foot 5003. The lower value is based upon the height that 99% of women exceed and the upper value is based upon the height that 99% of men fall below.

For many users, a comfortable straddling stance that permits rocking corresponds to FIG. 50A where the feet 5003 are placed near shoulder width or slightly wider than the shoulders 5002 and thus having a flat region between rocking regions of length corresponding to at least a user's shoulder-width is advantageous. A straddling stance of a user's feet placed less than near shoulder-width apart permits very little rocking amplitude before a user's center of gravity begins to pass outside of a user's feet and thus a user begins to lose balance.

The above table provides expected measures for average male and female users in the lowest 1st, middle 50th, and top 99th percentiles of the United States population. It also provides expected measures for an average 5-year-old child in the middle 50th percentile of the United States population. The above table (in inches) lists the measure L1 of the shoulders 5002 width (first row), which corresponds to the minimum flat region width for various sized users in the first row and the user's corresponding typical foot width in the second row. The second row lists the measure A1 of the corresponding angle of leg spread required for a typical user to achieve a shoulder-width (row one) stance. Two single foot widths (third row) and one shoulder-width (first row) are added together as the measure L2 to get the sixth row that corresponds to a maximum flat center portion length (e.g., along the major axis) to permit a user to rock while comfortably straddling a mat with both feet over a rocking region. The seventh row lists the measure A2 of the corresponding angle of leg spread required for a typical user to achieve a shoulder-width plus 2 feet (row six) stance. Four single foot widths (third row) and one shoulder-width (first row) are added together as the eighth row that corresponds to a minimum board length (e.g., along the major axis) to permit a user to rock while comfortably straddling a mat with both feet over a rocking region and within the mat surface. The foot length is listed on the fourth row and provides a minimum board width to permit a user's feet to remain within the mat surface. The required foot span is listed on the fifth row and provides a minimum board width to permit a front and back edge of a user's foot to remain inside a 3-inch near edge area that is inside a 0.75-inch surrounding edge by a buffer of 20% of foot length on either end of the foot and an additional buffer of 10% of foot length for a typical shoe's extra length compared to the enclosed foot. The average weight is listed on the ninth row. The tenth row lists the bending rigidity required for a two-inch bending deflection with support points corresponding to the center of the user's feet that are placed shoulder width plus 2 feet apart, which is a center-to-center span that is the average of rows six and eight. The eleventh row lists the flexural rigidity required for a two-inch bending deflection with the same support points as row ten. Many of the values listed herein related to measures of average human anatomy are derived from data in the reference book *The Measure of Man and Woman* by Alvin R. Tilley, John Wiley & Sons, New York, 2002, pages 11-4.

For those users desiring a highly rockable mat with less stability, the rocking region advantageously spans the entire underside. For many users, that want a combination of a stable center portion and an outer rocking region, the inner edge of the rocking region advantageously corresponds to the inside edges of the left and right feet when comfortably straddling the mat. For these users, when the rocking region is within these limits, a user may straddle the flat or concave mid region and place their feet on opposite ends over the rocking regions and thus rock the board from side-to-side. For example, 98% of women's feet are between 3.0 and 4.1 inches wide and 98% of men's feet are between 3.4 and 4.5 inches wide. Therefore the width (e.g., L in FIGS. 8I, 8J, and 9P) of the rocking region outside of a relatively flat or concave center portion is advantageously between 3.0 and 4.5 inches, this allows the rocking region to be substantially under the foot. Consequently, the board length along its major axis is advantageously between 21.6 and 40.9 inches for users straddling with an angle of leg spread between 20° and 30° and for a typical comfortable leg spread of 25° between 25.9 and 36.3 inches. A 30 inch board may be straddled by the smallest 1% of women by utilizing an angle of approximately 30° while also being straddled by the largest 99% of men by utilizing an angle of about 20°. Therefore boards of about 30 inches in length afford a rocking region accessible by almost all sizes of users that prefer these performance characteristics. For other users, that want a predominantly stable platform, the inner edge of the rocking region advantageously corresponds to the outside edges of the left and right feet when straddling the mat. Herein are disclosed innovative devices designed to meet the preference needs for the above exemplary user groups.

One advantageous embodiment is to curve the base (bottom surface) in several ways, such as shown in FIGS. 9A-9H, which show a fully or partially curved surface base or underside 902 curved gradually to 3 inches inward (at 904 and 905 in FIG. 9B) and continuing upward and toward the center surface that is slightly raised above 903. Or, put another way, a central area whose edges begin to extend downward toward the floor 903 at the contact points 904 and 905 (approximately 3 inches from the edge) before reversing direction and rising upward from the floor 903 toward the generally vertically oriented edge at rocking regions 926 and 927. The curving edge size may be constant all along the board. This provides a consistent sloped tilting feel in all directions.

In another embodiment the entire bottom surface is concave and rounded, but when loaded by a user, compresses in the central area of the bottom surface to flatten out and conform to the plane of the floor surface beneath. However, the user may readily rock the platform and move the compressed area toward one side or the other in a smooth and stable fashion due to the dampening resulting from the compressed area that conforms to the surface of the floor. The material for the fully rounded or curved surface base may be compressible or soft, and hence pliable enough to flatten in this manner. The surface curve may follow a generally catenary or elliptical path, which enables a smooth transition from the center almost flat surface area to a steeper perimeter surface and edge area. The surface curve path may mirror or follow a general catenary (bridge support span) curvature and path. The generally vertical side edge of the mat may be curved following the curvature of a constant mean curvature surface area bubble, and may resemble a fluid membrane whose sides are under differing pressures. The bottom surface may be made of one or more layers of flexible, rigid, compressive, semi- or non-compressive materials of various durometers such as foam, urethane, wood, plastic, gas or liquid filled bladders or chambers, etc. to construct a fully or partially curved surface base embodiment.

Other curved surface base embodiments employ drop stitch inflatable technology that utilize internal threading or filaments or fibers 2804 connecting a first (top or upper) surface and a second (bottom or lower) surface to maintain, under pressure, a flat or planar first and second surface with a uniform thickness where a seam 919 is placed around the perimeter of the first and second surfaces to seal them together and thus permit the interior to be pressurized sufficiently to engage the internal threading of filaments or fibers 2804 in a taught state that counteracts the surface's tendency, under pressure, to produce non-parallel top and bottom surfaces. The seam width where the two surfaces are connected may be advantageously sized such that when pressurized, at and near the perimeter of the first and second surfaces, the seam pinches the two surfaces closer together (center gap 925) than the limiting distance afforded by the internal threading or fibers 2804. The device is thus allowed to shape into non-parallel top and bottom surfaces around the perimeter region where the filaments or fibers 2804 are not fully engaged. The two surfaces may be pinched together at the edges by the seam width being narrower than that traditionally employed in current applications. The seam may be thinned more on one surface side 924 of the seam 919 than the other in order to pinch one surface side more than the other due to the surface material's resistance to being stretched. The resulting shape may be modeled as a minimal surface area curve under differing pressures with an additional pressure source deriving from the constraining geometry of the taught seam that does not significantly stretch. This distinctive seam, surface geometry, and resulting edge pinching, results in a mat that, when pressurized, has a more rounded bottom or top surface and bottom or top edge. This result is accomplished while retaining a mostly flat top or bottom surface along and near the perimeter as controlled by the seam geometry and resulting pinching forces. Such an advantageous shape affords a greater rockability or more stability.

The bottom surface 921 may be sized to a smaller or greater footprint area than the upper surface 918. For example, tapering in and shrinking the perimeter of the top surface 918 relative to the perimeter shape of the bottom surface 921 may create the top surface 918 perimeter shape. Such tapering/shrinking of top surface 918 perimeter may be maximized at the farthest apart perimeter edges (e.g., at the ends of an elliptical perimeter's major axis) such as by an additional inch inward from the sides at the far ends of the perimeter (e.g., major axis ends) as compared to the bottom surface 921 and reduced down to no reduction of the perimeter as compared to the bottom surface at the closest apart perimeter edges (e.g., minor axis ends). Alternatively, this may be reversed with the tapering of top surface 918 perimeter maximized at the closest together perimeter edges (e.g., at the ends of the elliptical perimeter's minor axis). Additionally, the tapering may be eliminated with the top surface 918 perimeter may be equally shrunk as compared to the bottom surface at all points along the top perimeter. Alternatively, this sizing may be reversed such that the top surface is larger than the bottom surface to produce a more stable concaved surface platform that is harder to rock (e.g., by flipping the platform upside-down). Additionally, a hybrid approach may be taken where sizing is reduced along one axis (e.g., minor axis) and increased along the other (e.g., major axis) to produce a saddle shaped surface that rocks along one convexly shaped axis and is stable along the other concavely shaped axis.

Figure 9A:
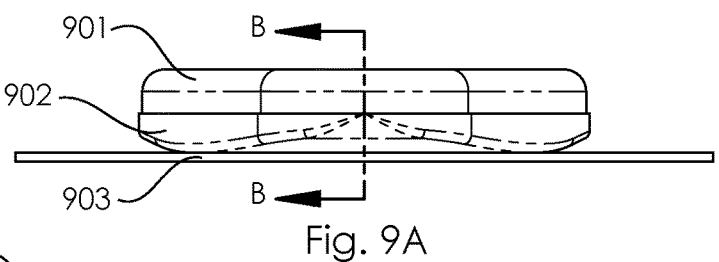
FIG. 9A is a side view of a standing platform with a rocking base with variable rigidity and flexibility.

Any of these reductions may also be achieved to some extent, as permitted by the seam width, by affixing the side seam 919 to overlap a greater or smaller portion of the bottom surface 921 as compared to the top surface 918 or alternatively, in the case of a variable sizing differentiation between top and bottom, alternatively by adjusting the width of seam 919 by curving one side of the seam more or less than the other side of the seam as shown at trimmed side 924. When sealed with seam 919 and inflated to pressure, this produces a curved surface device with edges or whole surface that curls to account for the differing surface areas of the top and bottom and/or any width adjustment of seam tape 919 center gap area 925 such as shown in FIGS. 9AC, 9AD, where the center gap area 925 narrows at trimmed side 924 of seam tape 919 and FIGS. 30A and 32A where the center gap area 925 remains constant and seam tape 919 does not have any trimmed side 924.

When the effect of the differing sized top and bottom surfaces is advantageously combined with the effect of the pinching seam 919, it produces an asymmetrical effect such that the one surface (e.g., bottom 921) curves in further and longer than the other (e.g., top 918) surface and the latter (e.g., top 918) surface may develop a small protruding lip or such lip may be adjusted such that it is advantageously counteracted by curvature of the edge seam 919 and surface (e.g., top 918) to maintain a primarily convex shape of curvature. Thus, the bottom, curved edge and surface shape, may afford greater rockability, and may be formed to have a longer more gradual curve (i.e., greater average radius of curvature and thus larger rocking region) than the opposite curved edge and surface shape on the top that may be a more generally flat surface with a more sharply curved top edge.

In some embodiments, the top surface 918 may be covered with a variable thickness layer to equalize out any lip on the perimeter of the top surface afforded by the asymmetry between top and bottom surfaces and not being counteracted by the curvature imposed by the seam's pinching force. In other embodiments, the area of increased overlap may be distributed non-uniformly around the perimeter such that the overlap is increased as the seam approaches the wider major axis dimension (e.g., 820 mm) of the surfaces and is decreased as the seam approaches the narrower minor axis dimension (e.g., 450 mm) of the surfaces. This results in a curved underside surface that has a greater rockability in its wider dimension (major axis) than in its narrower dimension (minor axis). The opposite approach (e.g., increased overlap towards the narrower dimension and decreased overlap towards the wider dimension) may be taken to provide a surface that has a greater rockability along its narrower dimension than in its wider dimension. Alternatively, seam overlap may be held consistent throughout, with no differentiation between the wider and narrower axes of the top surface, to provide a consistent rockability along its entire perimeter.

Utilizing a curved surface shape on the underside of the standing platform enables a pleasing rocking motion. In contrast, a rocking chair typically uses a constant curved arc that may flatten out towards the each end of the arc which then slows down the rocking motion as the person in the chair approaches the limits of rocking afforded by the chair, a standing platform rocker is most pleasing when constructed with a very different kind of arc. In particular, when the standing platform is in its neutral position of resting flat on a floor surface with no forces being applied to the surface of the platform, a stable position may be desired and is achieved with an arc on the bottom surface of the platform whose curved shape is flattened toward the center and gets a sharper curve (e.g., smaller radius of curvature) toward the edges.

Several mathematical curves may be approximated to achieve a pleasing rocking motion, each curve of which appeals to the tastes of different people. One such advantageous curve is an ellipse with eccentricity between 0.91 and 0.999. However, in the case of thicker mats, approaching the maximum disclosed advantageous ranges of mat thicknesses, the eccentricity may advantageously approach 0.80. And, in cases where the elliptical shape (i.e., rocking region) only reaches inward about 3 inches to a flat/non-curved inner contained surface, the eccentricity may advantageously span the whole range to 0.00. Such a curve may be applied to the bottom surface along the longest dimension and then adjusted as such a curve is rotated about the center point of the surface such that the height of the ellipse is constant but the width of the ellipse is varied to match the desired shape of the surface as seen from above. Another such curve is a catenary or funicular as used in some bridges to avoid bending moments, this may be expressed as $$y = a \cosh\left(\frac{x}{a}\right).$$

When using a catenary (or parabolic approximation of a catenary) a large value for the parameter $\alpha$ is required to give a shape that corresponds to an ellipse with high eccentricity in order to get a pleasing rocking motion with stability in the center.

Additionally an equation such as described in *The n-dimensional analogue of the catenary: existence and nonexistence* by U. Dierkes and G. Huisken, Pacific Journal of Mathematics, Vol. 141, No. 1, 1990, and available at http://projecteuclid.org/download/pdf_1/euclid.pjm/1102646773 may be used as the curve to shape the surface bottom. Such a shape may be found by creating a soap bubble along a boundary which depicts the outline of the desired surface shape as seen from above and applying a greater pressure on one side and a lower pressure on the other side in order to deform the bubble surface into a minimal surface under pressure with the desired pleasing rocking motion. In general, a surface bottom that approximates a minimal surface under pressure offers a smooth rocking experience and depending on the particular curve selected has rocking properties that some users find most pleasing and advantageous.

As previously described, the rockability may be adjustable in the disclosed devices. There are several reasons why a user may want to alter the responsiveness of the rocking motion: in one example, a user may be overly sensitive to a highly rockable surface such that a certain level of movement disrupts their concentration while at task during work. Other users may prefer a more responsive action because the additional movement does not bother them, or the extra movement actually aids their concentration.

Some users are kinetic learners who think more clearly when they move; while others think or concentrate better when they move less and are fairly still. The disclosed devices are adjustable so that these different types of users may utilize the same disclosed devices by altering the responsiveness of the mat. In those embodiments where the bottom surface has a set curvature level, the user may then utilize the top surface to modulate or adjust the overall responsiveness of the platform. By adjusting the softness or resilience of the top surface, a user may alter responsiveness of the mat regardless of the properties of the bottom surface. For example, FIG. 9 series of drawings disclose rocking surfaces with an adjustably inflated top surface such as standing platforms 907, 909, 913, and the like. These surfaces may be inflated or possess adjustable springs as shown in FIG. 24A-24E. They may be of other materials that permit the top portion to be adjustable to change the level of responsiveness. In these various versions of the device, a rocking surface may be disposed as the bottom surface while the adjustability of the top surface permits a user to modulate the top surface responsiveness such that it affects the overall responsiveness of the device.

In this way the speed and reactiveness of the user's movements may be softened such that the device moves less (or more) than would otherwise occur without adjustment. In another example of this concept, 3502 of FIG. 35A is replaceable with a rocking surface. The top surface is adjustable to either soften or firm up the top surface, which in turn alters the overall responsiveness of the device as previously described. The same concept is applicable to FIGS. 23A-23C, FIG. 24, FIG. 42, FIG. 46, and FIG. 66E as examples. In each of these variations, the top surface becomes a means of adjusting and modulating the responsiveness of the rocking action for the user without altering the bottom surface characteristics. A user may fine-tune the platform to improve their cognitive performance or focus during work. For example, a user entering into a high stress phone call may adjust the mat for increased movement by softening up the top surface to encourage more balance movements and engage their core which can help to reduce stress. By allowing for a kinetic outlet for stress during such a call, users can keep their blood pressure down, and their thoughts clearer than if they were forced to be relatively still during a high stress situation. In other circumstances, the same user may be reading detailed reports or spreadsheets where less movement is desired to aid in concentration. An adjustable top surface is new in the art, where the obvious way to adjust reactiveness of moving or rocking surfaces has been to alter the bottom surface characteristics and keep the top surface relatively firm and more rigid.

7. Various Embodiments of Devices 7.1. Multi Layered Mat

Disclosed are embodiments wherein one or more individual interlocking pieces may be layered upon one another to permit the user to adjust the mat's key metrics to meet their needs and desires, FIGS. 22A-22P. Disclosed herein are additional embodiments, FIGS. 29A-29D, with multiple layers of foam, rubber, or the like that are selected to produce a linear compression modulus within the disclosed advantageous ranges over at least a half of the range of the available strain (e.g., at least 0.0 to 0.75 inches for an available range of deflection of 0.0 to 1.5 inches which corresponds to the available strain) and an $R^2$ value of 0.89. A hybrid embodiment, FIGS. 31A-31E, includes at least one enclosed fixed or adjustable pressure air bladder surrounded by layers above and/or below of foam, rubber, or the like.

Disclosed are embodiments, FIGS. 23A-23F, that include a rigid membrane between one or more pairs of adjacent layers of foam, rubber, or the like. The rigid membranes may be fabricated out of high-density polyethylene (HDPE) or other strong materials. When the rigid membrane receives a loading force over an area, it operates to distribute the force over a larger area underneath and is engineered and designed to produce a linear compression modulus within the disclosed advantageous ranges over at least a 50% range of the available strain and an $R^2$ value of 0.89. The rigid membrane may be cut up into a lattice of individual circular or polygonal areas (e.g., 2307 and 2308) of increasing sizes (e.g., increasing diameters, widths, etc.) in lower layers so as to distribute the force to an ever larger area as each rigid layer passes the loading force downward to the next lower layer.

As shown in FIG. 23F, it is possible to sandwich non-linear compression modulus materials (e.g., layers 2304, 2305, 2306, 2309, 2310, and 2311) by rigid or semi-rigid dividers (e.g., 2307, 2308, 2312, and 2313) in such a way that the resulting compression modulus of the sandwich (e.g., standing platform 2301) is more linear than the compression modulus of the bulk materials individually. This is achieved by varying the stress level between the layers of materials (i.e., dispersing the force over a larger area in lower layers of materials). The force is constant throughout all of the layers (both materials and dividers), so the area over which the force is applied must change to result in different stress levels. Stress is defined as $$\sigma = \frac{F}{A}$$

where F is force and A is the area over which the force is applied. Stress may be computed as $\alpha = E\varepsilon$ where $\sigma$ is stress, E is secant modulus of elasticity and $\varepsilon$ is strain $$\varepsilon = \frac{\delta}{L}$$

where $\delta$ is the deflection of the top surface and L is the thickness of the material. The formula for the deflection of a layer is then $$\delta_n = \frac{FL_n}{A_n E}.$$

The formula for the total deflection of the stacked system is shown as $$\delta_{Total} = \delta_1 + \delta_2 + \delta_3 = \frac{FL_1}{A_1 E} + \frac{FL_2}{A_2 E} + \frac{FL_3}{A_3 E}.$$

The thickness and area of each layer may be adjusted to achieve a more or less linear response.

7.2. Spring-Loaded Mat

Disclosed are embodiments as shown in FIG. 24 (comprising FIGS. 24A-24E) wherein individually adjustable springs are arrayed together under a resilient layer 2402 to provide an adjustable mat. Near the perimeter, the adjustment set screws 2404 may be set so as to provide a collapsing and conforming edge. Furthermore, a central section or other disclosed zones may be adjusted to be softer and more resilient, while the ends or other zones can be adjusted to be firmer. The same variability of zones may be achieved in many embodiments such as the individually adjustable tubes 1608 and 1615 of FIG. 16, individually adjustable inflatable balls 1806 of FIG. 18, assembling differing density foam blocks 2201 of FIG. 22, individually adjustable chambers 1702 and 1704 of FIG. 17, individually tightened tensioners 2603 of FIG. 26, and individually tightened tensioners 2702 of FIG. 27. The springs 2406 are selected to provide a linear compression modulus within the disclosed advantageous ranges and over many of the disclosed ranges of strain and $R^2$ values. One example of a type of linear spring that meets the above performance specifications is a helical coil spring that exerts a constant rate of force per unit distance compressed.

Disclosed are embodiments utilizing wave springs as shown in FIGS. 27A-27D. The wave springs provide an adjustable linear compression modulus within the disclosed advantageous ranges and over many of the disclosed ranges of strain and $R^2$ values by permitting their pretensioning to be adjusted with elastic or inelastic tensioners 2702 to adjust the slope of the stress to strain curve.

7.3. Balance Board with Rebounding Top

Disclosed are devices with a hard (bending rigidity greater than 100 lb×in$^{-1}$, flexural rigidity greater than 50,000 lb×in$^2$, and/or compression modulus greater than 600 lb×in$^{-2}$ over many of the disclosed ranges of strain and $R^2$ values) upper surface that may be generally elliptical and that is centered on top of a center pivot surrounded by an array of adjustable springs (e.g., adjustment set screws pushing against spring compression washers) that provide a generally linear compression modulus over many of the disclosed ranges of strain and $R^2$ values as the surface is rocked upon the center pivot where the range of motion at the edges is at least 30 mm for a configured force in the range 80-250 lb. The design affords a balance board that does not travel away from its set positioned location relative to the user's work area under normal use by a user as is typical for traditional balance board designs where the moving action of the board is in contact with the underlying floor surface and thus may cause the board to migrate as it is used.

Such embodiments may be supplemented by attaching a cushioned surface to the top surface to provide a less firm feel and that tends to dampen the forces a user applies with their feet and other body parts. This gives the device a rebounding top. Such cushioned surface may be composed out of internal threaded air mat, one or more air chambers, rubber mat, foam mat, etc.

Current applications for stand on rocking devices utilize hard and relatively inflexible rigid top surfaces that transfer energy to point loads directly and make the surfaces very reactive with quick responsiveness. When thinking about creating a rocking platform for use with a standing desk, the goal was to make a device that is less reactive and slower to respond to foot movements and weight shifts on the platform in order to reduce the cognitive load (i.e., the total amount of mental effort being used) needed to manage the instability of the platform. By making it more stable, it permits a more peaceful, higher performing state of mind. Research has shown that the control of body sway and cognitive functioning are to some extent related. For example see: *Effect of cognitive load on postural control* by Gerhard Andersson, Jenni Hagman, Roya Talianzadeh, Alf Svedberg, and Hans Christian Larsen, Vol. 58, No. 1, Brain Research Bulletin, May 2002 Pages 135-39, doi:10.1016/s0361-9230(02) 00770-0.

Some of the disclosed devices that permit rocking include a standing surface 914 that distributes the exerted point loads or pressure points from a user's foot into a broader area (e.g., FIG. 23F) so that the rocking platform becomes less sensitive and less reactive. This slows down and dampens the rocking and tilting motions that normally occur more rapidly when the foot does not have this additional dampening layer. This same dampening and, in some disclosed embodiments, adjustable dampening may be applied, using any of the attachment mechanisms described herein, to the top surface of skateboards, surfboard, scooters, wake boards, central pivot rocker balance boards, and roller rocker balance boards (e.g., Indo® board) to make them less reactive, more forgiving, and easier to use for beginners.

7.4. Multi Chambered Gas Mat

Disclosed are embodiments with a multi-chambered gas mat system (e.g., FIGS. 18A-18F and 17A-17H). Such a design has been found to have beneficial effects in adjusting the slope of the mat. Another multi-chambered system is disclosed wherein longitudinal or latitudinal chambers 1608 of FIGS. 16A-16M, beneath a top surface, may be employed to permit adjustability of pressure within different zones or areas beneath a user's footfall or stance. Such chambers may be of any size or shape to permit the foot or stance of a user to be supported by either increasing gas pressure or reducing it in different portions of the mat. Optionally, such chambers may maintain a flat surface by utilizing internal threading or filaments or fibers 2804 connecting a first (top or upper) surface and a second (bottom or lower) surface to maintain a flat surface. The chambers may be vertical 1702 or 1704 in nature as well, and/or overlap each other in varying degrees. Also, the chambers may be hollow and operate to receive other objects such as gas-filled balls 1806, which provide more individualized pressure and response for each discrete ball or combination of balls oriented in various patterns under a user's foot, within the platform. Alternatively, the balls may be foam, rubber, or the like and permit mat adjustment by the substitution of balls with those of differing characteristics such as differing compression secant modulus and/or coefficient of restitution. The chambers may also be filled with foam or other fillers that perform the disclosed functions by being of varying feel/character corresponding to the varying feel/character of balls inflated to different pressure levels. The chambers may be hybrid and contain balls that are surrounded and held in place within foam filling.

Also disclosed is an adjustable pressure mat that may be altered to fit with a user's weight and use and comfort range underfoot. Most adult users find that pressurizing the mat between 2.0 and 4.0 psi is most advantageous and maintains a sufficiently stable standing surface or platform for standing at a desk without significant cognitive load to a user to main maintain their balance. Some users may find it advantageous to go above or below this range depending upon their size and weight, and use preferences, for example, as low as 1.0 psi and as high as 8.0 psi or even as high as 10.0 psi. Larger and heavier adults and children tend to prefer pressures above 3.0 psi while smaller and lighter children and adults tend to prefer pressures below 4.5 psi. According to the United States Center for Disease Control National Center for Health Statistics, available at http://www.cdc.gov/nchs/data/ series/sr_11/sr11_252.pdf, the $10^{th}$ percentile average body weight of the U.S. population is 116.4 lb. and the $90^{th}$ percentile is 266.3 lb. Testing has shown that over 80% of potential users, those whose weight falls between the $10^{th}$ and 90th percentiles, tend to prefer pressures between 2.0 psi and 5.0 psi. All of the disclosed gas filled devices are pressurized or can be pressurized to fall within these ranges.

Typical drop stitch fabric material has a fabric tensile strength ranging between 200 to 350 psi depending on the orientation of the fabric and the grade of material. Such material is rated for a maximum pressure of approximately 22 psi. For a standing platform application, a typical inflation pressure is 3.5 psi. Doubling that pressure to 7 psi as a safety factor, the minimum tensile strength required for drop stitch fabric for a standing platform is between 65 and 110 psi.

Lower inflation pressures have not been preferred or sought for drop stitch devices. High pressure has been desired in order to have as rigid or stiff a structure as possible. The disclosed drop stich devices start with a much lower inflation pressure which permits a user increased foot movement, and both encourages, and causes, users to make more small or micro movements. This is possible because the lower pressure mat provides a less stable surface. This results in several advantages—it improves circulation, enhances muscle engagement, and increases and improves lymphatic flow, which then elevates a user's health and performance. Mats that posses a single pressure adjustable air chamber provide the same improved benefits, and decreased inflation in all relevant designs serve the purpose of enhancing micro movements without the distraction of more extreme changes being perceived by a user. Thus, a user may gain the benefits of constant and subtle movements which permits the body's pumping mechanisms, such as the lymph system, to operate more normally, without the distraction of excessive movements while performing work tasks.

7.5. Internal Threaded Air Mat

Some of the disclosed air mats or beams (interchangeable terms for the purposes of this disclosure) maintain a flat surface by utilizing internal threading or filaments or fibers 2804 connecting a first (top or upper) surface and a second (bottom or lower) surface to maintain flat surfaces. Without these connecting internal filaments or fibers 2804, the pressurized gas mat loses its flat shape. Such unwanted shape distortions are exacerbated in air chambers lacking these filaments or fibers 2804. While this type of material has been commercially available, the application, constructions, and developments in the disclosed embodiments herein have not been previously employed for use with this type of material.

A perceived negative of such disclosed design is that it does not resist the compressive force at the edges of the mat, which in turn causes those edges to buckle when weight is applied. However, the disclosed designs are benefited by a differing (from the center) edge compression secant modulus, such as is disclosed in section 4.3—Collapsing and conforming edge.

7.6. Surface Terrain

Disclosed are devices that may have a strip or hump bifurcating the center or middle of a central air beam of the mat. This strip or bump may be of other lengths on the surface, or may be of other shapes; as viewed from above, it may be straight, serpentine, circular, or toroidal in shape, or any combination of shapes. It may be located at any location on the surface where the foot contact occurs, or on the opposite planar side where the floor surface is in contact with it. It may be a different density (less or more firm than the mat) of cushioned material than the provided air portion of the mat. It allows for flexing, exercising, and/or stretching the toes, calves, and ankles. And it may be rigid or semi-rigid of various materials. One of the benefits of having a firmer bump in relation to the rest of the mat surface is to increase the pressure, which allows for more stimulation underfoot. This is believed to provide improved circulation, while still providing a softer general surface of the remaining mat.

A perimeter bump or elevation may be advantageous to a user so they may easily feel the location of the board perimeter with their feet and also to provide an edge upon which to grip their feet upon when rocking the board. This bump may be angled to improve the positioning or alignment of the foot and ankle when applying pressure on the ends for rocking purposes.

Like the other terrain variants, this disposition of the hump or strip may be oriented lengthwise or crosswise or closer to an edge. When closer to the edge, the mat itself may be flipped over or turned 180 degrees so that the edge may be closer to the opposite edge without having a different mat. These orientations permit the standing user to stand in a manner that allows them to comfortably manipulate their feet so that they may increase the circulation and massage their feet; as well as elevate their heels or toes; and to rotate their ankles, utilizing a harder or firmer strip to support their manipulations. And it is adaptable to different foot lengths and sizes by increasing or decreasing the size or width of the hump or strip.

Another type of surface terrain is generally flat and affords differing regions or zones of firmness. A user wearing high heels may desire a firmer rear zone where they place their heels and a softer front zone where they place the balls of their feet. Attaching a semi-flexible thin top surface layer to cover a portion of their board's top surface may provide a firmer zone. The covering layer may be made of a thin wood veneer, bamboo, spring metal, plastic, fiberglass, carbon fiber, and/or other materials with similar rigidity properties. The cover may be shaped to cover a desired portion of the top surface. The cover may be affixed in one of several ways. The cover may include thin magnets to hold it in place over attracting thin magnets built into the mat, just below its surface. The cover may be affixed with a weak adhesive that permits easy removal. The cover may be affixed with a grooved pattern that dove tails into an opposite pattern along the curved edge perimeter of the mat. The cover may come in sections that may be placed adjacent to each other to provide a configurable area of continuous coverage. The cover may provide a region or zone that is more stable and/or less bouncy offering a different dynamic than the uncovered area.

In these, and their variants, the surface stiffness or firmness may be adjusted by thickening the surface material, or permanently affixing one or more additional thin layers of the same material in order to providing a slightly stiffer surface. This in turn, helps distribute the point load across a broader area underfoot. Such surface material may be of a variety of PVC type or other similar materials that create a firmer surface without adding overly thick layers on the top of the device. The surface may be thicker or have thin layers of a second or more sheet of the same material in order to maintain a similar feel underfoot but with a slightly varied firmness. The thickening changes the dynamics slightly and helps to stabilize the platform. Such layers may be permanently affixed during fabrication of the device, or may be permanently affixed later by a seller prior to shipment or by the user after delivery. Various methods already described in this specification may be utilized to adhere or otherwise attach these layers to the surface of the devices described herein.

Also disclosed is an add-on surface attachment with moveable and depressible, shock absorbing "bumps" that operate to massage a user's feet, and are attached or otherwise connected to the disclosed mats. An example mat attachment is shown in FIG. 63 (comprising FIGS. 63A-63H). The mat attachment is a flexible, semi-flexible or rigid surface material forming a substrate containing either a regular or irregular lattice of openings to permit bumps to protrude through each opening. The mat attachment that connects to the mat is substantially horizontal in a relatively flat orientation, and contains multiple holes (from one to hundreds or even thousands depending on the size of the depressible shock absorbing button or bumps and the surface area of the mat). Each hole permits a button to be freely inserted through the hole upward. Each button possesses an extended base or flange which is wider than the hole or collar and prevents the button from completely escaping upward out of the hole, but may move freely downward into the mat surface and then continue to depress or push into the cushioned mat from above, downward towards the floor surface. This provides multiple shock absorbing buttons that operate to massage the feet of a user.

The horizontal member or add-on may be made of any number of materials, but is generally thin enough to insert buttons through its holes such that the buttons come into contact upward with a user's feet when standing upon them. It can be of a cloth material that is flexible and stretches such that it naturally tightens against the mat when attached; or, it can be made of a thin plastic material. In inflatable board embodiments the material may tighten to snuggly fit and/or stretch around the mat upon board inflation. It may be attached in any number of ways. For example, it may utilize attachment points located on the mat top surface, edges, or bottom surface. The attachment may be of differing sizes. The surface of the add-on may be rigid or soft along a continuous sliding scale of stiffness or rigidity, but still permit buttons to pop upward toward a user's feet. When that user steps on the add-on, attached to the mat, the user's downward foot pressure in turn depresses the buttons, each independently, based upon the pressure received at that button's location, and push down into the mat's cushioned spring surface. The mat itself may contain these properties by having a permanent surface portion that is part of the mat that serves the previously described function, but the same effect can also be achieved with an attachable part, thus giving the user the flexibility to upgrade a more basic mat that lacks this feature. And, it may be disconnected from a mat when the user no longer needs or wants it.

As described, the number of holes is limited only by the size of the surface attachment and the diameter of the holes. Thus the number of holes may be from one larger hole to hundreds or even thousands of smaller holes. The user may insert buttons through any subset of the holes in any pattern they desire. The buttons themselves may be made of different lengths and levels of firmness. The buttons may be soft or hard or any level between. The holes may vary in size on the same attachment and the buttons may vary in size as well. The user is then able to adjust and fine-tune the foot stimulation or massage effect underfoot by customizing the button mapping underfoot and in a manner that feels best to them.

The mat attachment may be located anywhere on the board surface. As one example, a board or mat may contain two attachments located at the short ends of a mat (at the ends of the major axis), so that a user may stand on a flat, smooth surface while working, and then periodically, shift their stance and feet such that they stand on the buttons to massage and stimulate their feet, or to drive their legs downward to initiate a rocking action while receiving a massage action underfoot. And because of the continuous adjustability, the user may adjust the terrain of the buttons to match the user's feet in a manner that is both comfortable and more beneficial. The result is a device that succeeds in invigorating the standing user, which in turn, helps them to maintain an energized level even during tedious work.

Another example is where the attachment covers the entire top surface, even to the point where the holes extend along the edge of the mat such that the buttons also point outward, away from the user, and not just upward, from the top surface. The user may then take advantage of the compressible edge, so that when an edge is compressed, the buttons are engaged and reoriented but still massaging or otherwise engaging with the user's feet. This effect occurs whether the user's foot is located at the compressed edge while still remaining entirely on the mat; or, where a portion of the user's foot is in contact with the ground surface.

7.7. Curved Surface Platform

Disclosed is a curved surface platform that expands the response options and provides dynamic variability for a user. The inflated versions of the curved surface mat may be up to 39 inches in length; however, the larger size fits under fewer desks than the other versions disclosed in these specifications. Pre-curving the device surface, such as shown in FIG. 30 (comprising FIGS. 30A-30H) and FIG. 31 (comprising FIGS. 31A-31E), as part of its construction is advantageous in enhancing the rocking function of the device. And a user's weight (in the ranges disclosed) tends to flatten to some degree the platform such that it feels flat underfoot when standing, such as shown in FIG. 30D. For example, as shown in FIG. 30G-30H, a user may stand with their feet more centrally positioned on the platform. In this stance, the user is standing "flat" on the mat and the floor surface beneath, while the external edges at the farthest locations continue to curve up off of the floor surface. The user may then widen their stance and compress or direct the upturned ends towards the floor surface, such as is shown in FIG. 31D. The user is able to initiate a rocking motion side to side, which permits them to flatten one end against the floor surface, while the opposing end more easily lifts off of the floor surface. The rocking motion provides the additional benefits disclosed; utilizing a curved surface platform makes the desired effect easier to achieve for the standing user.

In another version, one of the disclosed mats may be affixed on top of a rigid rocking surface such as a balance board that affords a large range of rocking motion. For example, see FIGS. 42E-42F and 42I-42J. The addition of a cushioned mat on top of a balance board allows for one's changing motion and force input to the balance board to be dampened. This allows beginners or those with lesser balancing abilities to more successfully and more easily utilize the resulting balance board when so fashioned with a top surface mat. Such top surface mats provide a shock absorber to absorb some of the energy when a user hits the hard limits of tilt that such balance boards afford as well as to dampen the input as one applies changing forces. Another way is to couple curved attachments at the perimeter of the mat at one or more locations to assist in initiating a rocking action by the user stepping on the curved attachment, or utilizing the curved attachment to extend a rocking surface when foot pressure is applied on the mat near the curved attachment. Thus, a substantially flat mat (aside from the curved edge and perimeter) may have an enhanced curvature added by the curved attachment when desired; either on the bottom surface or on the mat edge perimeter. As disclosed, each of the disclosed devices creates a hybrid apparatus that is able to provide the benefits of an anti-fatigue mat concurrently while providing more dedicated exercise methods and benefits with the same device.

7.8. Rocking, Noise, and Temperature Control

At some or all times, a user may not desire the rockability feature. In those cases, an add-on edge (e.g., non-compliant base 916) may be employed to prevent the mat from rocking in the manner disclosed. One way to achieve this is to have an attachable edge, base, or frame, or unattached substructure, base, or frame (e.g., non-compliant base 916 or base 917), following the entire external perimeter of the mat, such that the mat is almost entirely within the add-on. Another way is to add attachable clips (e.g., clips 1902) of size small to larger sizes that are set equidistantly around the perimeter of the mat. This solution requires far less additional material to achieve the same result where a limited number, 3 or more clips or feet or rocking blockers are attached to the mat to prevent tipping and rocking. They may be fabricated of any number of materials, plastic, rubber, fabric, wood, fiberglass, carbon fiber, etc.; and may be of any desired width.

In some embodiments, a thin fabric layer made of cotton, polyester, linen, paper, silk, or other similar material may be added or affixed to the bottom surface to keep the bottom surface out of direct contact with the floor. This has the advantageous benefit of allowing the board to rock without producing significant noises. Some bottom surfaces, such as PVC based materials, produce a squeaking noise when rocked by a user upon a hard ground surface such as wood, cement, linoleum, or other hard floor surface. Such noises are greatly reduced when the devices are rocked upon a soft ground surface such as carpeting, or other soft floor surface. Therefore, to avoid such noises that may prove distracting and bothersome to users, a thin fabric may be affixed (e.g., glued, buttoned, hooked, looped, Velcroed®, magnetically held, elastically held, static cling, capillary action, etc.) to the bottom surface to avoid noise when the device is rocked. Alternatively, a skirt or cosy of fabric may be added that contains an elastic band that expands sufficiently to place the device inside and once inside, completely covers the bottom and sides of device with the elastic portion only covering top perimeter at the near edge area and surrounding edge such that the skirt is held in place. Such a skirt may be added and/or removed as desired by a user. Such a skirt may also be affixed to attachment points such as by hooks, rings, loops, buttons, magnets, draw string(s), slip cover, etc.

Such a skirt or cosy may also cover the top surface to provide an insulating advantage. Some disclosed devices exhibit a heat sink like effect on a user's feet due to a device having either significant thermal conductivity or thermal mass relative to a user's feet. By covering the top surface with an insulating material, a user's feet are advantageously isolated from the heat sink effect by a layer of low thermal conductivity, and thus a user does not experience cold feet due to the device whisking away heat from their feet. Any layer of low thermal conductivity material may be utilized to provide this advantage. Alternatively, the device may include a resistive heating element and/or pre-heated high thermal mass material layer to maintain the device temperature to one that is comfortable for the user. The heating element, when electrically powered, may be integrated into any device accessory grounding mechanism (e.g., cable 4902 and plug 4903 or clamp 4905). The heating element may be located on the mat top, bottom, and/or side surface, may be attachable, detachable, embedded, and/or integrated with the device. The pre-heated high thermal mass material layer may be composed of shredded or granulated or fluid material that conforms to the user's feet, such as rice, buckwheat, liquid, plastic or rubber pellets, sand, etc. Such a non, semi, or compressive granulated layer that it is highly conforming to the details of a user's foot shape (e.g., conforming to the individual toes) and when placed on top of a smooth, lesser conforming, spring constant layer mat is an innovative combination that provides a very supportive and detailed conforming surface for feet.

8. Beneficial Applications of Devices

8.1. Exercise

Also disclosed, is a standing mat that may also be utilized for exercises during breaks from work or in other environments. Workers have often exercised at work by having resistance devices near their workspace and by creatively placing treadmills, bicycles and other various devices designed specifically for exercise in order to improve fitness and productivity. Such devices are cumbersome and can be heavy, especially if weights and the like are placed near the workspace. Such items can be a hazard as they are heavy and can drop, risking injury if they strike a person. The disclosed devices, with their cushioned and more responsive rebounding characteristics enable plyometric exercises and calisthenics to be performed with greater convenience and safety. The softer, resilient, trampoline type surface of the mat, coupled with its light weight, permits its inclusion in the workplace as an aid to exercise, but at the same time minimizing dangerous or cumbersome interference with the primary purpose which is work productivity. And, when exercises have been completed, the mat is immediately restored to a supportive and productive anti-fatigue mat.

Additionally, a worker may perform many movements on the mat that are minimal so as not to disrupt their work concentration. For example, as previously described, the user may rock the device to slightly increase their heart rate, and improve circulation and blood flow, but without the excessive distraction (cognitive load) that can be caused by other dedicated exercise devices, such as can occur with treadmills, balance devices such as Indo Boards® and the like, which are more reactive and therefore more distractive (impose a larger cognitive load) to a worker at task. Movement on the device is permitted along a continuum of stillness, to slight movement and rocking and foot adjusting, on up to the point where a user takes a break from their work tasks and uses such a platform as a dedicated exercise platform. As a dedicated exercise platform, they may perform various plyometric and callisthenic exercises; with, or conjunction with additional exercise devices, such as elastic bands, weights, bars, poles, and medicine type balls. These are just examples of a much longer list of other exercise items that may be used with the disclosed devices. However, a great benefit is that while the mat is an outstanding platform for numerous exercise options, it is minimally disruptive to the work environment; and is immediately operative to being rededicated as a superior anti-fatigue mat.

The disclosed devices may be calibrated to account for the weight of the person utilizing them as an exercise device by adjusting such a device's rebounding resilience or bounciness characteristics such as by the adjustment mechanism. By these adjustments, a user may advantageously adapt the feel of the exercise platform to match their desired feel. A heavier person may desire a firmer feel such as by tightening tensioners 2603 or inflating with valves 2802 or 2806 to a higher pressure. A person may desire to adjust the feel depending upon the particular exercises they are performing. For example, when doing planks, the user may position their hands along the collapsing edge and may desire to adjust the mat such as to prevent their hands from bottoming out on the floor. Alternatively, a user may wish to adjust the firmness of the mat to achieve a level of stability or instability that is advantageous for their exercise needs. A person may also choose to adjust the portion of the mat upon which they place their feet, hands, or other body part that is supporting their weight so as to achieve the desired cushioning, stability, instability, etc. For example, a user may do one plank exercise with their elbows situated nearer to the center of the mat, which provides a firmer feel. The user may then follow this with a different exercise where they place their fists closer to the perimeter of the mat to achieve a softer feel that is less stable. A softer, less stable perimeter feel is afforded by the transitioning force required to deflect the mat surface as the perimeter of the mat is approached.

Additionally, a user may perform other calisthenics in a more unique manner utilizing the disclosed devices. For example, pushups may be performed with the hands gripping at or near the collapsing edge to create different balance and resistance features unique to this platform. A user may increase or decrease pressure from hand to hand into to the inflated version's surface, and alter the tension by adjustment for their weight and strength; and may alter their hand positions at the edges or towards the center of the device. Also, a user may "pump" or push vigorously with one or both hands to stimulate their muscles and balance in different ways that are unique to the disclosed devices. A softer setting level (lower compression secant modulus) results in a less firm and less stable medium that is easier to press into with one's hands during a push up. Thus, one may take advantage of the variable surface tension that is adjustable for users with different abilities, conditions or needs; or to make the exercises more difficult or easier by adjusting the surface tension. Another example is to apply these same principles to a user's foot stance, when doing macro movements like squats, with their feet partially on the mat and partially over the conforming edges toward the floor surface. Other exercises are also available that are more unique to the disclosed devices due to their disclosed properties.

Disclosed is an exercise method utilizing any of the disclosed air-spring mats that possess: a curved perimeter at one or more of the ends or sides in a line that most advantageously deviates from straightness in a smooth, continuous fashion; comprising generally two short ends or sides (at the ends of the major axis) and two long ends or sides (at the ends of the minor axis) with a total maximum long end length of less than 39 inches; and a collapsing and conforming curved edge that arcs from a point near the edge of the bottom surface plane in contact with a ground surface to a point near the edge of the top surface plane, that contacts a user. The disclosed mat permits the movement dynamics to be adjustable for any weight user by increasing or decreasing inflation pressure of the air spring.

The curved perimeter in concert with a curved edge provides benefits that standard mats do not. The disclosed mat moves and compresses as the user places force on it, especially at the edges as well as tilts upward at the non-pressured sides when sufficient force is applied by the user on or near the edge perimeter. The user is able to pivot (tilt) the mat upward and downward multiple times in a pleasing and unique manner, which elongates the calves to stretch them, and stimulates the leg muscles and benefits posture. The feet may be placed where the heels are at or near any part of the edge along the curved perimeter portion of the mat. When the user presses their heels downward, the air spring edge collapses, and the mat more readily tilts upward away from the heels in contrast to typical rectangular or square shapes. The curved perimeter of the mat aids in the tilt in a significant manner. The user may also use their forefeet to press on the edge (as if standing on their toes), which tilts the mat from the back. The user may bend and flex their knees to varying degrees to increase the resistance and to exercise their balance and coordination. In designs that utilize rocking bottom surfaces or enhance curve edges or attachments that increase the mat's readiness to rock, the described curved edge and perimeter of the mat enhance its rocking ability.

The curved perimeter and curved edge of the mat reduces the surface area against which the pressure is being applied, which then helps initiate a tilt more easily; and permits the tilt to be manually maintained by the user's fine motor adjustments of their leg muscles. The more easily tilted mat also provides consistent visual cues to the user, which provides reliable feedback to the user as to the effort and control being applied. When a downward force is applied closer to the edge band of the mat, the vertical components to the tension force cancel out. Closer to the edge band of the mat the surface tension force does not act in a direction as to oppose the downward force. Instead, the edge surface is oriented in line with the downward force, which causes the material under the force at the edges to buckle easily. A standard square cornered mat does not perform such movements nearly as well. If the rectangular mat is air filled, then applied pressure of feet in one area, fails to relieve the air pressure at the near corners on either side of the feet. The corners do not buckle and instead remain pressurized. This in turn causes signification resistance to the mat tilting due to the interference of the more pronounced and pressurized corners. With the disclosed mat, the pressure from the feet is directed downward onto a smaller surface area than with a rectangular or strait edge mat, which in turn, permits the mat to tilt more readily. There are no pronounced corners along the curved perimeter capable of increasing in pressure on its perimeter to resist edge rotation and tilt. This, in turn, provides less force and requires less energy to begin and sustain the mat tilt.

It has been found that when standing for a long period of time, posture can get poor and then such posture is maintained during a long standing time segment before the user sits. According to information in an advisory by the U.S. Department of Labor, Occupational Safety and Health Administration, SHIB Mar. 24, 2004, updated 2011, *Safety and Health Information Bulletins: Suspension Trauma/Orthostatic Intolerance* available at http://asha.gov/dis/shib/shib032404.html, excessive standing in a static position can result in Orthostatic Intolerance in susceptible individuals. Orthostatic Intolerance is improper blood flow causing people to get light headed or even faint. An example is soldiers fainting while at attention because they stay too long in a fixed body position. Changing postural positions regularly helps offset such negative effects. The described edge and perimeter curvature of the disclosed mat permits the user to initiate helpful posture changes while standing. When a user is standing on their feet and stuck in extension all day it can tend to put them in an anterior tilt (where they're bending forward at the waist with their buttocks pointing outward). Poor posture stances are alleviated by engaging the anterior core and activating the gluteus muscles to put oneself into a more posterior pelvic tilt (where the buttocks is directed forward). This posture change and action is more easily accomplished with the disclosed device because the ready tilting action of the device moves the body more quickly and easily from anterior tilt, to a more neutral tilt, and then on through to a posterior pelvic tilt. The smoother transitions result in improved overall posture, and lengthen the time a user may work comfortably in the standing position.

Different users may stand in a static or fixed position differently; for example, one user may habitually stay in a constant posterior tilt, where another user habitually locks up in a different tilt. In such cases, the described benefits remain because the user may move and tilt the mat, which alters their stance and alleviates an excessively static stance and position regardless of how they maintain their static stance while standing. Exercises unique to the disclosed curved edge and curved perimeter mat that benefit posture and balance are possible and disclosed.

Having a variable curved perimeter or curved edge provides a range of varying edge compression moduli that vary with the average radius of perimeter curvature and/or edge curvature in the area where a user places their feet. Areas with greater average perimeter or edge radius of curvature have a greater edge compression modulus than areas with a lesser average perimeter or edge radius of curvature. Unique exercises and stimulation movements are thus possible with the multi-curved (edge and perimeter) mat that utilizes the range of available average edge compression modulus under a user's feet.

Many exercises are available that take advantage of the unique properties of the disclosed air spring device. As previously described, exercise methods utilizing the unique structure and characteristics of the disclosed mat that possesses both a curved perimeter and a curved edge are possible. Disclosed is a method of exercise on a air spring trampoline-like mat with a total maximum length in one direction (e.g., along a major axis) of less than 39 inches, having generally two short ends or sides (e.g., sides 6011 in FIG. 60D) and two long ends or sides (e.g., front edge 6008 and rear edge 6009 in FIG. 60D), a top surface plane for standing and movement, a bottom surface plane for contact with a ground surface, and a collapsing and conforming curved edge that arcs from a point near the edge of the bottom surface plane to a point near the edge of the top surface plane along the perimeter of the mat. The mat also has a curved perimeter at one or more of the ends or sides in a line that deviates from straightness in a smooth, continuous fashion. The disclosed mat permits the movement dynamics to be adjustable for any weight user by increasing or decreasing inflation pressure of the air spring.

The curved perimeter in concert with a curved edge provides movement benefits that standard mats do not. For example, in a toe grip exercise where the user compresses and flexes their toes at the collapsible conforming near-edge of the mat. The toes and forefoot depress the compressible edge, which provides increased stimulation underfoot. The curvature of the perimeter along with the curvature of the edge helps better facilitate the ability to engage the toes.

Another discrete exercise is to perform a "forward mat tilt up" with both toes towards the middle portion and heels near the edge of a long side of the mat. The user applies pressure at their heels at the rear edge of the mat. It has been found that the stretching action for the calves is greater and improved with this exercise. Because the board tilts (in this case) up towards the user, the surface of the mat hovers beneath the user's feet, with the surface parallel to the bottoms of the user's feet. The board's tilt position provides a visual cue or feedback to the user, which helps them hold the stretch position for a longer period of time.

Another movement is a "rear mat tilt" with both forefeet at a near-edge of the mat on the forward (facing work area) long side. Pressure is exerted down through the forefoot. The forward action of the foot towards the floor surface serves to tilt the mat such that the portion behind the compressed area elevates. This action is unique to the device because of both its perimeter curvature and because of the vertical curvature of the edge of the mat.

Another movement is where the user stands on their toes and lightly bounces. The user may hold another surface with their hands for additional balance support. The user may flex their knees or dip in a squatting motion to any degree desired in order to increase difficulty or change the feel and balance of the exercise.

Another exercise is to turn the mat a quarter turn (90 degrees) so that a short side faces forward in the same direction the user is facing (or perpendicular to the work area to which the user is facing). It should be noted that symmetrical devices do not technically have a front or a back, but such terms are used when a standing person is using the device. One may perform a forward mat tilt up with both forefeet towards the center of the surface, heels at furthermost end edge. The user applies pressure downward through the heel. The edge collapses while the curvature minimizes counter force against the downward action (due to the reduction of defined corner resistance), resulting in the mat tilting upward away from the pressure zone with the elevation maximized at the far end of the board from the heels. A rocking action may be applied as well, and is more easily performed due to the curvature of the generally vertically oriented edge coupled with the curvature of the perimeter edge. Both in combination provide a unique movement and exercise. The muscles of the legs, glutes and tendons in the ankle and foot area are simultaneously engaged and stimulated in a manner not possible with devices lacking the combined curvatures of the disclosed device.

Another exercise is that, instead of feet together, a user may alter the stance of their feet such that one foot is extended in front of the user and the other foot is extended to the rear of the user. The edge curvature and perimeter curvature decrease the resistance to the tilting actions previously described for other exercise movements. This movement may be performed with a forward mat tilt up with right leg forward on long side; or a forward mat tilt up with left leg forward on long side; or a forward mat tilt up on short side with both legs. Or, the user may perform a rear mat tilt up with both forefeet on mat surface and rear feet off of mat at rear long side edge. As well as a rear mat tilt with both forefeet on the forward edge of the short side. By compressing the edge with the forefeet, the rear portion of the mat tilts up toward the user.

It should be apparent that other foot stances and heel/toe variations may be employed on the mat which varies the balance and feel of the device underfoot to the benefit of the user in being able to stand for longer periods of time in comfort. Other exercises are also possible that do not involve standing. One variation is to perform similar exercises in a kneeled position. The air spring is extremely comfortable to kneel upon, and coupled with the curved edge and curved perimeter, permits similar benefits previously described for a standing user, but instead the knees are engaged downward to initiate mat tilt, and to more significantly alter the user's position. Other exercises may be utilized to take advantage of the boards unique properties. For example, planks may be performed in greater comfort than when performed on a surface harder than the disclosed curved edge and perimeter air spring.

Planks are an exercise form already discussed, but some additional plank exercises for the disclosed device may also be utilized. A user may place their elbows towards the near side (rear orientation) of the mat such that the forward long side tilts up when the elbows press downward near the edge portion of a curved portion of the edge perimeter. The level of tilt is dependent on the inflation tension setting that a user deems most appropriate for their skill level, size and weight, whether the force is focused at the elbows, or spread across the forearms when holding the plank position. The disclosed devices permit a greater amount of elbow pressure downward as a result of their cushioning. The disclosed devices permit increased elbow pressure by the user due to the cushioned surface than possible when performing regular planks on a more rigid floor surface, even a carpet or typical mat padding in a gym, while still permitting a tilt of the entire mat. One may perform movements where the elbow pressure is adjusted to hold the plank while controlling the mat to pop up and down in sets. For example, one may exert pressure on elbow to tilt mat upward from floor surface 15× for 2 sets, etc. It should be noted that this technique applies for standing exercises at edge.

Another significant stimulation movement for a standing user is the ability of the disclosed board's ability to rock side to side more readily. The rocking of the board is discussed in these specifications in more detail, but exercise methods are able to be adapted to take advantage of these benefits. Other exercises may include:

(1) Rocking side to side at short ends of the mat; knee bend can change to alter difficulty and feel.

(2) Rocking front to back at long side of the mat with the user rotated 90 degrees relative to the mat (e.g., like the rotated 90 degree user in FIG. 3 and FIG. 57B); knee bend can change to alter difficulty and feel.

(3) Rocking front to back at long side of the mat with either right leg forward and left leg back or with left leg forward and right leg back; pressure applied at balls of the feet. Knee bend can change to alter difficulty and feel.

As also described elsewhere, exercise bands, cords, springs and the like may be attached or otherwise coupled to the board and may add to the unique exercise properties of the board. For example, such bands may be adhered to the base surface so that, when compressed by a standing user, remains secure such that the bands may be extended at tension and resistance without slipping out from under the mat. Additionally, connection or attachment points may be placed along the curved vertical edge of the mat at one or more locations. After a band (or cord or spring member) is so connected, a user may grasp a portion of the band with their hands, and extend the band to create resistance. At this point, the advantages of the tipping board due to its curved perimeter and curved edge are initiated. FIGS. 33A-33D show how a connected band under tension by a user affects the board by turning it up at the connection points. In the exercises described here, one may see a similar response where a user utilizes one of the previous standing movements with a resistance band. The board tilts, the bands add resistance but that resistance is more smooth and more extended so that the movement is smoother to the user during the resistance phase of the movement. The curved edge and perimeter collapse from the foot pressure responds to the resistance action by the band or bands.

The increased friction afforded by the mat when a loading force is applied to its surface is beneficial in its use as an exercise platform as well. Between exercises, a user may easily slide the disclosed devices around on the floor by removing themselves from the surface (e.g., stepping off the device or such as when planking, removing one's hands from the surface); once removed such a device's friction is reduced and it may be readily moved with little force being required. Conversely, while performing an exercise, including ones wherein one of the disclosed devices is placed against a wall and one's back is placed against the device to press against the wall with the device providing a cushioning and conforming shape for the back so as to more evenly distribute the forces across one's back as one leans into the wall, as well as turning one's torso from side to side; the device's friction is increased under load and thus tends to remain in place while the loading exercise (that causes a force to be applied, generally perpendicularly, to the surface in contact with the floor or wall) is being performed.

8.2. Safer Impact for a Falling Person on it

A corollary benefit of the disclosed mats is that they are an extremely effective method of preventing injury if one were to inadvertently fall on such a mat. If a user were to trip elsewhere (through no contact with the mat), the disclosed mat technology is very effective at breaking such a fall and greatly reducing the chance of injury. While ancillary, this benefit is by no means minor. According to statistics compiled by the Center for Disease Control's 2015 released "$3^{rd}$ edition Fall Prevention study" available at http://cdc.gov/homaandrecreationalsafety/pdf/CDC_Falls_Compendium-2015-a.pdf, wherein it states in part that "one-third of people aged 65 and older fall each year, and those who fall once are two to three times more likely to fall again." Additionally, the study found that falls are the "leading cause of both fatal and non-fatal injuries among older adults," which causes our elderly loved ones loss of independence and ultimately a "reduced quality of life." The disclosed mat is an effective fall break. Adjacent mats can be linked together in a lattice (e.g., triangular, rectangular or hexagonal mats that fit together with no gaps between them) to provide a stable but effective fall break over a larger contiguous area.

8.3. Surgical/Medical Applications

Also disclosed is an improved anti-fatigue active surface for doctors when performing surgery. The benefits disclosed may be applied to many in the medical professions (e.g., for use by technicians in a medical lab, doctors outside of surgery, compounding pharmacies, radiology, or other sterile room applications). Some surgeries can last an entire workday, even beyond 12 hours where a surgeon must continue with the surgery until it is completed, no matter how long it takes. The disclosed devices provide an improved platform upon which a physician may stand for long periods of time in greater comfort and with improved alertness, whether in surgery or not. The mat may contain an antimicrobial and/or antibacterial agent or surface. Additionally, a highly impermeable surface or super hydrophobic surface (e.g., as described by C. Guo and A. Vorobyev in *Multifunctional surfaces produced by femtosecond laser pulses*, Journal of Applied Physics on Jan. 20, 2015, a summary of which is available at http://rochester.edu/newscenter/superhydrophobic-metals-85592) that is readily cleaned may also be applied for such uses. The top surface of the mat may also be selected to provide adequate friction for users standing on the mat wearing either dry or damp surgical booties. The mat may be sized to optimize different medical and surgical uses. The mat may also be secured in some manner (e.g., microsuction tape) to the floor surface to prevent movement even when unweighted. The surgeon may select tapered edges that may also be attached or incorporated in these specialized applications. However, as disclosed, a surgeon may select a mat that is easily moved about. The firm surface, lightweight and substantially rigid structure is well adapted to provide a comfortable and supportive surface for a medical professional. Testing users have reported that they are able to stand comfortably for as much as four times as long or more without the onset of discomforts associated with lengthy standing.

8.4. For High Tech Environments

In high-tech environments (e.g., electronics, microprocessor manufacturing, explosives, and chemical storage industries) where the management of the risk of electrostatic discharge around electrostatic sensitive devices is important, the disclosed device 4901 may be equipped with an accessory grounding mechanism (e.g., cable 4902) to provide a dissipative feature such as shown in FIGS. 49A-49C. This may take the form of a traditional antistatic mat being affixed to the top surface 4904 of the disclosed device 4901. Alternatively, the grounding surface may be in the form of a skirt or cosy that covers the top surface 4904 and can be held in place similarly to the skirt or cosy disclosed in Section 7.8—Rocking, noise, and temperature control. Grounding surface can also be a semi-rigid or rigid cover that is shaped to securely and snuggly conform and tighten around the perimeter curved edge upon inflation of inflatable embodiments of device 4901. Optionally, an antistatic wrist strap may itself be connected to the mat. The grounding of the disclosed mats is done through resistance between $10^5$ and $10^8$ ohms between such a mat's surface 4904 and the reference ground plug 4903. In an advantageous embodiment, the resistance across the surface of the mat 4904 to ground is controlled at all points to stay within the range of $4 \times 10^7$ ohms and $9 \times 10^7$ ohms. Grounding may be accomplished by providing a cord 4902 that plugs 4903 or connects into the ground of a typical electrical outlet (e.g., 3-pronged or 2-pronged) and connects to the mat through the prescribed resistance. The surface 4904 of the disclosed mats 4901 may also be covered with an anti-static material that inhibits triboelectric charging (the buildup of charge by rubbing or contact with another material). For example, Pink Poly (a clear hot pink polyethylene that may be formed into a film on the surface of the disclosed devices or a thin foam applied to such a surface) is a suitable material to use for this purpose of avoiding the buildup of a charge such as due to rubbing ones foot or shoe on the surface 4904. The surface 4904 may also be covered with a vinyl optimized for its dissipative feature characteristics. The surface 4904 may employ multiple layers; a top layer providing static dissipative characteristics may be layered on top of a highly conductive scrim that is connected with cable 4902 to ground such as by clamp 4905. The underside of the mat may also contain a static-dissipative layer, such as those constructed of foam or vinyl.

Another form of high-tech environment is a clean room that may require a silicone free mat to avoid contamination during assembly processes such as soldering, adhesive bonding, coating, and wire bonding. Another application is in the food or metal industries where the mat may be covered with an outer surface (e.g., nitrile rubber) that is resistant against heat, oils, alkaline liquids, acids, hot metal shavings, etc. These properties may be additionally integrated with the disclosed dissipative anti-static characteristics for industries requiring both.

9. Further Details of Certain Disclosed Embodiments

The above and other objects, effects, features, and advantages of the present devices will become more apparent from the following description of the embodiments thereof taken in conjunction with the accompanying drawings.

Figure 1A:
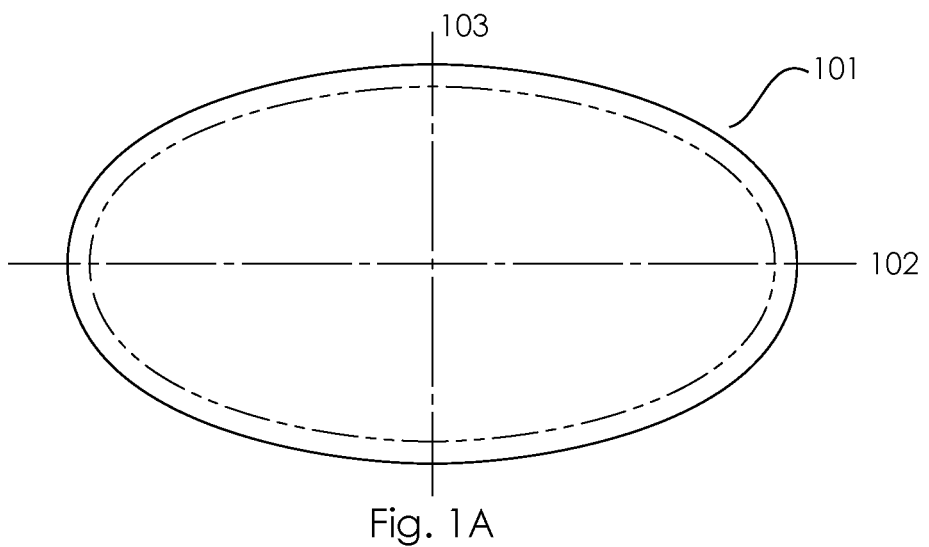
FIG. 1A is a top view of a board with an alternate shape that may be used for different foot positions.
Figure 1B:
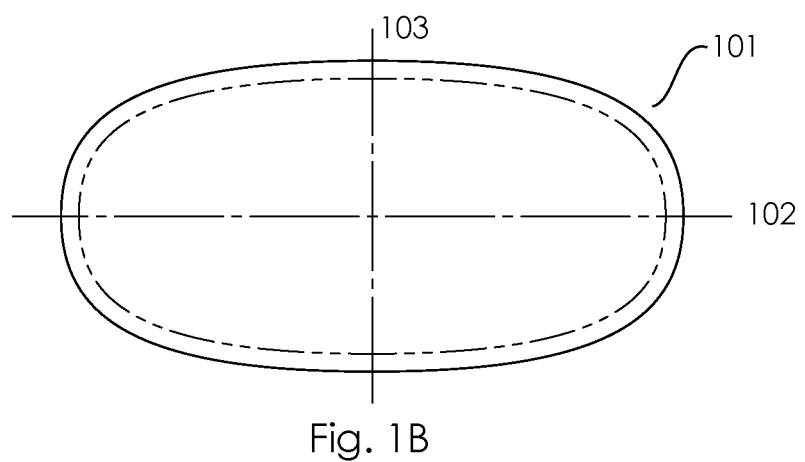
FIG. 1B is a top view of a board with a different alternate shape that may be used for different foot positions.
Figure 1C:
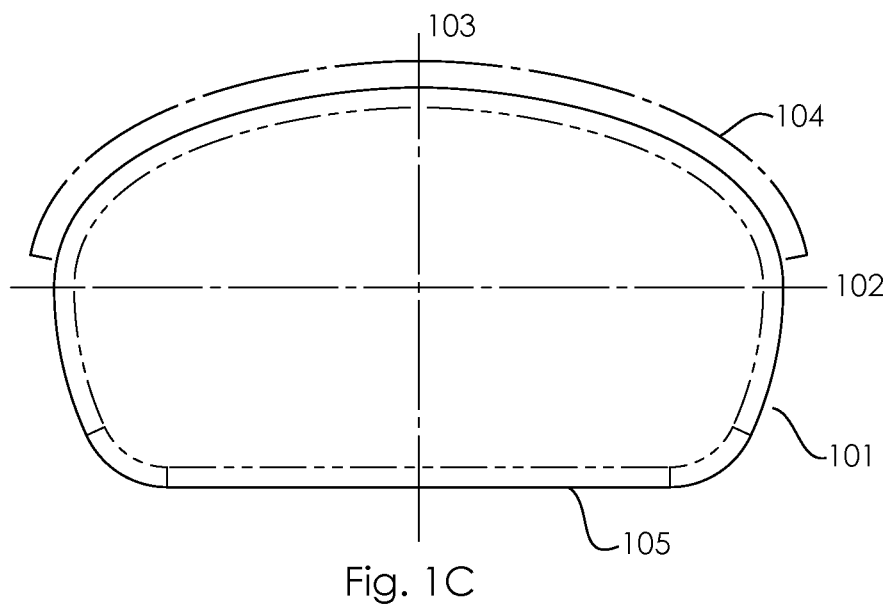
FIG. 1C is a top view of a board with another alternate shape that may be used for different foot positions.

FIGS. 1A-1C show possible alternate shapes for the boards 101. Different shapes may be used to offer an ideal edge 104 for a user to place their feet. FIG. 1A shows an ellipsis-like external perimeter curvature with the board 101 being symmetrical about horizontal axis 102 and vertical axis 103. FIG. 1B shows a modified ellipsis-like perimeter with less curvature along the corners with the board 101 being symmetrical about horizontal axis 102 and vertical axis 103. In each case, these shapes have been found to be effective in enabling to some degree other disclosed features such as disclosed in section 6.2—Different orientations for foot placement of curved perimeter. FIG. 1C shows a D shape mat that has a curved perimeter 104 and a straight perimeter 105 with the board 101 being asymmetrical about horizontal axis 102 and symmetrical about vertical axis 103. This shape allows a user to position their body in different ways. When a person stands with their feet further apart, the feet tend to point outward at a greater angle than when their feet are closer together. The board in FIG. 1C is gently curved along the "D" perimeter curvature 104 to accommodate the wider angle of the feet when in a wide stance. If a user desires to have part of their feet on the mat and part off the mat (to increase circulation or to put pressure under the arch for a massaging effect), the D shape allows for the feet to be at wider angles in a wide stance such that the part of their foot that is off and on the mat. The D shape may be more or less gradual, but there continues to be a straight edge on the opposite side. A user may flip the mat around to stand either on the curved perimeter side or the straight perimeter side. The flat end of the D shape permits a more balanced stance in the event a user wishes to stand in that manner. Additional shapes are also possible that conform to the previously described metrics. Some examples are shown in FIGS. 60A-60F, later described. Any polygonal shape conforming with the disclosed metrics is possible though not shown.

Figure 1D:
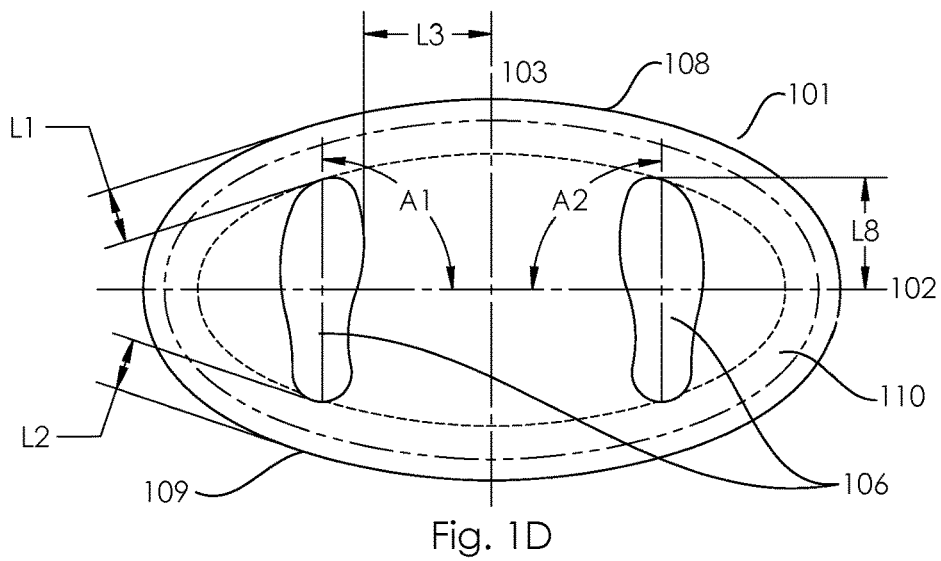
FIG. 1D is a top view of a user standing on the board of FIG. 1A.

FIG. 1D is a top view of a user with feet 106 standing on the board 101 of FIG. 1A and positioned symmetrically about horizontal axis 102 and vertical axis 103. The inside edge of the user's left foot 106 is at a distance of L3 from the vertical axis 103. The front edge of the user's left foot 106 is at a shortest distance L1 from the front perimeter 108 of board 101 and the back edge of the user's foot 106 is at a shortest distance L2 from the rear perimeter 109 of board 101. The distance L1 differs from the distance L2 due to the position of the user's left foot 106 relative to the horizontal axis 102. The area in between the two dashed lines is the near edge area 110. In FIG. 1D the feet 106 are touching the edge of the near edge area 110.

Figure 1E:
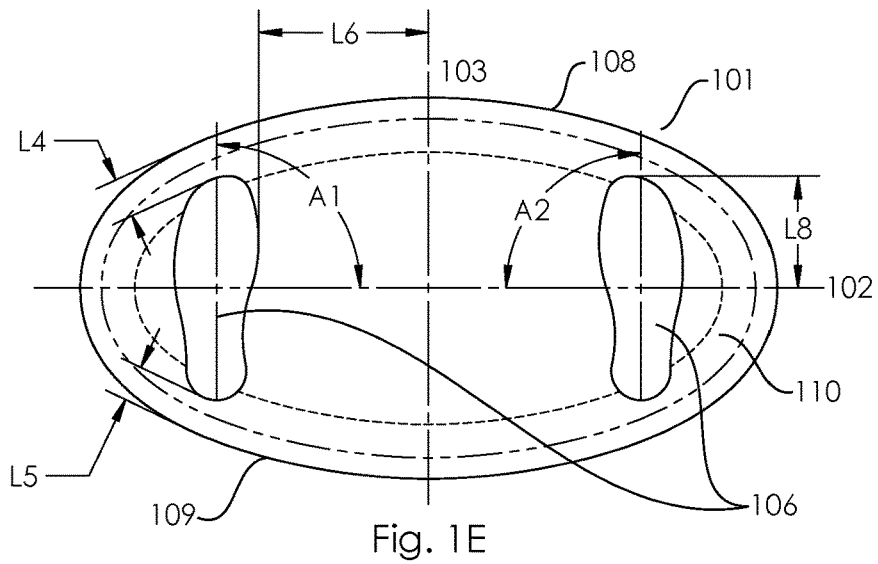
FIG. 1E is a top view of the user standing on the board of FIG. 1D with a wider stance.

FIG. 1E is a top view of the user with feet 106 standing on the board 101 of FIG. 1D with the feet 106 in a stance wider than in FIG. 1D. The inside edge of the user's left foot 106 is at a greater distance of L6 from the vertical axis 103 than the distance L3 in FIG. 1D. The front edge of the user's left foot 106 is at a lesser shortest distance L4 from the front perimeter 108 of board 101 than the distance L1 in FIG. 1D and the back edge of the user's foot 106 is at a lesser shortest distance L5 from the rear perimeter 109 of board 101 than the distance L2 in FIG. 1D. The distance L4 differs from the distance L5 due to the position of the user's left foot 106 relative to the horizontal axis 102. The feet 106 in FIG. 1E are partially in the near edge area 110.

Figure 1F:
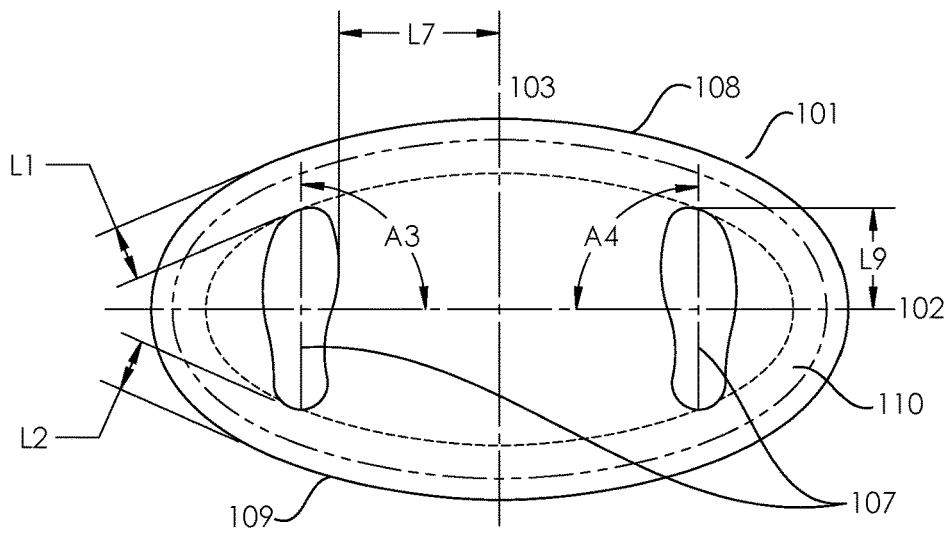
FIG. 1F is a top view of a user with shorter feet standing on the board of FIG. 1D.

FIG. 1F is a top view of a user with shorter feet 107 than the feet 106 of FIG. 1D. The shorter feet 107 are standing on the board 101 of FIG. 1D. The inside edge of the user's left foot 107 is at a greater distance of L7 from the vertical axis 103 than the distance L3 in FIG. 1D. The front edge of the user's left foot 107 is at a shortest distance L1 from the front perimeter 108 of board 101 that is equal to the distance L1 in FIG. 1D and the back edge of the user's foot 107 is at a shortest distance L2 from the rear perimeter 109 of board 101 that is equal to the distance L2 in FIG. 1D. The distance L1 differs from the distance L2 due to the position of the user's left foot 107 relative to the horizontal axis 102. The feet 106 in FIG. 1F are touching the edge of the near edge area 110.

Figure 2A:
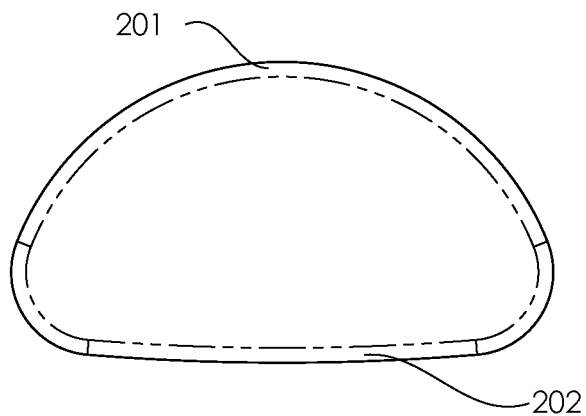
FIG. 2A is a top view of a D shaped mat.
Figure 2B:
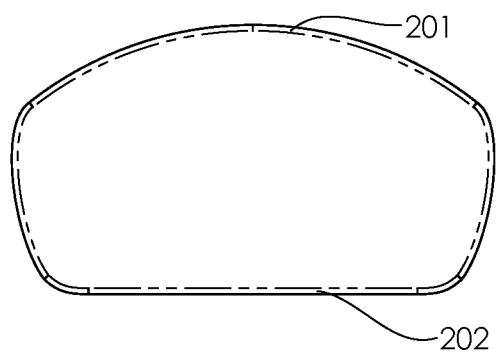
FIG. 2B is top view of an alternate embodiment of a D shaped mat.
Figure 2C:
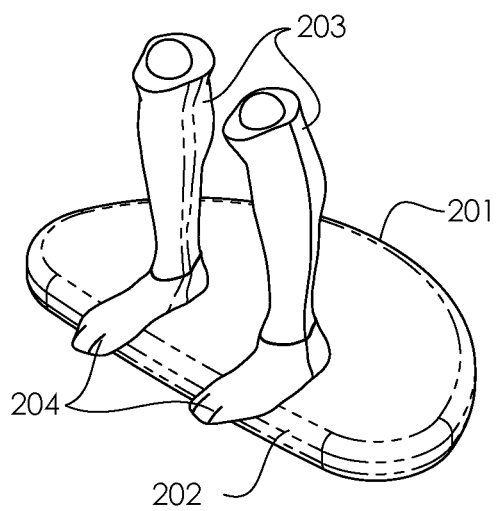
FIG. 2C is an upper isometric view of a user standing on the straight edge of a D shaped mat.
Figure 2D:
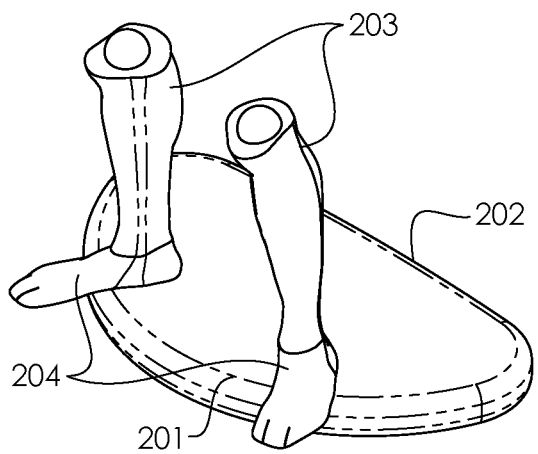
FIG. 2D is an upper isometric view of a user standing on the curved edge along the curved perimeter of a D shaped mat.

FIG. 2A shows a D shape mat that has a curved perimeter 201 of curved edge and a straight perimeter 202 of curved edge. This shape allows a user 203 to position their body in differently useful ways. FIG. 2B shows an alternate D shape, where the curved perimeter 201 of curved edge is more gradual, and there is still a straight perimeter 202 of curved edge on the opposite side. FIGS. 2C and 2D are upper isometric views showing how a user 203 may flip the mat around to stand with their feet 204 pointing outward, either on the curved side 201 or the straight side 202.

Figure 3L:
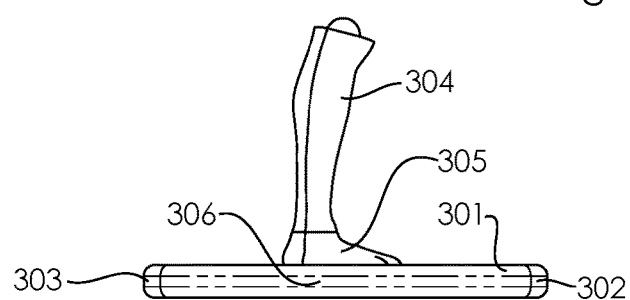
FIG. 3L is a side view of the user standing on the middle of the standing platform in the lengthwise direction of FIG. 3A with their feet angled out slightly along the edge of the board.
Figure 3M:
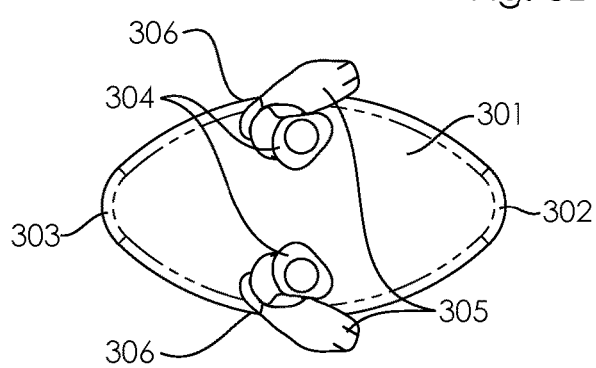
FIG. 3M is a top view of the user standing on the middle of the standing platform in the lengthwise direction of FIG. 3B with their feet angled out slightly along the edge of the board.
Figure 3N:
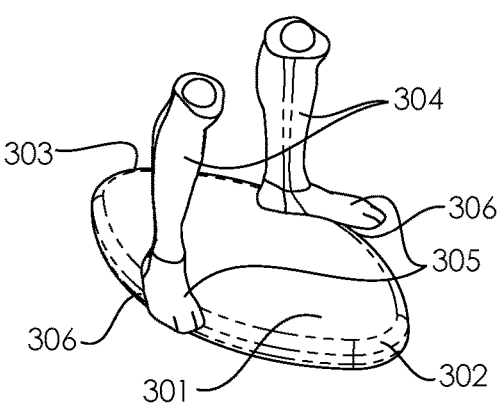
FIG. 3N is an upper isometric view of the user standing on the middle of the standing platform in the lengthwise direction of FIG. 3C with their feet angled out slightly along the edge of the board.

FIG. 3A shows a side view of a user 304 standing with feet 305 oriented straight out on one end 302 of a standing platform board 301 in the lengthwise orientation. FIG. 3B is a top view and FIG. 3C is an upper isometric view of the user 304 standing with feet 305 oriented straight out on one end 302 of the board 301 in the lengthwise orientation of FIG. 3A. FIGS. 3D and 3E are top and upper isometric views of the user 304 standing with feet 305 pointing in along the curved perimeter on one end 302 of the board 301 in the lengthwise orientation of FIG. 3B. FIG. 3F is a side view of the user 304 standing with feet 305 on the opposite end 303 of the board 301 shown in the lengthwise orientation of FIG. 3A. FIGS. 3G and 3H are top and upper isometric views of the user 304 standing with feet 305 pointing out along the edge on the opposite end 303 of the board 301 in the lengthwise orientation of FIG. 3B. FIG. 3I is a side view of the user 304 standing with their feet 305 oriented straight ahead on top of the opposite end 303 of the board 301 of FIG. 3A. FIGS. 3J and 3K are top and upper isometric views of the user 304 standing with their feet 305 oriented straight ahead on top of the opposite end 303 of the board 301 of FIG. 3B. FIG. 3L is a side view of the user 304 standing with feet 305 angled out slightly on the middle edges 306 of the board 301 in the lengthwise orientation of FIG. 3A. FIGS. 3M and 3N are top and upper isometric views of the user 304 standing with feet 305 angled out slightly on the middle edges 306 of the board 301 in the lengthwise orientation of FIG. 3B. The position of FIGS. 3L-3N allows the user's foot arches to conform along the edge of the board. Other shapes may be employed to permit additional flexibility in how a user may adjust their stance and foot placement.

Figure 4A:
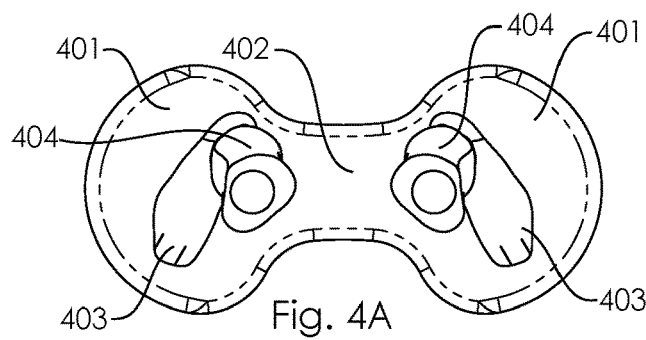
FIG. 4A is a top view of a user standing on the wide section of a tapered platform.
Figure 4C:
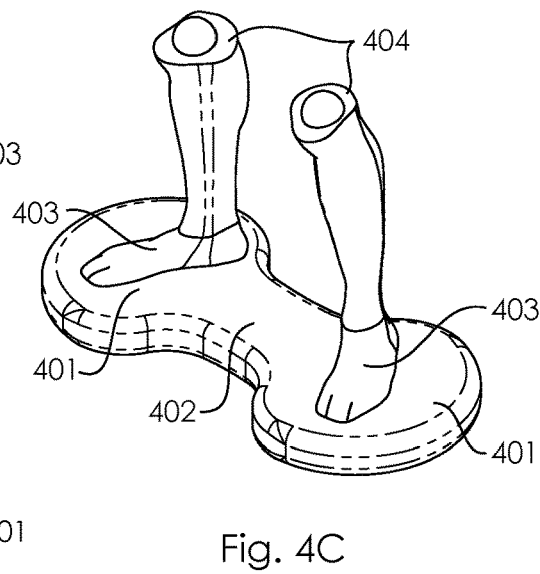
FIG. 4C is an upper isometric view of a user standing on the wide section of the tapered platform of FIG. 4A.
Figure 4B:
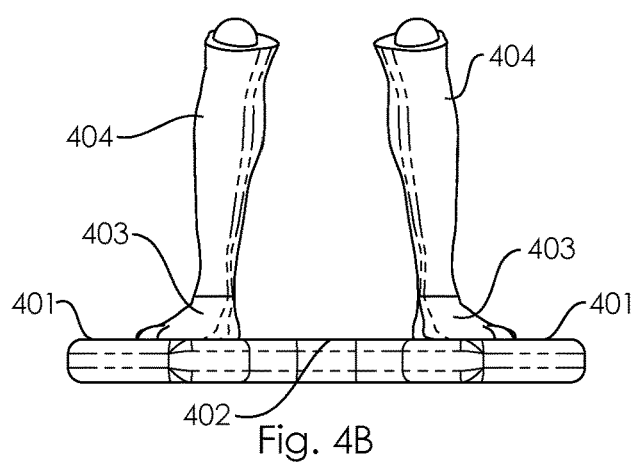
FIG. 4B is a front view of a user standing on the wide section of the tapered platform of FIG. 4A.
Figure 4D:
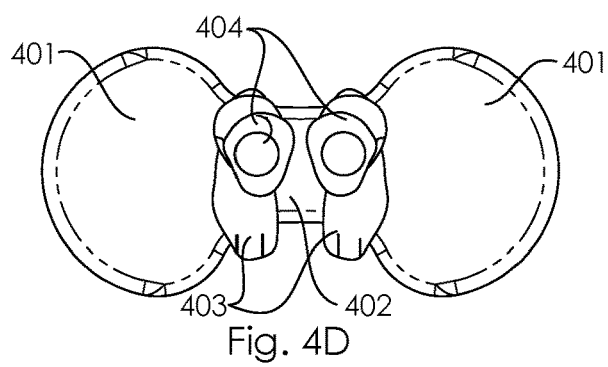
FIG. 4D is a top view of a user standing on the narrow section of the tapered platform of FIG. 4A.
Figure 4E:
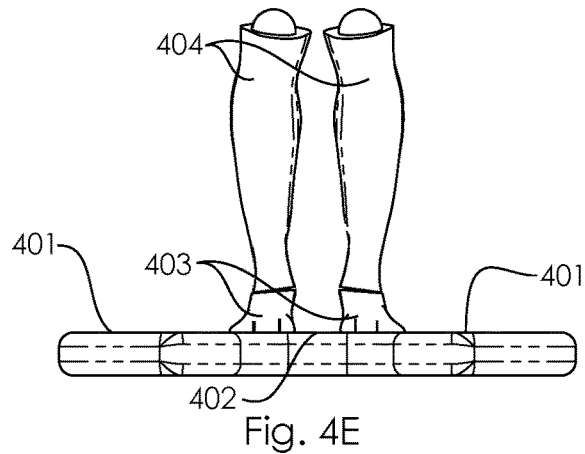
FIG. 4E is a front view of a user standing on the narrow section of the tapered platform of FIG. 4A.
Figure 4F:
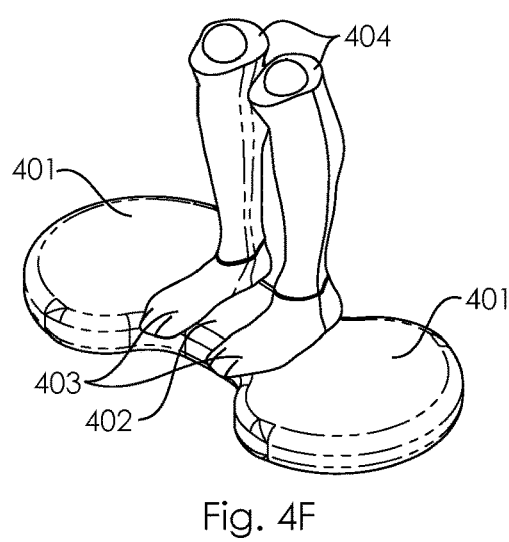
FIG. 4F is an upper isometric view of a user standing on the narrow section of the tapered platform of FIG. 4A.

FIG. 4A shows a user's legs 404 standing on the wider ends 401 of a dumbbell shaped (e.g., hippopede like) platform that has two wider ends 401 and a narrower center section 402. FIG. 4A is a top view, FIG. 4B is a front view, and FIG. 4C is an upper isometric view showing the user's feet 403 each positioned on one of the wide ends 401. This curved and center tapered board allows a variety of places for a user to place their feet. They may stand in the wide end areas, 401 if they want a standard and stable flat surface. FIG. 4D is a top view, FIG. 4D is a front view, and FIG. 4F is an upper isometric view showing the user with both feet 403 positioned in the narrow center section 402 of the dumbbell shaped platform of FIG. 4A. The center section 402 is not as stable and deforms more than on the wide ends 401. It is narrow enough that the user may rock their feet 403 back and forth and the front and back edges of the narrow section 402 deform and rebound with the user's feet 403.

Figure 5A:
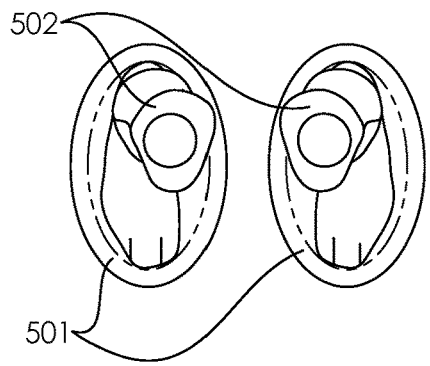
FIG. 5A is a top view of a user standing on a split standing platform with their feet aligned forwards.
Figure 5B:
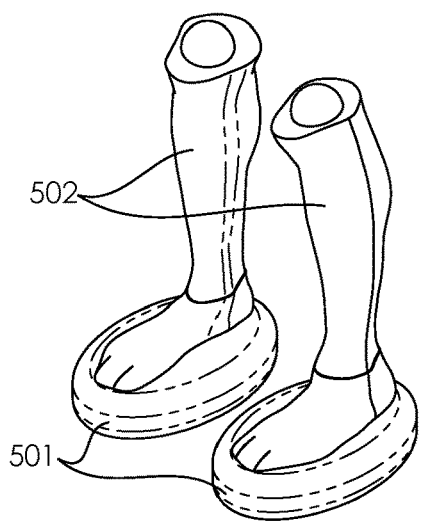
FIG. 5B is an upper isometric view of a user standing on the split standing platform of FIG. 5A with their feet aligned forwards.
Figure 5C:
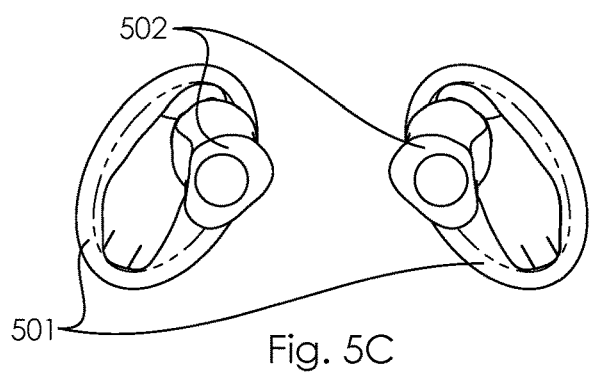
FIG. 5C is a top view of a user standing on the split standing platform of FIG. 5A with their feet aligned outwards.
Figure 5D:
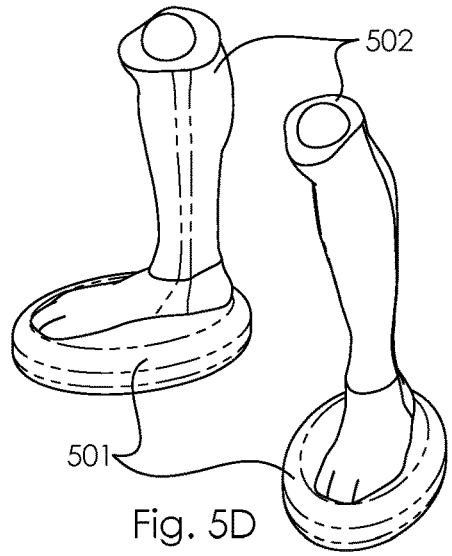
FIG. 5D is an upper isometric view of a user standing on the split standing platform of FIG. 5A with their feet aligned outwards.
Figure 5E:
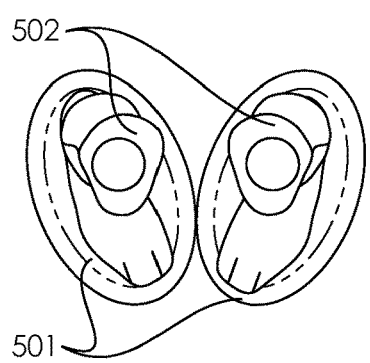
FIG. 5E is a top view of a user standing on the split standing platform of FIG. 5A with their feet aligned inwards.
Figure 5F:
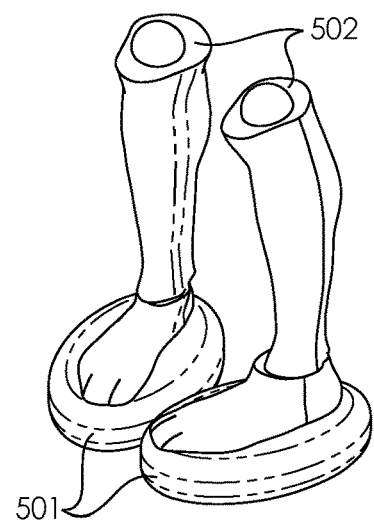
FIG. 5F is an upper isometric view of a user standing on the split standing platform of FIG. 5A with their feet aligned inwards.
Figure 5G:
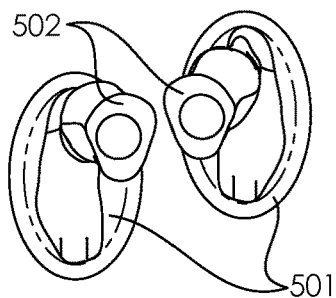
FIG. 5G is a top view of a user standing on the split standing platform of FIG. 5A with their feet offset.
Figure 5H:
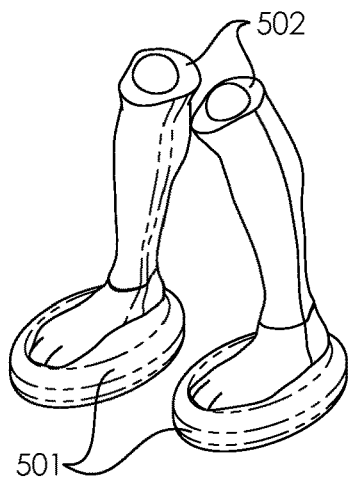
FIG. 5H is an upper isometric view of a user standing on the split standing platform of FIG. 5A with their feet offset.
Figure 5I:
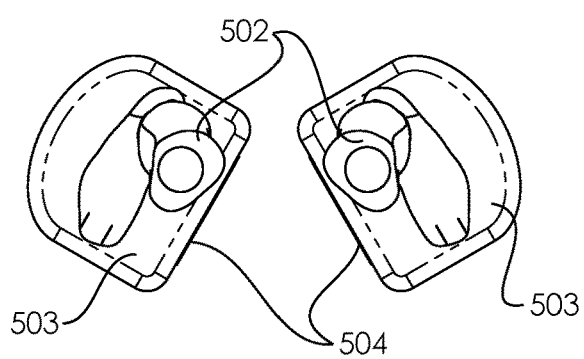
FIG. 5I is a top view of a user standing on a coupling standing platform which is separated and with their feet aligned outwards.
Figure 5J:
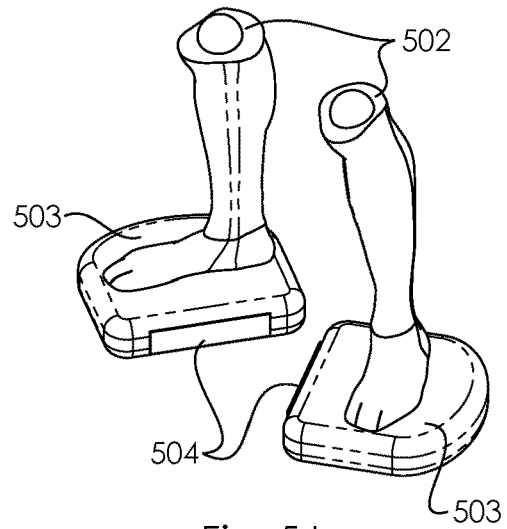
FIG. 5J is an upper isometric view of a user standing on the coupling standing platform of FIG. 5I which is separated and with their feet aligned outwards.
Figure 5K:
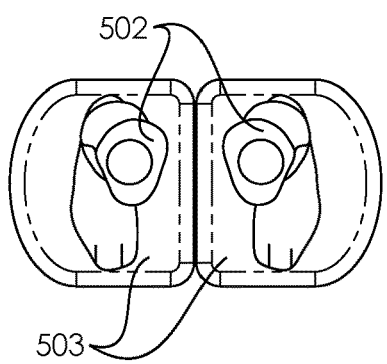
FIG. 5K is a top view of a user standing on the coupling standing platform of FIG. 5I which is joined and with their feet aligned outwards.
Figure 5L:
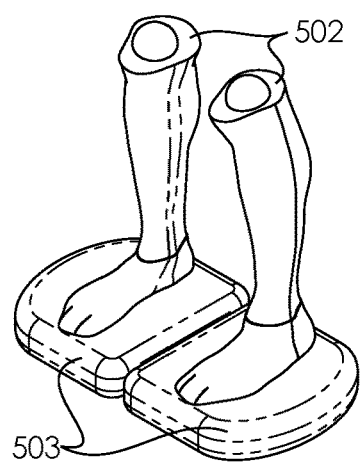
FIG. 5L is an upper isometric view of a user standing on the coupling standing platform of FIG. SI which is joined and with their feet aligned outwards.

FIG. 5A is a top view and FIG. 5B is an upper isometric view showing a user's legs 502 standing on two separate platforms 501. The separate platforms 501 permit the user to position their legs 502 in any orientation they please. FIG. 5C is a top view and FIG. 5D is an upper isometric view showing the platforms 501 of FIG. 5A spread apart and pointed outward. This lets the user position their legs 502 in a wider stance. FIG. 5E is a top view and FIG. 5F is an upper isometric view showing the platforms 501 of FIG. 5A brought together and pointed in. This setup allows the user to position their legs 502 close together. FIG. 5G is a top view and FIG. 5H is an upper isometric view showing the platforms 501 of FIG. 5A offset front and back which allows the user to place one foot in front of the other. FIG. 5I shows different separate pads 503 which have Velcro® type fasteners 504 on the inside edges. Alternatively, microsuction tape may be used instead of Velcro® fasteners 504. This allows the two coupling standing platform pieces 503 to be separated and also attached, depending on the position the user wants. FIG. 5I is a top view and FIG. 5J is an upper isometric view showing the pads 503 separated and the user standing with their legs 502 apart. FIG. 5K is a top view and FIG. 5L is an upper isometric view showing the pads 503 of FIG. 5I attached, and the user standing with their legs 502 closer together and facing forwards. Varying standing position throughout the day is beneficial for the user, and the separate pads 501 and 503 permit many different positions.

Figure 6A:
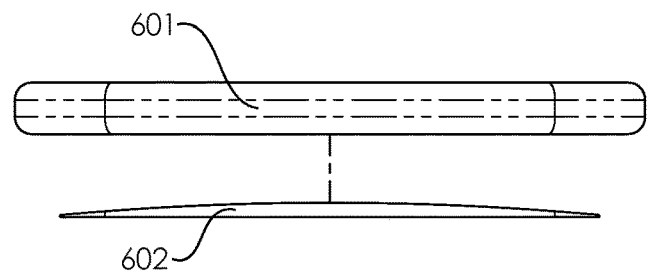
FIG. 6A is a front exploded view of a flat inflatable platform and a rigid curved arch.
Figure 6B:
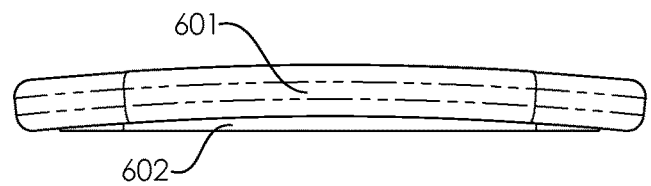
FIG. 6B is a front view of the flat inflatable platform of FIG. 6A resting on the rigid curved arch of FIG. 6A.
Figure 6C:
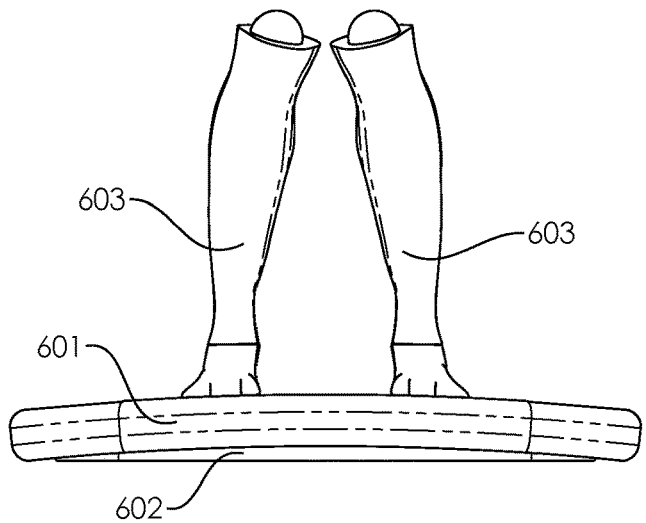
FIG. 6C is a front view of a user standing on the flat inflatable platform attached to the rigid curved arch of FIG. 6B.
Figure 6D:
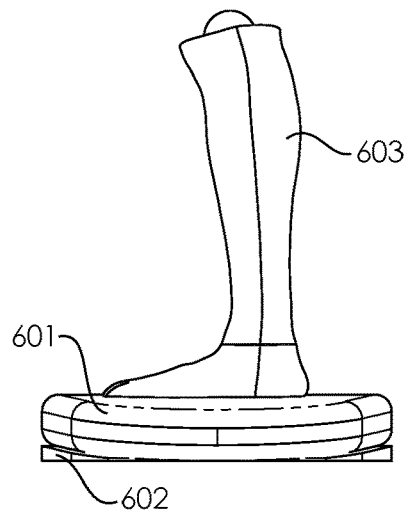
FIG. 6D is a side view of a user standing on a flat inflatable platform attached to a rigid convexly curved arch.
Figure 6E:
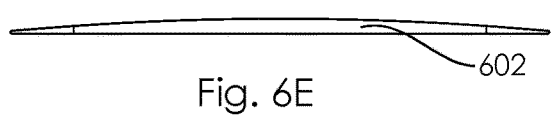
FIG. 6E is a front view of the rigid convexly curved arch of FIG. 6D.
Figure 6F:
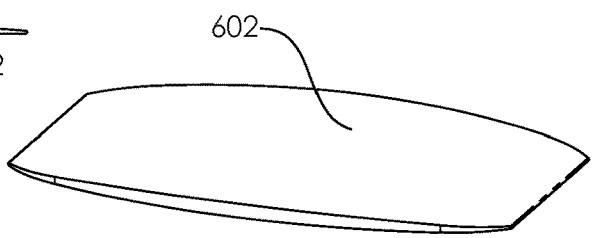
FIG. 6F is an angled view of the rigid convexly curved arch of FIG. 6D.
Figure 6G:
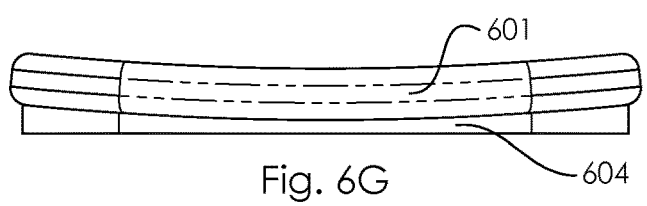
FIG. 6G is a front view of a flat inflatable platform attached to a concave rigid curved arch.

FIG. 6A shows a front exploded view of a flat inflatable standing platform 601 and a rigid curved arched plate 602 with a convexly curved arched upper surface and a flat lower surface. The rigid arched plate 602 is an accessory that helps align the feet and ankles of a user who tends to over pronate. FIG. 6B shows a front view of the standing platform 601 resting on the rigid arched plate 602 of FIG. 6A. As seen, the platform 601 bottom surface curves to conform to the upper arch of the plate 602, this results in a similar curvature at the top surface of the platform 601. The platform may be attached in a variety of ways including Velcro® type fasteners, magnets, adhesive, clips that attach to the ends of the board, and fasteners that are attached to the board. FIG. 6C is a front view showing that when a user 603 stands on the curved top surface of the standing platform 601 attached to the rigid curved arch 602 of FIG. 6B it compensates for the user's foot pronation and aligns their feet more properly. FIG. 6D is a side view of a user 603 standing on a flat inflatable platform 601 attached to a rigid convexly curved arch 602. FIG. 6E is a front view of the rigid convexly curved arch 602 of FIG. 6D. FIG. 6F is a side view of the rigid convexly curved arch 602 of FIG. 6D. FIG. 6G is a front view of a flat inflatable platform 601 attached to a concave rigid curved arch 604. The concave rigid curved arch 604 is similar to convexly curved arch 602 of FIG. 6D, but it has a concavely curved upper surface, which can be utilized to respond to those users whose feet over supinate. Supination (or underpronation) is the insufficient inward roll of the foot after landing. This places extra stress on the foot and can result in knee, plantar fasciitis, and Achilles damage and injury. The disclosed device may be configured to alleviate the effects of over supination as well. The arched plate 602 may also be semi-rigid so long as it similarly elevates the mat in the manner described.

Figure 7A:
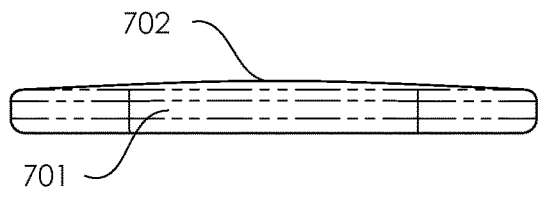
FIG. 7A is a front view of a mildly convexly curved standing platform.
Figure 7B:
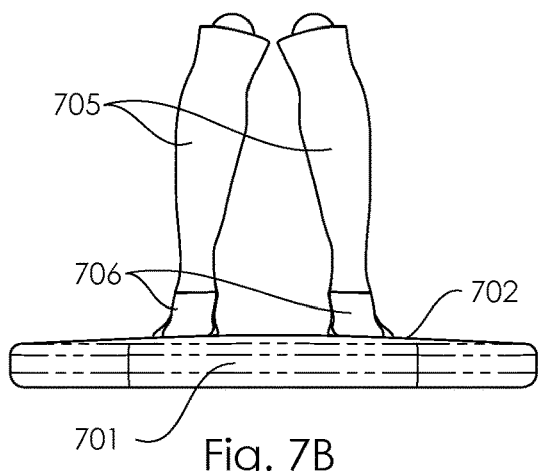
FIG. 7B is a front view of a user standing on the mildly convexly curved standing platform of FIG. 7A.
Figure 7C:
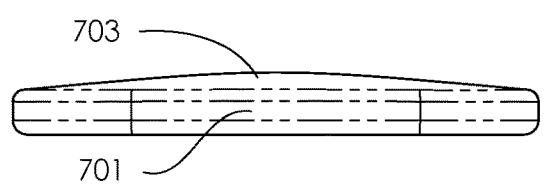
FIG. 7C is a front view of a moderately convexly curved standing platform.
Figure 7D:
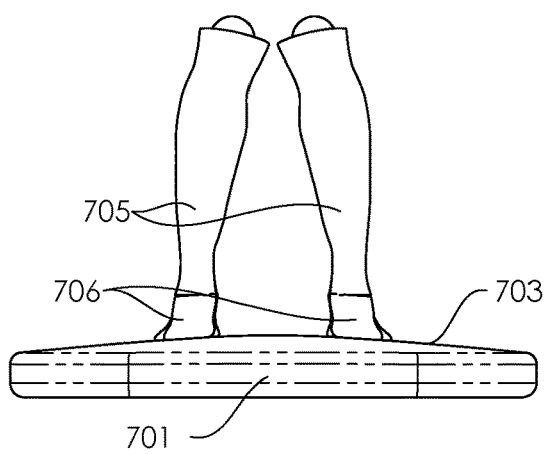
FIG. 7D is a front view of a user standing on the moderately convexly curved standing platform of FIG. 7C.
Figure 7E:
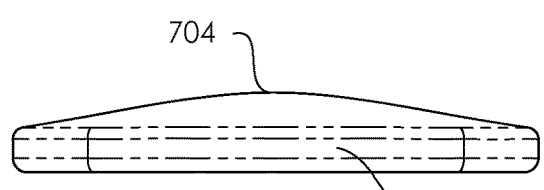
FIG. 7E is a front view of a strongly convexly curved standing platform.
Figure 7F:
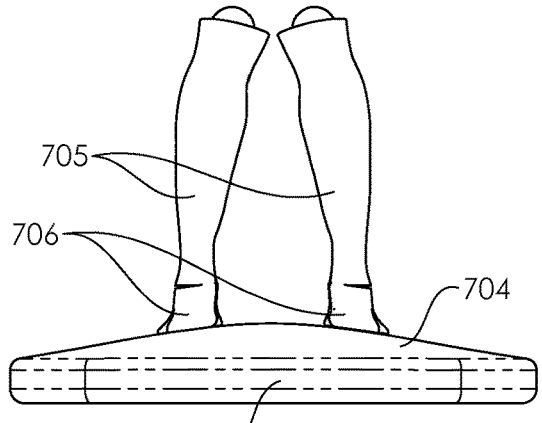
FIG. 7F is a front view of a user standing on the strongly convexly curved standing platform of FIG. 7E.
Figure 7G:
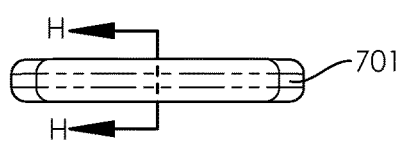
FIG. 7G is side view of a standing platform with a concave surface.
Figure 7H:
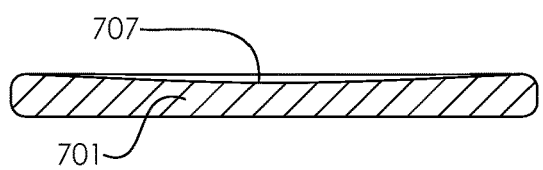
FIG. 7H is a cross-section view along line H of the standing platform of FIG. 7G.

FIG. 7A shows a mildly convexly curved domed platform. The platform base 701 has a mildly convexly curved surface top 702. FIG. 7B shows a front view of the platform base 701 of FIG. 7A with a user 705 with mildly pronated feet 706 adjusted out by the mildly convexly curved surface top 702 (i.e., nearly flat, e.g., with a maximum height less than 130% of the height at the edge band). When the user stands on and applies weight to the platform 701, the surface top 702 deforms slightly and results in properly aligned feet 706. For some users, if there is no curved surface (i.e., the surface of platform base is flat), the feet 706 may tend to over pronate or over supinate which disrupts proper body posture. FIG. 7C shows a front view of a platform base 701 with a moderately convexly curved surface 703 (i.e., less close to flat, e.g., with a maximum height between 130% and 160% of the height at the edge band). FIG. 7D shows a front view of the platform base 701 of FIG. 7C with a user 705 with moderately pronated feet 706 standing on the platform surface 703. FIG. 7E shows a front view of a platform base 701 with a strongly convexly curved surface 704 (i.e., least close to flat, e.g., with a maximum height greater than 160% of the height at the edge band). FIG. 7F shows a front view of the platform base 701 of FIG. 7E with a user 705 with strongly pronated feet 706 standing on the platform surface 704. The amount of surface curvature, including whether it is convex or concave, may be optimized for different users 705 and different pad firmnesses. The user's weight and feet play a part in determining the correct surface curvature. A soft pad requires a larger surface curvature to end up in the neutral position when weight is applied. FIG. 7G is side view of a standing platform 701 with a concave surface top. FIG. 7H is a cross-section view along line H of the standing platform 701 of FIG. 7G with a concave surface top 707. When the user 705 of FIG. 7F stands on the concave surface top 707 of FIG. 7H, the user's feet 706 of FIG. 7F tilt in the opposite direction from the convex surface tops 702 of FIG. 7B, 703 of FIG. 7D, and 704 of FIG. 7F to correct the over supination of the feet.

FIG. 8A is a side view of a user standing on a standing platform 801 with their feet 803 angled off the front conforming and collapsible edge 805 of the board. The ground 804 supports the toes of the feet 803. FIG. 8B is an upper isometric view showing the feet 803 off the front conforming collapsible edge 805 of the standing platform 801. FIG. 8C is a side view of a user standing on a standing platform 801 with their feet 803 angled up onto the rear conforming and collapsible edge 806 of the board. The ground 804 supports the heel of the foot. FIG. 8D is an upper isometric view showing the feet 803 tilting up onto the back conforming collapsible edge 806. Being able to stretch on both sides of the board allows the user to stretch different parts of their legs 802 all while facing forward at their desk.

FIGS. 8E and 8F are respectively a side and an upper isometric view of a user stretching their legs 802 with their feet 803 pointed down off the front of a standing platform 801 while balancing the standing platform 801 on its front side rocking region 809 that contains the center of a collapsed flat section of length L1 and lifting the rear edge 806 off the ground 804. The front side rocking region 809 compresses in response to the downward force of the user's feet 803 which smoothes the transition to the curved edge by increasing the effective rocking region. FIGS. 8G and 8H are respectively a side and an upper isometric view of a user stretching their legs 802 with their feet 803 pointed up on the back of a standing platform 801 while balancing the standing platform 801 on its rear side rocking region 810 that contains the center of a collapsed flat section of length L2 and lifting the front edge 805 off the ground 804. The rear side rocking region 810 compresses in response to the downward force of the user's feet 803 which smoothes the transition to the curved edge by increasing the effective rocking region.

FIG. 8I is a front view of a user straddling a standing platform 801 with their legs 802 and feet 803 apart and rocking the standing platform 801 up onto the user's right side rocking region 807 that contains the center of a collapsed flat section of length L3 and lifting the user's left side rocking region 808 off the ground 804. While not shown here and elsewhere, the feet 803 also compress into the top surface of platform 801. The user's right side rocking region 807 compresses in response to the downward force of the user's right foot 803 which smoothes the transition to the curved edge by increasing the effective rocking region. FIG. 8J is a front view of a user straddling a standing platform 801 with their legs 802 and feet 803 apart and rocking the standing platform 801 up onto the user's left side rocking region 808 that contains the center of a collapsed flat section of length L4 and lifting the user's right side rocking region 807 off the ground 804.

Figure 9B:
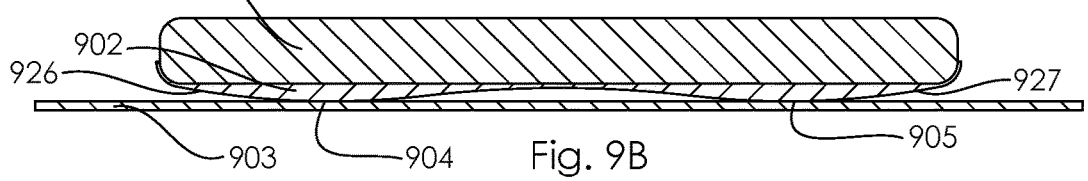
FIG. 9B is a front cross-section view along line B of the standing platform of FIG. 9A.

FIGS. 9A-9H show a standing platform 901 with a rockable base 902 attached. FIG. 9A is a side view of a standing platform 901 with a rockable base 902 with variable rigidity and flexibility that is on a floor 903. FIG. 9B is a front cross-section view along line B showing how the standing platform 901 fits into the rockable base 902. The rockable base 902 is a relatively rigid material of sufficient rigidity to permit a rocking motion (e.g., the base should be at least as rigid as the board, having a bending rigidity of at least 11 lb×in$^{-1}$ and a flexural rigidity of at least 4,000 lb×in$^2$). The base 902 contacts the floor 903 at two lines of contact 904 and 905 on opposite sides of the base 902. Platform 901 has minimal surface area touching between lines of contact 904 and 905 and the floor 903. In applications where floor 903 may be wet or covered with any liquids, such as near a swimming pool, this design provides a reduced slip hazard by lines of contact 904 and 905 pushing away water with little resistance due to the adjacent empty volumes beneath the hoard into which the lines of contact 904 and 905 push and/or displace water or other liquids. The rockable base 902 has two rocking regions: a right rocking region 926 that begins at line of contact 904 and extends outward and a left rocking region 927 that begins at opposite line of contact 905 and extends outward. The rocking base 902 is sized such that the outer perimeter is substantially coextensive with the outer lower perimeter of the platform 901. The lines of contact 904 and 905 extend in a vertical direction (when the base is horizontal) and the base 902 tapers thinner away from the lines of contact 904 and 905 toward the perimeter of the base 902 to provide a rocking region. The rigidity may be variable by utilizing different materials such as foams, fillers, plastics, woods, fiberglass, carbon fiber, metal, aramid fibers and the like, or other woven and non-woven materials, or even bamboo, just to name a few.

Figure 9C:
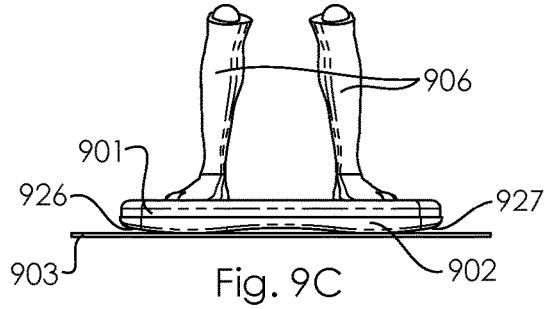
FIG. 9C is a front view of a user standing on a standing platform with a rocking base in the centered position.
Figure 9D:
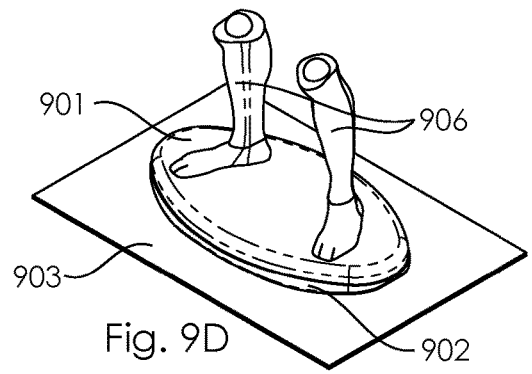
FIG. 9D is an upper isometric view of the user standing on the standing platform of FIG. 9C.
Figure 9E:
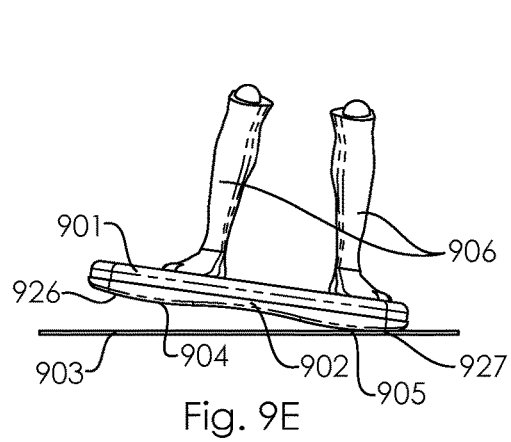
FIG. 9E is a front view of a user standing on a stranding platform with a rocking base with it rocked to the user's left side.
Figure 9F:
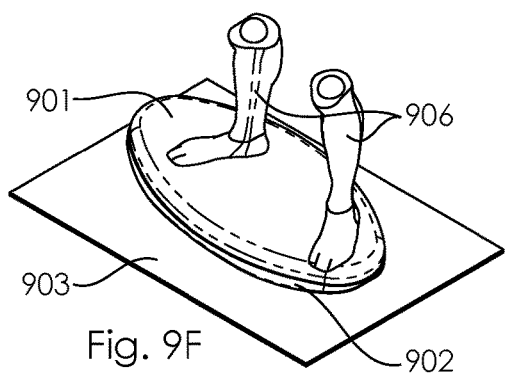
FIG. 9F is an upper isometric view of the user standing on the standing platform of FIG. 9E.
Figure 9G:
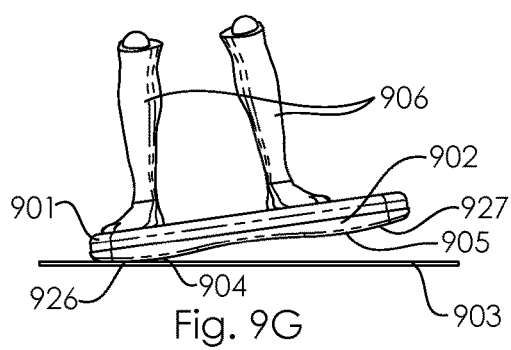
FIG. 9G is a front view of a user standing on a standing platform with a rocking base with it rocked to the user's right side.
Figure 9H:
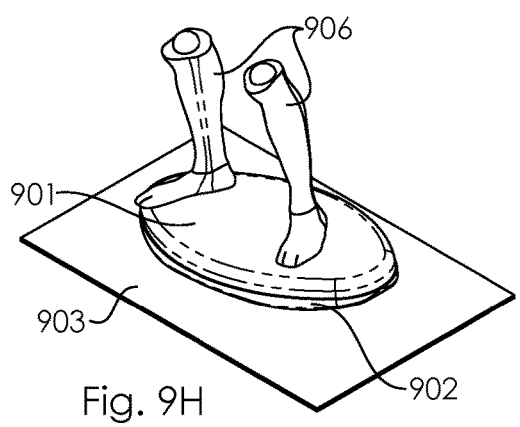
FIG. 9H is an upper isometric view of the user standing on the standing platform of FIG. 9G.

The rocking region may be softer or firmer, or portions of the rocking level may be made of multiple shore durometers, firmnesses, and/or rigidities. For example, the external ends may be fabricated of softer resilient material, while the more central area is more rigid for additional support. The central area can also be made flexible such that the board bends some amount when a user stands on it. With a bending board, the location of the two contact points 904 and 905 change the bending characteristics of the board. Changing how far apart they are spaced makes the board either bend more or less, and this can be tuned to compensate for a user with misaligned joints. The two contact points 904 and 905 contact the floor 903. FIG. 9C is a front view and FIG. 9D is an upper isometric view showing the user standing with their legs 906 positioned above the contact points so the platform 901 is balanced and level. FIG. 9E is a front view and FIG. 9F is an upper isometric view showing the user with their weight shifted to the user's left of the contact point 905. This causes the platform 901 to rotate up along the rocking region, causing a rocking action. FIG. 9G is a front view and FIG. 9H is an upper isometric view showing the user with their weight shifted to the user's right, on the outside of the contact point 904. This causes the platform 901 to tilt upward on the opposite side's rocking region. The user is thus able to rock back and forth by shifting their weight, which provides an opportunity for them to move instead of standing statically. The platform is sufficiently stable such that it remains relatively non-moving when rocking is not desired or initiated.

Figure 9I:
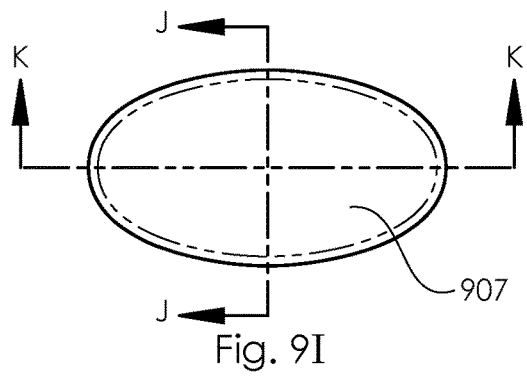
FIG. 9I is a top view of a standing platform with a catenary rigid or semi-rigid rocking base.
Figure 9J:
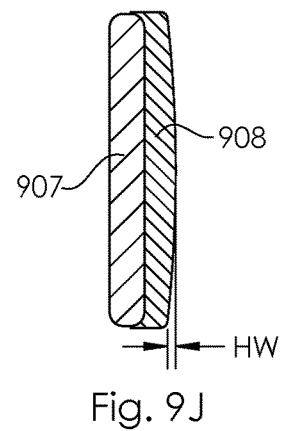
FIG. 9J is a side cross-section view along line J of the standing platform of FIG. 9I.
Figure 9K:
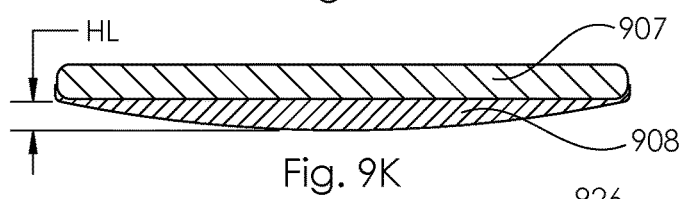
FIG. 9K is a front cross-section view along line K of the standing platform of FIG. 9I.

There are many types of surface curves suitable for sloped tilting or rocking. FIGS. 9I-9K show a board 907 that has a revolved catenary curve surface base 908, providing a rocking region all along the bottom surface of the board 907. The base 908 may be constructed of either rigid or semi-rigid material and is rigid enough to facilitate a rocking motion. The revolved catenary curvature is advantageous because it facilitates, for a non-circular board perimeter, greater tilt in a side-to-side direction than in a front-to-back direction. FIG. 9I is a top view of a standing platform 907 with a catenary rigid or semi-rigid rocking base. FIG. 9J is a side cross-section view along line J of the standing platform 907 of FIG. 9I showing the catenary curve surface base 908. FIG. 9K is a front cross-section view along line K of the standing platform 907 of FIG. 9I with the catenary curve surface base 908 and shows that the lengthwise sloped tilting height HL allows the user to rock the board lengthwise higher than they can with the lesser widthwise sloped tilting height HW shown in FIG. 9J. FIG. 9K also shows the catenary curve surface base 908 gets thin towards the ends of the board. The thickness of the surface base 908 can be designed so it tapers towards the ends, which permits some amount of flex and movement. The right amount of flexibility allows engaging movement while still providing enough rigidity to rock the board back and forth. FIG. 9K shows the platform 907 sitting in the rocking base 908. A friction fit is one way to attach the two, but other more secure ways may be employed. One example is to put both the platform 907 and the base 908 into a skin that has some means of opening such as a zipper, Velcro®, or other method. When the board 907 is inflated, it tensions the skin, and then the board 907 and base 908 are firmly connected. Skins can be used to contain boards and bases of any size or shape including round ones. When the board 907 is an embodiment with a compressible material (e.g., an inflatable or foam material), it desensitizes the rocking feeling of the rigid base 908. This is advantageous for providing a smoother and easier to control rocking feeling.

Figures 9L, 9M:
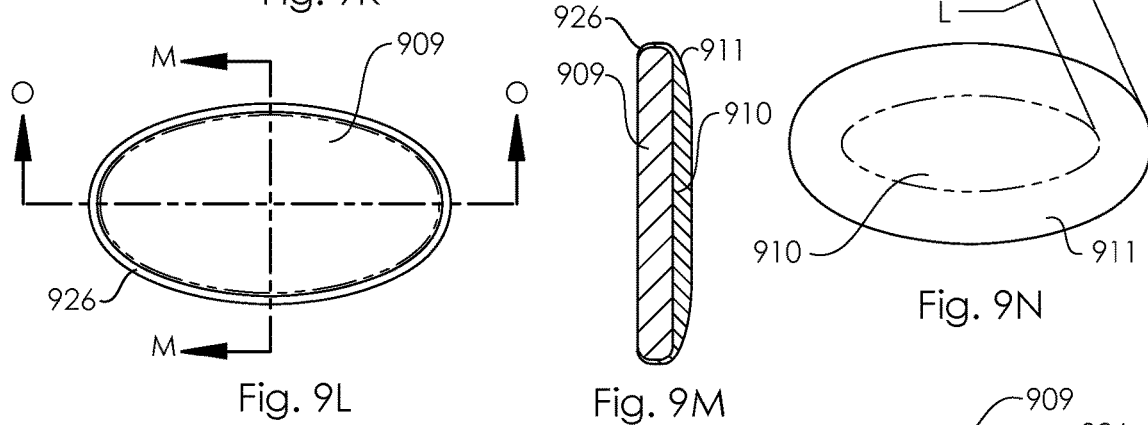
FIG. 9L is a top view of a standing platform with an elliptical edge rigid or semi-rigid rocking base.
FIG. 9M is a side cross-section view along line M of the standing platform of FIG. 9L.
Figure 9N:
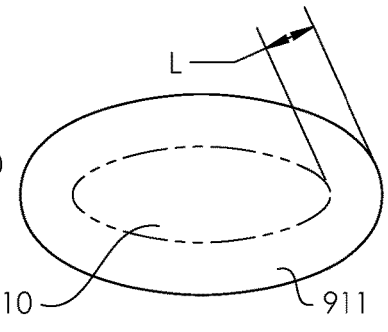
FIG. 9N is a bottom view of the standing platform of FIG. 9L.
Figure 9O:
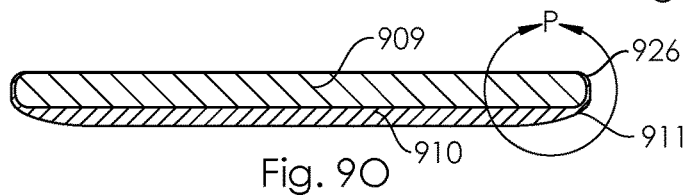
FIG. 9O is a front cross-section view along line O of the standing platform of FIG. 9L.
Figure 9P:
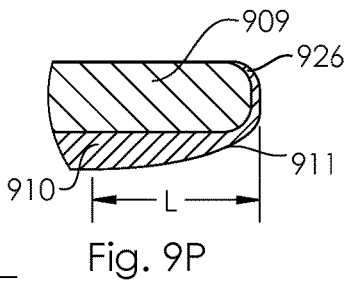
FIG. 9P is a front cross-section view showing further details of the region within the area P of the standing platform of FIG. 9O.

FIGS. 9L-9P show a board with a flat center surface base 910 that has an elliptical curve 911 along the perimeter as the bottom surface transitions to the edge (i.e., a cross-sectional profile taken at any point around the board perimeter exhibits an elliptical curve along the bottom of the board with a constant semi-major axis of length L). The base 910 may be constructed of either rigid or semi-rigid material and is rigid enough to facilitate a rocking motion. FIG. 9L shows a top view of a standing platform 909 with an elliptical edge rigid or semi-rigid rocking base and base edges 926. FIG. 9M is a side cross-section view along line M of the standing platform 909 of FIG. 9L showing base 910, edge curve 911, and base edges 926. As seen in FIG. 9N, a bottom view of the standing platform edge curve 911 of base 910 of FIG. 9L, the length L of the curve 911 is constant all along the board perimeter. This provides a consistent sloped tilting feel in all directions. The flat center section 910 provides a stable base surface, so the user only tilts the board when the user intends it. FIG. 9O is a front cross-section view along line O of the standing platform 909 of FIG. 9L showing base 910, edge curve 911, and base edges 926. FIG. 9P is a front cross-section view showing further details of the region within the area P of the standing platform 909 of FIG. 9O and shows a close-up of the elliptical edge curve 911 of length L that forms a rocking region and may effectively be extended if base 910 is compressible. The edges of the base 926 curl up over the edges of the platform 909. This is one way to attach the base 910 to the platform 909. The uninflated platform is placed inside the base and then inflated so that it is constrained by the base edges 926. The base edges 926 are made to be flexible so they bend along with the platform edge when the user steps on them. The base edges 926 can be made flexible by thinner geometry or by being made out of a different material (either through double shot molding or assembly) that is less stiff than the base 910.

Figure 9Q:
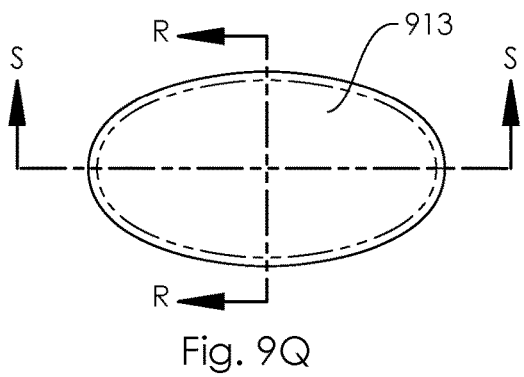
FIG. 9Q is a top view of a standing platform with a variable ellipse profile rigid rocking base.
Figure 9R:
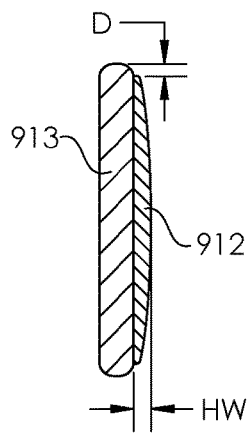
FIG. 9R is a side cross-section view along line R of the standing platform of FIG. 9Q.
Figure 9S:
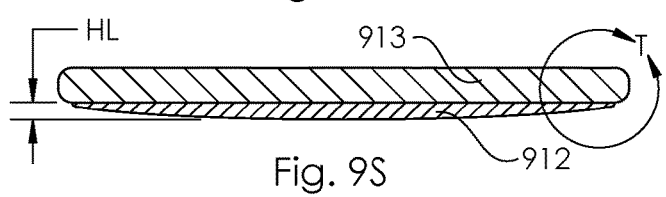
FIG. 9S is a front cross-section view along line S of the standing platform of FIG. 9Q.
Figure 9T:
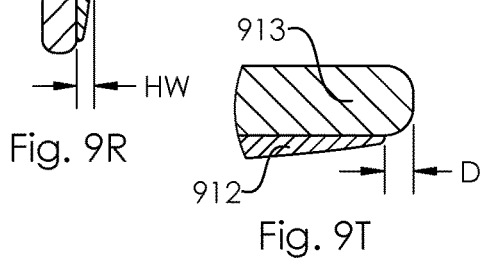
FIG. 9T is a front cross-section view showing further details of the region within the area T of the standing platform of FIG. 9S.

FIGS. 9Q-9T show a board that has a constant height (i.e., HW is equal to HL) elliptical curve base 912, creating a rocking region all along the bottom surface of the board. The base 912 may be constructed of either rigid or semi-rigid material and is rigid enough to facilitate a rocking motion. This means the eccentricity of the ellipse is variable and changes along the edge of the board because the lengthwise (major axis) surface curve is flatter than the widthwise (minor axis) surface curve. FIG. 9Q is a top view of a standing platform 913 with a variable ellipse profile rigid rocking base. FIG. 9R is a side cross-section view along line R of the standing platform 913 of FIG. 9Q with elliptical edge curve base 912 and a widthwise sloped tilting height HW. FIG. 9S is a front cross-section view along line S of the standing platform 913 of FIG. 9Q with elliptical edge curve base 912 and a lengthwise sloped tilting height HL that is the same height as HW in FIG. 9R. FIG. 9T is a front cross-section view showing further details of the region within the area T of the standing platform 913 of FIG. 9S and shows a close-up of the elliptical edge curve base 912 that includes the rocking region. The difference D is shown in FIGS. 9R and 9T between the shorter span of base 912 and the span of standing platform 913. Alternatively, not shown, the difference may be greater or a smaller than difference D. When rocking, the elliptical edge curve base 912 transitions to the collapsing and confirming top surface 913 to advantageously allow for a smooth transition of the rocking motion between the curvature of edge curve base 912 and the top surface 913.

Figure 9U:
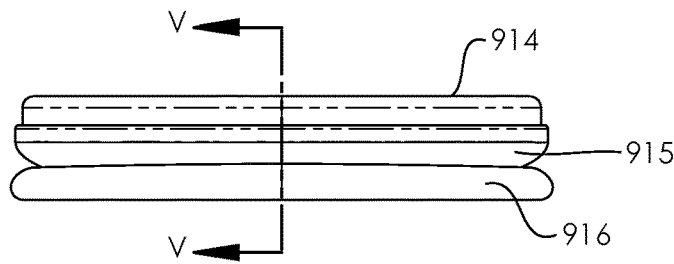
FIG. 9U is a side view of a standing platform with a curved bottom on a toroidal compliant or non-compliant base.
Figure 9V:
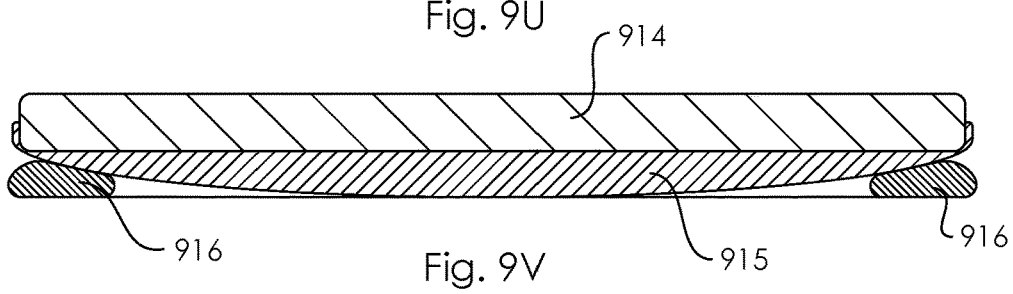
FIG. 9V is a front cross-section view showing further details along line V of the standing platform of FIG. 9U.

FIG. 9U shows a side view of a rocking standing platform that has a standing surface 914, a curved compliant or non-compliant rocking bottom 915, and a toroidal compliant or non-compliant base 916. FIG. 9V shows a front cross-section view showing further details along line V of the standing platform of FIG. 9U with standing surface 914, rocking bottom 915, and toroidal base 916 that shows the curve of the compliant or non-compliant rocking bottom 915. The rocking bottom 915 can be made out of many materials such as plastic, composite including fiberglass and carbon fiber. The plastic can be solid or it can be a lightweight cored out design. The composite can be laminated with different fibers and orientations and also with honeycomb or foam cores to achieve the desired firmness, thickness, and weight. The rocking bottom 915 can be permanently affixed to the standing surface 914 using a method such as adhesive or heat bonding, or the rocking bottom 915 can be attached and unattached, using fasteners, a snap fit, microsuction tape, or Velcro®. FIG. 9V also shows the compliant or non-compliant base 916 is a ring (toroidal) in this embodiment. The base 916, in compliant base embodiments, can be a material that provides resistance or damping such as foam, an air filled bladder, or a liquid filled bladder. Some of these embodiments such as the air filled and fluid filled bladders can be adjusted to tune the response and adjust the amount of resistance or damping. Increasing the pressure of the air or fluid filled complaint base slows and limits the movement of the tilting. The ring can also be made of coil springs, leaf springs, or designed with geometry that results in a spring like resistance. The purpose of the compliant base is to provide resistance to make it harder to tilt the board so it is more stable, or to dampen the motion of the board, so it moves from side to side slower. The base 916 can also be rigid (non-compliant) if the user does not wish to tilt. FIG. 9Y is an exploded upper isometric view of the standing platform shown in FIG. 9U showing the standing surface 914 removed from the compliant or non-compliant rocking bottom 915 which is lifted off of the toroidal compliant or non-compliant base 916.

Another way to alter the level of movement is to utilize an adjustable top surface to modulate or alter the responsiveness of the rocking motion of standing platforms 901, 907, 909, 913, and 914. By adjusting the softness or resilience of the top surface, a user may alter responsiveness of the mat, regardless of the properties of the bottom surface. These top surfaces may be inflated or they may possess adjustable springs similar to that shown in FIG. 24A-24E, or they may be composed of other firmness adjustable materials.

Figure 9W:
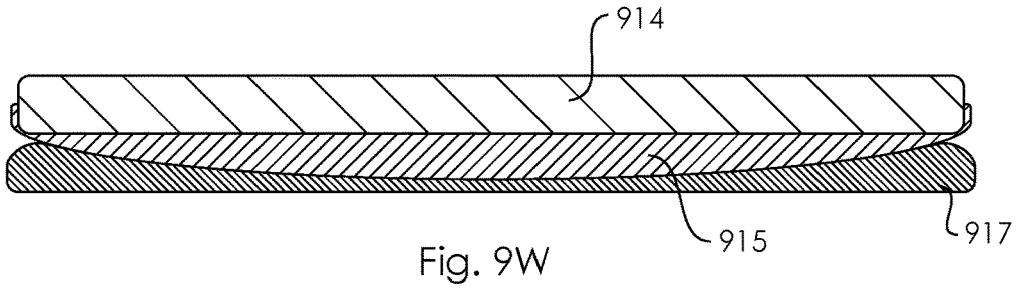
FIG. 9W is a front cross-section view of a standing platform with a curved bottom on a closed compliant or non-compliant base.

FIG. 9W shows a solid closed (non-toroidal) compliant or non-compliant base 917 can be used. This version of the base has a closed flat bottom, and raised edges that contact the compliant or non-compliant rocking bottom 915 and separate it from the ground. The flat bottom is advantageous to protect the floor, such as hard wood, from rubbing, damage, and wear from the friction of the rocking base 915 of the standing surface 914.

Figure 9X:
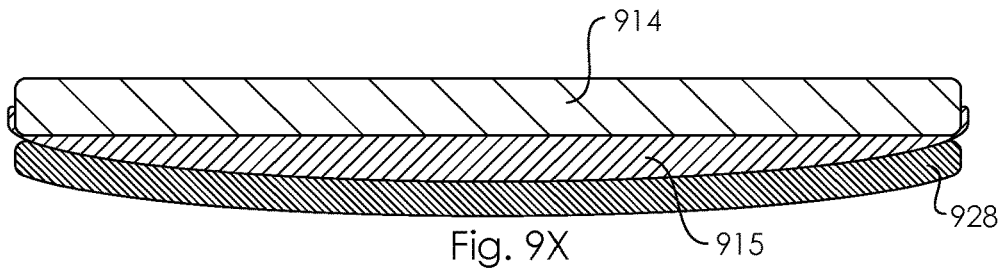
FIG. 9X is a front cross-section view of a standing platform with a curved bottom on a compliant or non-compliant curved base.
Figure 9Y:
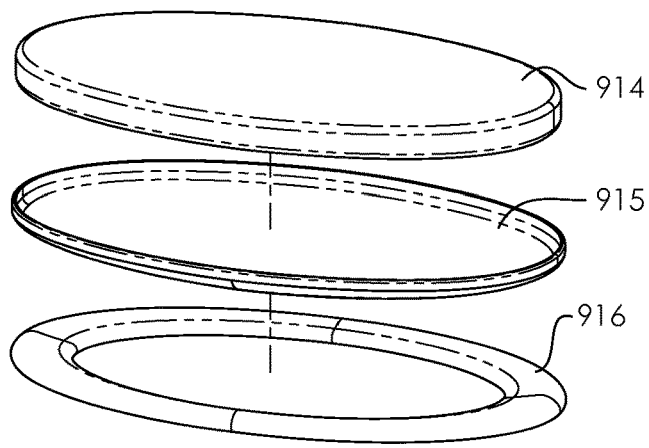
FIG. 9Y is an exploded upper isometric view showing further details of the standing platform of FIG. 9U.

FIG. 9X shows a solid closed (non-toroidal) compliant or non-compliant curved base 928 can be used. This version of the base has a curved bottom that contacts the compliant or non-compliant rocking bottom 915. The curved bottom, when compliant, is useful for protecting the floor from wear from the friction of the rocking base 915 of the standing surface 914. When the base 928 is complaint, it provides some dampening to the rocking while still permitting the user a full tilt and rock. When the base 928 is compliant, the center of the base deforms under a user's weight and creates a more stable flat area. When enough weight is shifted to the side of the board, the whole system still permits the user to tilt and rock.

Figure 9Z:
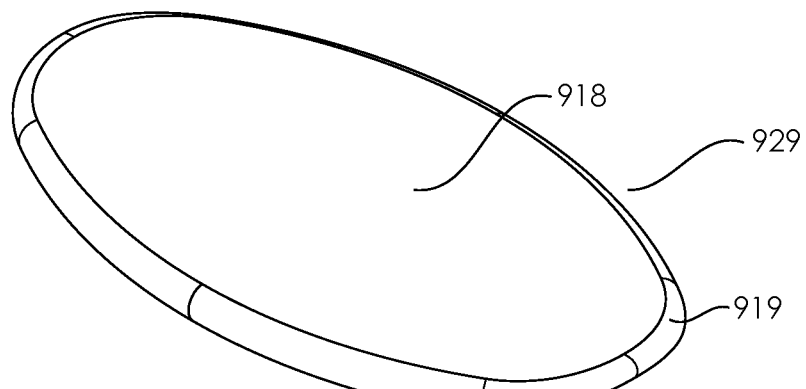
FIG. 9Z is an upper isometric view of a drop stitch inflatable platform with a curved bottom edge.
Figure 9A:
Figure 9A:
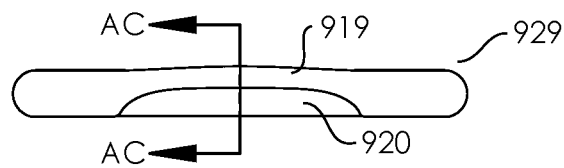
Figure 9A:
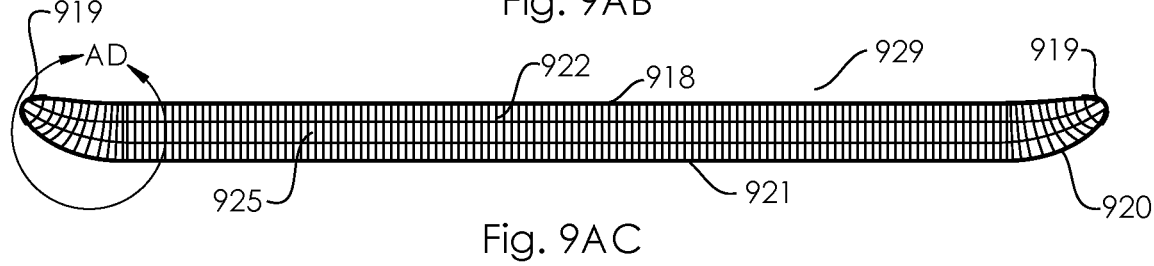
Figure 9A:
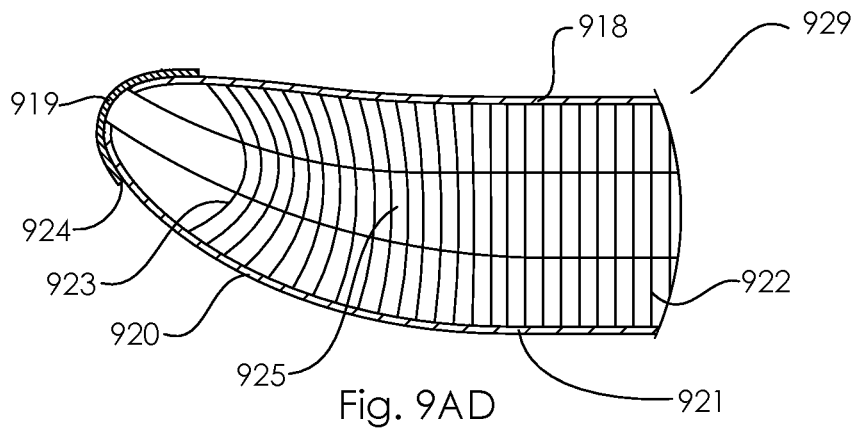

FIGS. 9Z-9AD show a platform that has a curved bottom surface as it transitions to the edge that is created using the drop stitch inflatable technology alone, and no rigid base is required. FIG. 9Z is an upper isometric view of a drop stitch inflatable platform with a curved bottom edge 929. It is formed of a drop stitch top surface 918, a drop stitch bottom surface 921, a side seam tape 919, and the internal drop stitch fibers 922. The flexible fabric material of the top surface 918, bottom surface 921, and side seam tape 919 are non-elastic and generally do not stretch and therefore help to limit and control the geometry of the resulting device. The side seam tape 919 overlaps the edges of the top surface 918 and the bottom surface 921 to leave a center gap area 925 between these two surface edges where there is a middle non-overlapping region of side seam tape 919, with the gap area 925 narrowing with trimmed side 924 of seam tape 919. Advantageously, towards the two ends of the major axis of the elliptical perimeter, the drop stitch top surface 918 is trimmed smaller than the bottom surface 921 and the side seam tape 919 is cut narrower at trimmed side 924. As shown in FIG. 9AA, this tapering of the seam 919 width is done by trimming off some of the bottom portion of the side seam 919 at trimmed side 924 in order to leave the top surface 918 generally flat while curving up the bottom surface 921 at curved bottom portion 920 that affixes along the trimmed side 924 of the seam 919. This is also shown in FIG. 9AB, where the tapering of the seam 919 at trimmed side 924 of FIG. 9AA curves the bottom surface 921 of FIG. 9AC making it visible in the side view at curved bottom portion 920. FIG. 9AC is a front cross-section view along line AC of the inflatable platform of FIG. 9AB showing a center gap area 925 between a top surface 918 and a bottom surface 921, a side seam tape 919, curved bottom portions 920, and internal drop stitch fibers 922. FIG. 9AD is a front cross-section detailed view of the region within the area AD of the inflatable platform of FIG. 9AC showing the center gap area 925 between the top surface 918 and the bottom surface 921, the side seam tape 919 with a trimmed side 924, the curved bottom portion 920, and internal drop stitch fibers 922 including untaught fibers 923. As shown in FIGS. 9AC and 9AD, together in concert, the differing top and bottom surface areas and tapered seam width at the ends cause the bottom surface 921 to curve upward at the two curved bottom portions 920 that curve upward with a smaller radius than the larger radius curvature of the top surface 918 edge. This advantageously leaves a larger flat surface area on the top 918 than the bottom 921. Where the side seam tape 919 is tapered to narrow it at trimmed side 924, so as to pinch the bottom and top surfaces closer together at the ends, the drop stitch fibers 923 are not taught, but relaxed, as detailed in FIG. 9AD. The resulting curved bottom shape provides a rocking region and also enhances the ability to rock the platform. FIG. 9AC shows only the ends of the board curving up, however, the board can also be made where the edges curve up around the entire perimeter. This improves the rocking abilities of the board in all directions. A specific embodiment that is especially advantageous is a board that is relatively short (between 16 inches and 39 inches in length), and is oblong shape (i.e., a first axis that is substantially longer than and perpendicular to a second axis) such that the width of the board is less than its length. When a board of this general shape has curved edges around the entire perimeter of the board, it permits the user to rock the board up on its edge at any position along the perimeter by using only their feet while standing on the board. The length is such that with a comfortable stance, the user's feet are near the ends of the board so they are able to rock side-to-side. The width is less than the length so that a typical sized foot of a user may be placed close enough, at, or overlapping both the front and rear edges of the board so the user can rock the board front and back and side-to-side only using their feet while standing on the board.

Figure 10A:
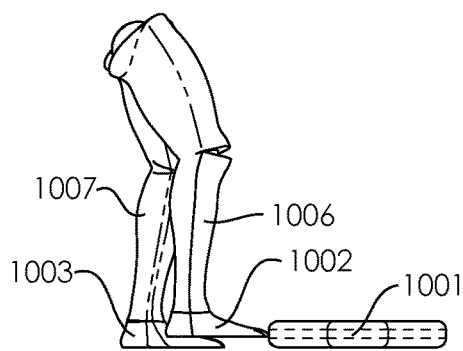
FIG. 10A is a side view of a user preparing to slide a standing platform with their right foot along the back of the board.
Figure 10B:
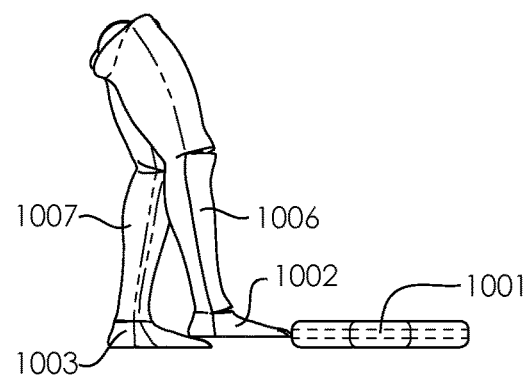
FIG. 10B is a side view of a user sliding a standing platform with their right foot pushing the back of the board.
Figure 10C:
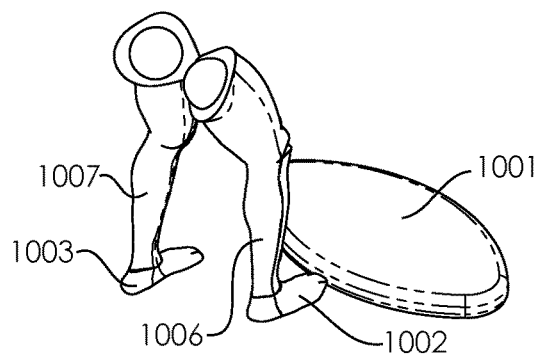
FIG. 10C is an upper isometric view of the user preparing to slide the standing platform of FIG. 10A.
Figure 10D:
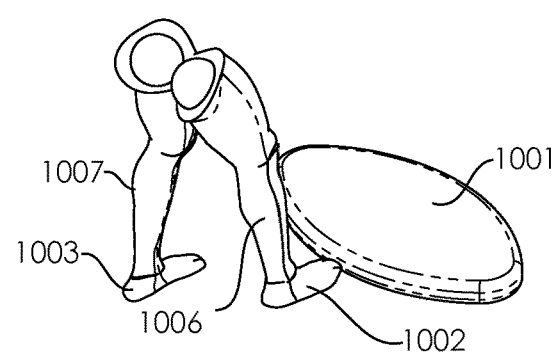
FIG. 10D is an upper isometric view of the user sliding the standing platform of FIG. 10B.
Figure 10E:
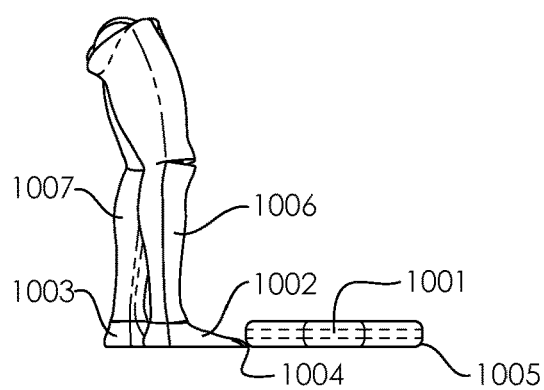
FIG. 10E is a side view showing a user positioning their right foot in the gap between the bottom of the back end edge of a standing platform and the floor.
Figure 10F:
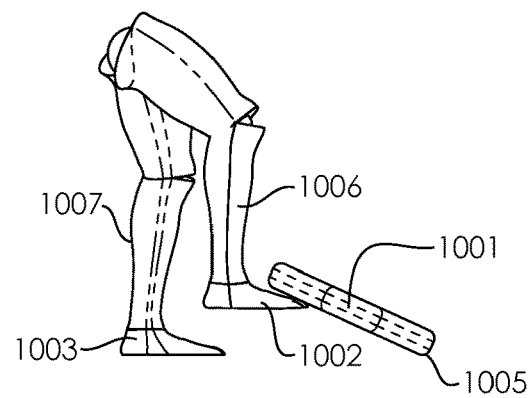
FIG. 10F is a side view of a user flipping a standing platform up using their foot underneath the board.
Figure 10G:
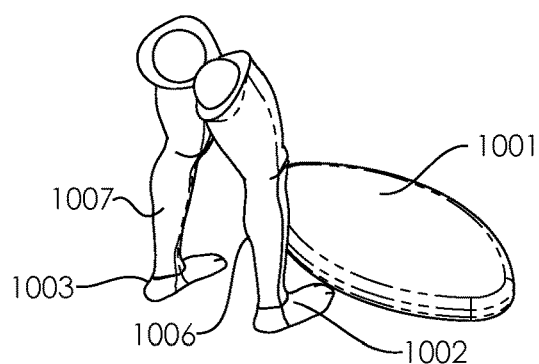
FIG. 10G is an upper isometric view showing a user positioning their right foot in the gap between the bottom of the back end edge of a standing platform and the floor.
Figure 10H:
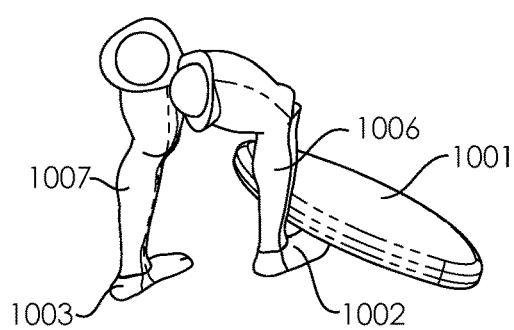
FIG. 10H is an upper isometric view of a user flipping a standing platform up using their foot underneath the board.

FIG. 10A shows a side view of a user standing with their left foot 1003 planted, as shown, and balanced on their left leg 1007, and holding up their right leg 1006, behind the back of a standing platform 1001. FIG. 10B shows a side view of the user pushing the standing platform 1001 by extending their right leg 1006. The standing platform 1001 has a substantially vertically oriented edge (e.g., one that includes bottom edges 1004 and 1005), which is not seen in typical standing platforms. The edge is also thick enough (falls within the disclosed advantageous ranges) that it is easy to slide with one's foot. FIGS. 10C and 10D are upper isometric views showing the sliding motion from an isometric view. FIG. 10E shows a side view of a user positioning their right foot 1002 in the gap in between the floor and the bottom edge 1004 of the standing platform, 1001. The platform has curved edges, so it is possible to wedge one's foot underneath it. FIG. 10F shows a side view of the user lifting the back bottom edge 1004 of the board 1001 by raising the right leg 1006 and pivoting platform 1001 along the opposite bottom edge 1005. This is useful because it allows users to flip the board up and position it vertically against the wall or along the side of a desk without having to bend over to move and place the board with their hands. FIGS. 10G and 10H show the lifting motion from an upper isometric view.

FIG. 11 (comprising FIGS. 11A-11P) illustrates an alternate embodiment to permit flipping up a standing platform 1101 by way of the uniquely compliant characteristics of the standing platform 1101. FIG. 11A is a side view and FIG. 11B is a front view showing the user placing their left leg 1108 on the end of the top surface 1110 of the standing platform 1101. FIG. 11C is a side view and FIG. 11D is a front view showing the user pressing down on the top surface 1110 of the standing platform 1101 with their left leg 1108. The end of the board 1101 deforms slightly and pivots, hinges, or rocks about bottom edge 1104 and as a result, the opposite end opposing bottom edge 1105 of the board lifts into the air. FIG. 11E is a side view and FIG. 11F is a rear upper isometric view showing the user sliding their right foot 1103 underneath the lifted end of the board 1101 at bottom edge 1106 so their foot 1103 can press against the bottom surface 1111 to lift the platform 1101. FIG. 11G is a side view and FIG. 11H is a rear upper isometric view of a user flipping a standing platform 1101 up using their right foot 1103 to raise the bottom edge 1106 of the board 1101. FIGS. 11G and 11H show that once the right foot 1103 is under the board 1101 at bottom edge 1106, the user places their left foot 1102 back on the floor and is able to lift the board 1101 by lifting the right leg 1109 causing the device to pivot about edge 1107 and lift at edge 1106.

FIGS. 11I-11P show a user lifting a standing platform to a vertical orientation using only their feet. This is made possible due to the board's sufficient rigidity, light weight, and rockable edges. In combination, these features enable a user to more easily manipulate the mat with either their feet or their hands. This results in greater ease of movement of the mat from underfoot when transitioning from a standing position to moving the mat to a storage location when the user is ready to sit during work. Ease of movement of the mat increases the user's incentive to alternate more frequently between sitting and standing during the workday. Ergonomic advisors generally recommend more frequent transitions (every 30 minutes as one example) between a sitting and a standing position. A difficult-to-move or manipulate mat (as is common in the current art) interferes with this advantageous purpose and decreases the number of times a user will be willing to make the transition from sitting to standing and back again. The sufficient rigidity, light weight, and rockable edges of the disclosed device allow for a greater number of transitions during the workday, which in turn, is healthy and beneficial to the user.

Figure 11I:
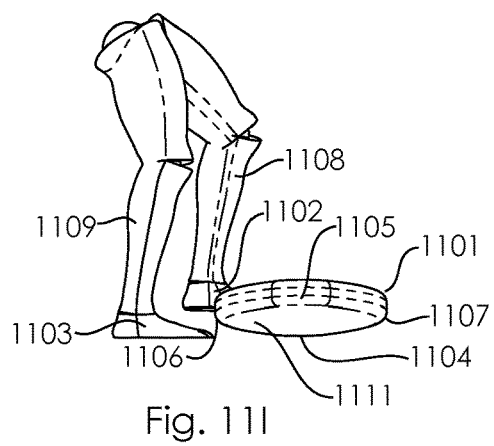
FIG. 11I is a side view of a user rocking a standing platform by pressing the left side of the platform with their left foot.
Figure 11J:
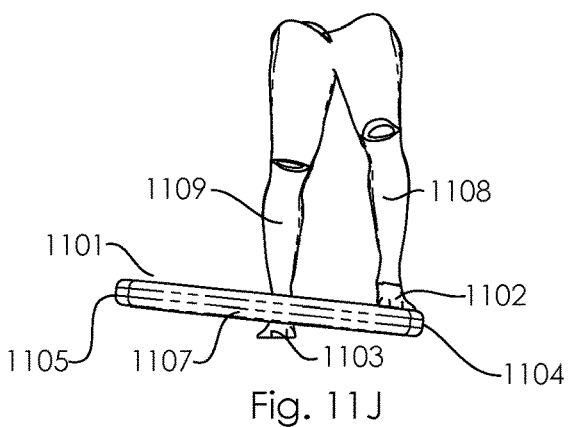
FIG. 11J is a front view of a user rocking a standing platform by pressing the left side of the platform with their left foot.
Figure 11K:
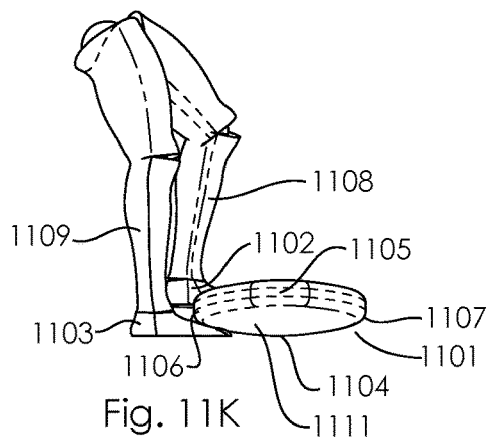
FIG. 11K is a side view of a user sliding their right foot under a standing platform while rocking the platform up with their left foot.
Figure 11L:
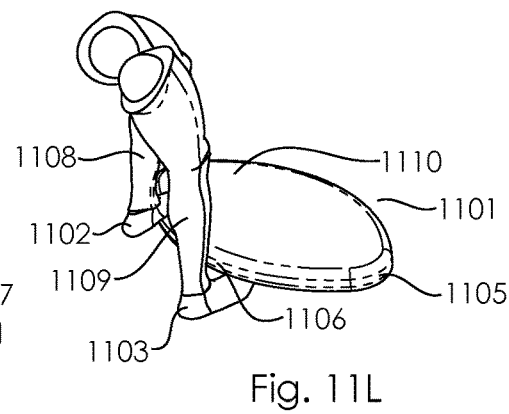
FIG. 11L is a rear upper isometric view of a user sliding their right foot under a standing platform while rocking the platform up with their left foot.
Figure 11M:
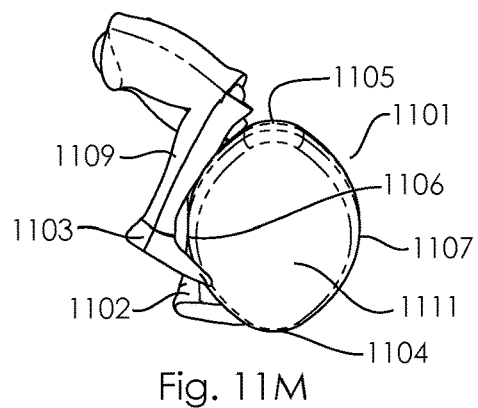
FIG. 11M is a side view of a user raising a standing platform up by rocking it up with their left foot, while raising the bottom surface with their right foot.
Figure 11N:
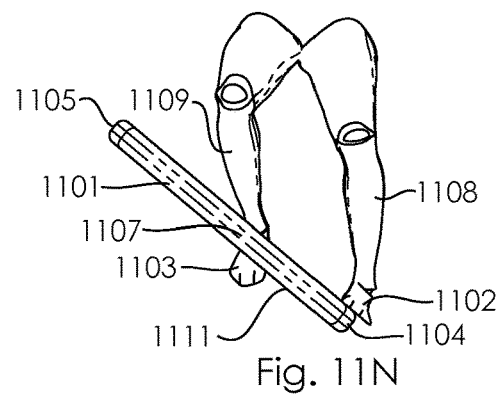
Figure 11O:
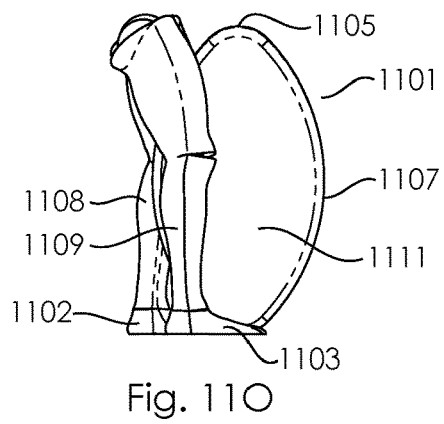
Figure 11P:
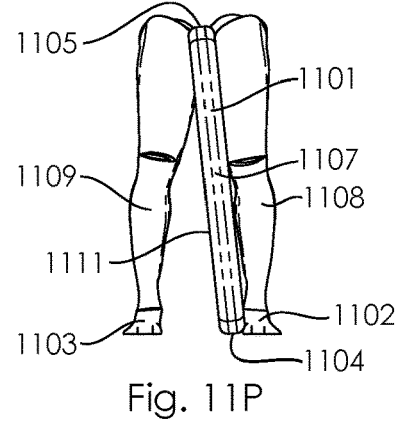

FIG. 11I is a side view and FIG. 11J is a front view showing the first step which is where the user rocks the right bottom edge 1105 of the board 1101 up off the ground by pressing on the top surface 1110 near the left bottom edge 1104 of the board 1101 with their left foot 1102. FIG. 11K is a side view and FIG. 11L is a rear upper isometric view showing the second step where the user slides their right foot 1103 under the bottom surface 1111 of the board 1101 while the left foot 1102 continues to press down on the top surface 1110 near the left bottom edge 1104 of the board 1101 which holds the right bottom edge 1105 of the board 1101 up off the ground. FIG. 11M is a side view and FIG. 11N is a front view showing the user raising the platform 1101 to a steep angle by continuing to rock the left bottom edge 1104 with the left foot 1102 while simultaneously lifting up on the bottom surface 1111 of the board 1101 with the right foot 1103. FIG. 11O is a side view and FIG. 11P is a front view showing the platform 1101 in a nearly vertical orientation. It is shown that the platform 1101 is held between the user's legs 1108 and 1109. Another possibility is for the user to grab the raised bottom edge 1105 of the board 1101 with their hand when it is in a near vertical position. This procedure permits a user to be able to move the platform 1101 easily when they, for example, have trouble bending over. The platform's 1101 unique combinations of physical properties make it possible to lift it in this manner.

Figure 12B:
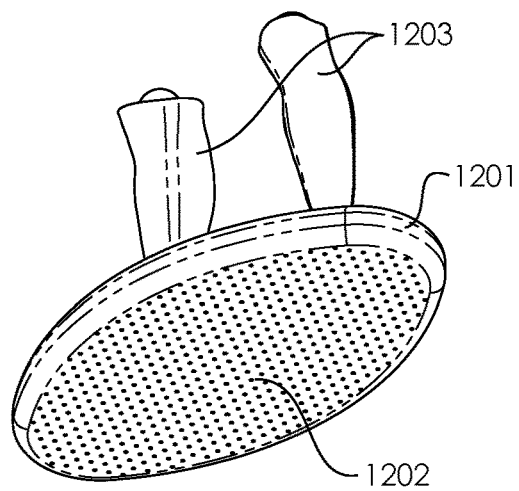
Figure 12C:
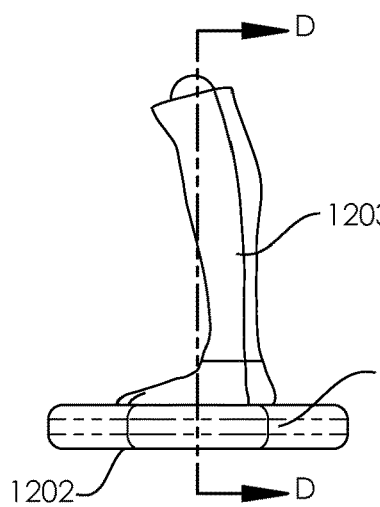
Figure 12D:
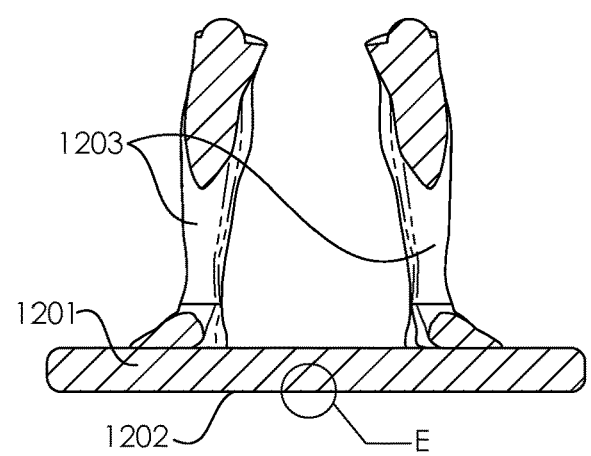
Figure 12E:
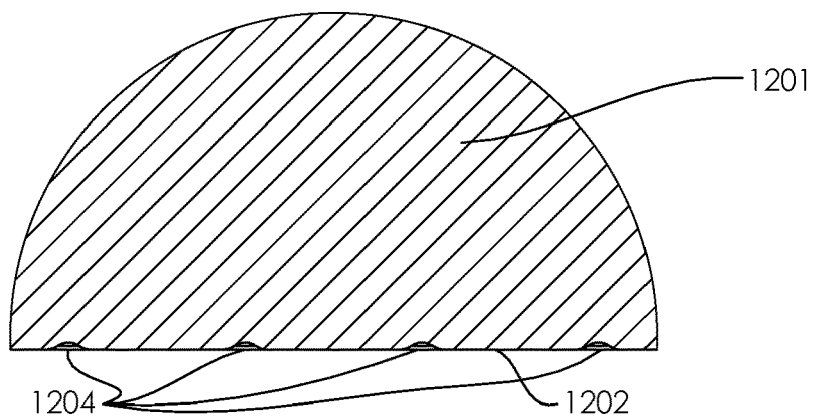

FIG. 12A is a bottom view that shows the bottom of a standing platform 1201 that has a plurality of dimples on its bottom surface 1202. FIG. 12B is a lower isometric view of a user standing on the dimpled standing platform 1201 of FIG. 12A. FIG. 12C is a side view of the user standing on the standing platform of FIG. 12B. FIG. 12D is a front cross-section view along the line D of the user standing 1203 on the standing platform 1201 of FIG. 12C showing bottom surface 1202. FIG. 12E is a close up front cross-section view of the region within the area E of the bottom surface 1202 of the standing platform 1201 of FIG. 12D and shows dimples 1204. The purpose of these dimples 1204 is to reduce the contact between the floor and the bottom platform surface 1202 to make it easier to slide out of the way.

Figure 13A:
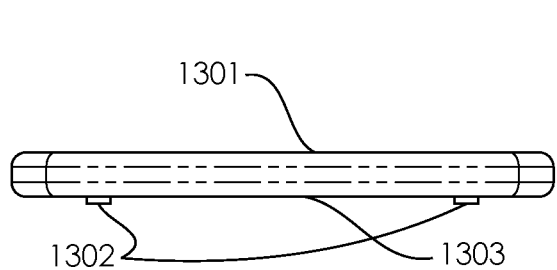
Figure 13B:
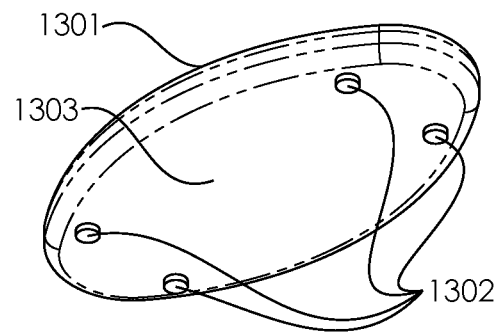
Figure 13C:
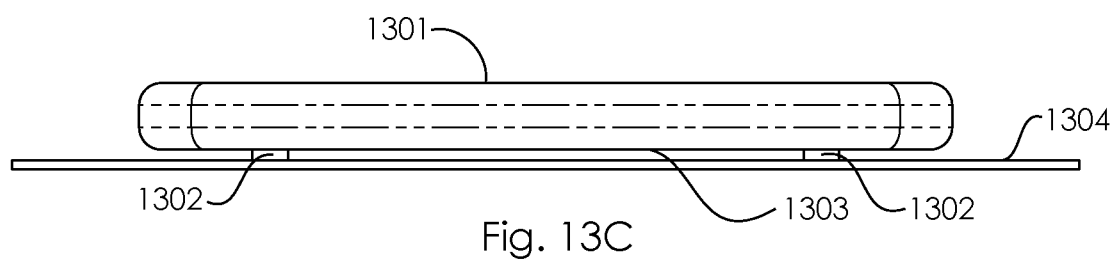
Figure 13D:
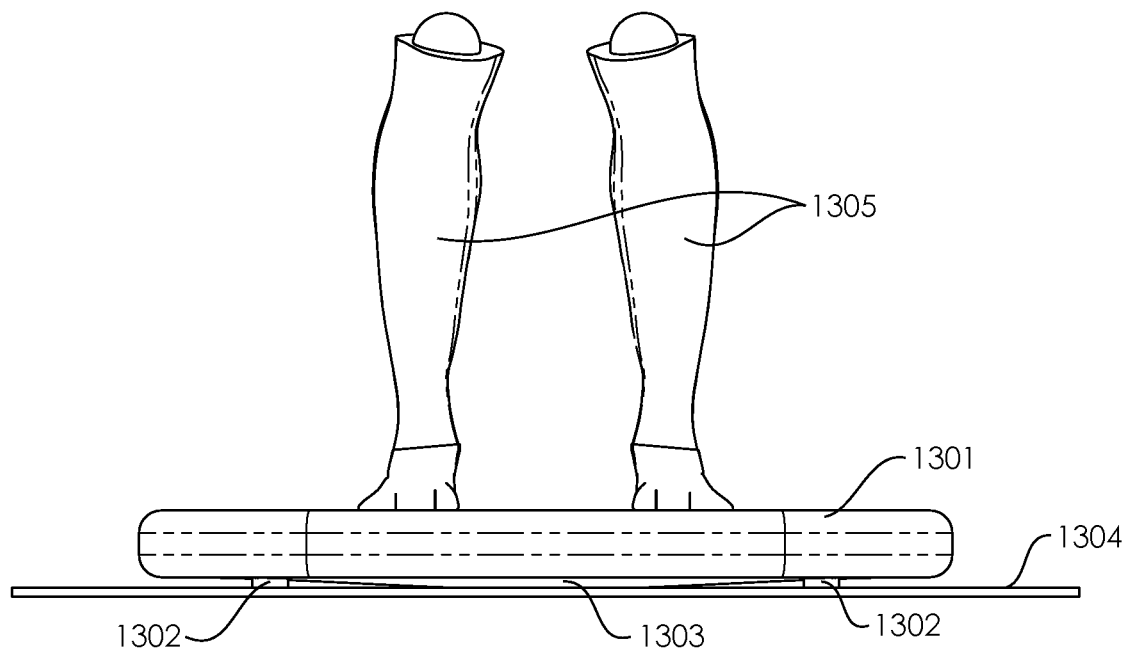

FIG. 13A is a front view and FIG. 13B is a lower isometric view showing a standing platform 1301 that is supported by corner supports 1302 attached to the platform's bottom surface 1303. The corner supports 1302 are very thin pads (e.g., less than an eighth of an inch thick) that are made from a slippery material with low coefficient of friction. The corner supports 1302 are shown placed at the perimeter of the lower surface of the platform 1301 but may be placed at a relatively small distance from the perimeter. It is desirable for the platforms 1301 to slide easily so users may push them aside when they are not in use, and also to move easily to reduce the chance of causing tripping when accidentally pushed. FIG. 13C is a front view that shows a standing platform 1301 with corner supports 1302 on a floor surface 1304 and it shows that the weight of the platform 1301 is fully supported by the pads, so it slides easily. It is also desirable for standing platforms 1301 to be extremely stable and resist sliding when users stand on them. FIG. 13D is a front view that shows that when a user 1305 stands on a standing platform 1301 that is supported by corner supports 1302, the center of the platform 1303, deforms down until it touches the floor 1304. The standing platform 1301 is made from a material that has a much higher coefficient of friction than the corner supports 1302 so once some weight is on the standing platform 1301 it resists sliding much more than when it is unloaded.

FIG. 14 (comprising FIGS. 14A-14F) shows an alternate embodiment to FIG. 13 (comprising FIGS. 13A-13D) that also achieves low friction when unloaded and high friction when loaded. FIG. 14A is a front view and FIG. 14B is a lower isometric view of a standing platform with a plurality of low friction nubs. This embodiment uses a plurality of low friction nubs 1405 on the bottom surface 1402 of the standing platform 1401 to achieve the same effect as FIG. 13. FIG. 14C is a front view of the standing platform of FIG. 14A on a floor 1403 and shows that there is an air gap between the bottom surface 1402 of the platform 1401 and the floor 1403 because it is fully supported by the low friction nubs 1405. FIGS. 14D-14F show that when a user 1404 stands on the platform 1401 the platform bottom surface 1402 deforms and contacts the floor 1403. FIG. 14D is a side view of a user 1404 standing on the standing platform 1401 of FIG. 14C with a bottom surface 1402 that has distributed low friction sliding nubs 1405 of FIG. 14F and is resting on the floor 1403. FIG. 14E is a front cross-section view along line E of the user 1404 standing on the standing platform 1401 of FIG. 14D with bottom surface 1402 resting on the floor 1403. FIG. 14F shows a close up front cross-section view of the region within the area F of the bottom surface 1402 of the standing platform 1401 of FIG. 14E with the user 1404 of FIG. 14E standing on the platform 1401 and shows the platform bottom surface 1402 deforming around the low friction nubs 1405 so that it contacts the floor 1403. The platform bottom surface 1402 has a higher friction coefficient than the low friction nubs 1405, so when load is applied to the platform 1401 and bottom surface 1402 comes into contact with the ground 1403, the standing platform 1401 resists sliding due to the increased coefficient of friction.

FIG. 15 (comprising FIGS. 15A-15K) is another embodiment that achieves low friction when unloaded and high friction when loaded, using different materials than the previous embodiments. FIG. 15A is a front view of plastic structured standing platform with a cutout 1506 to make it easier for a user to pick the board up off the floor with a hand or hand in combination with a foot. This platform has a compliant top cover 1501 made from foam, rubber, inflatable, or other like material, a support structure 1502 made from a more rigid material such as plastic, and nubs 1503 on the bottom of the support structure 1502, made from a high friction material. Although the support structure 1502 is made from a substantially rigid material, the geometry of the structure allows it some bending flexibility. It is arched so that it rests on the two ends 1507, and the center of the structure and the immediately adjacent area is off the floor and separated by an air gap 1508. FIG. 15B is a lower isometric view that shows an example of a plastic structure 1502 underneath the platform. FIG. 15C is a front view that shows the platform resting on the floor 1504 with no load. This view shows the air gap 1508 between the floor 1504 and the nubs 1503 on the bottom of the support structure 1502.

FIGS. 15D-15G show the platform with a user 1505 standing on it. FIG. 15D is a side view showing a user 1505 standing on a plastic structured standing platform resting on the floor 1504, a compliant top cover 1501, and an end 1507. The load from the user 1505 causes the support structure 1502 of FIG. 15E to flex until the nubs 1503 of FIG. 15E touch the floor 1504. This achieves low friction when the platform is unloaded, and a stable surface that does not slide when loaded. FIG. 15E is a front cross-section view along line E of the user standing on the standing platform of FIG. 15D with top cover 1501 and nubs 1503 on the bottom of the support structure 1502 that has two ends 1507 and is resting on the floor 1504. FIG. 15F is a front cross-section detailed view of the region within the area F of the edge of the standing platform of FIG. 15E that is resting on the floor 1504 and shows the design of the compliant top cover 1501. The top cover 1501 follows along the surface of the support structure 1502 with a constant thickness until it reaches the edges near the ends 1507. Then the top cover 1501 extends out further than the support structure 1502 and has a tighter edge radius to make it thicker. This provides a buildup of compliant material on the edge of the platform, which provides a conforming edge as disclosed in section 4.3— Collapsing and conforming edge. The support structure 1502 rests on the floor 1504. FIG. 15G is a front cross-section detailed view of the region within the area G of the center of the standing platform of FIG. 15E. The top cover 1501 follows along the surface of the support structure 1502 with a constant thickness in this center portion which is away from the edges near the ends 1507 of FIG. 15F. The support structure 1502 flexes under load until the nubs 1503 touch the floor 1504.

One means to achieve mats within the disclosed advantageous ranges of the key metrics is to employ a honeycombed or similarly ribbed or cored out structure, FIG. 15B for example, of rigid and lightweight material that includes cushioned portions where a user's footfall occurs. Thus it is cushioned underfoot but still lightweight and substantially firm, where the edges are configured to still be collapsible and conformable under foot. Also, one mat may have a softer upper surface with a more rigid central portion of the mat in its middle. The more rigid material does not extend to the edges of the mat so that the edges achieve better conformability to the foot, while still maintaining greater rigidity in the center. An additional plastic (meaning malleable properties as well as materials) surface provides support and some conformability under foot. Layers may be employed wherein a first portion of the surface is made of a different firmness or durometer of material than a second and/or later portion toward the edges where the plastic may be softer or more malleable than the first and/or prior portion or layer. The layers may be composed of a "double shot" or "multi shot" fabrication process for a resilient surface with a softer layer on top of a more firm or rigid layer.

FIG. 15H is a front view that shows a variation of the previous embodiment where the bottom edges of the support structure 1502 are cut away to create a curved edge 1509. There is still a compliant top cover 1501 to provide a soft surface for the user's feet. The cut away curve 1509 is shown to have a length of L. Various length curves and curves of different profiles can be used to change the rocking characteristics. FIG. 15I is a side view showing that the curved edge 1509 exists along the entire perimeter of the board. The curved edge 1509 may vary in length and shape to change the rocking characteristics at different points along the perimeter. FIG. 15J is a bottom view showing the rib pattern that comprises the support structure 1502. This rib pattern ensures that the base structure 1502 is substantially rigid while staying lightweight. FIG. 15K is a lower isometric view showing the base of the support structure 1502 and the curved up edges 1509.

FIG. 16 (comprising FIGS. 16A-16M) shows a standing platform that has ridges 1607 on the bottom surface to achieve lower friction when unloaded and higher friction when loaded. The platform has a flat top surface 1601 that may be rigid or semi-rigid and ridges 1607 on the bottom surface 1602 where it contacts the floor 1604. The ridges may be in various patterns, but all require that airspace 1605 be provided between the ridge formations regardless of their path or shape. FIG. 16A is a side view of a user 1603 standing on a standing platform with a flat top surface 1601 and a ridged bottom surface 1602 on a floor 1604. FIG. 16B is a lower isometric view of the standing platform of FIG. 16A with a flat top surface 1601 and a ridged bottom surface 1602. FIG. 16C is a front view of the standing platform of FIG. 16A with a flat top surface 1601 and a ridged bottom surface on a floor 1604. FIG. 16D is a cross-section detail view along line D of the standing platform of FIG. 16C and shows a double/multi shot top construction or layers with a first shot or layer 1610 of a first firmness or durometer that evens out the top ridges 1607 to produce a smooth surface to accept second shot or layer 1616 of a second firmness or durometer to create flat top surface 1601. FIG. 16D also shows how there is only a point contact between the floor 1604 and each bottom ridge 1607 along a bottom surface 1602. Longitudinal air tubes 1608 are separated by internal partitions 1609 and form the bottom ridges 1607 where the bottom surface 1602 is in contact with the floor 1604. Alternatively, top second layer 1616 and bottom first layer 1610 may be unified into a single one-shot top construction to produce a flat top surface 1601. Alternatively, the top layer 1616 and/or layer 1610 may be constructed of any rubber-like material that is flexible but less compressible. When considered in three dimensions, the point contact between bottom ridge 1607 and the floor 1604 is extended into a line contact. These areas of contact surrounded by airspace 1605 allow the device to slide more easily (lower static friction) when it is unloaded as the area of contact is reduced as compared to when loaded and ridges 1607 deform slightly and produce a greater, wider line contact (higher static friction). For example, a user 1603 of FIG. 16A stepping off of the platform as line contact area is reduced unloads the device and relieves surface pressure. Additionally, the external edges between the two surfaces 1601 and 1602 are generally vertical in orientation in order to provide a perpendicular surface to receive the energy of a side impact, so that the lower friction surface permits the platform to move away from the impact more easily when the mat or platform is unloaded (e.g., not under external pressure such as that the standing user 1603 of FIG. 16A provides).

FIGS. 16E-16I show an embodiment of a standing platform 1606 with ridges 1607 that have longitudinal air tubes 1608. FIG. 16E is a bottom view of an inflatable tube standing platform 1606 with ridges 1607. FIG. 16F is a lower isometric view of the inflatable tube standing platform 1606 of FIG. 16E with ridges 1607. FIG. 16G is a front view of the inflatable tube standing platform 1606 of FIG. 16E. FIG. 16H is a side cross-sectional view along line H of the standing platform 1606 of FIG. 16G showing a number of longitudinal air tubes 1608 that are separated by internal partitions 1609. The resulting shape of this construction has ridges 1607 on both the top and bottom surfaces, because of the air pressure pressing out against both surfaces. FIG. 16I is a front cross-sectional view along line I of the standing platform 1606 of FIG. 16H that is perpendicular to the cross-section of FIG. 16H and shows one embodiment of internal partition 1609 with perforations 1611 to allow the air to flow freely between at least some adjacent air tubes 1608 of FIG. 16H that have top and bottom ridges 1607. Although not shown in these specific drawings, all gas filled mats (for other drawings as well as in this disclosure) may possess one or more air valves and the ability to adjust the inflation air pressure of these devices in one or more regions.

FIGS. 16J-16M show an embodiment of a standing platform 1613 with ridges 1612 that have latitudinal air tubes 1615. FIG. 16J is a bottom view of an inflatable transverse tube standing platform 1613 with ridges 1612. FIG. 16K is a lower isometric view of the inflatable transverse tube standing platform 1613 with ridges 1612 of FIG. 16J. FIG. 16L is a side view of the inflatable transverse tube standing platform 1613 of FIG. 16J. FIG. 16M is a front cross-sectional view along line M of the standing platform 1613 of FIG. 16L showing a number of latitudinal air tubes 1615 that are separated by internal partitions 1614. The resulting shape of this construction has ridges 1612 on both the top and bottom surfaces, because of the air pressure pressing out against both surfaces. In some embodiments there are perforations to allow the air to flow freely between at least some adjacent latitudinal air tubes 1615. Some embodiments include a double shot or layer top construction with a first shot or layer of a first firmness or durometer that evens out the top ridges 1612 to produce a smooth surface to accept second shot or layer of a second firmness or durometer to create flat top surface.

FIGS. 17A-17D show a standing platform 1701 that has a plurality of vertical cylindrical air chambers 1702, which allow for a tunable feel to the surface. The separate air chambers 1702 form small bulges on the top and bottom surfaces of the platform 1701. FIG. 17A is an upper isometric view of an inflatable platform 1701 that has vertical cylindrical air chambers 1702. FIG. 17B is a top view of an inflatable platform 1701 of FIG. 17A that has vertical cylindrical air chambers 1702. FIG. 17C is a front cross-section view along line C of the platform 1701 of FIG. 17B with vertical cylindrical air chambers 1702 and partition walls 1703. FIG. 17D is a front cross-section detailed view of the region within the area D of the platform 1701 of FIG. 17C with vertical cylindrical air chambers 1702 and partition walls 1703. FIGS. 17C and 17D show air chambers 1702 separated by partition walls 1703. The air chambers 1702 may be pressurized independently of each other so the user may dial in a surface that has variable firmness. Alternatively, holes may be placed in at least some of the partition walls 1703 of chambers 1702 to permit adjacent chambers 1702 to be pressurized uniformly. Chambers 1702 may include a needle type valve or other adjustment mechanism on any of its walls that does not abut another chamber (e.g., the bottom center of a chamber 1702 or, for perimeter chambers 1702, an exterior side wall) to allow a user to tune the surface feel of the chamber and any chambers 1702 connected via holes. Alternatively, an air chamber 1702 pressure may be fixed at manufacture when an adjustment mechanism is omitted. There may be certain areas where the chambers 1702 have a higher pressure that provides a firmer place to stand. Other areas may be made where the chambers 1702 are set to a lower pressure so they deflect more for a given load. FIG. 17D is a more detailed cross-section view of area D in FIG. 17C. Platform 1701 may include a rigid or semi-rigid top surface above chambers 1702 for a more uniform feeling of the surface.

FIGS. 17E-17H show a standing platform 1701 that has a plurality of vertical hexagonal air chambers 1704, which allow for a tunable feel to the surface. The separate air chambers 1704 form small bulges on the top and bottom surfaces of the platform 1701. FIG. 17E is an upper isometric view of an inflatable platform 1701 that has vertical hexagonal air chambers 1704 with partition walls 1703. FIG. 17F is a top view of an inflatable platform 1701 that has vertical hexagonal air chambers 1704 with partition walls 1703. FIG. 17G is a front cross-section view along line G the platform 1701 of FIG. 17F with vertical hexagonal air chambers 1704 and partition walls 1703 with optional holes 1705. FIG. 17H is a front cross-section detailed view of the region within the area H of the platform 1701 of FIG. 17G with vertical hexagonal air chambers 1704 and partition walls 1703 with optional holes 1705. FIGS. 17G and 17H show the air chambers 1704 separated by partition walls 1703. The air chambers 1704 may be pressurized independently of each other so the user may dial in a surface that has variable firmness. Alternatively, holes 1705 may be place in at least some of the partition walls 1703 of chambers 1704 to permit adjacent chambers 1704 to be pressurized uniformly. Chambers 1704 may include a needle type valve or other adjustment mechanism on any of its walls that does not abut another chamber (e.g., the bottom center of a chamber 1704 or, for perimeter chambers 1704, an exterior side wall) to allow a user to tune the surface feel of the chamber and any chambers 1704 connected via holes 1705. Alternatively, an air chamber 1704 pressure may be fixed at manufacture when an adjustment mechanism is omitted. There may be certain areas where the chambers 1704 have a higher pressure that provides a firmer place to stand. Other areas may be made where the chambers 1704 are set to a lower pressure so they deflect more for a given load. FIG. 17H is a more detailed cross-section view of area H in FIG. 17G. Platform 1701 may include a rigid or semi-rigid top surface above chambers 1704 for a more uniform feeling of the surface.

FIG. 18 (comprising FIGS. 18A-18F) shows a ball filled standing platform, which serves two purposes: it slides easily (low friction) when unloaded and sticks (high friction) when loaded, and it allows for an adjustable pressure across the surface. FIG. 18A is a bottom view of a ball filled standing platform with bumps 1802 and a side wall 1801. FIG. 18B is a lower isometric view of the ball filled standing platform of FIG. 18A with bumps 1802 and a side wall 1801. FIG. 18C is a front view of the ball filled standing platform of FIG. 18A with bumps 1802 and a side wall 1801 on the floor 1803. FIG. 18D is a side cross-section view showing along line D of the standing platform of FIG. 18C and shows that the platform has a foam or other malleable or compressive material top 1804 and a side wall 1801 which encloses a cavity which holds a number of inflatable balls 1806 which are separated by partition walls 1805. Alternatively, not shown, the balls may be in foam filled cavities, or other cushioning material, to hold them in place in a lightweight manner. There may also be added a thinner surface layer, not shown, over the foam 1804. The balls 1806 may be individually pressurized and filled to different pressures to achieve the desired mat surface feel. This permits different zones to be configured with firmer and less springy areas next to areas that are less firm and more resilient, such as a firm center portion and a less firm periphery and/or side regions. The balls 1806 stretch the bottom surface thereby creating bumps 1802. These bumps 1802 create the low friction property of the platform when it is unloaded. FIG. 18E is a front view of a ball filled standing platform with bumps 1802 and a side wall 1801. The platform is on the floor 1803 with a foot 1807 applying force to the top of the platform. FIG. 18F is a side cross-section view along line F of the standing platform of FIG. 18E with a side wall 1801 and shows that when a user's foot 1807 applies a load on top 1804, some balls 1806, which are separated by partition walls 1805, are compressed and deformed 1808, resulting in a greater internal pressure. This deformation squishes (flattens) the bottom surface bumps 1802, which helps the mat stick to the floor 1803 with a greater static coefficient of friction. In an alternate embodiment, the balls 1806 may be constructed of a material that does not require inflation. In such an embodiment, the balls may be of different densities to achieve the desired mat surface feel. The cavities may be slightly pressurized (e.g., 1 psi versus the higher, variably pressurized balls) to provide a greater bending and flexural rigidity to the platform.

FIGS. 19A-19C show an extra stable standing platform system comprising a standing platform 1901 and support clips 1902. The support clips 1902 limit rocking and tipping of the platform 1901 that result from forces applied by user 1903. FIG. 19A is a front view of a user 1903 standing on a standing mat 1901 that has support clips 1902 attached to it. FIG. 19B is an upper isometric view of the user standing on the standing mat 1901 of FIG. 19A that has support clips 1902 attached to it. FIG. 19C is an upper isometric view of the standing mat 1901 of FIG. 19A that has low profile support clips 1904 attached to it. These shorter clips 1904 permit the user to step on the edges of the platform where the clips 1904 are attached and deform and compress the edges some amount before the user's feet contact the non-deforming and non-compressible low profile clips 1904.

FIGS. 20A-20F show an alternative to the support clips 1902 of FIG. 19 with an optional ramp attachment 2001 and 2004 that may be added to the standing platform 2003 that has a generally vertically oriented edge. Rocking and tipping of the platform 2003 through forces applied by user 2002 is limited by ramp attachment 2001. The standing platforms disclosed herein do not pose a significant tripping hazard on their own because they are lightweight and have low friction and therefore move easily upon unintentional contact with a foot. However, in some environments having a tapered edge may be a mandated requirement. FIG. 20A is a front view of a user 2002 standing on a standing mat 2003 with a ramp attachment 2001. In FIG. 20A, standing mat 2003 is behind ramp attachment 2001 and can be seen in FIG. 20B which is a side cross-section view along line B of the user 2002 standing on the standing mat 2003 of FIG. 20A with the ramp edge 2001 attached to it. FIG. 20C is an upper isometric view of a user 2002 standing on a standing mat 2003 that has a ramp edge 2001 attached to it. The ramp attachment 2001 attaches to the standing platform 2003 and surrounds it, as shown in FIGS. 20B and 20C. FIG. 20D shows an exploded upper isometric view of the ramp attachment 2001 removed from the platform 2003. Ramp attachment 2001 may include a concave inside curved edge that conforms to the shape of convex curved edge of standing platform 2003 when standing platform 2003 is inflatable and thus may be inflated once ramp attachment 2001 is in place and thus permits inflation to lock and hold the ramp attachment 2001 in place and deflation to loosen, unlock, and remove ramp attachment 2001. FIG. 20E is a front view of a user 2002 standing on a standing mat 2003 that has a partial height ramp edge 2004 attached to it. FIG. 20F is a side cross-section view along line F of the user 2002 standing on the standing mat 2003 of FIG. 20E that has a partial height ramp edge 2004 attached to it. FIGS. 20E and 20F show an alternate design ramp attachment 2004 where the standing platform 2003 extends above the top of the ramp attachment 2004. This allows the user 2002 to still be able to step on the edges of the mat and deform them while still having the ramp attachment 2004. Either of the ramp attachments 2001 or 2004 can also be made of compliant materials such as foam or be inflatable so that they deform along with the standing platform 2003 when stepped upon by the user 2002.

FIG. 21A shows an upper isometric view of a spring filled platform 2107 and FIG. 21B is a front view. The platform 2107 is shown having a curved front edge 2106 and a flat rear edge 2105. It can be configured to have both edges curved or flat. FIG. 21C is a side cross-section view along the line C of FIG. 21B showing that the platform 2107 has rows of springs 2102 held in bases 2104 inside of chambers of the cover 2101. The bases 2104 hold the springs 2102 in rows, and top caps 2103 are installed on the springs to create a smooth surface. The top caps 2103 may permit removal by a user so that the individual springs 2102 may be swapped with alternate springs, not shown, having differing stiffnesses to provide mat adjustability. FIG. 21D is a top cross-section view along the line D of FIG. 21B showing the rows of springs 2102 held in the bases 2104. The inflatable cover 2101 contains the springs and preloads them partially. The cover 2101 can be sealed and inflated, or it can be deflated and the springs 2102 alone support the user. FIG. 21D shows the front edge 2106 of the board 2107 does not have a row of springs 2102 because it tapers down and there is not space; however, it is capable of being inflated to create a curved edge that is compliant. The rear edge 2105 is shown as being flat as it matches the straight row of springs 2102. Curved spring bases 2104 can also be employed to put rows of springs 2012 along curved edges. The cover 2101 does not need to have smooth edges. One possible configuration would for it to tightly fit against the edges of the spring bases 2104 rather than having a smooth shape that the bases 2104 fit in. FIG. 21E is an exploded top angled view showing the separate bases 2104 and all of the springs 2102 and top caps 2103.

FIG. 22 (comprising FIGS. 22A-22P) shows a system of interlocking foam blocks that allow the user to create a custom standing platform according to their preferences. FIG. 22A shows a front view of a foam block 2201 that operates to interlock with other identically shaped blocks. FIG. 22B is a cross-section along the line B of FIG. 22A showing that the foam block 2201 has side pins 2202 and side holes 2204 as well as pins on the bottom surface 2203 and holes on the top surface 2205. These pins and holes permit assembly of a platform by interlocking multiple blocks 2201. FIG. 22C is a top view, FIG. 22D is an upper isometric view, and FIG. 22E is a lower isometric view of single interlocking foam block 2201 that has holes on the top surface 2205, pins on the bottom surface 2203, side pins 2202, and not shown side holes 2204 of FIG. 22B. FIG. 22F is a side view that shows nine blocks 2201 combined to create one platform. FIG. 22G is a cross-section view along the line G of FIG. 22F showing the connected blocks stacked on top of each other. FIG. 22H is an exploded top angled view of the combined single platform showing how the interlocking blocks 2201 can be combined to create the platform of FIG. 22F. FIG. 22I is an upper isometric view of the nine blocks 2201 combined to create the platform of FIG. 22F. Different density and/or compression secant modulus blocks may be used and combined to create a platform with the firmness adjusted to meet the needs and/or desires of a particular user, such as by having zones of differing firmness characteristics. Different interlocking features may also be employed instead of the pins and holes, such as rails in t-slots, magnets, microsuction tape, and Velcro® type fasteners. The foam pieces 2201 may also alternate orientation between layers. For example, the first layer may have the pieces 2201 in the lengthwise direction, and the second layer has the pieces oriented 90 degrees apart so they run in the widthwise direction. In one embodiment, the interlocking lattice scale changes with each layer, such that the upper interlocks are smaller and closer together than each subsequent lower level. An outer wrapper that is vacuum wrapped around the stack to provide greater bending and flexural rigidity may encompass the whole stack. A lattice of plastic discs, sized to permit the interlocking mechanism between layers to remain, may also be placed between layers to afford a larger conic dispersal of point loads on the top surface to affect a more linear stress to strain curve.

FIG. 22J is an upper isometric view that shows an assembly of different size interlocking foam blocks. It is formed of long blocks 2201 and shorter cross blocks 2206. The different blocks can be made from different density foams and similar property materials. This allows the user to construct their ideal standing platform by mixing and matching the densities along the length of the board and throughout the layers. FIG. 22K shows the side of an assembly of different size interlocking foam blocks. This shows that there are cross blocks 2206 on the top layer, and long blocks 2201 making up the lower two layers. FIG. 22L is a front cross-section view along the line L of FIG. 22K showing the cross blocks 2206 on the top layer, and long blocks 2201 along the bottom two layers. FIG. 22M is an upper isometric view showing an assembly of interlocking foam blocks with the addition of square blocks 2207. The lower two layers are still made up of the long blocks 2201 and cross blocks 2206 surround the square blocks 2207 on the top layer.

FIG. 22N is an upper isometric view that shows a covered assembly of interlocking foam blocks. A wrap 2208 covers all of the assembled blocks to hold them together so the assembly can be moved without any pieces falling off. The wrap 2208 can be an elastic fabric, heat shrink material, or other materials that can enclose the blocks. The wrap can be permeable or it can be airtight. There can be holes to allow free airflow, or it can be restricted to create a different response. FIG. 22O is an exploded top angled view showing the separate pieces of an assembly comprising of long blocks 2201 and cross blocks 2206. This shows how the top layer has cross blocks 2206 oriented 90 degrees apart from the long blocks 2201 which make up the lower two layers. FIG. 22P is an exploded top angled view showing the separate pieces of an assembly comprising of long blocks 2201 cross blocks 2206 and square blocks 2207. This shows how the top layer has cross blocks 2206 and square blocks 2207 while the bottom two layers are made up of long blocks 2201. The order of these pieces can be mixed and matched in any way to achieve the desired feel.

FIG. 23A shows a user's legs 2302 and feet 2303 standing on a linear firmness foam standing platform 2301. FIG. 23B is an upper isometric view showing the user's legs 2302 and feet 2303 standing on a linear firmness foam standing platform 2301. FIG. 23C is a side cross-section view along the line C of FIG. 23A showing the inside of the linear firmness foam standing platform. It has multiple layers of material: the top layer 2304 middle layer 2305 and bottom layer 2306. In between the top 2304 and middle 2305 layers of material are small discs 2307 and in between the middle 2305 and bottom 2306 layers of material are large discs 2308. In alternative embodiments, not shown, the small discs 2307 and/or large discs 2308 may be substituted with other polygonal shaped objects such as hexagons. This stack of material and discs spreads out the load from the user's foot 2303 and distributes it over a greater area towards the bottom of the platform. For materials with nonlinear firmness, this results in a more linear stress to strain curve of their firmness. The material that makes the layers can be many types that posses a wide variety of material properties. Some examples include foam of various densities, air or fluid filled bladders, composites including fiberglass and carbon fiber, and even metals such as steel, titanium and aluminum. The layers can be of varying thicknesses. For example, a soft material like foam may be a thicker layer while a more rigid material can be thin so it is still flexible. Some users may prefer a harder on top and a softer layer farther down while others may prefer the opposite.

FIG. 23D is an exploded top angled view showing how there are multiple small discs 2307 and large discs 2308 to cover the entire surface. FIG. 23E is a cross-section view of a sheet linear firmness foam platform containing thicker and more rigid sheet 2313 between layers 2310 and 2311 and thinner and less rigid sheet 2312 between layers 2309 and 2310. FIG. 23F is a partial view of the sheet linear firmness foam platform showing how the sheets cause the load/pressure on an area of layer 2309 to spread out to a larger area of layer 2310 and then an even larger area of layer 2311 closer to the ground.

FIG. 24 (comprising FIGS. 24A-24E) shows a spring-loaded standing platform that offers an adjustable firmness surface. FIG. 24A is a front view of a spring-loaded standing platform. FIG. 24B is a side cross-section view along the line B of FIG. 24A showing that it has a resilient layer 2402, a semi rigid support base 2403 that has bores for holding a plurality of springs 2406 and adjustment set screws 2404 that are used to push against the spring compression washers 2405 to adjust the spring preload. The semi rigid support base 2403 has rounded bottom edges 2401 which permit the entire platform to rock on its edges such as disclosed in section 6.5—Rocking ability. FIG. 24B shows the board unloaded with the preload set to the minimum value, so the springs 2406 are in their extended or unloaded state. The springs are limited in extension by upper washers 2410 which are connected to the support base 2403 by wires 2411. The wires 2411 limit the upward extension of the springs 2406 and do not permit them to force the resilient layer 2402 upward while still allowing the springs to be compressed. The outer most springs 2409 may have different spring rates than the inner springs 2406 and they may be adjusted differently to provide a different surface response near the perimeter of the platform.

FIG. 24C is a side cross-section view that shows the load from a foot 2408, exerted upon the upper surface of the platform 2401. The cover 2401 and resilient layer 2402 conform to the foot, and a number of springs 2407 underneath the foot 2408 compress to support the load. The wires supporting the compressed springs 2412 and 2413 go slack when the springs 2407 are compressed. 2412 is a more relaxed wire and 2413 is a less relaxed wire due to the different amount of compression in the springs. The other springs 2406 that are away from the foot 2408 remain uncompressed and the wires 2411 are therefore still taut.

FIG. 24D is a side cross-section view that shows the board with an amount of preload in the middle of the adjustment range. The adjustment set screws 2404 are threaded further into support base 2403. This forces the spring compression washer 2405 up which compresses the springs 2406. The top of the spring 2406 is constrained by the upper washer 2410 and wires 2411. The wires 2411 limit the upward extension of the springs 2406 and do not permit them to force the resilient layer 2402 upward while still allowing the springs to be compressed or preloaded.

FIG. 24E is a side cross-section view that shows a load from a foot 2408 stepping/pressing on the board of FIG. 24D that has a medium amount of preload set. The springs away from the load 2406 remain at their preloaded length and tension, while the springs under the load 2407 are compressed further to support the foot 2408. This adjustment may be used to change the feel of the surface and also to accommodate heavier or lighter users.

FIG. 25A is an upper isometric view that shows a foam standing pad 2501 that has a variable compression secant modulus which is achieved with an adjustable tension perimeter strap 2502. The perimeter strap 2502 runs through two clamp supports 2503 on opposite perimeter edges of the pad 2501. FIG. 25B is a detailed view showing the strap 2502 running through the clamp support 2503 and adjustment buckle 2504. The adjustment buckle 2504 allows the user to tighten the perimeter strap 2502. The adjustment buckle 2504 is shown to be extending from one of the clamp supports 2503, but there are other ways for it to be configured. One way is where the buckle 2504 goes into a cutout in the board 2501 so the clamp supports 2503 remain flush along their entire lengths. This is advantageous in that there is no protrusion extending from the board to interfere with rocking or stepping on the edge. Another configuration positions the buckle 2504 to offset from the center of the board so it does not interfere with rocking or stepping on the center of the edge. The clamp supports 2503 can also be designed to assist rocking by having a curved bottom edge. The clamp support 2503 can also be covered with foam or co-molded with a softer material to create a compliant rocking edge. Tightening the strap compresses the foam pad material 2501 along the horizontal directions, which makes it firmer in the vertical direction. FIG. 25C is a side view and FIG. 25D is a top cross-section view along the line D of FIG. 25C that shows the pad 2501 in a relaxed and uncompressed state. L1 is the relaxed length of the pad, W1 is the relaxed width, and H1 is the relaxed height. FIG. 25E is a side view and FIG. 25F is a top cross-section view along the line F of FIG. 25E that shows the pad 2501 when the perimeter strap 2502 is tightened. When the strap 2502 is tightened, the pad 2501 is compressed so the length and width decrease to L2 and W2 and the height may increase slightly to H2. The cross sections shown in FIGS. 25D and 25F reveal that the board 2501 may have internal springs 2506 to ensure alignment and to prevent the board 2501 from deforming out of plane. The springs 2506 are held in the cylinders 2505 which are attached to one clamp support 2503 and the pistons 2507 which are attached to the other clamp support 2503 compress the springs 2506. This arrangement ensures the two clamp supports stay aligned, and the springs help return the foam board 2501 to its original shape when the strap 2502 of FIG. 25A is loosened with adjustment buckle 2504.

FIG. 26A is an upper isometric view that shows variation of foam, rubber, or the like, pad that has adjustable compression secant modulus that permits differing zones of firmness across the minor axis. It has multiple slices of foam 2601 (or other like material), which stack together to form a rectangular shape. There are two end clamps 2602 on each end of the assembly. Wires, bungees, elongated bolts, or some other tensioners 2603 run longitudinally through the assembly and are terminated at each end clamp 2602. In an alternative embodiment, the major and minor axes are swapped from the embodiment shown in FIG. 26 (comprised of FIGS. 26A-26F) to produce an adjustable platform where the tensioners 2603 run along the minor axis instead of the major axis to produce a mat that permits individually adjustable zones across the major axis instead of the minor axis. FIG. 26B is a side view showing and end clamp 2602 with three termination points 2604 for the tensioners 2603. FIG. 26C is a top view and FIG. 26E is a front cross-section view along the line E of FIG. 26C that shows the pad in a relaxed state with a length of L1, a width of W1, and a height of H1. FIG. 26E also shows one of the relaxed tensioners 2603 passing through the length of the pad.

FIG. 26D is a top view and FIG. 26F is a front cross-section view along the line F of FIG. 26D that shows the pad in a tensioned state where ends 2602 are pulled together. FIG. 26D also shows one of the tensioned tensioners 2603 passing through the length of the pad. When tensioned, the length decreases to L2 and the width and height may increase slightly to W2 and H2. Buckling of the foam 2601 under high tension from tensioners 2603 may be avoided by selecting tensioners 2603 made out of a sufficiently rigid material (e.g., a threaded rod) or alternatively by enclosing the entire mat (other than exposing end clamps 2602) or just the top and/or bottom surface with a sufficiently rigid membrane such as made from high-density polyethylene (HDPE), to frame the mat in its proper shape and form so as to avoid buckling.

FIG. 27 (comprised of FIGS. 27A-27D) shows a standing pad that may be incorporated as a component of a standing platform with adjustable linear compression modulus over many of the disclosed ranges of strain and $R^2$ values and over a range of strain from 0% to 50% and an $R^2$ value of 0.90. FIG. 27A is an upper isometric view of an adjustable firmness semi-rigid pad. The adjustment mechanism (tensioners 2702) varies the firmness and permits differing zones of firmness across the minor axis. The pad subsurface 2701 may be broken up into sections, not shown, corresponding to the differing zones and tensioners 2702 to permit a greater variability of firmness between adjacent zones. The standing pad is constructed with a semi-rigid material such as carbon fiber, metal, fiberglass, or plastic that is shaped into wave springs along both the major and minor axes and may be encased in an elastomeric foam or rubber to construct a standing platform. The encasing may include a fill of small foam, rubber, or plastic resilient or non-resilient pellets or various sizes and shapes that are contained within a shaped encasement of foam or rubber which may be sheathed within a fabric such as a PVC sheath or other disclosed materials. Alternating peaks and dips in the pad subsurface 2701 create a geometry that is elastic and responsive even though the material itself is semi-rigid. There are holes or slots in the wavy structure that permit the elastic or inelastic tensioners 2702 to pass through the length of the pad. The tensioners 2702 may be composed of wires, inelastic or elastic rods, bungees, or elastomeric rubber and may include springs on their ends and may include an attachment mechanism (e.g., threads, pins, fasteners, etc.) on at least their ends to permit an adjustment mechanism. When tightened, the tensioners 2702 squeeze the wavy pattern together (compress the wave springs) which increases its compression and thereby its marginal firmness.

FIG. 27B shows a side view of the pad subsurface 2701 with tensioners 2702. FIG. 27C shows a front cross-section view along the line C of FIG. 27B showing an adjustable firmness semi-rigid pad subsurface 2701 with tensioners 2702. FIG. 27D shows a detailed view of the area D of FIG. 27C that shows an adjustable firmness semi-rigid pad subsurface 2701 with tensioners 2702. In an alternative embodiment, the major and minor axes are swapped from the embodiment shown in FIG. 27 (comprised of FIGS. 27A-27D) to produce an adjustable pad where the tensioners 2702 run along the minor axis instead of the major axis to produce a pad that permits individually adjustable zones across the major axis instead of the minor axis.

FIG. 28A shows a drop stitch inflatable platform 2801 that has a valve 2802. FIG. 28B shows a partial cross-section view which reveals drop stitch fibers 2804 connecting a top and bottom surface of the inflatable platform 2801. Standing platform 2801 has a limited board surface area as compared to the size of valve 2802, and any object on the top or bottom surface of the board may interfere with use by limiting or inhibiting where a user may stand. Bulge 2803 is due to the lack of fibers 2804 below the valve 2802.

FIG. 28C is a top view that shows a standing platform 2801 which uses a small needle air valve 2806 (seen in FIGS. 28D-F). FIG. 28D is a front cross-section view along the line D of FIG. 28C, and FIG. 28E is a detailed view of the region within the area E of FIG. 28D. The location of the needle valve 2806 is more appropriate than the location of valve 2802 for the standing platform because the valve 2806 is small enough to be placed on the side of the platform, while still permitting enough airflow to fill the low volume inflatable. The side valve is made of a malleable, conformable or flexible material that can be compressed or distorted to minimize damage if a standing user's downward pressure were to impinge upon it in some way. Though not limited to these materials alone, some examples of valve materials are rubber, flexible and malleable plastics, elastomers and the like. Any materials that minimize damage with use, and any material that achieves this result are contemplated. The valve 2806 can be of a short length when entering the filling chamber(s) of the mat, to further minimize impingement by a user's activity on the mat. Another benefit of the needle valve 2806 is that it minimizes interference with the drop stitch fibers 2804 that causes bulge 2803. Despite the advantages of a needle valve 2806 it may be necessary to use a more standard valve. Valve 2802 can take any one of a variety of forms that permit the placement of valve 2802 as shown. One problem with valve placement on the top surface 2808 of standing platforms is that when it is stepped on the mat deflects, and the valve is able to touch the bottom surface 2805 of the pad, or a user feels the valve underfoot and perceives it as annoying or uncomfortable. FIG. 28F shows a close up front cross-section view of a standing platform 2801 with a protecting encasement 2807 around the needle air valve 2806.

FIG. 28G shows a top view of a foot 2809 stepping on an air valve which is installed on the top surface 2808 of a drop stitch inflatable standing platform 2801. FIG. 28H shows a cross-section (corresponding to a view along line I in FIG. 28G) of a drop stitch inflatable 2801 that has a valve 2802 mounted on the top surface 2808 and shows the limited clearance between the bottom of the valve 2802, and the bottom surface of the mat 2805. The drop stitch fibers 2804 are removed at the valve 2802, which causes a bulge 2803 on the bottom surface 2805. FIG. 28I shows a cross-section (corresponding to a view along line I of the mat of FIG. 28G) of a foot 2809 stepping on a valve 2802, which causes the top surface 2808 of the inflatable 2801 to depress, and the bottom of the valve 2802 to come in contact with the bottom surface 2805 of the inflatable 2801. Over time, this contact may cause wear and leaks in the material. It also has a harsh feel, because the user's weight is transferred through the plastic valve 2802 and not supported by the complaint air inflatable. The drop stitch fibers 2804 are removed at the valve 2802, which causes a bulge 2803 on the bottom surface 2805.

FIG. 28J shows an improved configuration which reduces the previously indicated challenges (corresponding to a view along line I of the mat of FIG. 28G) that has an elastomeric bumper 2810 surrounding the air valve 2802. The elastomeric bumper 2810 may also be placed at the bottom of the value 2802 to prevent it from cutting into or causing undo stress on the bottom surface 2805 material. FIG. 28K shows that when a foot 2809 steps on the valve 2802, in the configuration of FIG. 28J, the bumper 2810 contacts the bottom surface 2805 of the inflatable, instead of the bottom of the valve 2802. This spreads the load out over a larger area, which reduces damage to the inflatable's bottom surface 2805 material, and also maintains some similarity to the feel of stepping elsewhere on the inflatable 2801.

FIG. 29 (comprising FIGS. 29A-29D) shows various embodiments of multi-density standing platforms. FIG. 29A shows a standing platform with an outer layer 2901 and one or more inner cores of one or more densities. FIG. 29B is a front cross-section view along line B of FIG. 29A showing a platform that has an outer layer 2901 and an inner core 2902. These layers and/or cores may be different density foams, gels, or solids. By composing various combinations the feel of the platform can be changed. For example, if a softer material is used for the outer layer 2901 the surface has a very soft and conforming feeling, where if the outer layer 2901 is firmer, it is more supportive while the center core 2902 still provides overall cushioning. FIG. 29C is a front cross-section view (corresponding to a view along line B of FIG. 29A) showing an alternative platform with outer layer 2901, two thin inner layers 2903 and 2905, and one thicker center core 2904. FIG. 29D is a front cross-section view (corresponding to a view along line B of FIG. 29A) showing an alternative platform with a thin outer layer 2906 and a thick inner core 2907. The outer layer 2906 may be a more rigid material than foam such as wood, spring metal, plastic, carbon fiber, or fiberglass, so it provides a more stable surface than the foam itself and yet remains flexible because the cross-section of the material is thin enough to permit it to flex for the given weights of the users. The cross-section dimensions of the platform outer layer 2906 can vary greatly depending on the material used. Given a certain material, the outer layer 2906 can be designed to have a flexural rigidity and compression modulus that falls within our desirable range. All the layers may be inflatable, or they may be a mixture of inflatable and non-inflatable. The layers can be pressurized to different pressures to achieve the desired characteristics. The outer layer 2906 may be perforated or have holes placed strategically to optimize the rebound dynamics.

FIGS. 30A-30H show a standing platform 3001 that has a curved surface that raises the ends 3003 above the floor 3002. This shape provides a variety of ways to interact with the board to improve the user's standing experience. The platform may have some portions with one or more inflated, gas filled chambers, or it may be of one or more layers or other shaped portions that utilize various foams, fillers, or materials of plastic, wood, bamboo, metals, carbon fiber, fiberglass, or aramid fibers and the like, or other woven and non-woven materials, etc. FIGS. 30A and 30B show how a user may stand with their legs 3004 and 3005 and their feet 3006 and 3007 in the center if they want to distribute their weight more evenly. One advantageous embodiment is to use string mat inflatable technology. This allows the creation of curved surface inflatables and they may be inflated to a high pressure so the board has some rigidity and is able to hold this shape and provide resistance to bending. As disclosed, there are advantageous non-inflated devices that may be utilized to approximate the same or similar characteristics, properties, shapes, and utilities. FIG. 30G is a front view of a user standing with both feet 3006 and 3007 in the middle of the curved surface standing platform 3001 on the floor 3002. FIG. 30H is an angled view of the user with both feet 3006 and 3007 standing in the middle of the curved surface standing platform 3001 of FIG. 30G.

FIGS. 30C-30H show how a user may exercise their leg 3005 by deforming the end 3003 of the platform 3001. FIGS. 30C and 30E show the user with their left foot 3007 and leg 3005 shifted to the left end 3003 of the platform 3001. FIGS. 30D and 30F show the user depressing the end 3003 of the board 3001 which provides resistance (pushback force) against the underside of the user's foot 3007, and it provides exercise and builds strength. It also provides a type of movement that reduces body fatigue and stiffness. Attachment points may be incorporated into the standing platform and accessories may be attached. One example is attaching elastic exercise bands to the end of the board, so the board provides resistance in addition to the bands.

Alternatively, not shown, the platform 3001 shown in FIG. 30 can also be raised off the ground. If the raised board 3001 rigidity falls within an appropriate range (depending on the user's weight, a bending rigidity in the range 15 122 lbxin$^{-1}$) it can be flexed to provide a leg exercise. FIGS. 30C and 30D show a user depressing the end 3003 of a board 3001 to the ground 3302 with their foot 3007. If the board 3001 was raised off the ground, there would be more available range of motion for the deflection. Another embodiment of FIG. 30 (not shown) is to have a platform 3001 with a very soft top which allows the foot to sink into it. This ensures that the feet are flat relative to the ground, even when the platform itself is curving up.

FIG. 31A is a front view that shows a user standing with a centered stance on a two layer sandwiched curved surface platform that has a top 3101 (e.g., composed of one or more of inflatable, foam, rubber, etc.) and a semi-rigid base layer 3102 (e.g., composed of fiberglass or carbon fiber) with the user standing with their feet 3109 and 3110 about shoulder-width apart and near the center of the top 3101 and away from the ends of the board 3106 and 3107. Filling a string mat inflatable to a high pressure may create a rigid enough surface by itself; however, it may result in a standing surface that is too firm for a user. The laminate embodiment shown in FIGS. 31A-31E uses the semi-rigid base layer 3102 to provide the needed support, so the top 3101, when inflatable, may be deflated to the pressure which provides the desired feel. FIG. 31B is a front view of a user standing on the two layer sandwiched curved surface standing platform of FIG. 31A. FIG. 31C is an angled view of a user standing on the two layer sandwiched curved surface standing platform of FIG. 31B. FIGS. 31B and 31C show that the semi-rigid base layer 3102 may still be flexed so that it maintains all of the exercise and other functionality disclosed. FIGS. 31B and 31C also show the user balancing with most of their weight on their planted left foot 3110 and left leg 3105 flattening the left end of the board 3107, causing it to depress to the ground 3103, and little weight on their raised right foot 3109 and right leg 3104 on the right end of the board 3106. This has the benefit of stretching different leg muscles and building the user's balance over time.

FIGS. 31D and 31E show an alternative embodiment with a triple layer, standing platform laminate. This one has the semi-rigid layer 3102 in the middle and an inflatable layer on top 3101. The bottom layer 3108 may be a second inflatable layer, or it may also be another material depending on the needs of the user. One example is to have a rubber, or other similar material, base layer 3108, which protects the floor material from the semi-rigid layer 3102 and which also provides anti-slip traction. Other bottom surfaces within these specifications may also be utilized. An alternate material may be smooth if the user wants the platform to advantageously be able to slide. Or the bottom surface may utilize some combination of regions of differing smoothness. FIG. 31E is an angled view of a user standing on the flattened three layer sandwiched curved surface standing platform of FIG. 31D. FIGS. 31D and 31E also show a user with their feet 3109 and 3110 apart flattening both ends of the board 3106 and 3107 completely, causing them to depress to the ground 3103.

FIG. 32A is a front view and FIG. 32B is an angled view showing that one may also use a curved surface standing platform 3201 inverted, or upside down for different exercises and movements and to provide a different response and feel for the user. When the user steps on an inverted curved surface standing platform 3201, they may deform the board and be lowered to the floor 3202. The user may achieve different motions by standing on the platform in different spots. The board 3201 also remains in contact with the floor 3202 at the ends of the board 3203 and air gaps 3204 are formed between the remaining arced portion of the board and the floor 3202.

FIGS. 32C-32I show a standing platform 3207 with an elliptical like shape with a curved surface where the curvature is along the minor axis and where the major axis has no curvature. FIG. 32C is a side view that shows the standing platform 3207 resting in a neutral position with the bottom surface center portion touching 3205 the floor 3202. FIG. 32D is a side view and FIG. 32E is an angled view which shows a user's legs 3206 standing on the platform 3207 in a neutral and balanced position with no rocking relative to the floor 3202 with the bottom surface center portion touching 3205 the floor 3202. FIG. 32F is a side view and FIG. 32G is an angled view which shows the user's legs 3206 rocking forward along the minor axis to rock the front edge 3208 to touch 3205 down to the floor 3202 and the rear edge 3209 away from the floor 3202. FIG. 32H is a side view and FIG. 32I is an angled view which shows the user's legs 3206 rocking backward along the minor axis to rock the rear edge 3209 to touch 3205 down to the floor 3202 and the front edge 3208 away from the floor 3202.

FIG. 33A is a front view and 33B is an upper isometric view which show a platform 3301 that has an upwardly facing top surface 3306 and has a bottom surface 3307 that is configured to rest on the floor 3308. The illustrated top surface 3306 is generally planar when the platform is unloaded and the bottom surface 3307 rests on the floor 3308. FIGS. 33A and 33B show a user 3302 standing on a platform 3301 holding elastic bands 3303 that are attached to the platform 3301. The user 3302 is gripping the cord handles 3304. FIG. 33C is a front view and 33D is an upper isometric view which show user 3302 pulling on the elastic band handles 3304. This motion causes the elastic bands 3303 to stretch, and it also causes the ends of the board 3305 to pull up. Depending on where the user places their feet, the ends of the board 3305 pull up more or less which gives a different feel to the exercise. The elastic bands provide a mechanism for the user 3302 to perform resistance exercises. In addition to the bands 3303 stretching, the platform 3301 compresses during a pull, which moves the entire user's body 3302 up and down. The platform rests on a substantially horizontal surface floor 3308. FIG. 33E is a front view which shows a user 3302 standing off-center on a standing platform 3301. The user is holding onto handles 3304 that connect to an elastic strap 3303.

FIG. 33F is a lower isometric view that shows the bottom of the standing platform 3307 which shows that the elastic strap 3303 runs continuously under the bottom of the standing platform 3301 and is held in place with strap guides 3309. Running the strap 3303 under the bottom of the board 3307 is a simple way to attach the strap 3303 to the board 3301 and it also makes it so the strap 3303 evenly loads the bottom of the board 3307 when the strap 3303 is pulled. FIG. 33G is a front view which shows the user 3302 standing off-center on a standing platform 3301 and pulling on the straps. The off-center position of the user 3302 results in the right side of the board 3311 deflecting up more than the left side of the board 3310. This allows the user 3302 to adjust the flex by shifting from side to side and changing where their feet are located. If the user wants a heavier pull on one end, they can stand closer to the end of the board, and if they want a lighter pull, they can stand more in the center of the board to allow more flex. FIG. 33H is a lower isometric view which shows the bottom of the board when the user 3302 is pulling on the strap handles 3304. More strap guides 3309 can be used and their positions can differ to change how defined the path of the strap 3303 is. For example, as shown, the strap 3303 can be pulled to the front of the board and pulled in that direction. If the strap guides 3309 are placed further out, that reduces the ability to pull the straps in different directions. Multiple strap guides 3309 can be placed, so some or all of them can be used to adjust how constrained the strap 3303 is. There are many other ways to attach the straps to the board in addition to D-ring attachments and guidance straps 3309. Additional ways include using microsuction tape or to use hook and loop fasteners or Velcro®. One side of the material can be applied around the entire bottom edge of the platform, and the other side can be on the ends of the straps. This allows the user to place the straps anywhere around the perimeter of the board including the front and the sides.

FIG. 33I is a front view and FIG. 33j is a side view of a user 3302 on a standing platform 3301 while holding onto the strap handles 3304 of the exercise bands 3303. The strap handles 3304 of the exercise bands 3303 are not connected to the standing platform 3301, but the exercise bands 3303 utilize a wedge 3312 and the user's weight to keep them in place. A1 and A2 are the angles between a line that runs along the length of the bottom of the user's foot where it contacts the top surface of the standing platform 3306 and the vertical line that is tangent to the back of the user's calf. FIG. 33I and FIG. 33J show the user 3302 holding the exercise bands 3303 in their relaxed position. When the exercise bands 3303 are in the relaxed position the angle A1 is approximately 90 degrees. FIG. 33K is a front view and FIG. 33L is a side view of a user 3302 on a standing platform 3301 while pulling on the strap handles 3304 of the exercise bands 3303. In FIG. 33K and FIG. 33L the exercise bands 3303 are in a tensioned position. The tension in the exercise bands 3303 pulls on the front region of the standing platform 3313 causing it to lift up. With the front region of the standing platform 3313 lifted up, the angle A2 becomes less then 90 degrees due to the rotation of the user's foot. With the exercise bands in the tensioned position as in FIG. 33K and FIG. 33L the user's calf is also stretched because of the rotation of the user's foot from A1 to A2.

Alternatively, not shown, a raised board exercise can be applied to FIG. 33, where the user 3302 pulls on the ends of the board 3301 with elastic bands 3303. If the board 3301 rigidity falls within an appropriate range (depending on the user's weight, a bending rigidity in the range 15-122 lb×in$^{-1}$) it can be flexed to provide a leg exercise. When the board 3301 is raised off the ground, the user 3302 can step on the ends of the board deflecting them to the ground, and then they can control the resistance and range of motion of the pull cords 3303 by varying the amount of pressure applied with their feet.

FIG. 34 (comprising FIGS. 34A-34F) shows each platform generally has two opposite faces, one of which is generally placed on the floor 3408 and the other of which is generally stood upon with user's feet 3401. The floor 3408 is representative of any of a variety of possible ground surfaces as are typically found in residential or commercial environments.

FIGS. 34A-34F illustrate an embodiment of a mat that utilizes angle of slope to offset some of the negative effects of standing for longer periods while facing in one direction, usually while working at a desk. FIG. 34A is an upper isometric view of a sloped mat 3402 with the user's feet 3401 placed on the sloped mat which is on the floor 3408. FIG. 34B is a side view of the sloped mat 3402 of FIG. 34A with the back edge 3403 shown higher than the front. FIG. 34C is a side view of a flat mat 3404. FIG. 34D is a side cross-section view of the flat mat 3404 of FIG. 34C which illustrates a flat mat 3404 on a floor 3408, a foot 3401, foot heel 3407, and foot ball 3406. When standing on a compliant mat surface such as of mat 3404, there is a higher pressure at the heel 3407 than at the forefoot or ball 3406 of the foot 3401. The heel 3407 sinks deeper into the mat 3404, than the heel 3407 of the foot 3401, and results in a stance that can, over time, cause additional discomfort to a user. The ball or forefoot depth line 3405 shows that the heel 3407 depresses the mat below the ball 3406. This misalignment propagates though the body and has detrimental effects on posture and results in discomfort and strain. The discomfort may be partially offset by placing a more firm or dense material in the area of where a heel is likely to be placed by a standing person. The more resilient or firmer area under the heel serves to resist the additional pressure and so help better equalize the stance. However, the entire surface may be composed of the same material, along with a uniform slope, giving the user a more uniform and consistent feel underfoot, which is advantageous, and may be less costly, by using fewer different types of surface materials. It has also been found to be overall more comfortable to have the same resilience under foot no matter where the user positions their feet when oriented toward their work surface.

FIG. 34E shows a side view of the sloped mat 3402 of FIG. 34A. This shows a sloped mat that has one taller side edge 3403 that allows for a foot to come to rest in a balanced or neutral orientation or position. FIG. 34F is a side cross-section view which shows the sloped mat 3402 of FIG. 34A with a foot 3401 standing on it in a neutral position, where the rear edge 3403 of the mat (in other words, the edge that is closest to the rear heel 3407 of the user's foot 3401) is raised. More weight is supported at the heel 3407 than the ball of the foot 3406 so the heel 3407 deforms the mat 3402 further than the ball 3406 does. With a correctly angled surface, the heel 3407 and the ball 3406 end up level with each other, as shown with the ball depth line 3405. In other words, the resulting downward angle (from rear to front, or from heel to toe) compensates for the higher pressure at the heel 3407 of the foot 3401. The foot 3401 is in a neutral position such that the front ball 3406 and heel 3407 are roughly equally elevated above the plane of the floor as shown by parallel to floor line 3405.

FIG. 35A is a side cross-section view and FIG. 35B is an upper isometric view which show a user's legs 3503 standing on a double layer platform that has a top layer 3501 and a bottom layer 3502. FIGS. 35A and 35B show the user standing with their feet 3504 in a flat and balanced position and supporting the user's heels at a height level with the front of their feet. FIG. 35C is a side cross-section view and 35D is an upper isometric view which show the user's legs 3503 tilting forward on the platform, tilting the top layer 3501 and raising the user's heels above the front of their feet. The bottom layer 3502 is a relatively softer material that deforms readily while the top layer 3501 is, relative to layer 3502, more rigid to provide a flat platform to stand on. The user may tilt the slope forward by shifting their weight forward, either by moving their feet 3504 close to the edge, or by leaning forward. FIG. 35E is a side cross-section view and 35F is an upper isometric view which show a user's legs 3503 leaning back, which causes the bottom layer 3502 to compress, thereby tilting the top layer 3501 and lowering the user's heels below the front of their feet. The bottom layer 3502 also deforms in a similar manner when the user leans side to side.

FIGS. 36A-36C show a standing platform 3601 with an adjustable tilting base 3602. FIG. 36A is a side view of the standing platform 3601 with the adjustable tilting base 3602 set to a flat position. FIG. 36B is a side view of the standing platform 3601 with the adjustable tilting base 3602 set to an angle of 4 degrees. FIG. 36C is a side view of the standing platform 3601 adjusted to an angle of 8 degrees. The base has a front hinge 3603 and a support plate 3604 that holds the platform. The platform 3601 can be any type of standing platform including solid foam materials, gas inflated boards, spring-loaded platform, etc. The tilt angle can be set to any desired angle (slope).

The correct angle depends on the material properties such as firmness, durometer rating, density, and air pressure where applicable, as well as other factors. The correct angle of slope is also dependent on user variables, such as the user's foot size, length and shape, and the user's weight. Where a gas filled mat is utilized, the slope angle may be varied by incorporating an adjustable sloped base with an upper gas filled portion directly underfoot, which may be configured to be adjustably sloped in multiple angles with one or more layers in the manner just described. This configuration permits the user to benefit from the quick bounce response such as permitted by air mat embodiments, while still permitting the disclosed benefits of adjustable slope angle.

In an alternative embodiment, the adjustable slope angle portion may reside above the gas filled mat portion. This configuration permits an indirect benefit of the bouncy response of the air mat with the feel of a traditional anti-fatigue material underfoot. While not shown, see 1601 as an example of a surface that can be adjustably sloped, while residing over various gas-filled disclosed embodiments. The slope of a gas filled mat may also be adjusted by altering the gas mat itself, whether by varying the length of internal support connections (e.g., fibers 2804) so that the inflated surface is sloped at a particular angle, or situating an additional bladder (e.g., layer 3502) above or below the primary air bladder (e.g., layer 3501) which permits adjustment of the slope by altering the one or more secondary bladders (e.g., layer 3502).

The firmness of the mat is one variable that determines the beneficial angle of the standing mat in addition to human factors such as weight and foot shape. The compression secant modulus of the mat is generally representative of how much the surface of the pad deflects under a given load. The pressure distribution of a human foot varies depending on the person, but typically, while standing, the highest pressure is found at the heel. This results in the heel depressing into the mat farther than the forefoot. Additionally, density of the mat material may vary. Density of the mat material is a measure of how heavy the material is for a given volume. Some types of mat materials have firmness proportional to their densities. Other types of materials do not have this proportional relationship. Durometer is a measure of a material's hardness and may be used to compare materials. Materials with higher durometer are harder and are firmer when standing on them. Lower durometer materials are softer and deflect more when standing on them. Deflection or depression is the amount, as measured in distance, the pad compresses when a load is applied to it.

All of the disclosed factors affect what the beneficial slope of the surface of the mat should be to achieve a neutral foot with respect to the underlying floor as represented in FIG. 34F at 3405. Maximum benefit is achieved when the heel of the user remains at or above the level of the forefoot when standing on the mat. Softer or less firm materials deflect more under the same load than firmer materials. Both the heel and ball depress deeper into a soft material, but the heel still depresses proportionally more than the ball. This means that a soft material has a greater difference in deflection than a firm material. For example, if on a firm mat the ball depresses 3 mm, and the heel depresses 6 mm, the angle required to make up for that 3 mm drop is less than a soft mat where the ball depresses 6 mm and the heel depresses 12 mm.

Some typical pad materials have nonlinear compression modulus so the slope of the tangent of their stress to strain curve (i.e., the derivative of the stress to strain curve) increases as they are compressed (i.e., strained). The pad needs to be set at an angle such that the pad height drop along the length of the foot makes up for the difference in deflection between the heel and the ball of the foot to achieve a neutral foot as shown in FIG. 34F. Also as the angle increases, more weight is shifted to the front of the foot, which causes the heel to deflect less into the mat and help balance the feet. Finally, a user may be more comfortable having the heel slightly elevated above the forefoot after all factors are considered. This is because the user has a reduced chance of leg, foot and back discomfort if they more closely maintain a stance to which their body has grown accustomed, probably over years.

Users are characterized by a history of how they wear shoes and what angle their feet have been adapted to over time. Some women are used to wearing relatively high heels on a regular basis, while men generally wear substantially flat shoes with a slight heel elevation. When standing on a mat, these habits and physical attributes to which a user has become accustomed, affect the level of slope that is optimum for that user. It has been found that the angle of slope is generally less that 12 degrees, 12 degrees being a very high angle and not likely to be utilized except for a very small segment of the population. A significant portion of users, whether barefoot or shod, benefit from a slope angle generally between 2 to 5 degrees. This range benefits many users and is the more likely angle for embodiments that are non-adjustable.

Even angles greater than 12 degrees of slope may be possible, but these are special cases where the user may be rehabilitating from an injury and/or may require a greater than normal slope angle to work comfortably. Additionally, as shown in FIGS. 36A-36C, adjustability of the slope angle may be achieved so that when the exigency requiring the more extreme slope of FIG. 36C is over, the mat angle may be adjusted to a more common or typical slope angle FIG. 36A or FIG. 36B for a user's size, weight, and materials used for the mat.

FIG. 37 (comprising FIGS. 37A-37D) shows a platform 3701 with a variable rear hump 3703 and standard (not humped) front edge 3702. FIG. 37A is a front view, FIG. 37C is an upper isometric view, and FIG. 37D is a top view of a standing platform 3701 with a variable rear hump 3703. FIG. 37B is a side cross-section view along the line B of FIG. 37A which shows more detail on one possible shape of the standing platform 3701 and rear hump 3703. This rear hump 3703 has a curved surface to provide different positions for the user to place their feet. If they want a deep stretch, they can put their heels on the center of the hump for maximum height, or if they want a lighter stretch, they can spread their feet and stand on the lower section of the hump 3703. This platform 3701 can also be rotated 180 degrees so the hump 3703 is in the front and front edge 3702 is at the back. That way a user can stretch their leg in the opposite way by putting the ball of their foot on the hump 3703 and the heel on the platform 3701. The hump 3703 can be an integral part of the platform 3701, or it can also be an attachment that can be affixed and removed from the board, and also placed on different locations on the platform's top surface.

FIG. 38A is a front view and FIG. 38C is an upper isometric view which show a platform 3801 with a front dome 3802. This is a different shaped dome that provides a number of different ways to place a user's feet and stretch their legs. FIG. 38B is a side cross-section view along the line B in FIG. 38A showing that the dome 3802 extends above the top surface of the platform 3801 such that a user can raise their foot by placing it on the dome 3802 and they can stretch their legs by angling their foot on the dome 3802. The dome 3802 has a curved surface so the user can place their feet on the dome from various angles. The dome 3802 is long enough so either one or both feet can be placed on it at once. FIG. 38D is a top view of the standing platform of FIG. 38A showing there is a large flat area of the platform 3801 for the user to stand and the dome 3802 takes up a smaller area at the front of the platform. The dome 3802 can be an integral part of the platform 3801, or it can also be an attachment that can be affixed and removed from the board, and also placed on different locations on the platform's top surface.

FIG. 39 (comprising FIGS. 39A-39D) shows a standing platform 3901 with a raised bump 3902 in the center of the board. FIG. 39A is a front view and FIG. 39C is an upper isometric view which give different perspectives of the standing platform 3901, as well as the shape and position of the center bump 3902. FIG. 39B is a side cross-section view along the line B of FIG. 39A showing the bump 3902 protruding above the top surface of the platform 3901. This bump 3902 can be used for stretches and additional locations for the user to place their feet. FIG. 39D is a top view of the standing platform 3901 of FIG. 39A showing the bump 3902 oriented in the center of the platform 3901. It can also be offset from the center and located anywhere along the platform 3901.

FIG. 40A is a side view of a rear hump standing platform which has an inflatable base 4001 and an inflatable rear hump 4002. FIG. 40B shows the side cross-section of the platform along the line B of FIG. 40A, and how the rear hump 4002 elevates above the base 4001, it also shows the drop stitch internal filaments 4006 that maintain the shape of the inflatable standing platform. FIG. 40C is an upper isometric view that shows the rear hump 4002 positioned partially around the rear edge of the base 4001. Front curved edge 4003 provides a variety of positions for the user 4004 of FIG. 40D to put their feet 4005 of FIG. 40D and other body parts. FIG. 40D is an upper isometric view that shows how a user 4004 may stand with their feet 4005 on the platform 4001 with a normal stance. FIG. 40E is a top view showing an exemplary shape of the platform 4001. This shape may vary depending on what kind of positions a user 4004 of FIG. 40D wants to obtain, and what platform area is desired.

FIG. 41A is a side view showing a user 4104 with their feet 4105 hanging off the front edge 4103 of the platform 4101. FIG. 41B is an upper isometric view that shows how with a normal stance, the user's feet 4105 can align with the perimeter curve in the front curved edge 4103. FIG. 41C is a side view that shows a user 4104 with their feet 4105 positioned together and hanging off the front edge 4103 of the platform 4101. FIG. 41D is an upper isometric view that shows that the user's feet 4105 are still aligned with the front edge 4103 even when they are brought together due to the perimeter curvature of the front curved edge 4103. FIG. 41E is a side view that shows the user 4104 standing on the rear hump 4102. The hump 4102 supports the heels of the feet 4105 and the balls and toes of the feet rest on the platform base 4101. FIG. 41F is an upper isometric view that shows how with a normal stance, the user's feet 4105 can align with the perimeter curve along the rear hump 4102. FIG. 41G is a side view that shows the user 4104 with their feet 4105 partially on the floor 4106 and with their heels on the front edge 4103 of the platform 4101. When the user 4104 stands in the middle of the platform 4101, it provides a relatively firm and supportive surface. When they stand on the edge, such as in FIG. 41G, the platform provides a much softer surface that permits the user 4104 to bounce up and down on the edge 4103. FIG. 41H is an upper isometric view that shows how the user's feet 4105 can bounce up and down on the edge 4103.

FIGS. 42A-42J show a rim, ring, or perimeter hump platform 4201 with a rigid insert 4206. The inflatable platform 4201 has an edge hump 4205 that provides an elevated edge around the entire perimeter, which provides ways to position a user's feet 4203 in any direction. A rigid platform 4206 is disposed in the inflatable platform 4201 to cover the surface inside of the elevated edge 4205. FIG. 42A is a front view of a user's legs 4202 standing on the perimeter hump platform 4201 with their feet 4203 on the flat rigid insert 4206. FIG. 42B is a side cross-section view along the line B of FIG. 42A showing the user's legs 4202 and feet 4203 standing on the platform 4206 which provides a flat support base, while still providing cushioning by the inflatable platform 4201 below on top of floor 4204. FIG. 42C is an upper isometric view showing the rigid insert 4206 inset into the inflatable platform, 4201. FIG. 42D is an exploded upper isometric view showing the rigid insert 4206 removed from the inflatable platform 4201.

FIG. 42E is a front view of legs 4202 standing on an inverted ring hump platform 4201 in a configuration using a front-to-back roller 4208. FIG. 42F is a side cross-section view along line F of the legs 4202 standing on the platform 4201 of FIG. 42E. FIG. 42F shows the platform 4201 inverted so that platform bottom 4207 which contacts the floor in FIG. 42B is now the top. The platform 4201 of FIG. 42F is shown with a cylindrically shaped front-to-back roller 4208 placed underneath and resting on floor 4204. When the platform is inverted, the front-to-back roller 4208 runs along the rigid board 4206 and the edge hump 4205 contains movement of the front-to-back roller 4208 so it does not allow the user to fall. In this embodiment, the front-to-back roller 4208 is shown to be a cylinder. It is oriented so the user can rock back and forth, but it can also be oriented so they can rock side-to-side. Other shaped objects may be used, including a sphere, which provides movement in any direction. A soft disc that deforms to allow the user to tilt may also be used instead of rolling cylindrically shaped object. FIG. 42G is a front view of legs 4202 standing on an inverted ring hump platform 4201 when it is tilted with an adjustable spacer. FIG. 42H is a side cross-section view along line H of the legs 4202 standing on the platform 4201 of FIG. 42G with an adjustable spacer 4209. FIG. 42H shows a fixed adjustable spacer 4209 placed underneath the inverted platform 4201. This adjustable spacer 4209 has a flat base so it does not move, and it is placed in a location to prop up the platform 4201. The adjustable spacer 4209 is positioned to cause the platform 4201 to be tilted forward, but the position can be changed to permit the platform 4201 to be tilted backwards or side-to-side. FIG. 42I is a front view of legs 4202 standing on an inverted ring hump platform 4201 in a configuration using a side-to-side roller 4210. FIG. 42J is a side cross-section view along line J of the legs 4202 standing on the platform 4201 of FIG. 42I. The side-to-side roller 4210 is shown to be a cylinder that can roll side to side which requires the user with legs 4202 to balance.

FIG. 43A is an upper isometric view that shows rim hump 4302 of platform 4301 with holes 4304 in the rigid board 4303 to provide an attachment point for accessories. FIG. 43B is an exploded upper isometric view showing how a user 4309 can attach pads 4305 and elastic bands 4306 to the rigid board 4303. FIG. 43C is an upper isometric view that shows the platform assembled with the accessories. The pads 4305 can support a user's feet 4310 and arches in specific ways. The elastic bands 4306 provide resistance exercises. In addition to the bands stretching, the board 4303 flexes during a pull. The variable force applied by a user 4309 with elastic bands 4306 causes a user's entire body to move up and down slightly as a corresponding equalizing force results in their feet 4310 causing them to depress variably into pads 4305. FIG. 43D is an upper isometric view that shows board 4303 with D shape profile pads 4305 attached to provide support to a user's foot arches. FIG. 43E is an upper isometric view that shows pads 4307 which are thicker on the ends. These pads help align a user's feet 4310 into a neutral position to improve a user's entire body posture. Many other pad shapes may be utilized to advantageously support a wide range of different feet. Custom foot pads may be made for people with foot problems.

FIG. 43F is an upper isometric view that shows pads 4308 that are dome shaped. These pads allow a user to place their feet in new positions. Other shapes may also be used and the pads may be interchanged for different configurations. The pads may be custom formed to conform to the shape of a particular user's feet so that the user's feet do not slide easily off the pads.

FIG. 44A is an upper isometric view that shows a standing platform 4401 with two corrective foot pads 4402 placed on the top surface. These corrective foot pads 4402 can be installed for users that need support to align the joints in their feet. A wide variety of shapes and profiles can be used including custom molded pads for individual users. Also some shapes allow users to stand on different parts of the pads to get different results. The pad material should be semi rigid to rigid to provide adequate support without being uncomfortable.

FIG. 44B is an exploded upper isometric view that shows the corrective foot pads 4402 removed from the standing platform 4401. FIG. 44C shows the foot pads 4402 are raised off the surface of the standing platform 4401. The platform, including its pads, has a maximum height Hmax and a mat thickness or median height Hmed. FIG. 44D shows two different size foot pads 4402 and 4403 placed on the surface of the standing platform 4401. The pads can be customized for the user's body. In this case, a taller foot pad 4403 is used to compensate for a person with different length legs. FIG. 44E shows that the pads 4402 are moveable and in this FIGure they are positioned for a wider stance. FIG. 44F shows the foot pads 4402 positioned for a narrow stance. FIG. 44G shows the foot pads 4402 moved to the rear of the standing platform 4401. FIG. 44H shows the foot pads 4402 moved to the front of the platform 4401.

FIGS. 44I-44M illustrate various foot pads with different uses and features. FIG. 44I is an upper isometric view that shows a toroidal foot pad 4403. FIG. 44J is an upper isometric view that shows a horseshoe shaped foot pad 4404. These foot pads give a user the option to place their feet on different contours. They can rest their heel, arch, or any part of their foot on any part of the foot pads. The user also has the option to massage their feet while on a standing platform by using a foot pad with massage protrusions like foot pad 4405 shown in FIG. 44K that is an upper isometric view. The user can also get a massage with a vibrating (shown at 4408) foot pad 4406 shown in FIG. 44L that is a top angled view. FIG. 44M is a top angled view that depicts a foot pad 4407 that can generate heat 4409. A user can use the heated foot pad 4407 to apply heat to their foot.

FIG. 45 (comprising FIGS. 45A-45C) shows a standing platform 4501 with a rigid plate 4502 partially covering the top surface. FIG. 45A is a top view and FIG. 45B is an upper isometric view showing a user's feet 4503 standing on the platform 4501. The user's feet 4503 are partially standing on the rigid plate 4502 and partially on the compliant platform 4501. One reason to use a rigid plate 4502 is to provide additional support and a stable base while still allowing movement for the toes. Another reason to use a rigid plate 4502 is for a user wearing shoes with a minimal heel area such as high heels. The plate 4502 is stable and prevents piercing damage to the platform 4501. FIG. 45C is an exploded upper isometric view showing the plate 4502 removed from the platform 4501. The plate may be different sizes and shapes, and it may also be moved on the board so support may be provided for the front of the foot if desired.

FIG. 46A is a side view which shows a bottom dome standing platform. The dome 4602 is attached to the bottom of the platform 4601. The dome 4602 may be integrated into platform 4601 at manufacture or it may be non-integrated and separable. The dome 4602 may be inflatable or non-inflatable. Attachment of the dome may be by capillary action, microsuction tape, Velcro®, magnet, or two-sided tape. This dome 4602 has a flat bottom surface that positions the platform in a horizontal position when the user is balanced on the platform and allows users to tilt in any direction relative to the floor 4606, this promotes motion and requires some balance. The relative ease or difficulty required to keep the platform 4601 balanced depends upon the dome 4602 hardness. If the dome 4602 is hard, it rolls freely, and any weight shift causes it to tilt. If the dome 4602 is softer, it has some compression and allows for greater weight shift before it substantially moves. The dome 4602, when inflatable, can have adjustable hardness by changing the air pressure. The dome 4602, when inflatable, can be a separate air bladder from the main platform 4601, when it is also inflatable. FIG. 46B shows a cross-section view of the standing platform 4601 of FIG. 46A attached to dome 4602 along the line B showing an inflatable embodiment with drop stitch internal filaments 4603. FIG. 46C is a lower isometric view of the standing platform of FIG. 46A showing dome 4602 attached under platform 4601. FIG. 46D is a side view showing a user's legs 4604 and feet 4605 balancing on the dome platform 4601. FIG. 46E is a side view which shows a user's legs 4604 and feet 4605 with the platform 4601 tilted forward. As shown, the front of the platform 4601 is touching the floor 4606. The user can stay in this position to stretch their legs 4604. The user may also balance in a position in-between the balanced position shown in FIG. 46D and the fully tilted position shown in FIG. 46E.

FIGS. 46F-46H show top, front, and upper isometric views of a damping foam toroidal ring 4607 that can be used with a bottom dome standing platform 4601. The toroidal ring 4607 may be configured at manufacture to select an advantageous height, diameter, and compression modulus. Such selection causes the amount, feeling, and stability of movement of standing platform 4601 to vary. When in position below the standing platform 4601, the diameter of toroidal ring 4607 may extend as far as or even slightly farther than the edge of the standing platform 4601 and the height of toroidal ring 4607 may extend as high or even slightly higher as height of dome 4602. FIG. 46I shows a user's legs 4604 and feet 4605 standing on a bottom dome standing platform 4601 which is on the ground 4606 with a damping foam ring 4607 supporting the base of the platform 4601. FIG. 46J shows a user tilting the platform 4601 forwards, which compressed the front of the damping foam ring 4607. The foam ring 4607 provides resistance to tilting, and it slows down any motion, which makes it easier to stand and balance on the platform 4601. FIG. 46K is a cross-section view showing the platform 4601 in the neutral position and the foam ring 4607 is uncompressed. The ring 4607 can also be evenly preloaded in this neutral state to provide more initial stability. FIG. 46L is a cross-section view showing the platform 4601 tilted forward. This shows the front of the platform 4601 compressing the front of the foam ring 4607.

FIG. 47A is a front view and FIG. 47C is a lower isometric view which show a faceted dome platform 4701. FIG. 47B is a side cross-section view along the line B of FIG. 47A that shows the platform 4701 attached to the dome 4702. The facet operates to decrease the balance required for a user to stand with feet 4704 on a rigid domed platform 4701. The dome 4702 is not a continuous curved surface, but instead is split into a number of flat faces or facets. These faces are balance points that provide a margin for error in user weight shift before it causes the platform 4701 to move. The user can move from balance point to balance point, to position themselves in different ways to permit new stretches for their legs 4703. FIG. 47E demonstrates how the user with legs 4703 can angle their feet 4704 and shift the platform 4701 and dome 4702 to contact the ground 4705. This creates a rigid angled surface for the user.

FIG. 48A is an upper isometric view and FIG. 48B is a front view which show a standing platform with enlarged ends 4801. The standing platform has a flat center section 4802 that allows a user to benefit from a firmer, more stable surface. The standing platform transitions, at transition area 4804, from a thinner and harder portion, at the center section 4802, into a thicker and softer portion, at the ends 4801. The bottom 4803 of the standing platform remains flat to maintain a stable standing surface, but can have a contoured shape to create a more volatile standing surface. The transition area 4804 is smooth and gradual so that the user is less likely to trip while transitioning their feet to the thicker ends 4801. The thicker ends 4801 provide a softer more forgiving surface because they allow for more deflection. The larger radius curve 4805, positioned between bottom edge 4806 and end 4801, allows the user to easily rock the standing platform. As the radius increases, the bottom edge 4806 is positioned more inward toward the center section 4802, providing greater leverage for the user's pivot action about bottom edge 4806, effected by their downward force at ends 4801. When a load is applied to the end 4801, it generates sufficient leverage to allow the standing platform to tilt or rock easily. Edge 4807 acts as a stop to control the degree of rocking permitted by the standing platform 4801. A user can choose a variation of standing platform 4801 with an edge 4807 that is positioned closer to 4806, as to reduce the radius of curvature of curve 4805, for a standing platform that rocks over a smaller rocking region. The user may also choose an edge 4807 that is lower to the ground and further from edge 4806, as to increase the radius of curvature of curve 4805, for a standing platform that rocks over a larger rocking region.

FIG. 49A is an upper isometric view that shows that platforms may be grounded so the user 4906 is not electrically isolated from the earth. The platform 4901 has a conductive top 4904 that connects to the cable 4902, which has a plug 4903 to connect to the ground in the wall. Instead of just a conductive top 4904, the board 4901 can be covered with an electrically conductive skin. This skin can have a zippered, buttoned, or Velcro® opening for inserting the board 4901 and enclosing it inside the skin. The cable 4902 is wired to the conductive skin so the entire board is grounded. FIG. 49B is an upper isometric view that shows that the entire top surface does not need to be conductive. In this case individual strands of conductive material 4904 are woven into the top surface, and this conductive material connects to the cable 4902. FIG. 49C is an upper isometric view that shows an alternate embodiment where there are only conductive strands 4904 going across the top of platform 4901. Strands 4904 are positioned to touch a user's feet 4907 in any position feet 4907 are placed. Clamp 4905 at the end of the cable 4902 may be attached to a user's desk or to a post that goes into the ground.

FIG. 49D is a top angled view and FIG. 49E is an exploded upper isometric view to illustrate how a grounding bar 4908 can be used with a standing platform to prevent the user 4906 from being electrically isolated from the earth. The grounding bar 4908 is electrically conductive and allows the user to discharge excess static electricity from their body. The standing platform 4909 does not need to be conductive since the grounding bar is conductive. The grounding bar 4908 has a cable 4902 connected to it, which has a plug 4903 that can be easily plugged into the ground terminal in any wall outlet. The user can simply place their feet 4907 on the grounding bar 4908 to take advantage of its electrically grounding properties. To keep the grounding bar 4908 light weight it can be made with a conductive outer layer 4910 and have a light weight rigid inside layer 4911. Additionally, a cover designed to encapsulate the standing platform 4909 may be used to allow the user to electrically ground themselves. The cover is electrically conductive and can connect to the grounding outlet of a wall by using a plug like 4902 and an adapter like 4903. The cover may have a zipper, set of buttons, or have a Velcro® lining to allow it to be easily opened so the user can encapsulate the standing platform 4909, and then be zipped up or closed around the standing platform. The cover may also have a layer of pressure sensors integrated into it to allow the user to track their footprint on the mat. The pressure sensors can also be used to cause an alert to be produced for the user when they are being too stationary. The pressure sensors may also be used to cause an alert to be produced for the user of their over pronation or supination.

FIG. 50A is a front view of a user 5001 standing on a standing platform 5004 with their feet 5003 approximately shoulder 5002 width apart as shown by guidelines 5005 and measure L1 and their legs 5007 at a narrow angle A1 shown by the guidelines 5006. FIG. 50B is a front view of a user 5001 standing on a standing platform 5004 with their feet 5003 positioned in a wide stance such that the feet 5003 are wider than shoulder 5002 width by two foot widths apart as shown by guidelines 5005 and greater measure L2 and their legs 5007 at a wide angle A2 shown by guidelines 5006.

FIG. 51A is a top view of a standing platform 5101 with a surface 5105 that contains a circular central region 5102 of 2-inch diameter and a surrounding edge 5106 between perimeter 5104 and an edge band outside line 5103 indicating where the surface 5105 height begins to substantially diminish. FIG. 51B is a top view showing further details of the region within the area B of the standing platform 5101 of FIG. 51A with the surrounding edge 5106 between perimeter 5104 and edge band outside line 5103 indicating where the surface 5105 height begins to substantially diminish. FIG. 51C is a front view of the standing platform 5101 of FIG. 51A with surrounding edge 5106 between perimeter 5104 and edge band outside line 5103 indicating where the surface 5105 height begins to substantially diminish. FIG. 51D is a front view showing further details of the region within the area D of the standing platform 5101 of FIG. 51C with surrounding edge 5106 between perimeter 5104 and edge band outside line 5103 indicating where surface 5105 height begins to substantially diminish.

FIG. 51E is a top view of the standing platform 5101 of FIG. 51A with surface 5105 that contains circular central region 5102 of 2-inch diameter and surrounding edge 5106 between perimeter 5104 and edge band outside line 5103 indicating where the surface 5105 height begins to substantially diminish. Also shown in FIG. 51E is an edge band 5107 between edge band outside line 5103 and an edge band inside line 5108. FIG. 51F is a top view showing further details within the area F of the standing platform 5101 of FIG. 51E with the surrounding edge 5106 between perimeter 5104 and edge band outside line 5103 indicating where the surface 5105 height begins to substantially diminish and edge band 5107 between edge band outside line 5103 and edge band inside line 5108. FIG. 51G is a top view of standing platform 5101 of FIG. 51A with surface 5105 that contains circular central region 5102 of 2-inch diameter inside of a center area 5116 and surrounding edge 5106 between perimeter 5104 and edge band outside line 5103 indicating where the surface 5105 height begins to substantially diminish. Also shown in FIG. 51G is a near edge area 5109 between the edge band outside line 5103 and an exemplary third line 5110, delineating where the compression modulus is 90% of the center compression modulus at the outside of center area 5116, placed three inches inside of edge band outside line 5103. FIG. 51H is a top view showing further details of the region within the area H of the standing platform 5101 of FIG. 51G with the surrounding edge 5106 between perimeter 5104 and edge band outside line 5103 indicating where the surface 5105 height begins to substantially diminish and near edge area 5109 between the edge band outside line 5103 and exemplary third line 5110 placed three inches inside of edge band outside line 5103 and marking the perimeter of center area 5116.

FIG. 51I shows the feet 5115 of a 99th percentile male user standing on a circular standing platform 5111. The user has a comfortable and natural stance, such that the distance W between the inside of the tips of the feet, or inside the large toes, is equal to the width of the user's shoulders (20.6"). This distance is shown as distance W. The feet 5115 are angled outwards which is a normal standing stance. The amount that the feet 5115 are pointed out is 25 degrees per side, because it has been shown that this is the most stable toe out angle and therefore it is a typical natural way to stand (source: *The influence of foot position on standing balance* by R. L. Kirby, N. A. Price, and D. A. MacLeod, Journal of Biomechanics, Vol. 20, No. 4, 1987, and available at http://www.ncbi.nlm.nih.gov/pubmed.3597457). The FIGure is labeled to show the near edge region 5109 and the surrounding edge 5106. When determining the maximum necessary size for a circular standing platform, the chosen criteria is a mat that allows for the defined comfortable stance of a 99th percentile user that results in the forefoot 5112 resting within the near edge region 5109, and the heel 5113 of the foot resting outside of the near edge region 5109 and on the surface 5105. The center 5114 of the foot resides somewhere around the inside perimeter of the near edge region 5110. The resulting maximum necessary size diameter, D, is 28.75 inches.

FIG. 52A shows a platform 5201 that is clamped at one end 5204 by a fixture 5202 and the opposite end 5203 is extended freely as a cantilever. This image depicts a practically infinitely rigid platform because it is perfectly straight and the extended end 5203 does not deflect downward. FIG. 52B shows a platform 5201 that is clamped at one end 5204 by a fixture 5202 and the opposite end 5203 is extended freely as a cantilever. This platform has a finite rigidity and as a result, the extended end 5203 deflects downwards a distance "d". FIG. 52C shows a supported platform 5201 that is supported at one end 5204 by a fixed support 5205 and supported at the opposite end 5203 by a roller support 5206 so that it is not over constrained. The distance from the center of the bottom surface 5208 of the platform 5201 to the ground 5207 is "y1" when the platform is unloaded. FIG. 52D shows a supported platform 5201 that has a load of F applied to it over the central region. This causes the platform 5201 to bend so that the center of the bottom surface 5208 of the platform gets closer to the ground 5207 and the distance between the two is measured as "y2". Additionally, this causes the platform 5201 to compress at the fixed support 5205 and roller support 5206 so that the center of the bottom surface 5208 of the platform gets closer to the ground 5207 by a portion attributable to this compression and the distance of this compression is measured as "y3". The difference between y1 and the quantity y2 plus y3 is the amount of center bending deflection caused by the load F.

FIG. 52E is a cross-section view of a platform 5201. It has a mat thickness or height of "H1". An unloaded impactor 5209 produces no deflection of the top surface. FIG. 52F is a cross-section view of platform 5201. It has a mat thickness or height of "H1". A loaded impactor 5209 causes the top surface to deflect and results in a deflected height "H2". The ratio of H1 to H2 is the resulting strain. FIG. 52G is an isometric view of the platform 5201 with a loaded impactor 5209 causing the top surface to deflect, creating a depressed area.

FIG. 53A is a front view of a drop test impactor 5308 positioned above a standing platform 5301 on the ground 4307 with the wooden ovals 5302 attached to base 5303 and raised to initial drop height, Hd, above the top surface 5309 of standing platform 5301. The drop test impactor shaft 5306 is guided by bearings 5305 and loaded with weight 5304 on top of base 5303. FIG. 53B is a side view of a drop test impactor 5308 positioned above a standing platform 5301 on the ground 5307 with the wooden ovals 5302 attached to base 5303 and raised to initial drop height, Hd, above the top surface 5309 of standing platform 5301. The drop test impactor shaft 5306 is guided by bearings 5305 and loaded with weight 5304.

FIG. 53C is a front view of a drop test impactor 5308 that has been dropped and wooden ovals 5302 attached to base 5303 are impacting a standing platform 5301 on the ground 5307. The drop test impactor shaft 5306 is guided by bearings 5305 and loaded with weight 5304. FIG. 53D is a side view of a drop test impactor 5308 that has been dropped and wooden ovals 5302 attached to base 5303 are impacting a standing platform 5301 on the ground 5307. The drop test impactor shaft 5306 is guided by bearings 5305 and loaded with weight 5304. FIG. 53E is a front view of a drop test impactor 5308 that has rebounded and wooden ovals 5302 attached to base 5303 have risen to a maximum height of Hr, above the top surface 5309 of standing platform 5301, after impacting a standing platform 5301 on the ground 5307. The drop test impactor shaft 5306 is guided by bearings 5305 and loaded with weight 5304. FIG. 53F is a side view of a drop test impactor 5308 that has rebounded and wooden ovals 5302 attached to base 5303 have risen to a maximum height of Hr, above the top surface 5309 of standing platform 5301, after impacting a standing platform 5301 on the ground 5307. The drop test impactor shaft 5306 is guided by bearings 5305 and loaded with weight 5304.

FIG. 54A is a graph showing the stress versus strain response of a viscoelastic material where the solid line depicts the compression and the dashed line depicts the release and the difference between the two curves is the energy loss due to hysteresis. FIG. 55A is a graph showing catenary curves for the equation $$y = a\, \cosh\!\left(\frac{x}{a}\right)$$

with different "α" values.

FIG. 56A is a top view which shows a standing platform 5601 that has massage protrusions 5603 on its front edge 5602. FIG. 56B is a side view showing the protrusions 5603 extending out from the standing platform surface 5601. These protrusions 5603 may be a variety of sizes, heights, and located with various spacing. The protrusions 5603 may also be located on other edges or even on the top surface of the standing platform 5601. There may also be multiple rows or groupings of protrusions 5603. FIG. 56C is an upper isometric view and FIG. 56D is a side view which show a user 5605 standing on the front edge 5602 with the massage bumps 5603 pressing into the bottom of the user's feet 5604. FIG. 56E is a top view and FIG. 56F is a side view which show an example of a platform 5601 that has smaller and more densely packed protrusions 5606 on the front edge 5602.

FIGS. 57A-57D show an array of slats 5701 that can be placed on top of a standing platform 5702 to add a different texture or feeling underfoot. The array of slats 5701 exhibits a greater rigidity along the dimension of each slat length than along the perpendicular dimension along each slat width between its long edges. The array of slats 5701 can also be used to exercise or stretch a user's feet 5703. FIG. 57A is an upper isometric view which shows how a user 5704 can orient their feet 5703 for a more stable front-to-back surface while still being able to pivot the long edges of the slats 5701 toward the inside and outside of their feet to exercise or stretch their feet. FIG. 57B is an upper isometric view that illustrates how the user can orient their feet 5703 perpendicular to the length of the slats 5701 in order to easily pivot the slats about the long edges of the slats toward the front and back of their feet while still having a more stable side-to-side surface. FIG. 57C is an upper isometric view that shows how the slats 5705 can be oriented perpendicular to the slats 5701 of FIG. 57A in order to take advantage of the ability for the slats to pivot while orienting their feet in a different direction. The individual slats, 5701 and 5705, can be made out of a rigid or semi-rigid material. Different combinations of rigid, semi-rigid, hard or soft slats can be combined to create the array of slats, 5701 and 5705. FIG. 57D is an exploded upper isometric view of the standing platform 5702 of FIG. 57A which shows the separate slats 5701 are held in place with string 5706. The string 5706 can also be thread, wire, or rope. The slats, 5701 and 5705, may also be adhered to the standing platform 5702 or they may be held together by a rigid or semi-rigid base similar to base 5805 of FIG. 58D.

FIGS. 58A-58D demonstrate the use of an array of square protrusions 5806 attached to a base 5805. The array of squares 5801 is another embodiment that adds texture to a standing platform and can massage the user's feet 5804. FIG. 58A is an upper isometric view that illustrates how the user 5807 can take advantage of the benefits of the array of squares 5801 by placing the array of squares 5801 on a standing platform 5802 and standing on them. FIG. 58B is a cross-section view which shows how standing on the array of squares 5801 causes them to shift, deform, or articulate. This in turn helps the user 5807 stretch or exercise their feet 5804 by encouraging the user to re-adjust their foot 5804 position. FIG. 58C is an exploded upper isometric view that shows how the array of squares 5801 is placed on the standing platform 5802. FIG. 58D is an upper isometric view that shows the square protrusions 5806 and base 5805 are formed into one piece, array of squares 5801. The square protrusions 5806 can vary and be rigid or semi-rigid and can be made out of different durometer materials to create distinct individual areas such as individual area 5803 in the array of squares 5801 that are firmer or softer than other distinct individual areas. The base 5805 can be made out of rigid or semi-rigid materials to allow the base to flex or deform appropriate to the flexural rigidity and compression modulus of the standing platform 5802. The squares are not the only shape available, as any polygonal shape may be utilized. For example, they can be octagonal or triangular and the like. Additionally, the pattern and location of the protrusions, (one embodiment being the array of squares 5801), may be altered such that certain portions corresponding to the array of squares 5801 may be smooth and other portions or areas possess protrusions. Multiple versions or patterns corresponding to the array of squares 5801 may be made available to tailor for different types of user's feet 5804, their shape and size. Thus, portions of the surface may have protrusions, and other portions may be smooth. Additionally, a user's weight may affect the rigidity selected for the protrusions on the portions corresponding to the array of squares 5801.

FIGS. 59A-59D show the use of individual heel platforms 5901 that can be used to create a more stable standing surface for users with shoes or heels 5902. The individual heel platforms 5901 can be used with any standing platform 5903. FIG. 59A is an upper isometric view and FIG. 59D is an exploded upper isometric view which show the individual heel platforms 5901 resting on the standing platform 5903. FIGS. 59B and 59C are upper isometric views which show that the cupped individual heel platforms 5904 can be moved around according to the user's preference. The individual heel platforms 5901 are shown in a circular shape but, they may also be shaped square, triangular, or any convex (typically regular) polygon. Additionally, the size of the platforms 5901 may vary in order to accommodate user preferences or habits of movement on the mat. Some users may require larger platforms 5901 while some may be able to comfortably use smaller surface area platforms 5901. FIG. 59E is a large upper isometric view that shows cupped individual heel platforms 5904 in detail. FIG. 59F is a cross-section view of the cupped individual heel platforms 5904. The stiletto of the heel 5902 rests inside the cupped individual heel platform 5904, but does not attach to it. The cupped individual heel platform 5904 allows the user to move the platform with the stiletto of their shoe. This allows the user to quickly move the individual heel platforms to their desired position without having to bend over or look at the individual heel platforms.

FIG. 60A is an upper isometric view and FIG. 60B is a top view which illustrate a standing platform with edges that have various levels of curvature. The larger radius curve 6001 can be used as a larger rocking edge. The large radius curve 6002 allows the smaller radius curve 6003 and curve 6004 to provide a more volatile rocking edge that provides a smaller amplitude of rocking before reaching the limiting force at which no further rocking amplitude is provided and the edge collapses completely. Curve 6003 and curve 6004 also have a different feeling underfoot compared to the larger curve 6001 and curve 6002. The standing platforms in FIG. 60 can have more levels of curvature, be ridged, or semi-rigid. FIG. 60C is a top view that illustrates a different way of having a standing platform with edges that have various levels of curvature. The standing platform in FIG. 60C has two large concave curves 6006 which allow the standing platform to pivot about the smaller radius curves 6005. The medium radius curve 6007 provides another option for rocking, and feels something in between the feel of larger radius curves (e.g., curve 6001) and the smaller radius curves (e.g., curve 6004).

FIG. 60D shows a platform that has a curved front edge 6008 and a curved rear edge 6009 which is concentric with the front edge 6008. The four corners 6010 are shown to have relatively small and equal radiuses, although they can vary in size. The sides 6011 are shown to be straight and intersecting the center point of the curved edges 6008 and 6009, but the sides 6011 may also be curved and can be offset from the center point of the curved edges.

FIG. 60E shows an oblong diamond shape platform. The width between the front and rear corners 6012 is less than the length between the side corners 6013. The straight sides 6014 are shown to be equal and symmetrical, but they do not have to be.

FIG. 60F shows a narrow rectangular platform. The four corners 6017 are shown to have equal radiuses but they can vary in size. The length between the sides 6016 falls within the specified range to allow a natural standing stance, while the width between the front and back edges 6015 is sized to be approximately foot length. Different width boards can be offered for people with different size feet. The narrow width allows for substantial interaction with the edges because there is no central flat area to stand away from the edges. This allows the user to interact with both the front and rear edges 6015 at the same time (see also the related center section 402 in FIGS. 4D-4F).

FIGS. 60G-60K show various polygonal shaped standing platforms. FIG. 60G is a top view of a triangular platform with straight sides 6019 and rounded corners 6018. FIG. 60H a top view of a square standing platform with equal sides 6020 and rounded edges 6021. FIG. 60I a top view of a pentagonal standing platform with equal sides 6023 and rounded corners 6022. FIG. 60J a top view of a hexagonal standing platform with equal sides 6026 and rounded corners 6025. FIG. 60K is a top view of an octagonal standing platform with equal sides 6028 and rounded corners 6027. FIGS. 60I and 60J show one foot 6024 closer to one side in the near edge area and the other foot 6024 closer to the center of the board.

FIG. 61 (comprising FIGS. 61A-61D) demonstrates a system that allows a user to control the contour or flex of their standing platform. FIG. 61A is an exploded upper isometric view which shows two D shaped blocks 6102 placed on the floor 6104 that support a standing platform 6101. The D shaped blocks 6102 can also be attached to the standing platform 6101 or they can be attached to a support structure, such as a rail or frame, which can be attached or not attached to the standing platform 6101. The D shaped blocks 6102 can attach to the support structure in different locations so their spacing can be adjusted to change the contour of the standing platform 6101. When a user applies a load 6103 by standing on the standing platform 6101 its shape or contour changes depending on the distance between the two blocks 6102 and the locations of the user's load 6103. The contour can be either concave as shown in FIG. 61B and FIG. 61C or convex as shown in FIG. 61D. FIG. 61B is a front view which shows the D shaped blocks 6102 oriented to create a concave surface. FIG. 61C is a front view showing how the user can generate a more concave surface. FIG. 61D is a front view showing how the user can orient the D shaped blocks 6102 to create a convex surface. The contour can also twist by placing the D shaped blocks 6102 at an angle to each other instead of parallel to each other. The contour of the standing platform can be used to correct the user's pronation or supination. The contour can also be used to stretch the user's calves and ankles.

Alternatively, not shown, the bumps 6102 in FIG. 61 can also be used to raise the board 6101 off the ground 6104 to allow for additional exercises. If the raised board 6101 rigidity falls within an appropriate range (depending on the user's weight, a bending rigidity in the range 15-122 lb×in$^{-1}$) it can be flexed to provide a leg exercise. The height that the board is raised off the ground increases the range of motion of the flex. Also the board 6101 can be pre-flexed up so that it requires an even greater motion to flatten the end of the board against the ground.

FIG. 62A is a top view showing a standing platform 6201 that has curved end attachments 6202 connected to the ends of the platform 6201 to increase and ease of the rockability of the board. The attachments 6202 are shown to have a profile that follows along with the shape of platform 6201. Other profiles can also be used, such as a more rounded, larger radius curve, or even shapes that have corners. Such attachments improve the disclosed design's already enhanced ability to allow a user to initiate a rocking motion from a standing position. FIG. 62B is a front view showing that the end attachments 6202 have curved bottom surfaces 6204 that provide a larger rocking region which make it easier for the user to tilt the board. The attachments 6202 are connected to the board 6201 with T-slot connections 6203. FIG. 62C is an upper isometric view of a standing platform 6201 that is connected with T-slot connections 6203 to curved end attachments 6202. FIG. 62D is a front view of just the end attachment 6202. The curved bottom surface 6204 can be made to have various curvatures and heights to change the rocking response of the board. FIG. 62E is a top cross-section view along the line E of the end attachment 6202 of FIG. 62D showing the T-slot connections 6203. Flange 6205 retains the T-connectors 6206 of FIG. 62F that are attached to the platform 6201. FIG. 62F is an exploded upper isometric view showing the end attachments 6202 removed. The platform 6201 has T-connectors 6206 in the corners that interlock with the T-slot connections 6203 on the end attachments 6202. These can be fitted together when the board 6201 is deflated, and then when it is inflated, the T-connectors 6206 are tensioned and the attachments 6202 are firmly attached.

FIG. 62G is a top view of a board 6201 with angled end attachments 6207. There are many different types of attachments that can connect to the board 6201 and enhance the functionality, and this shows another example of one. FIG. 62H is a front view showing the shape of the angled attachments 6207. The angled attachments 6207 have a curved bottom 6208 for rocking, a flat surface 6209 for resting, and an angled surface 6210, which allows the user increased leverage to initiate and sustain a rocking action. FIG. 62I is a right side view of a standing platform 6201 with angled attachments 6207 that have a curved bottom 6208. FIG. 62J is a partial front section view along the line J of the standing platform 6201 of FIG. 62I showing how one angled attachment 6207 connects to the platform 6201. The platform 6201 has a strap 6213 attached to it that holds a ring 6212. A pin 6211 slides through the ring 6212 and is retained by a groove in the end attachment 6207. This can be installed easily when the board 6201 is deflated, and then, when it is inflated, the strap 6213 is tensioned, and the pin 6211 securely holds the angled attachment 6207 onto the board 6201. FIG. 62K is an exploded upper isometric view showing the angled attachments 6207 removed from the platform 6201. The rings 6212 are visible on the ends of the platform 6201. And the pin 6211 is shown removed from the system.

FIG. 63A is an upper isometric view that shows a standing platform 6301 with plastic end attachments 6302 that contain captive button protrusions 6303. The plastic ends 6302 are attached to the platform 6301 with T-connectors 6305 (as shown in FIG. 63B) and T-slot connections 6304. FIG. 63B is an exploded upper isometric view showing the components of the assembly. There is a plurality of button-like protrusions 6303 that are held in place within the end attachments 6302 and the platform 6301. The platform 6301 has four T-connectors 6305 that interface with the T-slot connections 6304 on the end attachments 6302. Also a soft base 6306 attaches to the bottom of the platform 6301 and attachments 6302. This base 6306 provides a soft contact for floor surfaces, and it fills in the gap between the floor and the platform 6301 due to it being lifted off the ground by the end attachments 6302. The base 6306 can be a uniform material, or it can be a composite material composed of varying stiffness and hardness. FIG. 63C is a detailed view of the region within the area C of FIG. 63B showing the T-connector 6305 attachment point of the standing platform 6301. FIG. 63D is a detailed view of the region within the area D of FIG. 63B showing the T-slot connection 6304 point on the end attachment 6302. The connection has a slot 6308 where the T-connector 6305 (shown in FIG. 63C) slides in, and flanges 6307 that retain the T-connectors 6305. To install the end attachments 6302 they are slipped onto the platform 6301 when it is deflated, and the T-connectors 6305 slide into the T-slot connections 6304 and then into slot 6308. Then the platform 6301 is inflated and that tensions the T-connectors 6305 against the flanges 6307 and holds them in place. FIG. 63E is a side view of the system showing the soft base 6306 under the platform 6301 with attached plastic ends 6302 with button protrusions 6303 and T-slot connections 6304. FIG. 63F is a front cross-section view along the line F of FIG. 63E showing one side of the platform 6301. There is a plurality of holes in the top of the plastic end 6302 where the button protrusions 6303 fit through. The base of the button protrusions 6303 is supported by the platform 6301. The button protrusions 6303 are held captive in the holes by their flanges.

FIG. 63G is a side view of the system showing the soft base 6306 under the platform 6301 with attached plastic ends 6302 with T-slot connections 6304 with a foot 6309 stepping on and depressing the button protrusions 6303 of FIG. 63F. FIG. 63H is a front cross-section view along the line H of FIG. 63G showing one side of the platform 6301. The user's foot 6309 presses against the button protrusions 6303 causing them to deflect the platform 6301 so they can depress. Several benefits result. Because the button protrusions 6303 are able to depress downward partially or in whole from beneath the top end or surface of the attachment plastic ends 6302, the user is able to receive stimulation underfoot that is not overly noticeable or distracting. Such a configuration provides a less pronounced pressure to the feet and provides the user configurable control over the level of stimulation. For example, a highly over-pronating hypermobile or "flat footed" user may prefer softer button protrusions 6303 that descend further beneath the top plate or surface of plastic ends 6302, while a high arch footed user may desire firmer and more elevated button protrusions 6303 to stimulate their feet. Additionally, the quantity and pattern of the button protrusions 6303 are configurable for each user by adding or subtracting button protrusions 6303 that may protrude through the top plate of plastic ends 6302. This is a significant improvement over current designs. The button protrusions 6303 can be a hard material such as metal or plastic, or they can also be soft and cushioned like rubber or other softer elastomer materials. The shape of the button protrusions 6303 can include flat cylinders, rounded cylinders, pointed cones, and other polygonal shapes that provide interesting or beneficial stimulation for feet. When using hard button protrusions 6303 they are able to deflect due to the deforming platform 6301. Button protrusions 6303 with different size flanges can be used to change the feel. For example, using button protrusions 6303 with a larger diameter flange takes more force to deform the platform 6301 so they feel stiffer. The height of the button protrusions 6303 can also be varied to change the intensity of the feel underfoot. Also button protrusions 6303 with different heights can be installed simultaneously for different interactions with the foot 6303. One use is to have the button protrusions 6303 follow the profile of a user's foot, while at other times the opposite configuration may be desired.

There are additional ways to add depressible button protrusions to a standing platform. One example is for the button protrusions to be constrained within a flexible skin. The skin can be a fabric or film like material that wraps around the platform. The skin can open up with a zipper to fit over the board, or it can be an elastic material that stretches over the board. When the board is inflated, the skin has a tight fit. The skin has hole openings and possibly grommets to reinforce those holes. The button protrusions are held captive in the holes, and extend up above the top of the skin. They can be depressed just like the embodiment shown with the attachments plastic ends 6302.

FIG. 64A is a front view which shows an assembled Schrader core valve. The Schrader core valve has a top body 6401, a bottom body 6402, and a cap 6403. FIG. 64B is a side cross-section view along the line B of FIG. 64A showing the inside of the assembled Schrader type core valve. The top body 6401 has an affixed Schrader insert 6406, which is threaded to accept a Schrader valve core 6405. The Schrader valve core 6405 is a common type of valve found on car tires, bicycle tires, and many other air inflation applications. The cap 6403 has an affixed threaded insert 6404 which threads onto the external threads of the Schrader insert 6406 to cover the valve and provide a smooth top. These valves are used for standing platforms, so it is important for the cap 6403 to have a smooth profile so it does not hurt to step on. The top body 6401 threads into the bottom body 6402 and is sealed with an internal gasket 6407. FIG. 64C is an upper isometric view showing the top of the assembly. The top of the cap 6403 has recesses 6408 to provide grip for fingers only in the direction of removal. This limits the amount of tightening torque the user can apply, while increasing the amount of removal torque. This prevents over tightening and ensures the user can get the cap back off while maintaining a mostly flat and smooth surface. FIG. 64D is a lower isometric view showing the bottom of the assembly. There are openings 6409 that allow air to flow through while blocking objects from entering and damaging the valve. The bottom body 6402 has two wing ribs 6410 which provides grip when screwing the two bodies together. FIG. 64E is an exploded upper isometric view showing the parts that make up the Schrader type core valve assembly.

FIG. 64F is a front view of a Schrader core valve clamped onto a sheet 6411 of material that makes up the top surface of a standing platform. The sheet 6411 is clamped between the top body 6401 and the bottom body 6402 of the valve. FIG. 64G is a side cross-section view along the line G of FIG. 64F showing the top body 6401 threaded into the bottom body 6402 with the sheet 6411 clamped between them. This embodiment has an additional O-ring 6413 to provide additional sealing between the top of the sheet 6411 and the top body 6401. FIG. 64H is a detailed side cross-section view of the region within the area H of FIG. 64G showing the top body 6401 clamping the sheet 6411 against the bottom body 6402. The top O-ring 6413 seals against the sheet 6411 and is held in the O-ring groove 6412. FIG. 64I is an exploded lower isometric view showing the O-ring 6413 removed from the O-ring groove 6412 of the top body 6401 and the sheet 6411 fitting between the O-ring 6413 and the bottom body 6402.

FIG. 65A is a side view of a typical air inflation hand pump. A typical air inflation hand pump has a pump body 6501, a shaft 6502, a handle 6503, a hose 6504, and a threaded end 6505. FIG. 65B is a front cross-section view along the line B of FIG. 65A showing a typical air inflation hand pump. This shows that the shaft 6502 has an internal bore 6506 and the piston 6507 compresses air in the pump body 6501. Check valve 6508 at the base of the pump lets air in, but does not let it out during pumping. This is one example of a single action pump design. There are many different pump designs including dual action pumps, which move air when the pump is moved both up and down instead pumping only in one of those directions. Any pump design is suitable provided the displacement is large enough to fill the platforms in a timely manner and that it can produce a pressure of at least 5 psi. FIG. 65C is an upper isometric view of the pump. FIG. 65D is a front view demonstrating an example of a quarter turn adapter that interfaces between a quarter turn valve and the pump hose threaded end 6505. The quarter turn adapter has a body 6509, a vertical slot 6510, a horizontal slot 6511, a gasket 6512, grips 6513, and a threaded fitting 6514. The threaded fitting 6514 screws into the pump hose 6504 threaded end 6505. Quarter turn valves have a locking cross bar, which slides into the vertical slot 6510 and then grips 6513 permit the adapter to rotate 90 degrees to lock the cross bar into the horizontal slot 6511. The gasket 6512 provides an airtight seal against the quarter turn valve during inflation. FIG. 65E is an example of a typical air needle 6515 which is used to fill certain types of air valves which can be used on the standing platform.

FIG. 66 (comprising FIGS. 66A-66L) demonstrates a rigid or semi-rigid edge of either hollow edge 6601 or framed edge 6605 with ribs 6602 to keep it strong and lightweight. FIG. 66A is an upper isometric view of a rigid or semi-rigid framed edge 6605 with reinforcing ribs 6602. The rigid or semi-rigid hollow edge 6601 can be bonded with an inflatable drop stitch fabric by bonding to a top layer 6603 and a bottom layer 6604 of the drop stitch fabric to create an inflatable standing platform as shown in FIGS. 66C-66D. FIG. 66B is an upper isometric view and FIG. 66C is a front view of a rigid or semi-rigid hollow edge 6601 attached to a top layer 6603 and bottom layer 6604 to create an inflatable standing platform. FIG. 66D is a detailed view of the area D of FIG. 66C showing a more detailed view of the hollow edge 6601, top layer 6603, and bottom layer 6604. FIG. 66F is a detailed cross-section view which shows a rigid or semi-rigid hollow edge 6601 that is closed with rounded corners, the rounded corners keep the drop stitch material 6608 from being damaged by sharp corners that could shear or tear the top layer 6603 when a user loads it, such as by standing upon it. The rigid or semi-rigid edge, either edge 6601, 6605, 6606, and 6609, may also be attached to a top layer 6603, bottom layer 6604, and side rail 6607 that covers the entire perimeter of the standing platform as shown, using edge 6609, in FIG. 66K. FIG. 66K is a detailed cross-section view which also demonstrates a rigid or semi rigid edge 6609 that has the top and bottom edges of 6609 lined up so that no bump is formed after inflation along the perimeter of the top layer 6603. The rigid or semi-rigid hollow edge 6601 makes the inflatable standing platform easier to tilt or rock.

FIG. 66E is a detailed cross-section view which shows how the standing platform can be made to form a bump around the perimeter of the top layer 6603 by using a framed edge 6605. The perimeter bump serves as a softer surface for the user to place their feet and can also alert the user when their feet are near the edge of the standing platform. As shown in FIG. 66E, the reason the perimeter bump is formed is because the top edge and the bottom edge of 6605 do not line up with each other, unlike as shown with hollowed edge 6601 in FIG. 66F. As shown in FIGS. 66G-66J, the rigid or semi-rigid edge can be two separate end pieces 6606 instead of one whole hollow edge 6601. FIG. 66H is an upper isometric view of two separate end pieced 6606. FIG. 66G is an upper isometric view, FIG. 66I is a front view, and FIG. 66J is a detailed view within the area J of FIG. 66I which show two separate end pieces 6606 attached to a top layer 6603, a bottom layer 6604, and two side rails 6607. The side rails 6607 overlap the top layer 6603, and the bottom layer 6604, as shown in FIG. 66L. FIG. 66L is a detailed section view which shows how the side rails 6607 are attached to the top layer 6603 and bottom layer 6604. The side rails 6607 also overlap a portion of the two separate rigid or semi rigid end pieces 6606, the top layer 6603, and the bottom layer 6604 as shown in FIG. 66J. The rigid or semi-rigid edge 6601, 6605, 6606, and 6609 can be soft or hard and may also be double shot with multiple durometer layers of material to control the rigidity of different regions.

FIG. 67 (comprising FIGS. 67A-67F) demonstrates a wireless power transfer system 6705 that can be used to power objects on a rigid or semi-rigid standing platform 6706. FIG. 67A is an upper isometric view and FIG. 67C is an exploded upper isometric view of wireless power transfer system 6705 resting on top of the standing platform 6706. FIG. 67D is an upper isometric view of the standing platform 6706 resting on the wireless power transfer system 6705. The wireless power transfer system 6705 may use magnetic induction coupling or magnetic resonance coupling power transfer technology to power devices that can be used with the standing platform 6706. The transmitter coils 6703 in the wireless power transfer system 6705 generate an alternating magnetic field when an alternating electric current passes through them. When receiver coils, which are installed in the devices that will be powered, are close to the transmitter coils 6703, magnetic flux passes through them creating an electric current, proportional to Faraday's law, to power the device. When power needs to be transferred to larger distances a material with a high permeability can be used in between the transmitter and receiver. Increasing the strength of the magnetic field, increasing the mutual inductance, or changing other electromagnetic properties of the system can also increase the distance that power can be transferred. If the transmitter and the receiver can be made to resonate at the same frequency, then power can be transferred wirelessly at higher efficiencies for larger distances as was shown by Mann Soljacic and his team (U.S. Pat. No. 7,825,543 B2). The wireless power transfer system 6705 can be placed on top of the standing platform 6706, on the bottom of the standing platform 6706, or be integrated into the standing platform 6706. The large array of coils 6703 ensures that any device that is being powered by the wireless power transfer system 6705 will always be efficiently powered while on the standing platform 6706. The wireless power transfer system 6705 can have a magnetically attached plug 6701. The coils 6703 of the power transfer system 6705 are sandwiched between two layers, 6702 and 6704. Each layer can be soft, hard, rigid, semi-rigid, or non-rigid. FIG. 67B is an exploded upper isometric view showing the various parts of the wireless power transfer system 6705 which include the magnetic plug 6701, the top layer 6702, the large array of coils 6703, and the bottom layer 6704. FIG. 67E is an upper isometric view and FIG. 67F is a front cross-section view which show an alternate embodiment, where the standing platform 6708 has a cavity within it. The internal wireless power transfer system 6707 fits into the platform 6708 with cavity and is enclosed. The platform 6708 with cavity can be any type of material mentioned including foam, an inflatable, or plastic.

FIG. 68A is a detailed partial front view, only showing the end of a standing platform 6801 when it is flat on the ground. FIGS. 68B-68G show the end of a platform 6801 as the platform is tilted up under a load at increasing angles. FIG. 68B, FIG. 68C, FIG. 68D, FIG. 68E, FIG. 68F, and FIG. 68G are detailed partial front views with the end of a standing platform 6801 tilting under load to angles 1, 2.5, 5, 10, 20, and 30 degrees, respectively. Under load, the bottom surface 6803 of the platform 6801 lifts off the ground, while a small contact patch area 6802 deforms flat under load and remains in contact with the ground. The contact patch center 6804 is marked with a point on the contact patch area 6802 of each FIGure. FIG. 68H is a detailed front view which overlays the position for FIGS. 68B-68G of the contact patch center 6804 over a standing platform 6801 at rest. These contact patch centers 6804 form a line that defines the equivalent curve 6806. The actual radius of the curved edge 6805 is shown to be 25 mm, providing a rocking region. However, when a user rocks on the edge, the platform 6801 behaves like it has a curved edge equal to the equivalent edge 6806, which is shown to be 45 mm, providing a larger effective rocking region. This is due to the collapsing edge. This behavior continues beyond the 30 degrees shown in FIG. 68G to 45 degrees or even further as the user continues to tilt further. If the edge is rigid, the effective radius of curvature remains 25 mm throughout the rocking motion, providing a fixed rocking region. Setting the platform 6801 to have different stiffness values changes the ratio of the equivalent radius to the actual radius, providing a change to the effective rocking region.

FIG. 69A is an upper isometric view and FIG. 69B is a front view showing standing platform cover 6901 that has a zipper 6902 and zipper teeth 6904 to allow it to open and close. The cover 6901 can open so that it can be installed over an inflatable standing platform. The standing platform cover 6901 can be made out of an elastic or non-elastic material, have hard panels with elastic sides, or be some variation of elastic, non-elastic, hard, soft, rigid, semi-rigid, or non-rigid material. FIG. 69C is a lower isometric view of a standing platform cover 6901 where the bottom surface of the cover is comprised of a mesh of elastic bands 6903 rather than fabric. The elastic bands 6903 allow the cover 6901 to stretch so it can be installed on a pre-inflated platform. The elastic bands 6903 also allow the cover to stretch so that it conforms with the standing platform even as it is deformed. FIG. 69D is an upper isometric view showing the standing platform cover 6901 with zipper 6902 and zipper teeth 6904 unzipped and opened. If the standing platform cover 6901 is made of non-elastic material an inflatable standing platform can have the cover 6901 installed by deflating the standing platform, placing the standing platform inside the cover, then inflating the standing platform and zipping up the cover 6901. The standing platform cover 6901 can employ other types of closing and opening mechanisms such as Velcro™, mircosuction tape, magnets, overlapping fabric, and buttons. The cover fabric can be made to be a variety of colors so the user can customize their standing platform by swapping covers. The standing platform cover 6901 can also be grounded by being attached to a ground terminal while being made of conductive material.

FIG. 70 (comprising FIGS. 70A-70C) shows a platform 7001 that has a concave edge around its perimeter. FIG. 70A shows a platform 7001 with an elliptical concave profile 7002 on one end of the board, and a circular concave profile 7003 on the other end. A variety of profile shapes can be used, and they can have a constant profile around the board, or they can transition between different profile shapes (e.g., elliptical or circular shape). This type of edge creates a near edge region that has a compression modulus lower than the center of the board using geometry alone. This allows a board that is made of a single material to achieve a soft conforming edge while having a stiffer center area. FIG. 70B shows how the concave ends 7002 and 7003 flex and deform easier than the solid center section. FIG. 70C shows the platform 7001 in use, where a user is tilting the board 7001 on the elliptical concave end 7002. The end 7002 flexes between the user's right foot 7005 and the ground 7004 so that the board 7001 can tilt up. The user's left foot 7006 is positioned on the center area of the platform 7001 and is lifted up by the tilting board. The circular concave end 7003 is undeformed and freely lifted.

Various embodiments of the standing platform disclosed herein may be distributed in conjunction with accessories as described below and elsewhere herein. For example, one or more embodiments of the standing platform may be distributed in packaging including a standing platform and one or more of the following disclosed accessories: compliant or non-compliant rocking bottom 915, toroidal compliant or non-compliant base 916, corner supports 1302, clips 1902, ramp attachment 2001, elastic bands 3303, adjustable tilting base 3602, rigid insert 4206, front-to-back roller 4208, fixed adjustable spacer 4209, side-to-side roller 4210, pads 4305, elastic bands 4306, corrective foot pads 4402, rigid plate 4502, damping foam toroidal ring 4607. The combination of a standing platform and one or more of the foregoing accessories may take the form of a kit that is distributed through various channels of distribution. The kit may also include an instruction sheet, which may be separate from or form a portion of a user manual, with instructions printed thereon to direct a user how to use the mat and how to employ the enclosed accessories in connection with the enclosed standing mat. For example, the instruction sheet may have printed thereon instructions to employ an enclosed pump to inflate the standing mat to within characteristics (as disclosed elsewhere herein) that are specified on the instruction sheet.

While the devices have been disclosed in connection with advantageous embodiments, it is not intended to limit the scope of the devices to the particular forms set forth, but on the contrary, it is intended to cover such alternatives, modifications, and equivalents as may be within the spirit and scope of the devices as defined by the appended claims.

Miscellaneous Specifications

A mat for standing comprising: an upper surface that accepts a standing user when the mat is placed on a floor surface; a length measured across a greatest span of the upper surface that is substantially longer than and perpendicular to any width measured across the upper surface, the length being no longer than 39 inches and no shorter than 16 inches; a lower surface positioned substantially opposite to the upper surface and connected to the upper surface by at least an edge of the mat, an external portion of the lower surface contacting the floor surface, the mat characterized by a linear compression modulus, measured at the upper surface, over an entire range of available strain, the linear compression modulus having a given coefficient of determination value of at least 0.92; and the mat characterized by a line, parallel to the greatest span, that permits a first foot position and a second foot position having the same relative position to the line and substantially perpendicular to the line, wherein the first position is entirely within the perimeter of the mat and the second position is such that at least one of a heel or a ball of the foot are at least one of nearer, at, or extending beyond the edge and a center of the foot remains completely within the perimeter of the mat, the mat characterized by a lower compression modulus near the edge, such that the position of the foot in the second position, is in a less stable location than the first position, the mat thereby facilitating the user to more easily rock their foot into at least one of the heel or the ball which encourages and permits more user movement.

The mat having a plurality of widths, from one end of the length to the other end to include a range of widths that permit both a ball and a heel of a user's foot, when substantially perpendicular to the length, to be in a position where the ball and the heel are nearer, at, or extending beyond the edge, the mat characterized by a lower compression modulus nearer to the edge, such that the position of the foot, located in the range of widths, is in a less stable location than wider width areas, the mat thereby facilitating the user to more easily rock their foot into the heel and into the ball which encourages and permits more user movement.

A kit comprising: a trampoline-like mat, comprising an upper surface that accepts a standing user when the mat is placed on a firm surface; and at least a first adjustment mechanism to permit adjustment of a linear compression modulus, measured at the upper surface, over an entire range of available strain, and the linear compression modulus having a given coefficient of determination value of at least 0.92; and an instruction sheet having printed thereon instructions to employ the adjustment mechanism in a manner to cause the linear compression modulus to vary.

The kit of the prior paragraph wherein the mat is inflatable, the kit further comprising a pump for inflating the mat in accordance with instructions on the instruction sheet.

A mat with a curved edge, that spans between an upper and a bottom surface that is substantially oriented perpendicularly to the first and second axes, wherein a majority of the edge has an average radius of curvature of at least 0.5 inches and at most 2.5 inches;

An inflatable board that is pressurized between X and Y psi for a given user weight, higher weight means higher pressure.

The mat of wherein at least a portion of curvature of the edge is non-linear.

The mat where the edge is curved along its continuum.

The mat wherein the linear compression modulus comprises: a linear center compression modulus within a range of 50-100 lb×in$^{-2}$; a linear edge compression modulus within a range of 43-88 lb×in$^{-2}$; and the linear edge compression modulus being 75% to 95% of the linear center compression modulus.

The mat wherein the mat is curved along an oval shape.

The mat further comprising at least a first adjustment mechanism to permit adjustment of a coefficient of restitution, compression modulus, bending rigidity, and flexural rigidity in order to affect rebounding characteristics of the mat.

The mat further comprising at least a first adjustment mechanism to permit adjustment of the bending rigidity and the flexural rigidity and to permit adjustment to achieve an edge of at least 1.5 inches in height, and characterized by a generally curved perimeter of generally curved edge following any curved path along said perimeter.

The mat wherein at least a portion of curvature of the edge is non-linear.

The mat where the edge is curved along its continuum.

The mat where the edge is substantially tapered.

The mat further characterized by an unloaded friction force of less than 3 pounds and a dry 70 lb loaded friction force greater than 25 pounds and a wet 70 lb loaded friction force of at least 80% of the dry 70 lb loaded friction force A curved bottom mat that that has a much higher rigidity and an arched bottom surface to permit rocking.

A regular shaped polygon or circular mat no wider than 29 inches.

A narrow board sized with feet always straddling a near edge area or hanging off into space.

The invention claimed is:

1. A mat for standing comprising:
    an upper surface that accepts a standing user when the mat is placed on a floor surface; a length, measured across a greatest span of the upper surface, that is perpendicular to a greatest width measured across the upper surface, the length being no longer than 40.9 inches, the width being no longer than 25 inches and no shorter than 9.6 inches;
    a lower surface positioned substantially opposite to the upper surface and connected to the upper surface by at least an edge of the mat, an external portion of the lower surface contacting the floor surface;
    a linear compression modulus, measured at the upper surface, for all but a first 10% strain of an available strain, the linear compression modulus having a given coefficient of determination value of at least 0.98; and
    at least a first adjustment mechanism that is operable to modify the linear compression modulus to be within a range of 40 to 100 lb×in$^{-2}$;
    the mat characterized by a lower linear compression modulus as measured within a near edge area than as measured within a central region.

2. The mat of claim 1 wherein a surrounding edge and the near edge area of the upper surface compresses to conform to the bottom of a standing user's foot when the edge is compressed by downward force applied by the user such that one portion of the user's foot straddling the edge is able to approach the floor surface while the other portion of the user's foot maintains contact with the upper surface of the mat.

3. The mat of claim 1 wherein the mat is further characterized by a linear center compression modulus as measured within the central region that is or is adjustable to be within a range of 50 to 100 lb×in$^{-2}$.

4. The mat of claim 1 wherein the mat is further characterized by a linear edge compression modulus as measured within the near edge area that is or is adjustable to be within a range of 43 to 88 lb×in$^{-2}$.

5. The mat of claim 1 wherein the linear compression modulus as measured within the near edge area is a linear edge compression modulus and the linear compression modulus as measured within the central region is a linear center compression modulus, and the linear edge compression modulus and the linear center compression modulus together form a linear compression modulus ratio that is or is adjustable to be within a range of 75% to 95%.

6. The mat of claim 1 wherein the at least a first adjustment mechanism permits an adjustment that can modify the linear compression modulus within a range of 50 to 80 lb×in$^{-2}$.

7. The mat of claim 1 further characterized by:
    a bending rigidity that is or is adjustable to be within a range of 15 to 122 lb×in$^{-1}$; and
    a flexural rigidity that is or is adjustable to be within the range from 2,000 to 101,000 lb×in$^2$.

8. The mat of claim 7 further characterized by a mass less than ten pounds, a mat density less than 0.013 lb×in$^{-3}$, and a surface pressure less than 0.026 lb×in$^{-2}$ to permit the mat to be easily moved by the user's foot.

9. The mat of claim 1 further characterized by a coefficient of restitution greater than 0.70.

10. The mat of claim 1 comprising an inflatable air bladder capable of being pressurized to at least a first pressure within a range of 2 to 5 lb×in$^{-2}$.

11. A mat for standing, comprising:
    an upper surface;
    a lower surface attached to the upper surface;
    at least one of the upper and lower surfaces being substantially planar;
    a length measured across a greatest span of the upper surface that is perpendicular to a greatest width measured across the upper surface, the length being no longer than 40.9 inches, the width being no longer than 25 inches and no shorter than 9.6 inches;
    a generally vertically oriented edge, connecting the lower surface to the upper surface, that conforms under the weight of a standing user to the surface of at least one of the standing user's feet pressing upon the mat;
    wherein the mat is characterized by a mat thickness within the range from 0.5 to 4 inches and has or is adjustable to have a bending rigidity within the range from 15 to 122 lb×in$^{-1}$ and a flexural rigidity within the range from 2,000 to 101,000 lb×in$^2$ such that the mat is self-supporting, the combination of the rigidity, the length, the width, the mat thickness, and the generally vertically oriented edge permitting the standing user with both feet positioned on opposite ends of the mat to rock the mat off the floor on one end using only the standing user's feet, wherein the generally vertically oriented edge comprises at least one rounded convex or concave portion such that when force is exerted at one end, the opposing end elevates off of the floor surface, wherein the mat is characterized by a range of linear deflection spanning downward at least 0.5 inches for a range of forces achievable by an adult sized user when standing and pushing the balls of the adult sized user's feet into the device as the adult sized user's weight shifts from one leg to another where at least 80% of the resulting deflection of the mat remains within the range of linear deflection, wherein the upper surface has a central region, the central region having a center compression modulus, and wherein the mat is further characterized by a linear edge compression modulus, wherein the edge compression modulus is no greater than 95% of the center compression modulus.

12. The mat of claim 11 further characterized by a coefficient of restitution greater than 0.70.

13. The mat of claim 11 wherein at least one portion of the mat is gas-filled.

14. The mat of claim 11 wherein the wherein the mat is characterized by a mat thickness between 1.5 and 3 inches.

15. A mat for standing, comprising:
an upper surface;
a lower surface attached to the upper surface;
at least one of the upper and lower surfaces being substantially planar;
a length measured across a greatest span of the upper surface that is perpendicular to a greatest width measured across the upper surface, the length being no longer than 40.9 inches, the width being no longer than 25 inches and no shorter than 9.6 inches;
a generally vertically oriented edge, connecting the lower surface to the upper surface, that conforms under the weight of a standing user to the surface of at least one of the standing user's feet pressing upon the mat;
a mat thickness between 0.5 and 4 inches, a bending rigidity that is or is adjustable to be between 15 and 122 lb×in$^{-1}$, and a flexural rigidity within the range from 2,000 to 101,000 lb×in$^2$ such that the mat is self-supporting, the combination of the rigidity, the length, the width, the mat thickness, and the generally vertically oriented edge permitting the standing user with both feet positioned on opposite ends of the mat to rock the mat off the floor on one end using only the standing user's feet; and
at least a first adjustment mechanism to permit adjustment of the bending rigidity and of the flexural rigidity and also to permit adjustment of a linear center compression modulus, measured at the upper surface, to be a value within a range of 50 to 100 psi, within a range of all but a first 10% strain of an available strain, and the linear compression modulus has a given coefficient of determination value of at least 0.98.

16. The mat of claim 15 wherein the mat has a mass of less than ten pounds and is characterized by a mat thickness between 1.5 and 3 inches.

17. A mat for standing, comprising:
an upper surface that accepts a standing user when the mat is placed on a firm surface;
a length, measured across a greatest span of the upper surface, that is perpendicular to a greatest width measured across the upper surface, the length being no longer than 40.9 inches, the width being no longer than 25 inches and no shorter than 9.6 inches, the length being sufficient to permit the user to place the user's feet near opposite ends of the length; and
at least a first adjustment mechanism to permit adjustment of a linear compression modulus, measured in a center area of the upper surface, to be within a range of 40 to 100 lb×in$^{-2}$, as measured within a range of all but a first 10% strain of an available strain, and wherein the linear compression modulus has a given coefficient of determination value of at least 0.98.

18. The mat of claim 17 further comprising a front edge and a rear edge substantially opposite to the front edge, a lower surface comprising a flat region, and a rocking region positioned near the perimeter of the mat, the flat region disposed between the rocking region along the front edge and the rocking region along the rear edge wherein the flat region on the lower surface of the mat is no longer than 29.6 inches and no shorter than 13.5 inches.

19. A standing mat, comprising:
a first surface, and a second surface positioned opposite to the first surface, the first and second surfaces connected to each other by at least an edge of the mat, each surface accepting a standing user when the opposing surface is placed on a floor surface;
a length measured across a greatest span of either the first or the second surface that is perpendicular to a greatest width measured across either the first or the second surface, the length being no longer than 40.9 inches, the width being no longer than 25 inches and no shorter than 9.6 inches;
a rocking region extending around at least a portion of a perimeter of the mat; and
at least a first adjustment mechanism to permit adjustment of a linear compression modulus, measured at an upper surface corresponding to the surface opposite to the surface placed on the floor surface, over a range of all but a first 10% strain of available strain, the linear compression modulus having a given coefficient of determination value of at least 0.98,
the mat being characterized by at least one of the first surface or the second surface being substantially planar, a bending rigidity that is or is adjustable to be within a range of 15 to 122 lb×in$^{-1}$, and a flexural rigidity that is or is adjustable to be within the range from 2,000 to 101,000 lb×in$^2$, the bending rigidity and the flexural rigidity being sufficient that the rocking region permits the user with both feet positioned on opposite ends of the mat to generate a pushback force that is felt against their first foot by significantly shifting their weight to their second foot to apply downward force to the rocking region and by rocking the board off the floor on one end, using only their feet, the feeling of the pushback force encouraging the user to move more, and
wherein the rocking region is positioned along the perimeter of the mat, and wherein the edge operates to functionally extend the rocking region by at least partially collapsing and conforming to pressure applied by the feet.

20. The mat of claim 19 wherein the first adjustment mechanism permits adjustment to achieve an edge of at least 1.5 inches in height and at least one portion of the mat is gas-filled.

* * * * *

UNITED STATES PATENT AND TRADEMARK OFFICE
CERTIFICATE OF CORRECTION

| | |
|---|---|
| PATENT NO. | : 11,172,775 B2 |
| APPLICATION NO. | : 16/102588 |
| DATED | : November 16, 2021 |
| INVENTOR(S) | : Publicover et al. |

It is certified that error appears in the above-identified patent and that said Letters Patent is hereby corrected as shown below:

In the Claims

Column 131, Lines 23-24, Claim 14 "The mat of claim 11 wherein the wherein the mat is characterized by a mat thickness between 1.5 and 3 inches" should read -- The mat of claim 11 wherein the mat is characterized by a mat thickness between 1.5 and 3 inches --

Signed and Sealed this
Twelfth Day of July, 2022

Katherine Kelly Vidal
*Director of the United States Patent and Trademark Office*